US011205907B2

(12) United States Patent
Nook et al.

(10) Patent No.: US 11,205,907 B2
(45) Date of Patent: Dec. 21, 2021

(54) RECHARGEABLE BATTERY JUMP STARTING DEVICE WITH BATTERY DETECTION SYSTEM

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: THE NOCO COMPANY, Glenwillow, OH (US)

(*) Notice: Subject to any disclaimer, the term of this patent is extended or adjusted under 35 U.S.C. 154(b) by 15 days.

(21) Appl. No.: 16/648,506

(22) PCT Filed: Sep. 20, 2018

(86) PCT No.: PCT/US2018/051964
§ 371 (c)(1),
(2) Date: Mar. 18, 2020

(87) PCT Pub. No.: WO2019/060552
PCT Pub. Date: Mar. 28, 2019

(65) Prior Publication Data
US 2021/0075234 A1 Mar. 11, 2021

Related U.S. Application Data

(63) Continuation-in-part of application No. PCT/US2018/051834, filed on Sep. 20, 2018, and a
(Continued)

(51) Int. Cl.
*H01M 10/46* (2006.01)
*H02J 7/00* (2006.01)
(Continued)

(52) U.S. Cl.
CPC .......... *H02J 7/0042* (2013.01); *F02N 11/087* (2013.01); *F02N 11/0862* (2013.01); *F02N 11/0866* (2013.01); *F02N 11/12* (2013.01); *F02N 11/14* (2013.01); *G02B 6/26* (2013.01); *H01M 10/0525* (2013.01); *H01M 10/425* (2013.01); *H01M 10/4207* (2013.01); *H01M 10/44* (2013.01); *H01M 10/46* (2013.01);
(Continued)

(58) Field of Classification Search
CPC ...... H02J 7/0042; H02J 7/0034; H02J 7/0024; H02J 7/0045; H02J 7/342; H02J 7/0031; H02J 7/0047; H01M 2010/4271; H01M 10/46
USPC ................. 320/105, 107, 114, 115, 165, 104
See application file for complete search history.

(56) References Cited

U.S. PATENT DOCUMENTS

| | | | | |
|---|---|---|---|---|
| 9,007,015 B1 * | 4/2015 | Nook | .................... | H02J 7/0029 320/105 |
| 2017/0012448 A1 * | 1/2017 | Miller | .................... | H02J 7/342 |
| 2020/0295575 A1 * | 9/2020 | Nook | .................... | H02J 1/122 |

* cited by examiner

*Primary Examiner* — Edward Tso

(74) *Attorney, Agent, or Firm* — Vorys. Sater, Seymour and Pease LLP; William L. Klima

(57) ABSTRACT

A rechargeable battery jump starting device with a vehicle or equipment battery detection system. The vehicle or equipment battery detection system is configured for detecting the connection of the rechargeable battery jump starting device with the vehicle or equipment battery to be jump charged.

15 Claims, 88 Drawing Sheets

Related U.S. Application Data continuation-in-part of application No. PCT/US2018/050904, filed on Sep. 13, 2018, and a continuation-in-part of application No. PCT/US2018/049548, filed on Sep. 5, 2018, and a continuation-in-part of application No. PCT/US2018/051655, filed on Aug. 19, 2018, and a continuation-in-part of application No. PCT/US2018/042474, filed on Jul. 17, 2018, and a continuation-in-part of application No. PCT/US2018/040919, filed on Jul. 5, 2018, and a continuation-in-part of application No. PCT/US2018/035029, filed on May 30, 2018, and a continuation-in-part of application No. PCT/US2018/034902, filed on May 29, 2018.

(60) Provisional application No. 62/569,355, filed on Oct. 6, 2017, provisional application No. 62/568,967, filed on Oct. 6, 2017, provisional application No. 62/569,243, filed on Oct. 6, 2017, provisional application No. 62/568,537, filed on Oct. 5, 2017, provisional application No. 62/568,044, filed on Oct. 4, 2017, provisional application No. 62/567,479, filed on Oct. 3, 2017, provisional application No. 62/562,713, filed on Sep. 25, 2017, provisional application No. 62/561,751, filed on Sep. 22, 2017, provisional application No. 62/561,850, filed on Sep. 22, 2017.

(51) Int. Cl.

| | |
|---|---|
| ***F02N 11/12*** | (2006.01) |
| ***F02N 11/14*** | (2006.01) |
| ***H02J 1/00*** | (2006.01) |
| ***H02J 7/34*** | (2006.01) |
| ***H01M 10/42*** | (2006.01) |
| ***H01M 10/44*** | (2006.01) |
| ***F02N 11/08*** | (2006.01) |
| ***G02B 6/26*** | (2006.01) |
| ***H01M 50/531*** | (2021.01) |
| ***H01M 50/543*** | (2021.01) |
| ***H01M 10/0525*** | (2010.01) |
| *H02J 1/10* | (2006.01) |
| *B60S 5/00* | (2006.01) |

(52) U.S. Cl.

CPC ....... *H01M 50/531* (2021.01); *H01M 50/543* (2021.01); *H02J 1/00* (2013.01); *H02J 7/0003* (2013.01); *H02J 7/0024* (2013.01); *H02J 7/0031* (2013.01); *H02J 7/00032* (2020.01); *H02J 7/0034* (2013.01); *H02J 7/0045* (2013.01); *H02J 7/0047* (2013.01); *H02J 7/342* (2020.01); *B60S 5/00* (2013.01); *H01M 2010/4271* (2013.01); *H01M 2220/20* (2013.01); *H01M 2220/30* (2013.01); *H02J 1/122* (2020.01); *H02J 7/00* (2013.01); *H02J 7/00302* (2020.01); *H02J 7/00304* (2020.01)

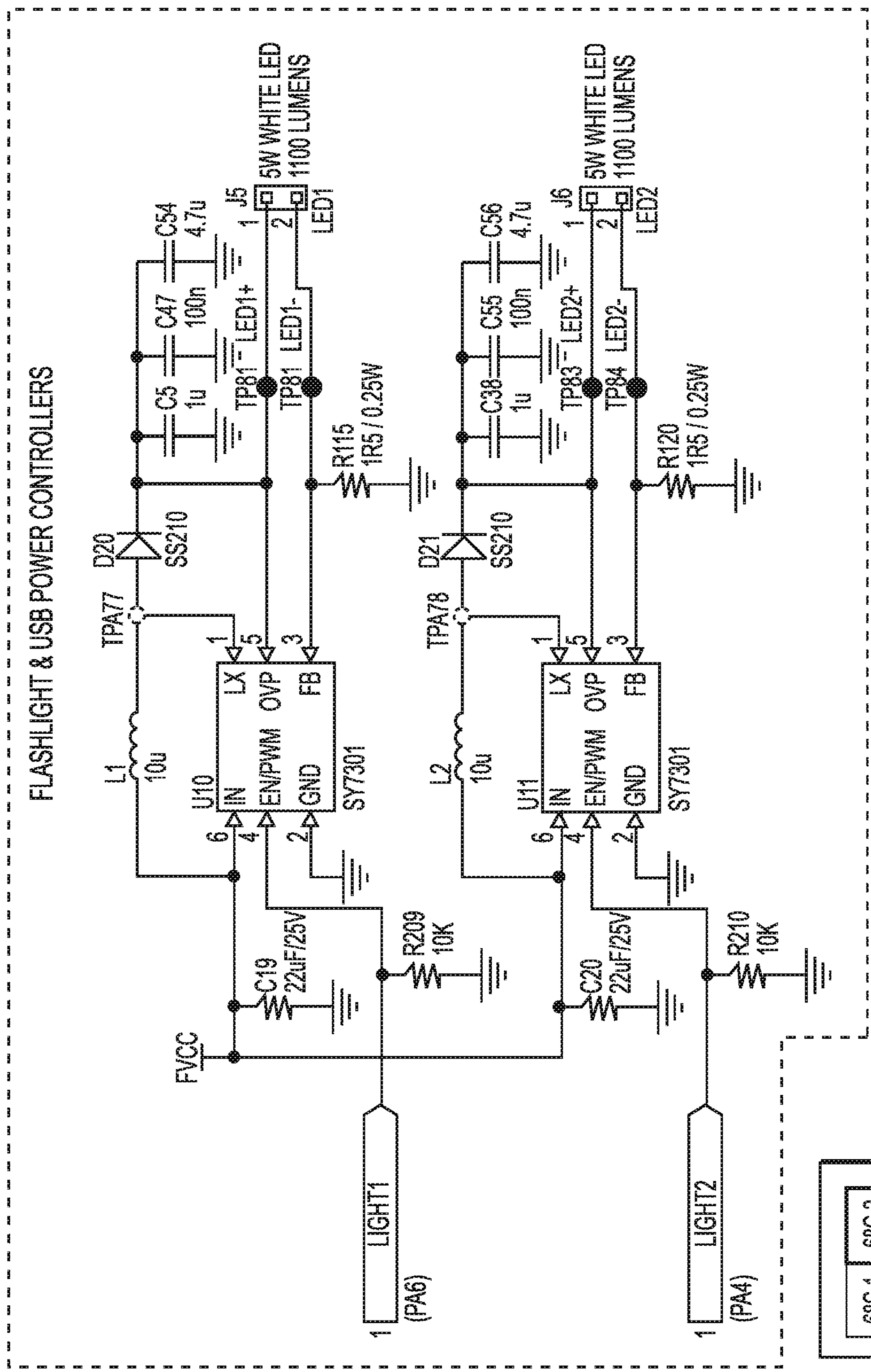
FIG. 68C-2
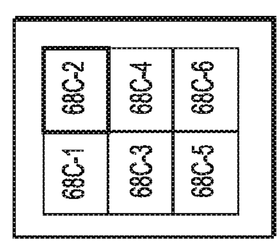

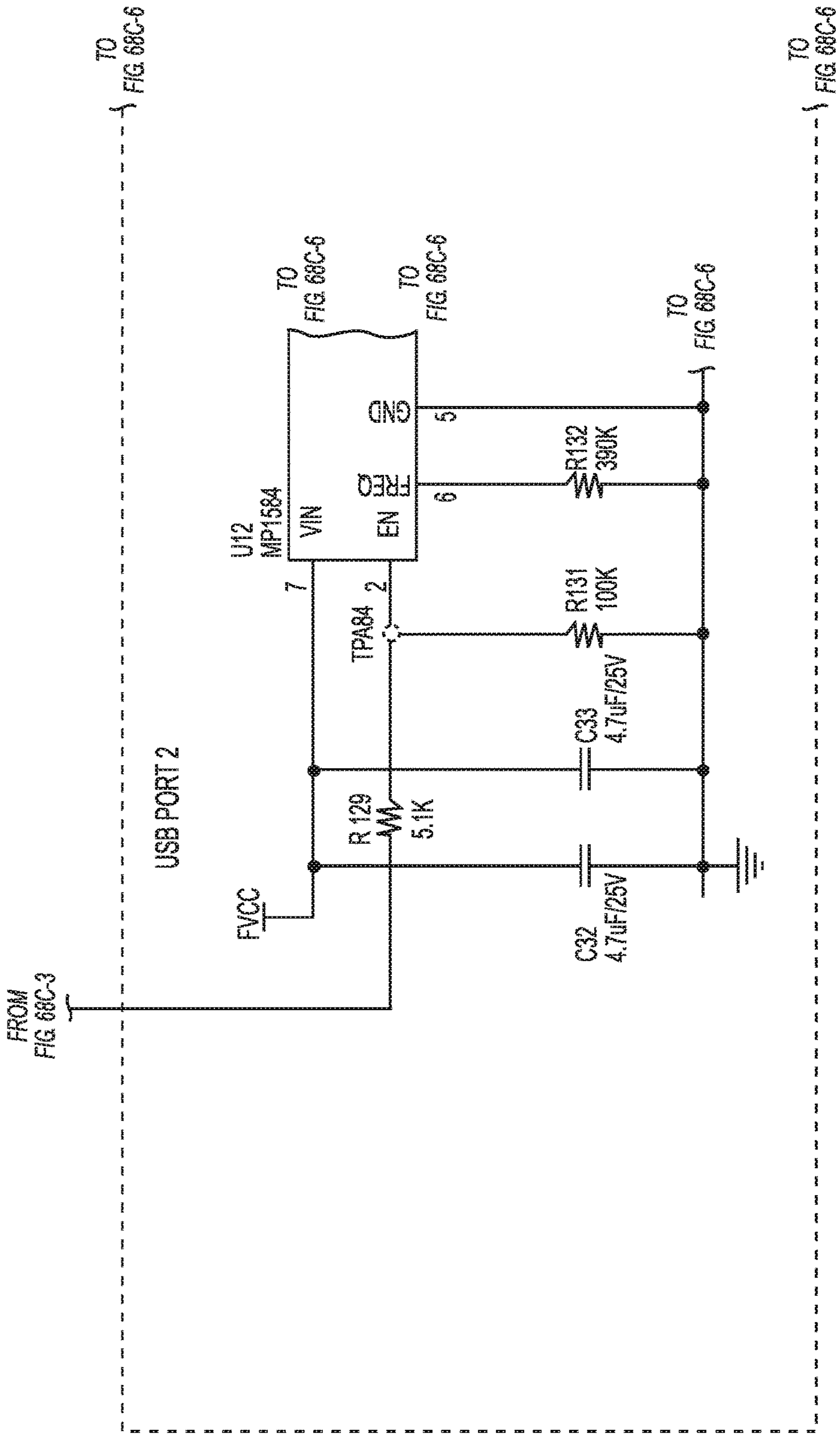
FIG. 68C-5
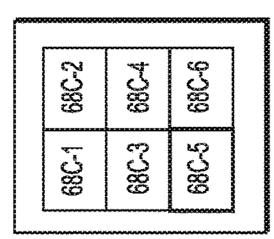

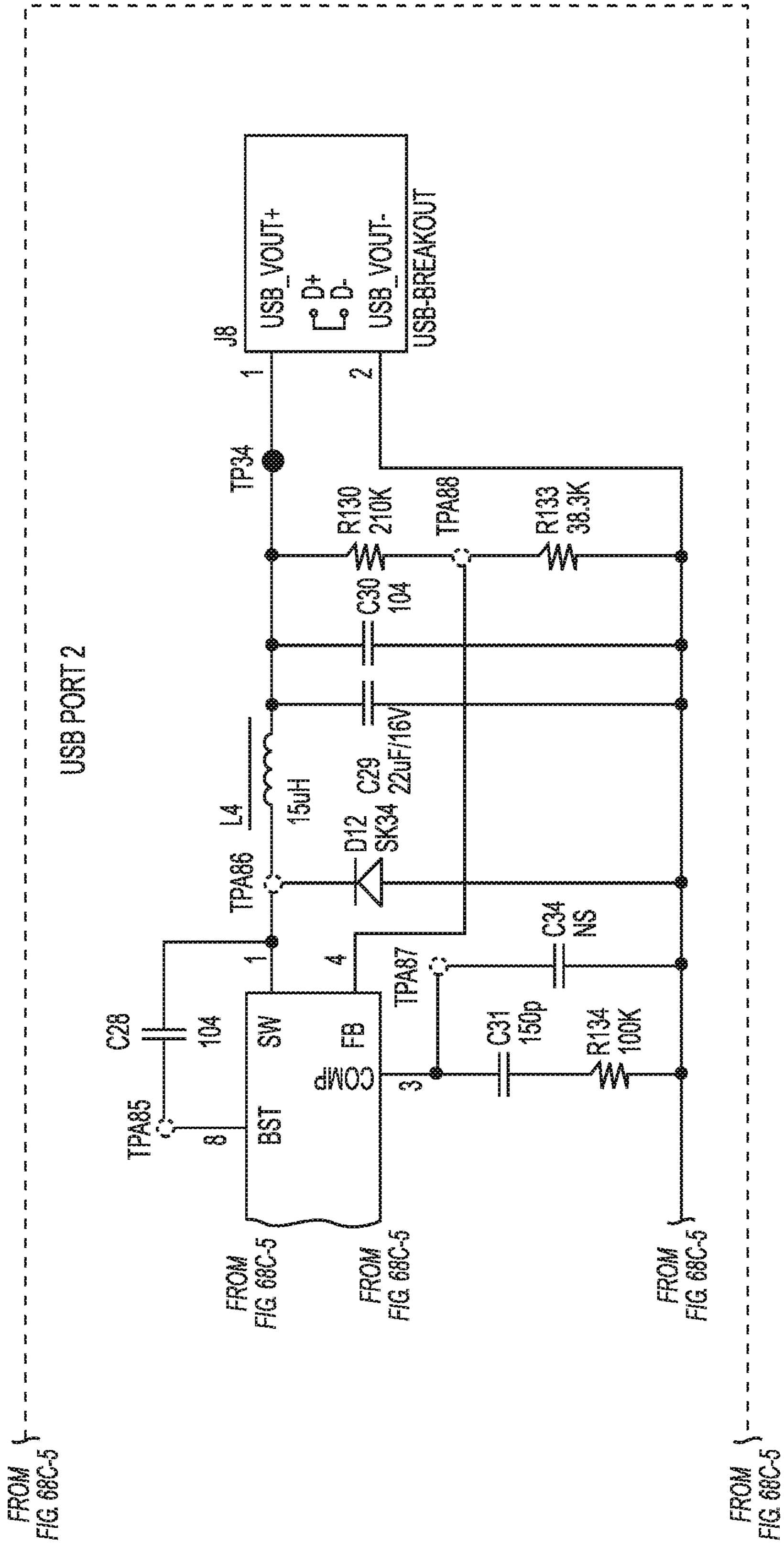
*FIG. 68C-6*
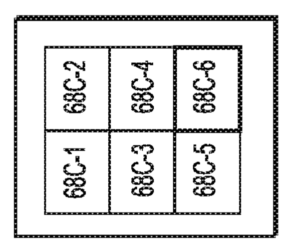

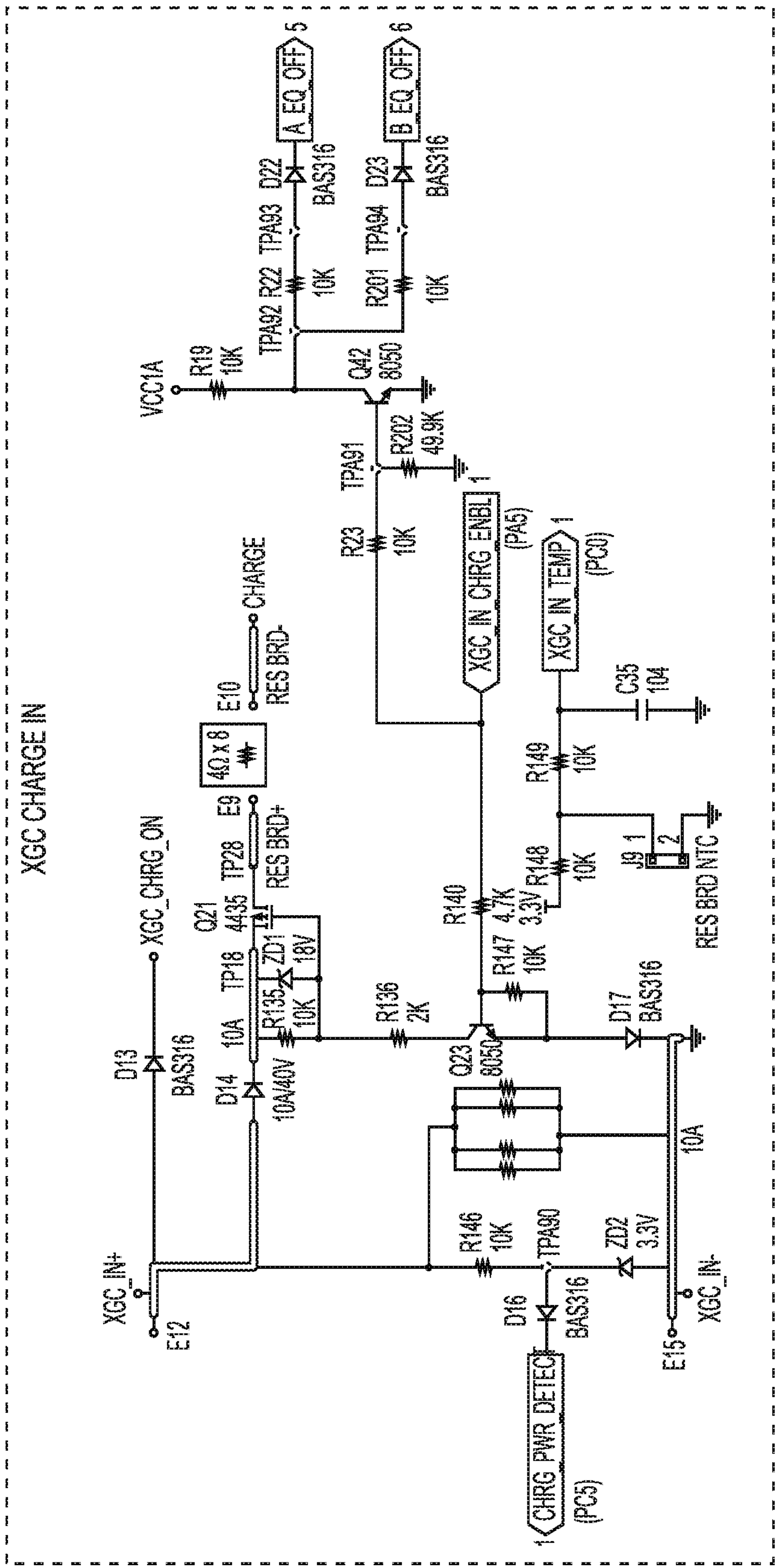
FIG. 68D-2
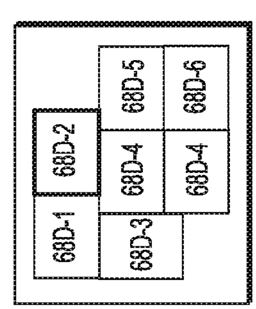

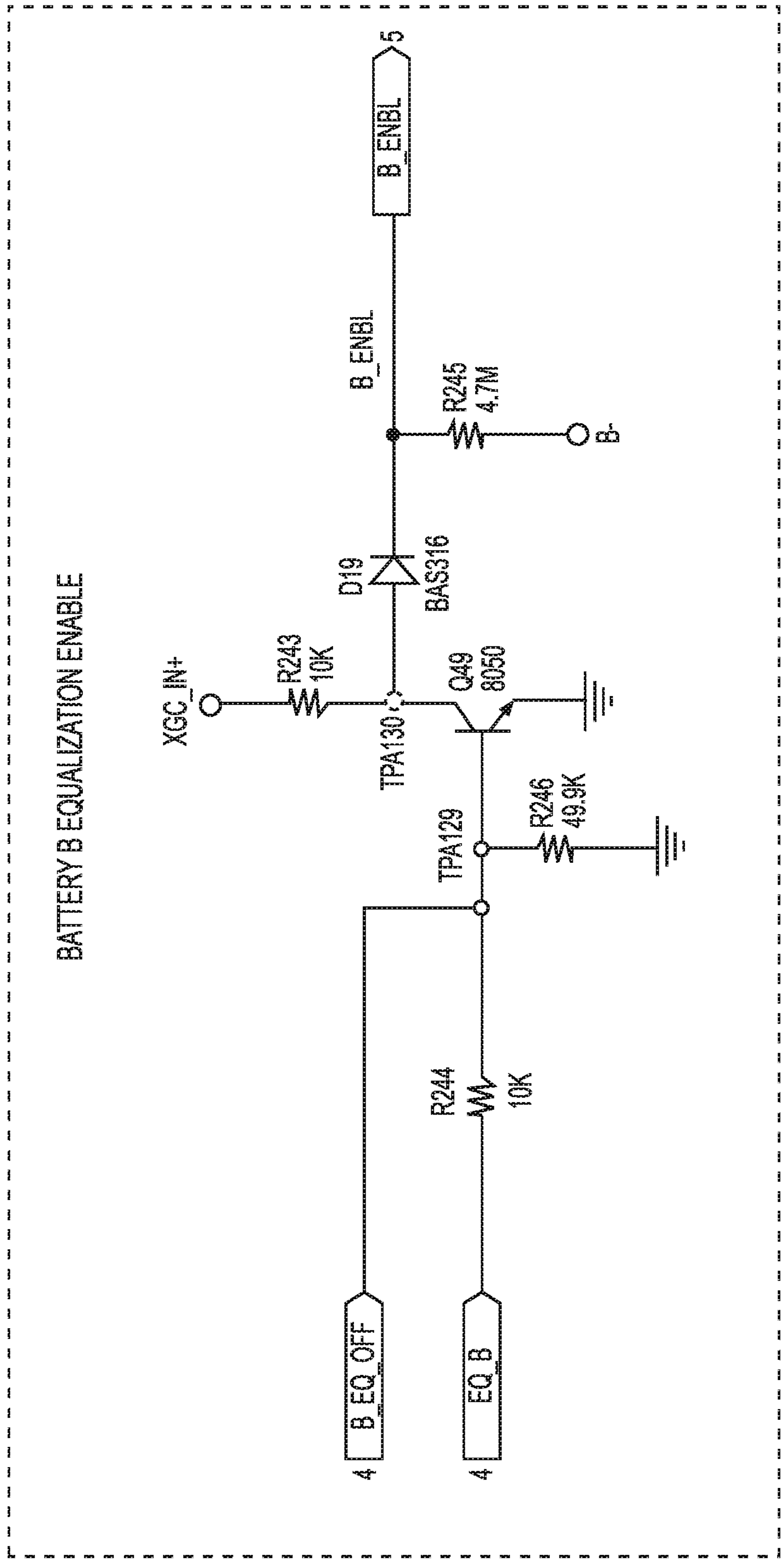
FIG. 68F-1
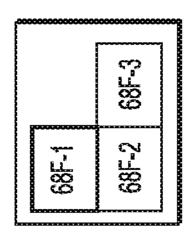

RECHARGEABLE BATTERY JUMP STARTING DEVICE WITH BATTERY DETECTION SYSTEM

RELATED APPLICATIONS

This PCT application claims priority to PCT/US2018/051834 filed on Sep. 20, 2018, PCT/US2018/051655 filed on Sep. 19, 2018, PCT/US2018/050904 filed on Sep. 13, 2018, PCT/US2018/049548 filed on Sep. 5, 2018, PCT/US2018/042474 filed on Jul. 17, 2018, PCT/US2018/040919 filed on Jul. 5, 2018, PCT/US2018/035029 filed on May 30, 2018, PCT/US2018/034902 filed on May 29, 2018, U.S. provisional application No. 62/569,355 filed Oct. 6, 2017, U.S. provisional application No. 62/569,243 filed Oct. 6, 2017, U.S. provisional application No. 62/568,967 filed Oct. 6, 2017, U.S. provisional application No. 62/568,537 filed Oct. 5, 2017, U.S. provisional application No. 62/568,044 filed Oct. 4, 2017, U.S. provisional application No. 62/567,479 filed Oct. 3, 2017, U.S. provisional application No. 62/562,713 filed Sep. 25, 2017, U.S. provisional application No. 62/561,850 filed Sep. 22, 2017, U.S. provisional application No. 62/561,751 filed Sep. 22, 2017, which are all hereby incorporated by reference herein in their entirety.

FIELD

The present invention is directed to a rechargeable battery jump starting device with a battery detection system. For example, the rechargeable battery jump starting device is a portable rechargeable battery jump starting device configured for jump starting automobiles, heavy equipment, commercial vehicles, commercial equipment, trucks, buses, commercial trucks, front loaders, dozers, back hoes, excavators, rollers, fork lift, specialized commercial equipment, logging equipment, airplanes, jets, and other battery started vehicles and equipment.

BACKGROUND

Currently, there exist battery jump starters for light duty applications such as jump starting automobiles. These light duty jump starters have a power circuit comprising battery cables connected to or connectable to the battery.

Further, there exist heavy duty battery jump starters using conventional lead acid batteries. These jump starters are very heavy in weight (e.g. hundreds of pounds) and are large dimensionally requiring same to be moved, for example, using a fork lift. The current heavy duty battery jump starters are not portable in any manner.

Thus, there exists a need for a portable heavy duty rechargeable battery jump starting device having significantly reduced weight and size to replace conventional heavy duty battery jump starters.

Further, there exists a need for a portable heavy duty rechargeable battery jump starting device having detachable positive and negative cables.

In addition, there exists a need for a portable rechargeable battery jump starting device having a master switch back light system to assist a user viewing the selectable positions of the control switch for selecting a particular operating mode of the portable rechargeable battery jump starting device in day light, sunshine, low light, and darkness.

Further, there exists a need for a portable rechargeable battery jump starting device having a 12V operational mode and a 24V operational mode.

Also, there exists a need for a portable rechargeable battery jump starting device having a dual battery diode bridge or a back-charge diode module.

Further, there exists a need for a portable rechargeable battery jump starting device having a leapfrog charging system.

In addition, there exists a need for a highly electrically conductive frame, for example, a highly electrically conductive rigid frame for use in a portable rechargeable battery jump starting device for conducting as much power as possible from the battery(ies) of the portable rechargeable battery jump starting device to a battery being jump started.

Also, there exists a need for an improved battery assembly, for example, a Li-ion battery assembly for use with an electronic device such as a rechargeable battery jump starting device.

In particular, the information in this document describes a new electronic circuit to detect the presence of a vehicle battery during the jump-start process. This invention, for example, can used or applied to an apparatus and system disclosed in U.S. Pat. No. 9,007,015 B1, fully incorporated by reference herein, and referred to as "the Patent" from here on. The terms "smart-switch", "back-charge diodes", "vehicle battery isolation sensor", "booster battery", "MCU", used in this new circuit description (see schematic on last page) refer to components in the patent described by the same names performing similar functions. Further, the new electronic circuit to detect the presence of a vehicle battery during the jump-start process can be used or applied to the rechargeable battery jump starting device disclosed herein.

Hand-held jump starters for vehicles are safer if their jumper terminals are not left "live", inadvertently, with the full jumper or booster battery potential across them, and with the capability of delivering a large amount of electrical energy in a short period of time. Such a situation may arise immediately after jump starting a vehicle or equipment, when a user is disconnecting the jumper cables from a vehicle or equipment battery, but accidently drops the jump starter, or has to walk away from the unit before getting a chance to turn it off. Live jumper terminals left unattended may pose a shock hazard or a fire hazard, if the "live" terminals get short circuited accidentally or connected through a low resistance path, for instance, moist human or animal tissue or body parts or by an electrically conductive surface (e.g. wet surface).

There exists a need for an improved device, system, and method to overcome the above issue. This improved device, system, and method detects the vehicle battery by sensing forward voltage drop across the "back-charge" diodes. If a vehicle battery is connected to jumper cables and is being charged by the internal booster battery (e.g. Li-ion battery pack(s)), then there will be forward current through the diodes, causing a positive forward voltage drop from anode to the cathode terminals of diodes.

SUMMARY

The presently described subject matter is directed to a battery jump starting device.

The presently described subject matter is directed to a new portable rechargeable battery jump starting device.

The presently described subject matter is directed to an improved battery jump starting device.

The presently described subject matter is directed to an improved portable rechargeable battery jump starting device.

The presently described subject matter is directed to a heavy duty battery jump starting device.

The presently described subject matter is directed to a heavy duty portable rechargeable battery jump starting device.

The presently described subject matter is directed to a battery jump starting device such as a portable rechargeable battery jump starting device, the device comprising or consisting of one or more batteries connected to a highly electrically conductive frame.

The presently described subject matter is directed to a battery jump starting device such as a portable rechargeable jump starting device, the device comprising or consisting of one or more rechargeable batteries connected to a highly electrically conductive frame.

The presently described subject matter is directed to a battery jump starting device such as a portable rechargeable battery jump starting device, the device comprising or consisting of one or more rechargeable batteries connected to a highly electrically conductive frame, the highly electrically conductive frame connected to or connectable to positive and negative battery cables.

The presently described subject matter is directed to a battery jump starting device such as portable rechargeable battery jump starting device, the device comprising or consisting of one or more rechargeable batteries connected to a highly electrically conductive frame, the highly electrically conductive frame connected to or electrically connectable to positive and negative battery cables.

The presently described subject matter is directed to a battery jump starting device such as a portable rechargeable battery jump starting device, the device comprising or consisting of a rechargeable battery assembly comprising or consisting of one or more rechargeable batteries connected to a highly electrically conductive frame.

The presently described subject matter is directed to a battery jump starting device such as a portable rechargeable battery jump starting device, the device comprising or consisting of a rechargeable battery assembly comprising or consisting of one or more rechargeable batteries connected to a highly electrically conductive frame, the highly electrically conductive frame connected to or connectable to positive and negative battery cables.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame.

The presently described subject matter is directed to a battery jump starting device such as a portable rechargeable battery jump starting device, the device comprising or consisting of one or more rechargeable Lithium-ion batteries ("Li-ion") connected to a highly electrically conductive frame or a high electrical current capacity frame.

The presently described subject matter is directed to a battery jump starting device such as a portable rechargeable battery jump starting device, the device comprising or consisting of two or more rechargeable batteries connected to a highly electrically conductive frame.

The presently described subject matter is directed to a battery jump starting device such as a portable rechargeable battery jump starting device, the device comprising or consisting of two or more rechargeable Li-ion batteries connected to a highly electrically conductive frame.

The presently described subject matter is directed to a battery jump starting device such as a portable rechargeable battery jump starting device, the device comprising two or more rechargeable Li-ion batteries connected to a highly electrically conductive frame.

The presently described subject matter is directed to a battery jump starting device such as a portable rechargeable battery jump starting device, the device comprising or consisting of two or more rechargeable Li-ion batteries connected to a highly electrically conductive frame or a high current capacity frame.

The presently described subject matter is directed to a battery jump starting device such as a portable rechargeable battery jump starting device, the device comprising or consisting of one or more rechargeable batteries connected to a highly electrically conductive frame at least partially surrounding the one or more batteries.

The presently described subject matter is directed to a battery jump starting device such as a portable rechargeable battery jump starting device, the device comprising or consisting of one or more rechargeable batteries connected to a highly electrically conductive rigid frame configured to at least partially surround the one or more batteries.

The presently described subject matter is directed to a battery jump starting device such as a portable rechargeable battery jump starting device, the device comprising or consisting of one or more rechargeable batteries connected to a highly electrically conductive frame configured to fully surround the one or more batteries.

The presently described subject matter is directed to a battery jump starting device such as a portable rechargeable battery jump starting device, the device comprising or consisting of one or more rechargeable batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to at least partially surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to at least partially surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable Li-ion batteries connected to a highly electrically conductive frame configured to fully surround the one or more rechargeable batteries.

The presently described subject matter is directed to a battery jump starting device such as a portable rechargeable battery jump starting device, the device comprising or consisting of one or more rechargeable batteries connected to a highly electrically conductive rigid frame.

The presently described subject matter is directed to a battery jump starting device such as a portable rechargeable battery jump starting device, the device comprising or consisting of one or more rechargeable batteries connected to a highly electrically conductive rigid frame comprising one or more conductive frame members.

The presently described subject matter is directed to a battery jump starting device such as a portable rechargeable battery jump starting device, the device comprising or consisting of one or more rechargeable batteries connected to a highly electrically conductive frame comprising one or more conductive frame members.

The presently described subject matter is directed to a battery jump starting device such as a portable rechargeable battery jump starting device, the device comprising or consisting of one or more rechargeable batteries connected to a highly electrically conductive frame comprising one or more conductors such as conductive metal plate, rod, bar, and/or tubing.

The presently described subject matter is directed to a battery jump starting device such as a portable rechargeable battery jump starting device, the device comprising or consisting of one or more rechargeable batteries connected to a highly electrically conductive frame comprising one or more conductors such as conductive copper (Cu) plate, rod, bar and/or tubing.

The presently described subject matter is directed to a battery jump starting device such as a portable rechargeable battery jump starting device, the device comprising or consisting of one or more batteries connected to a highly electrically conductive rigid frame comprising one or more rigid conductors such as conductive copper (Cu) plate, rod, bar and/or tubing.

The presently described subject matter is directed to a highly conductive cam-lock electrical connecting device.

The presently described subject matter is directed to a highly conductive cam-lock electrical connecting device for use in a battery jump starting device such as a portable rechargeable battery jump starting device.

The presently described subject matter is directed to a highly conductive cam-lock electrical connecting device in combination with a battery jump starting device such as a portable rechargeable battery jump starting device.

The presently described subject matter is directed to a highly conductive cam-lock electrical connecting device comprising or consisting of a male cam-lock end detachably connected to a female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the connecting arrangement is configured to tighten when the male cam-lock end is rotated within the female cam-lock device.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end, wherein the male cam-lock end includes an end face portion and the female cam-lock end includes an end face portion, wherein the end face portions engage each other when the cam-lock connection device is fully tightened.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the female cam-lock end is provided with an outer threaded portion and a nut for securing the rubber molded cover on the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a rubber molded cover fitted over the male cam-lock end and another rubber molded cover fitted over the female cam-lock end, wherein the male cam-lock end is provided with one or more outwardly extending protrusions cooperating with one or more inner slots in the rubber molded cover.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the slot is provided with an inner surface serving as a stop for the tooth of the pin of the female cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device, wherein the battery jump starting device comprises a highly electrically conductive rigid frame connected to one or more batteries, and wherein the female cam-lock is connected to the highly electrically conductive frame.

The presently described subject matter is directed to a highly conductive cam-lock electrical connecting device, comprising or consisting of an electrical highly conductive male cam-lock end; an electrical highly conductive female cam-lock end; and an electrical highly conductive connecting arrangement between the male cam-lock end and the female cam-lock for conducting electrical power therebetween when coupled together, further comprising a cable connected to the male cam-lock end, wherein the cable is a battery cable, including a battery jump starting device, wherein the female cam-lock end is connected to a battery jump starting device, wherein the battery jump starting device comprises a highly electrically conductive rigid frame connected to one or more batteries, and wherein the female cam-lock is connected to the highly electrically conductive frame, wherein the battery jump starting device, comprising a positive battery cable having a positive battery clamp, the positive battery cable connected to the highly electrically conductive rigid frame; and a negative battery cable having a negative battery clamp, the negative battery cable being connected to the highly electrically conductive rigid frame.

The presently described subject matter is directed to an improved electrical control switch for an electronic device The presently described subject matter is directed to an improved electrical control switch for use with a battery jump starting device such as a portable rechargeable battery jump starting device.

The presently described subject matter is directed to an improved electrical control switch in combination with a battery jump starting device such as a portable rechargeable battery jump starting device.

The present described subject matter is directed to an improved electrical control switch having a control knob provided with backlighting.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the control knob comprises a light blocking opaque portion and a clear portion or see through portion configured for serving as the light window.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising a printed circuit board located behind the control knob, the backlight being a light emitting diode (LED) mounted on the printed circuit board.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the electronic device is a battery jump starting device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump starting device comprises a cover; a first 12V battery disposed within the cover; a second 12V battery disposed within the cover; a highly electrically conductive rigid frame connected to the first 12V battery and the second 12V battery; a backlight LED for lighting up the clear portion or see through portion of the control knob, the backlight LED being mounted on the printed circuit board; a positive cable having a positive clamp, the positive cable connected to the battery; a negative cable having a negative clamp, the negative cable connected to the highly electrically conductive rigid frame; and a printed circuit board disposed within the cover, wherein the control switch extends through the cover, the control switch being electrically connected to the highly electrically conductive rigid frame, the control knob configured to selectively rotate between a 12V operating position and a 24V operating position, the control switch configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, wherein the system is configured to light up the backlight when the system is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for selectively displaying a voltage mode of operation of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for variably displaying the real time operating voltage of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an interface disposed behind the control knob, wherein the interface comprises a membrane label, wherein the interface comprises one or more backlight indicators, and wherein the one or more backlight indicators are configured for lighting up when the device is turned on.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame, wherein the battery is a first 12V battery and a second 12V battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, wherein the jump staring device comprises a cover; a battery disposed within the cover; a positive cable having a positive clamp, the positive cable connected to the battery; and a negative cable having a negative clamp, the negative cable connected to the highly electrically conductive rigid frame, wherein the battery is a Li-ion battery.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode, and further comprising an interface disposed between the control knob and the cover of the device.

The presently described subject matter is directed to an electrical control switch backlight system, comprising or consisting of an electrical control switch having a control knob, the control knob having a light window; and a backlight positioned behind the control knob for lighting up the light window of the control switch when the backlight is turned on, further comprising an electronic device, the control switch being mounted on the electronic device, the electronic device being a battery jump charging device comprising a cover; a first 12V battery disposed within the cover; a second 12V battery disposed within the cover; a positive cable having a positive clamp, the positive cable connected to the battery; and a negative cable having a negative clamp, the negative cable connected to the highly electrically conductive rigid frame, wherein the control switch extends through the cover, the control switch electrically connected to the first 12V battery and the second 12V battery, the control knob configured to selectively rotate between a 12V operating position and a 24V operating position, the control switch configured to selectively operate the device in a 12V mode or 24V mode, further comprising a highly electrically conductive rigid frame electrically connected to the first 12V battery, second 12V battery, and the control switch, and configured to selectively operate the device in a 12V mode or 24V mode, and further comprising an interface disposed between the control knob and the cover of the device, wherein the interface comprises a 12V backlight indicator and a 24V backlight indicator, the device configured to selectively turn on the 12V backlight indicator or 24V backlight indicator when a 12V or 24V mode of operation is selected by rotating the control know of the control switch.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights, and wherein the at least two visual indicators are provided by at least two light windows through the display located at the different positions, respectively, the at least two visual indicators selectively light up when the control knob is selectively rotated to one of the different positions on the interface by one of the at least two backlights.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface is provided with at least two visual indicators each located at the different positions, respectively, to indicate different operating modes of the device, the at least two visual indicators are configured to selectively light up when the control knob is selectively rotated to one of the different positions on the interface by one of the at least two backlights, wherein the at least two visual indicators are provided by at least two light windows through the display located at the different positions, respectively, the at least two visual indicators selectively light up when the control knob is selectively rotated to one of the different positions on the interface by one of the at least two backlights, and wherein one of the at least two visual indicators is the symbol 12V to indicate a 12 volt operation mode of the device and another of the at least two visual indicators is the symbol 24V to indicate a 24 volt operation mode of the device.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface comprises a printed circuit board located on or adjacent to a back side of the interface, the interface having at least two lights located at the different positions on the interface.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the interface comprises a printed circuit board located on or adjacent to a back side of the interface, the interface having at least two lights located at the different positions on the interface, and wherein the at least two backlights are at least two light emitting diodes (LEDs) connected to the printed circuit board.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the control knob comprises a light blocking opaque portion having a clear portion or see through portion configured to serve as the light window.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising: a first 12V battery disposed within the cover; a second 12V battery disposed within the cover; a highly conductive frame having a positive conductive pathway and a negative conductive pathway, the highly conductive frame electrically is selectively connected to the first 12V battery and/or the second 12V battery when the device is jump charging a battery to be charged; a positive battery cable having a positive battery clamp, the positive battery cable connected to the positive conductive pathway of the highly conductive frame; and a negative battery cable having a negative battery clamp, the negative battery cable connected to the negative conductive pathway of the highly conductive rigid frame, wherein the control switch is connected to the highly conductive frame to selectively operate the first 12V battery and/or the second 12V battery, the control knob configured to rotate between a 12V operating mode position and a 24V operating mode position to selectively operate the device in a 12V mode or 24V mode.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the device is configured to light up one of the at least two backlights on the interface when the device is turned on.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the interface is configured to display an real time operating voltage of the device during operation of the device.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising: a first 12V battery disposed within the cover; a second 12V battery disposed within the cover; a highly conductive frame having a positive conductive pathway and a negative conductive pathway, the highly conductive frame electrically is selectively connected to the first 12V battery and/or the second 12V battery when the device is jump charging a battery to be charged; a positive battery cable having a positive battery clamp, the positive battery cable connected to the positive conductive pathway of the highly conductive frame; and a negative battery cable having a negative battery clamp, the negative battery cable connected to the negative conductive pathway of the highly conductive rigid frame, wherein the control switch is connected to the highly conductive frame to selectively operate the first 12V battery and/or the second 12V battery, the control knob configured to rotate between a 12V operating mode position and a 24V operating mode position to selectively operate the device in a 12V mode or 24V mode, wherein the first 12V battery and second 12V battery are Li-ion batteries.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, and wherein the control knob is made of an opaque material and the light window is defined by a slot in the control knob filled light transmitting material.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the control knob is made of an opaque material and the light window is defined by a slot in the control knob filled light transmitting material, wherein the control knob comprises a round outer edge, and wherein the slot is a radially oriented slot extending from the outer edge of the control knob inwardly.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, wherein the control knob is made of an opaque material and the light window is defined by a slot in the control knob filled light transmitting material, wherein the control knob comprises a round outer edge, wherein the slot is a radially oriented slot extending from the outer edge of the control knob inwardly, and wherein the control knob comprises a finger gripping protrusion, and wherein the slot extends along a length axis of the protrusion.

The presently described subject matter is directed to a rechargeable battery jump starting device, comprising: a cover; a power source disposed within the cover; an interface mounted on the cover; at least two backlights located at different positions on the interface, the backlights are selectively powered by the power source; an electrical control switch mounted on the interface, the electrical control switch rotatable between the different positions on the interface; a control knob mounted on the electrical control switch, the control knob rotatable between the different positions on the interface, the control knob having a light window, wherein the light window of the control knob lights up when the control knob is selectively rotated to one of the different positions on the interface by one of the at least two backlights, further comprising an electrical switch located between the power source and the at least two backlights, the electrical switch is configured to light up one of the at least two backlights when the control knob is selectively rotated to one of the different positions on the interface.

The presently described subject matter is directed to an electrical optical position sensing switch system for an electronic device.

The presently described subject matter is directed to an improved electrical optical position sensing switch system for use in a battery jump starting device such as a portable rechargeable jump starting device.

The presently described subject matter is directed to an improved electrical optical position sensing switch system in combination with a battery jump starting device such as a portable rechargeable jump starting device.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state, wherein the circuit is configured so that when the transistor is "on", current flows from the first battery to the second battery when the batteries are connected in parallel.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, further comprising an enable circuit configured to reduce parasite current when the system is in an "off" state, wherein the circuit comprises a transistor acting as an electrical switch when the system is in an "on" state, wherein the circuit is configured so that when the transistor is "on", current flows from the first battery to the second battery when the batteries are connected in parallel, wherein the circuit is configured so that no current flows from the first battery to the second battery when the batteries are connected in series.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in.

The presently described subject matter is directed to an electrical optical position sensing switch system, comprising a first 12V battery; a second 12V battery; an electrical control switch electrically connected to the first 12V battery and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the electrical control switch; and an optical coupler electrically connected to the microcontroller, the optical coupler providing a signal to the microcontroller for indicating the position of the electrical control switch, wherein the circuit is configured so that when there is current flow or lack thereof, this allows the optical coupler to provide a signal to the microcontroller indicating to the microcontroller which position the control switch is in, wherein the circuit is configured so that an opposite signal is provided as a separate input to the microcontroller so that the microcontroller can determine when the control switch is an "in between" position between a 12V position and a 24V position.

The presently described subject matter is directed to an electronic device with a dual battery diode bridge system.

The presently described subject matter is directed to a rechargeable battery jump starting device with a dual battery diode bridge system.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a conductive frame connected to the first 12V battery, the second 12V battery, and the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a conductive frame connected to the first 12V battery, the second 12V battery, and the electrical control switch, wherein the conductive frame comprises a plurality of conductive frame members.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member, wherein the center frame member is connected to a positive battery cable.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein the dual battery diode bridge is a back-charge diode module, and wherein the back-charge diode module comprises a first channel of diodes accommodating current flow through the first 12V battery, and a second channel of diodes accommodating current flow through the second 12V battery, further comprising a conductive frame connected to the first 12V battery, the second 12V battery, and the electrical control switch, wherein the conductive frame comprises a plurality of conductive frame members, wherein the back-charge diode module comprising an upper frame member, lower frame member, and a center frame member located between the upper frame member and lower frame member and spaced apart from each other, the first channel of diodes are connected between the upper frame member and center frame member, the second channel of diodes are connected between the lower frame member and the center frame member, wherein the center frame member is connected to a positive battery cable, wherein the center frame member is connected to a positive cam lock configured for releasably connecting the positive battery cable to the positive cam lock.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, further comprising a smart switch connected to the first 12V battery and the second 12V battery, the smart switch configured for switching on current flow from the first 12V battery and/or the second 12V battery only upon detecting that the positive battery clamp and negative battery clamp are correctly connected to the correct polarity battery terminals of the vehicle battery being jump started.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a negative terminal of the first 12V battery is permanently connected to the smart switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a negative terminal of the first 12V battery is permanently connected to the smart switch, and wherein the negative terminal of the second 12V battery is selectively connected to the smart switch via the electrical control switch.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a positive terminal of the second 12V battery is permanently connected to the back-charge diode bridge.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a back-charge diode bridge connected to the first 12V battery and the second 12V battery, the back-charge diode module configured for protecting against a back-charge to the first 12V battery and/or the second 12V battery after a vehicle battery has been jump charged, wherein a positive terminal of the second 12V battery is permanently connected to the back-charge diode bridge, and wherein a positive terminal of the first 12V battery is selectively connected to the back-charge diode bridge via the electrical control switch.

The presently described subject matter is directed to a portable battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein dual battery diode bridge is a back-charge diode module.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the highly electrically conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein the back-charge diode module comprises an upper channel of diodes supporting current through the first 12V battery and a lower channel of diodes supporting current through the second 12V battery, wherein the upper channel of diodes and lower channel of diodes are connected to a bar of the highly electrically conductive frame leading to a positive output of the battery jump starting device for combining current from the upper channel of diodes and lower channel of diodes.

The presently described subject matter is directed to a battery jump starting device such as a portable rechargeable battery jump starting device, the device comprising or consisting of a first 12V battery; a second 12V battery; a highly electrically conductive frame connected to the first 12V battery and second 12V battery; an electrical control switch electrically connected to the conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; a microcontroller electrically connected to the highly electrically conductive frame; and a dual battery diode bridge connected to the highly electrically conductive frame, the dual battery diode bridge having two channels of diodes supporting the first 12V battery and the second 12V battery for protecting against back-charge after jump starting a vehicle, wherein dual battery diode bridge is a back-charge diode module, wherein the back-charge diode module comprises an upper conductive bar electrically connected to the upper channel of diodes, a lower conductive bar electrically connected to the lower channel of diodes, and a center conductive bar located between the upper conductive bar and lower conductive bar and electrically connected to both the upper channel of diodes and lower channel of diodes.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or a conductive frame, the charger configured for sequentially charging the first 12V battery and the second 12V battery.

The presently described subject matter is directed to a portable battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is operated to first charge the first 12V battery or second 12V battery, whichever has the lowest voltage or charge.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to incrementally charge the first 12V battery and the second 12V battery to maintain the first 12V battery and second 12V battery closed to the same potential during the charging sequence, wherein the charger is operated to first charge the first 12V battery or second 12V battery, whichever has the lowest voltage or charge.

The presently described subject matter is directed to a portable battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in fixed voltage increases.

The presently described subject matter is directed to a battery jump starting device, the portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in varying voltage increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in random voltage increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in fixed voltage increases, wherein the charger is configured to sequentially charge the first 12V battery and second 12V battery incrementally in 100 millivolt (mV) increases.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is operated to first charge the first 12V battery or second 12V battery, whichever has the lowest voltage or charge, wherein voltage charging increments are a portion or fraction of a total voltage charge required to fully charge the first 12V battery or second 12V battery.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, further comprising a programmable microcontroller electrically connected to the charger for controlling operation of the charger.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, further comprising a peak voltage shutoff to prevent overcharging the first 12V battery and second 12V battery.

The presently described subject matter is directed to a battery jump starting device such as a portable rechargeable battery jump starting device, the device comprising or consisting of a first 12V battery; a second 12V battery; a conductive wiring assembly or conductive frame connected to the first 12V battery and second 12V battery; an electrical control switch electrically connected to the conductive wiring or conductive frame, first 12V battery, and second 12V battery, the electrical control switch having a parallel switch position for connecting the first 12V battery and second 12V battery in parallel, the electrical control switch having a series switch position for connecting the first 12V battery and second 12V battery in series; and a charger connected to the conductive wiring assembly or conductive frame, the charger configured for sequentially charging the first 12V battery and the second 12V battery, wherein the charger is configured to sequentially charge the first 12V battery and second 12V battery incrementally in varying voltage increases, wherein the programmable microcontroller is configured to provided charge timeouts.

The presently described subject matter is directed to a leapfrog charging system and method for an electronic device.

The presently described subject matter is directed to a leapfrog charging system and method for use in a battery jump starting device such as a portable rechargeable battery jump starting device.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charge sequence is an incremental charge sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charge sequence is an incremental charge sequence, wherein the incremental charge sequence charges the first 12V battery or second 12V battery in increments less than a total charge increment to fully charge the first 12V battery or second 12V battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence is a back-and-forth charging sequence between the first 12V battery and second 12V battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence includes back-to-back charges of a same battery of the first 12V battery and second 12V battery two or more times prior to sequencing to the other battery.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the sequence is a programmed sequence.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the charging sequence includes one or more charging pauses.

The presently described subject matter is directed to a leapfrog charging system and method for an electronic device having at least a first rechargeable battery and second rechargeable battery, comprising or consisting of selectively charging the first rechargeable battery and second rechargeable battery in a charge sequence, wherein the sequence is a programmed sequence, wherein charging time increments, voltage increase amounts, and charging rates are all adjustable in the programmed sequence.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the charger configured for sequentially charging the first 12V battery and the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to incrementally charge the first 12V battery and the second 12V battery to maintain the first 12V battery and second 12V battery close to the same potential during sequentially charging the first 12V battery and the second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charger is configured to first charge the first 12V battery or second 12V battery, whichever has the lowest voltage or charge.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leap frog charger is configured to sequentially charge the first 12V battery and second 12V battery incrementally in fixed voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, and wherein the leapfrog charger is configured to sequentially charge the first 12V battery and second 12V battery incrementally in varying voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to sequentially charge the first 12V battery and second 12V battery incrementally in random voltage increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the leapfrog charger is configured to sequentially charge the first 12V battery and second 12V battery incrementally in 100 millivolt (mV) increases.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein voltage charging increments are a portion or fraction of a total voltage charge required to fully charge the first 12V battery or second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, further comprising a programmable microcontroller electrically connected to the leapfrog charger for controlling operation of the charger.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; a leapfrog charger connected to the first 12V battery and second 12V battery, the leapfrog charger configured for sequentially charging the first 12V battery and the second 12V battery; and, a programmable microcontroller electrically connected to the leapfrog charger for controlling operation of the charger, wherein the programmable microcontroller is configured to provided charge timeouts.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; a leapfrog charger connected to the first 12V battery and second 12V battery, the leapfrog charger configured for sequentially charging the first 12V battery and the second 12V battery; and a peak voltage shutoff to prevent over-charging the first 12V battery and second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence is a back-and-forth charging sequence between the first 12V battery and second 12V battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence is a back-and-forth charging sequence between the first 12V battery and second 12V battery, and wherein the charging sequence includes back-to-back charges of a same battery of the first 12V battery and second 12V battery two or more times prior to sequencing to the other battery.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein the charging sequence includes one or more charging pauses.

The presently described subject matter is directed to a rechargeable battery jump starting device having a back-charge diode system, the device comprising or consisting of a first 12V battery; a second 12V battery; an electrical control switch electrically connected to the first 12V battery and the second 12V battery, the electrical control switch having a parallel switch position for connecting the first 12V battery and second 12V battery in parallel, the electrical control switch having a series switch position for connecting the first 12V battery and second 12V battery in series; and a leapfrog charger connected to the first 12V battery and second 12V battery, the leapfrog charger configured for sequentially charging the first 12V battery and the second 12V battery, wherein charging time increments, voltage increase amounts, and charging rates are all adjustable in a programmed sequence.

The presently described subject matter is directed to a highly conductive frame for use in an electronic device.

The presently described subject matter is directed to a highly conductive frame for use with or part of a battery assembly of an electronic device.

The presently described subject matter is directed to a highly conductive frame for use in a battery jump starting device such as a portable rechargeable battery jump starting device.

The presently described subject matter is directed to a highly conductive frame in combination with a battery jump starting device such as a portable rechargeable battery jump starting device.

The presently described subject matter is directed to a highly conductive frame for connecting a battery to positive and negative cables for use in a battery jump starting device such as a portable rechargeable battery jump starting device.

The presently describe subject matter is directed to a battery assembly comprising or consisting of a battery connected to a highly conductive frame.

The presently describe subject matter is directed to a battery assembly comprising or consisting of a battery connected to a highly conductive frame for use in a battery jump starting device such as a portable rechargeable battery jump starting device.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is semi-rigid.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is rigid.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame is a three-dimensional (3D) frame structure.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members connected together.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes at least one through hole located at one or more ends of the at least one conductive frame member.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one of the multiple highly conductive frame member includes at least one through hole, wherein the at least one through hole is located at one end of the highly conductive frame member, wherein adjacent highly conductive frame members are fastened together using a highly conductive bolt and nut fastener.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one frame member is provided with at least one flattened end having a through hole.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein at least one conductive frame member includes a through hole, wherein the at least one frame member is provided on at least one end with a ring-shaped through hole.

The presently described subject matter is directed to a battery jump starting device such as a portable rechargeable jump starting device, the device comprising or consisting of a first 12V battery; a second 12V battery; and a highly conductive frame connected to the first 12V battery and second 12V battery, wherein other electrical components of the portable jump starting device bolt onto the highly conductive frame.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, further comprising an electrical control switch electrically connected to the highly conductive frame, the first 12V battery, and the second 12V battery, the electrical control switch having a parallel switch position for connecting the first 12V battery and second 12V battery in parallel, the electrical control switch having a series switch position for connecting the first 12V battery and second 12V battery in series, wherein the control switch bolts onto the highly conductive frame.

The presently described subject matter is directed to a battery jump starting device such as a portable rechargeable battery jump starting device, the device comprising or consisting of a first 12V battery; a second 12V battery; and a highly conductive frame connected to the first 12V battery and second 12V battery, wherein the highly conductive frame comprises multiple highly conductive frame members, wherein the highly conductive frame members are made of flat metal stock material.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are one or more selected from the group of electrically conductive bars, plates, rods, and tubes.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are flat conductive bars having one or more bends along a length of the conductive frame members.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are located adjacent to sides of the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, wherein the electrically conductive frame members are located adjacent to sides of the rechargeable battery, and, wherein the electrically conductive frame at least partially surround the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the electrically conductive frame comprises electrically conductive frame members connected together, and wherein the electrically conductive frame members are each provided with a through hole located in at least one end of the respective frame member for accommodating a fastener for connecting the electrically conductive frame members together or connecting the respective frame member to an electrical component.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the positive conductive frame is connected to a positive cam-lock for removably connecting with the positive cable and the negative conductive frame is connected to a negative cam-lock for removably connecting with the negative cable.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, and wherein the positive electrically conductive bar and negative electrically conductive bar are both oriented transversely relative to a length of the one or more rechargeable battery cells.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, wherein the positive electrically conductive bar and negative electrically conductive bar are both oriented transversely relative to a length of the one or more rechargeable battery cells, and wherein the electrically conductive bars are wider relative to a width of the one or more rechargeable battery cells and each protrudes from a side of the rechargeable battery assembly.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, wherein the rechargeable battery is a rechargeable battery assembly comprising one or more rechargeable battery cells, a positive electrically conductive bar connected to the positive terminal of the rechargeable battery, and a negative electrically conductive bar connected to the negative terminal of the rechargeable battery, and wherein the positive electrically conductive bar and negative electrically conductive bar are each provided with a through hole for connection with the electrically conductive frame.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, further comprising a switch connected between the negative conductor bar and the negative cable for selectively electrically connecting the negative conductor bar to the negative cable during operation of the rechargeable battery jump starting device.

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of the rechargeable battery and a negative conductive frame connected at one end to the negative terminal of the rechargeable battery; a positive battery cable having one end connected during operation of the rechargeable battery jump starting device to an opposite end of the positive conductive frame; a negative battery cable having one end connected during operation of the rechargeable battery jump starting device to the opposite end of the negative conductive frame; a positive battery clamp connected to an opposite end of the positive cable; and a negative battery clamp connected to an opposite end of the negative cable, further comprising a switch connected between the negative conductor bar and the negative cable for selectively electrically connecting the negative conductor bar to the negative cable during operation of the rechargeable battery jump starting device, wherein the switch is a smart switch for electrically connecting the negative conductor bar to the negative cable only upon detecting that the positive battery clamp and negative battery clamp are correctly connected to the correct polarity terminal of the vehicle battery being jump started (i.e. positive battery clamp connected to positive vehicle battery terminal and negative battery clamp connected to negative vehicle battery terminal).

The presently described subject matter is direct to a rechargeable battery jump starting device, the device comprising or consisting of a rechargeable battery having a positive terminal and a negative terminal; an electrically conductive frame comprising a positive conductive frame connected at one end to the positive terminal of rechargeable battery assembly and a negative conductive frame connected at one end to the negative terminal of the rechargeable battery assembly; a positive cam-lock connected to an opposite end of the positive conductive frame; a negative cam-lock connected to an opposite end of the negative conductive frame; a positive battery cable removably connected at one end to the positive cam-lock; a negative battery cable removably connected at one end to the negative cam-lock; a positive battery clamp connected to an opposite end of the positive cable; and a negative battery clamp connected to an opposite end of the negative cable.

The presently described subject matter is directed to a battery assembly for an electronic device.

The presently described subject matter is directed to a battery assembly for use in an electronic device.

The presently described subject matter is directed to a battery assembly for use in a battery jump starting device such as a portable rechargeable battery jump starting device.

The presently described subject matter is directed to a battery assembly in combination with a battery jump starting device such as a portable rechargeable battery jump starting device.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive highly conductive member and negative highly conductive member are both oriented transversely relative to a length of the positive and negative foil, respectively, wherein the highly conductive members are wider than the positive and negative foil, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are oriented flat against opposite ends of the at least one battery cell.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are provided with a through hole for connection with the electronic device using a bolt and nut fastener.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the highly conductive members are made from plate or bar type material.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil at least partially wraps around the positive highly conductive member, and the negative foil at least partially wraps around the negative highly conductive member, wherein the positive foil and negative foil fully wrap around the positive highly conductive member and the negative highly conducive member, respectively.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the positive foil is soldered or welded to the positive highly conductive member and the negative foil is soldered or welded to the negative highly conductive member.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the at least one battery cell is multiple battery cells layered one on top of the other.

The presently described subject matter is directed to a battery assembly for use in an electronic device such as a battery jump starting device, the device comprising or consisting of at least one battery cell having a positive foil end and a negative foil end; a positive highly conductive member connected to the positive foil; and a positive highly conductive member connected to the positive foil, wherein the battery assembly is covered with heat shrink material.

The presently described subject matter is directed to a rechargeable battery jump starting device comprising or consisting of a power circuit including a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; and an electrically conductive frame connected to the battery assembly.

The presently described subject matter is directed to a rechargeable battery jump starting device comprising or consisting of a power circuit including a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; and an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable.

The presently described subject matter is directed to a rechargeable battery jump starting device comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable.

The presently described subject matter is directed to a rechargeable battery jump starting device comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises a positive conductive pathway from the positive terminal connector of the battery assembly to the connection with the positive battery cable and a negative conductive pathway from the negative terminal connector of the battery assembly to the connection with the negative battery cable.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bars are both oriented transversely relative to a length of the one or more rechargeable battery cells.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bars are both oriented transversely relative to a length of the one or more rechargeable battery cells, and wherein the electrically conductive bars are wider relative to a width of the one or more rechargeable battery cells and each protrude from a side of the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein a side of the positive electrically conductive bar is connected flat against the positive foil end of the one or more battery cells and a side of the negative electrically conductive bar is connected flat against the negative foil end of the one or more batteries.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive electrically conductive bar and negative electrically conductive bar are each provided with a through hole for connection with the electrically conductive frame.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells, wherein the positive foil end at least partially wraps around the positive electrically conductive bar, and the negative foil end at least partially wraps around the negative electrically conductive bar.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive terminal connector is a positive foil end of the one or more rechargeable battery cells and the negative terminal connector is a negative foil end of the one or more rechargeable battery cells, wherein the positive foil end at least partially wraps around the positive electrically conductive bar, and the negative foil end at least partially wraps around the negative electrically conductive bar, wherein the positive foil end fully wraps around the positive electrically conductive bar and the negative foil end fully wraps around the negative electrically conducive bar of the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the positive foil end is soldered or welded to the positive electrically conductive bar and the negative foil end is soldered or welded to the negative electrically conductive bar.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the one or more battery cells are multiple battery cells connected in series and layered one on top of the other to provide the rechargeable battery assembly.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the layered multiple battery cells are covered with heat shrink material.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises multiple electrically conductive frame members connected together.

The presently described subject matter is directed to a rechargeable battery jump starting device, comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector; an electrically conductive frame connected to the battery assembly; a positive battery cable connected to the highly conductive frame; a negative battery cable connectable to the highly conductive frame; a positive battery clamp connected to the positive cable; and a negative battery clamp connected to the negative cable, wherein the electrically conductive frame comprises multiple electrically conductive frame members connected together, wherein the frame members are electrically conductive bars bent along multiple axes.

The presently described subject matter is directed to a rechargeable battery assembly for use in a rechargeable jump starting device, the rechargeable battery assembly comprising or consisting of a rechargeable battery assembly comprising one or more rechargeable battery cells having a positive terminal connector, a negative terminal connector, a positive electrically conductive bar connected to the positive terminal connector, and a negative electrically conductive bar connected to the negative terminal connector.

The presently described subject matter is directed to a rechargeable battery jump starting device with an improved vehicle or equipment battery detection device.

The presently described subject matter is directed to a rechargeable battery jump charging device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a “high” signal, allowing the jump starter to continue normal operation.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a “high” signal, allowing the jump starter to continue normal operation, and wherein, if the voltage is above the threshold, then internal jumper battery terminals continue being connected to the jumper cables through a smart-switch and the “back-charge” diodes and an internal battery negative terminal remains connected to a negative jumper cable.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a “high” signal, allowing the jump starter to continue normal operation, and wherein, if the forward voltage drop sensed is below a certain threshold, then the comparator puts out a “low” signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the vehicle or equipment battery positive terminal connector is a positive battery clamp and the vehicle or equipment battery positive terminal connector is a negative battery clamp.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a smart switch selectively connecting the negative terminal of the first rechargeable battery and the vehicle or equipment negative terminal battery connector.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the vehicle or equipment battery positive terminal connector is a positive battery clamp and the vehicle or equipment battery positive terminal connector is a negative battery clamp, wherein, if the voltage is above the threshold, then the negative terminal of the first rechargeable battery continues being selectively connected to the vehicle or equipment negative terminal battery connector by the smart switch while the negative terminal of the first rechargeable battery remains connected to the vehicle or equipment negative terminal battery connector.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a microcontroller unit having a jump starting device logic controlled by the microcontroller unit.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a microcontroller unit having a jump starting device logic controlled by the microcontroller unit, and wherein, if the forward voltage drop detected is below a certain threshold, then the comparator puts out a "low" signal, instructing the jump starting device logic controlled by the microcontroller unit to open the smart switch, disconnecting the negative battery terminal of the rechargeable battery of the rechargeable battery jump starting device from the negative battery cable, thus removing internal battery voltage from being applied across the positive and negative battery terminal connectors and rendering the positive and negative battery terminal connectors inactive or dead.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the back-charge diode array is connected along the positive battery cable.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, wherein the smart switch is connected along the negative battery cable.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein the back-charge diode array is connected along the positive battery cable, wherein the smart switch is connected along the negative battery cable.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the forward voltage drop sensed is below a certain threshold, then the comparator puts out a "low" signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead, and wherein a highly conductive frame connects the first rechargeable battery to the back-charge diode array.

The presently described subject matter is directed to a rechargeable battery jump starting device with a vehicle battery detection system, comprising or consisting of a detection circuit for detecting a forward voltage drop across the back-charge diodes, the detection circuit comprising an op amp subtractor or difference amplifier whose output is fed into a comparator, wherein, if a forward voltage drop is detected across the back-charge diodes, and if the voltage is above a certain threshold or external load of a vehicle battery connected to jumper cables, then the comparator puts out a "high" signal, allowing the jump starter to continue normal operation, and wherein, if the forward voltage drop sensed is below a certain threshold, then the comparator puts out a "low" signal, instructing a jump starter logic controlled by a micro-controller unit to open a smart-switch, disconnecting a negative battery terminal from a negative jumper cable, thus removing internal battery voltage from being applied across the jumper cables and rendering the cable terminals inactive or dead, wherein a highly conductive frame connects the first rechargeable battery to the back-charge diode array, and wherein highly conductive frame supports the back-charge diode array.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein a highly conductive frame connects the first rechargeable battery to the smart switch.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, and wherein a highly conductive frame connects the first rechargeable battery to the smart switch, and wherein the highly conductive frame connects the first rechargeable battery to the back-charge diode array.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a second rechargeable battery; and an electrical control switch electrically connected to the first battery and the second battery, the electrical control switch having a parallel switch position for connecting the first battery and second battery in parallel, the electrical control switch having a series switch position for connecting the first battery and second battery in series.

The presently described subject matter is directed to a rechargeable battery jump starting device with vehicle or equipment battery detection system, the device comprising or consisting of a first rechargeable battery having a positive terminal and negative terminal; a positive battery cable connected to the positive terminal of the first rechargeable battery; a vehicle or equipment positive terminal battery connector connected to the positive battery cable; a back-charge diode array connecting the positive terminal of the first rechargeable battery and the vehicle or equipment battery positive terminal battery connector; a negative battery cable connected to the negative terminal of the first rechargeable battery; a vehicle or equipment negative terminal battery connector connected to the negative battery cable; and a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator, wherein, if a forward voltage drop is detected across the back-charge diode array, and if the voltage is above a certain threshold or external load of the vehicle or equipment battery connected to the positive and negative battery cables, then the comparator puts out a "high" signal, allowing the rechargeable battery jump starting device to continue normal operation, further comprising a second rechargeable battery; and an electrical control switch electrically connected to the first battery and the second battery, the electrical control switch having a parallel switch position for connecting the first battery and second battery in parallel, the electrical control switch having a series switch position for connecting the first battery and second battery in series, further comprising a highly conductive frame connecting the first rechargeable battery, second rechargeable battery, and the electrical control switch, the highly conductive frame selectively connecting one or both of the positive terminals of the first rechargeable battery and second rechargeable battery to the back-charge diode array, and selectively connecting one or both of the negative terminals of the first rechargeable battery and the second rechargeable battery to a smart switch.

The battery jump starting device according to the present invention is configured to maximize the amount of power transmission from one or more batteries (e.g. Li-ion battery or batteries) to a battery (e.g. vehicle battery) being jump started. This requires a power circuit having a high or very high electrically conductive path from the one or more batteries to the battery clamps of the battery jump starting device. This physically requires the use of high or very high conductivity conductors such as metal (e.g. copper, aluminum) plates, bars, rods, and tubing. For example, a highly conductive rigid frame connects the one or more batteries to the positive and negative cables of the battery jump starting device during operation thereof.

The "rigidity" and "strength" of the highly conductive rigid frame provides structurally stability during storage and use of the battery jump starting device. This is important especially during use when high level of current is flowing through the highly conductive rigid frame potentially heating and softening the rigid frame. It is highly desired that the highly conductive rigid frame maintains its structurally stability and configuration during such use so as to avoid the risk of contact and electrically shorting with other electrical components of the battery jump starting device. This is especially true when making a compact and portable configuration of the battery assembly and the battery jump starting device itself to allow minimizing distances between electrical components located with the battery jump starting device.

The battery assembly comprising or consisting of the one or more batteries and the highly conductive frame can provide a "compact battery assembly" for use in the battery jump starting device. The battery assembly can be removably connected (i.e. detachable) as a unit to the battery jump starting device for replacement or servicing thereof. For example, the highly conductive frame is configured to wrap around and partially or fully enclose the one or more batteries to provide a compact configuration (i.e. one or more batteries nested within conductive frame). The highly conductive frame can surround the one or more batteries in one or more planes or axes. For example, the highly conductive frame wraps around the sides of the one or more batteries. As another example, the highly conductive frame wraps around the sides and the top and/or bottom of the one or more batteries capturing the one or more batteries on five or six sides (i.e. length sides, width sides, top side and/or bottom side). The highly conductive frame can be a single piece construction or multiple pieces connected or assembled together. For example, the highly conductive frame is constructed of multiple highly conductive frame members connected or assembled together.

BRIEF DESCRIPTION OF DRAWINGS

FIGS. 68A-1 thru 68F-3 show schematic circuit diagrams of the rechargeable battery jump starting device shown in FIG. 26.

DETAILED DESCRIPTION

Figure 1:
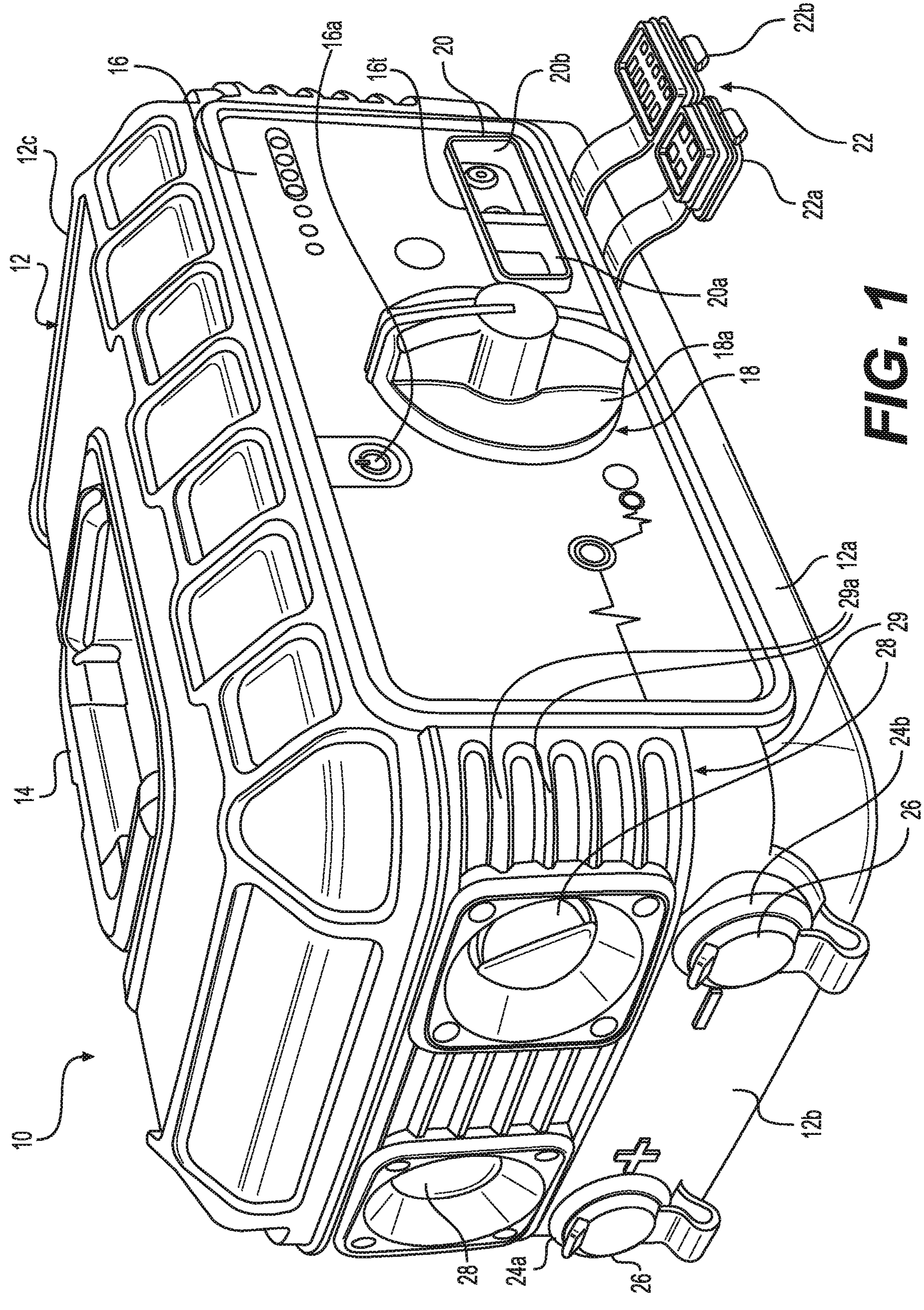
FIG. 1 is a front perspective view of a battery jump starting device according to the present invention.

The battery jump starting device 10 according to the present invention is shown in FIGS. 1-8.

The battery jump starting device 10 comprises a cover 12 fitted with a handle 14, and having the particular design shown in FIGS. 1-8.

The battery jump starting device 10 comprises a front interface 16, a power button 16*a* for turning the power on or off, and an electrical control switch 18 having a control knob 18*a* for operating the control switch 18. The main operational portion of the control switch 18 is located internally within the cover 12. The control switch 18 is configured so that a user can selectively rotate the control knob 18*a* to either a first position (12V mode) or a second position (24V mode) depending on the particular voltage system of the vehicle being jump started (e.g. 12V, 24V vehicle electrical system).

Figure 69:
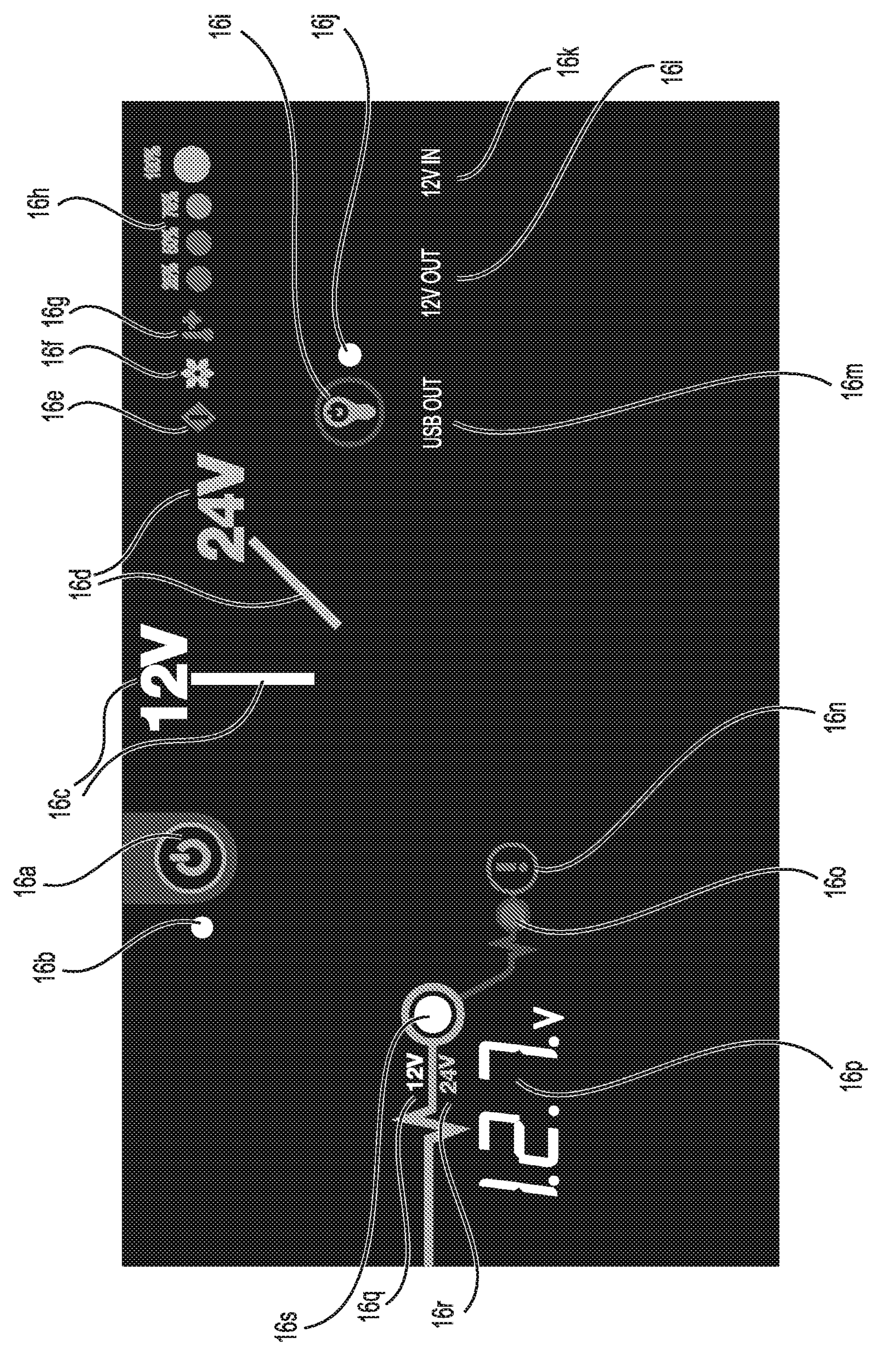
FIG. 69 is a detailed front view of an example embodiment of a display for use with the rechargeable jump starting devices shown in FIGS. 10, 110, and 310.

The detailed features of the interface 16 are shown in FIG. 69. The interface 16, includes:

1) Power Button 16*a;*
2) Power LED 16*b* (e.g. White colored LED);
3) 12V Mode LED 16*c* (e.g. White colored LED);
4) 24V Mode LED 16*d* at same location as 16*c* (e.g. Blue colored LED);
5) Error LED 16*e* (e.g. Red colored LED);
6) Cold Error LED 16*f* (e.g. Blue colored LED);
7) Hot Error LED 16*g* (e.g. Red colored LED);
8) Internal Battery Fuel Gauge LEDs 16*h* (e.g. Red, Red, Amber, Green colored LEDs);
9) Flashlight Mode Button 16*i;*
10) Flashlight LED 16*j* (e.g. White colored LED);
11) 12V IN LED 16*k* (e.g. White/Red colored LED);
12) 12V OUT LED 16*l* (e.g. White/Red colored LED);
13) USB OUT LED 16*m* (e.g. White colored LED);
14) Manual Override Button 16*n:*
15) Manual Override LED 16*o* (e.g. Red colored LED):
16) Voltmeter Display LED 16*p* (e.g. White colored LED);
17) 12V Mode LED 16*q* (e.g. White colored LED);
18) 24V Mode LED 16*r* (e.g. Blue colored LED); and
19) Boost LED 16*s* (e.g. White colored LED).

The above features can be modified with different colored LEDs and/or other arrangements on the face of the interface 16.

Figure 2:
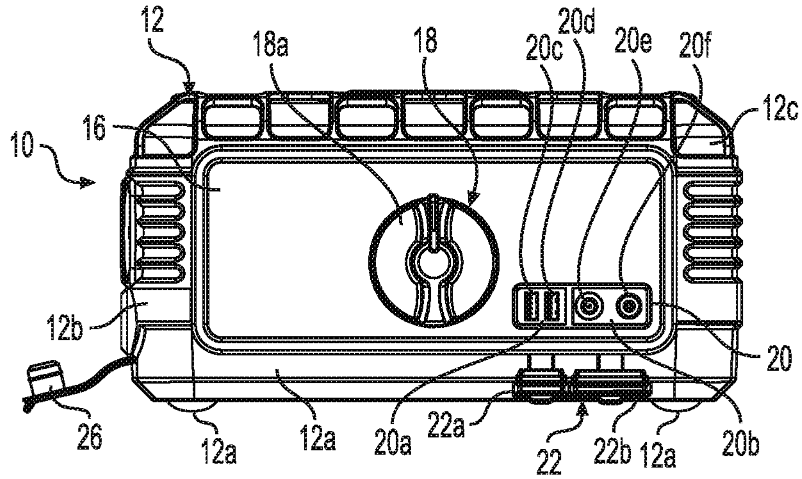
FIG. 2 is a front elevational view of a battery jump starting device shown in FIG. 1.
Figure 3:
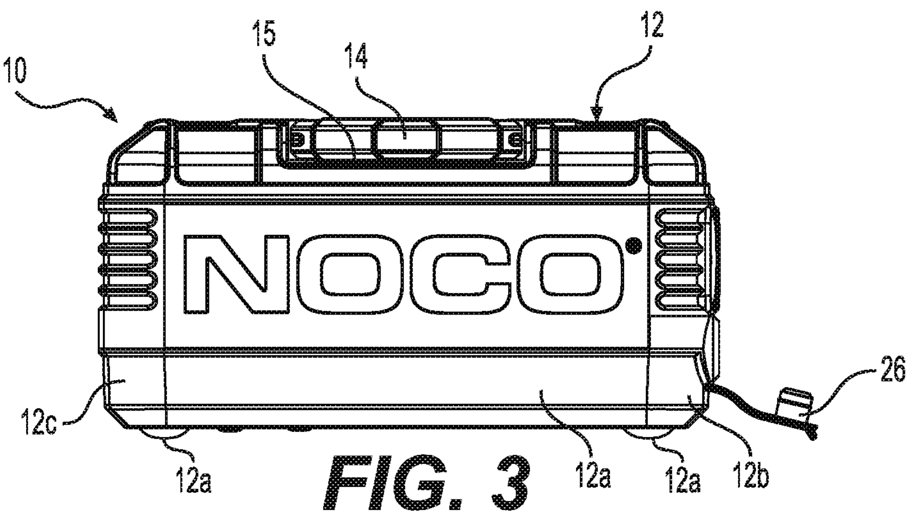
FIG. 3 is a rear elevational view of the battery jump starting device shown in FIG. 1.

The battery jump starting device 10 further comprises a port 20 having left side port 20*a* and right side port 20*b*, as shown in FIG. 2. The port 20 is configured to extend through a through hole 16*t* located in the lower right corner of the interface 16. The left side port 20*a* accommodates dual 2.1 amp (A) USB OUT ports 20*c*, 20*d* and the right side port 20*b* accommodates an 18 A 12V XGC OUT port 20*e* and a 5 A 12V XGC IN port 20*f*, as shown in FIG. 2.

The cover 12 is provided with the resilient sealing cap 22, including left side sealing cap 22*a* for sealing left side port 20*a* and right side sealing cap 22*b* for sealing right side port 20*b* during non-use of the battery jump starting device 10.

Figure 4:
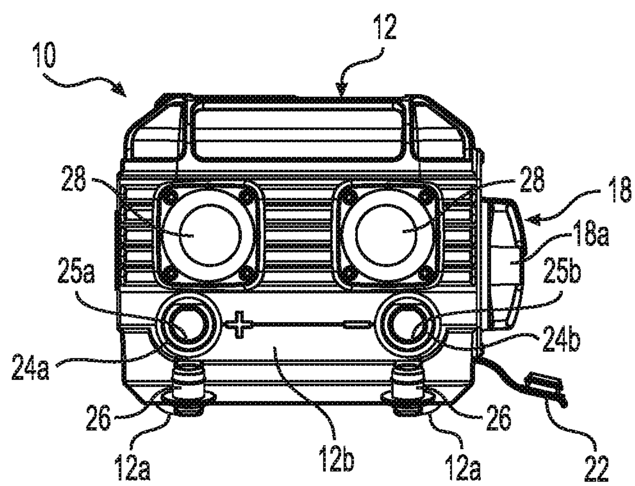
FIG. 4 is a left side elevational view of the battery jump starting device shown in FIG. 1.
Figure 5:
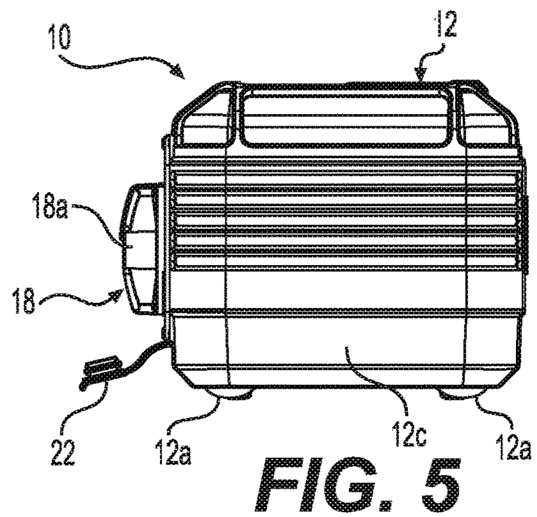
FIG. 5 is a right side elevational view of the battery jump staring device shown in FIG. 1.
Figure 6:
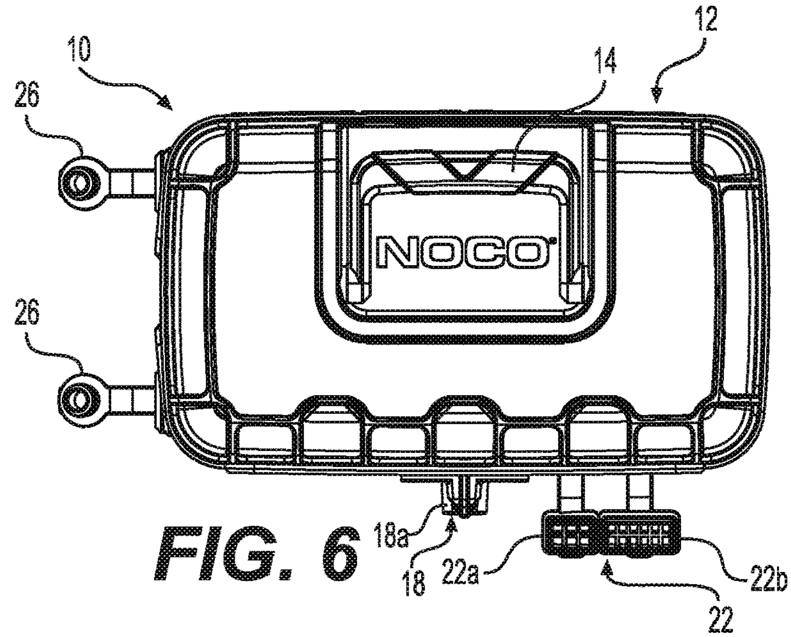
FIG. 6 is a top planar view of the battery jump starting device shown in FIG. 1.
Figure 7:
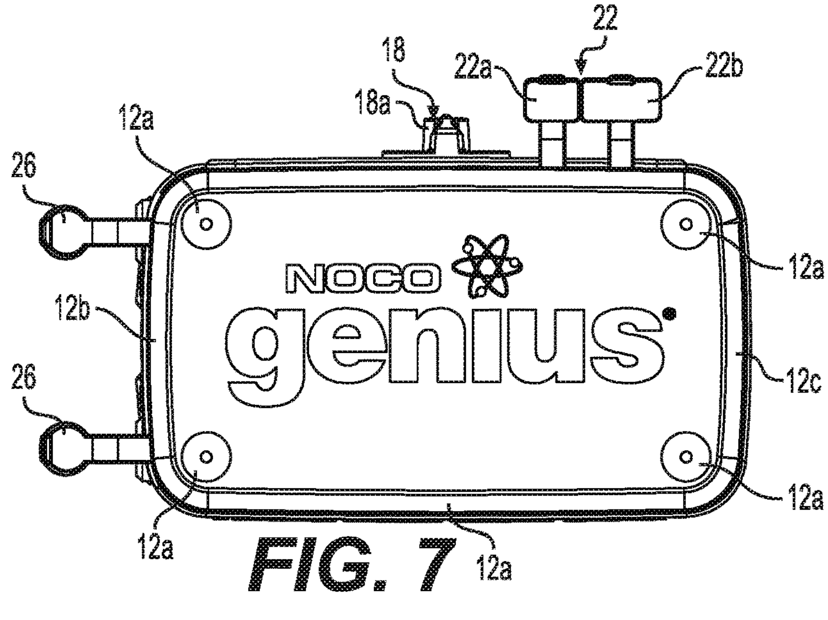
FIG. 7 is a bottom planar view of the battery jump starting device shown in FIG. 1.
Figure 8:
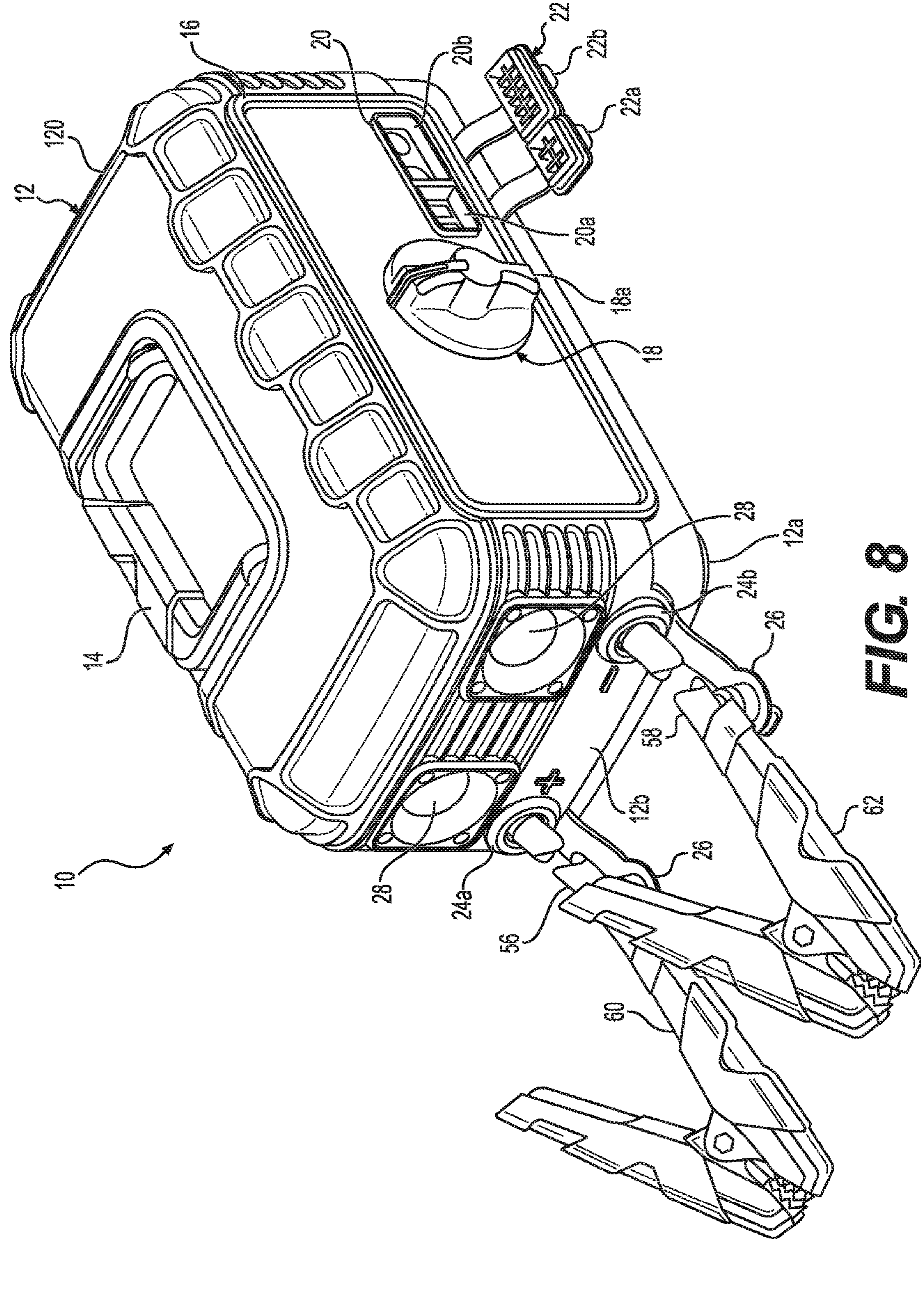
FIG. 8 is a perspective view of the battery jump starting device shown in FIG. 1 with detachable battery cables attached to the battery jump starting device.

The left side of the battery jump starting device 10 is also fitted with a pair of light emitting diodes 28 (LEDS) for using the battery jump starting device 10 as a work light. For example, the LEDs 28 are dual 1100 Lumen high-intensity LED floodlights), as shown in FIGS. 1, 4, and 8. The LEDs 28 are configured to have seven (7) operational modes, including 100% intensity, 50% intensity, 10% intensity, SOS mode (emergency protocol), blink mode, strobe mode, and Off mode.

The left side of the battery jump starting device 10 is fitted with a heat sink 29 (FIG. 1) for dissipating heat from the LEDs 28. For example, the heat sink 29 is made of a heat conductive material (e.g. molded or die cast aluminum heat sink). The heat sink 29 is provided with ribs 29*a* (FIG. 1) to facilitate the heat sink 29 transferring heat to the surrounding atmosphere to prevent the LEDs 28 from overheating.

The battery jump starting device 10 is shown in FIG. 1 without battery cables having battery clamps for connecting the battery jump starting device 10 to a battery of a vehicle to be jump started. The battery jump starting device can be configured to removably or detachably connect to a set of battery cables each having a battery clamps (e.g. positive battery cable with a positive clamp, negative battery cable with a negative clamp). Alternatively, the battery jump starting device can be fitted with battery cables hard wired directly to the device and being non-removable or non-detachable.

Figure 11:
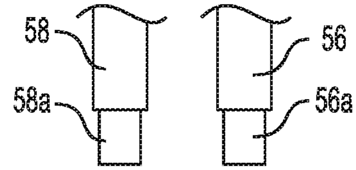
FIG. 11 is a top view of the connection ends of the detachable battery cables shown in FIG. 9.

As shown in FIGS. 1 and 4, the left side of the battery jump starting device 10 is provided with a POSITIVE (+) cam-lock 24*a* and a NEGATIVE (−) cam-lock 24*b*. The cam-locks 24*a*, 24*b* include receptacles 25*a*, 25*b* (FIG. 4) configured for removably or detachably connecting with connecting end 56*a* (FIG. 11) of the positive battery cable 56 (FIG. 8) and the connecting end 58*a* of negative battery cable 58, respectively. The cam-locks 24*a*, 24*b* are fitted with sealing caps 26 (FIG. 1) for closing and sealing the receptacles 25*a*, 25*b* of the cam-locks 24*a*, 24*b*, respectively, during non-use of the battery jump starting device 10 to keep dirt and moisture from entering the receptacles 25*a*, 25*b*.

Figure 9:
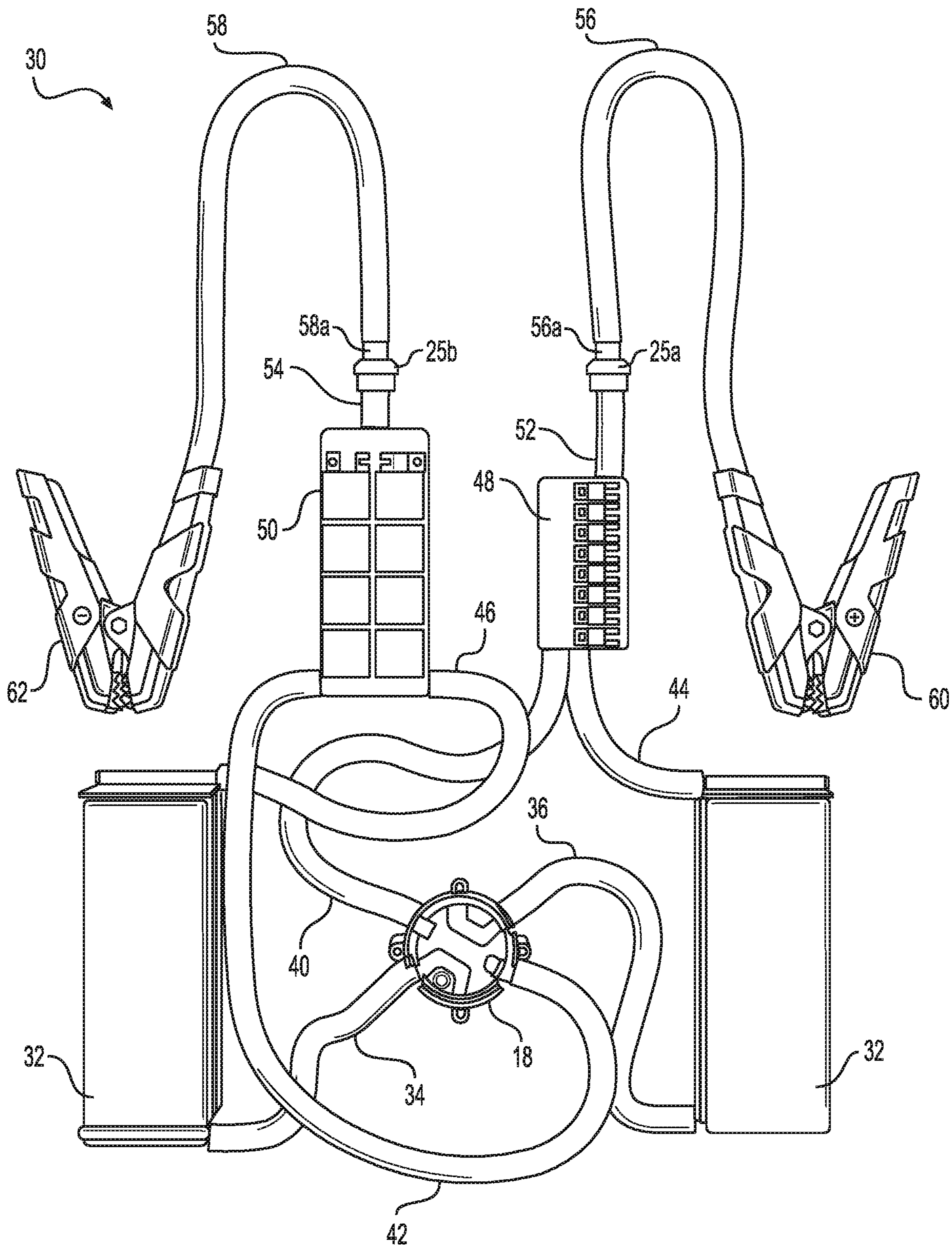
FIG. 9 is a top view of the layout of interior components of the battery jump starting device shown in FIG. 1 having detachable battery cables.

The power circuit 30 of the battery jump starting device 10 is shown in FIG. 9.

The power circuit 30 comprises two (2) separate rechargeable Lithium ion (Li-ion) batteries 32 (e.g. two (2) 12V Li-ion batteries) connected to the control switch 18 via a pair of cables 34, 36 (e.g. insulated electrical copper cables), respectively.

The power circuit 30 further comprises a reverse current diode array 48 (i.e. a reverse flow protection device or back-charge diode array) connected to the control switch via the cable 40 and the right side battery 32 via cable 44.

The power circuit 30 even further comprises a smart switch 50 (e.g. 500 A solenoid device) connected to the control switch 18 via cable 42 and the left side battery 32 via cable 46.

The positive battery cable 56 having a positive battery clamp 60 is removably or detachably connected to the positive cam-lock 24*a* (FIG. 9), which is connected to the reverse current diode array 48 via cable section 52.

The negative battery cable 58 having a negative battery clamp 62 is detachably connected to the negative cam-lock 24*b* (FIG. 9), which is connected to the smart switch 50 via cable section 54.

In the above described first embodiment of the power circuit 30, the electrical components of the power circuit 30 are connected together via cables (e.g. heavy gauge flexible insulated copper cables). The ends of cables are soldered and/or mechanically fastened to the respective electrical components to provide highly conductive electrical connections between all the electrical components.

Figure 10:
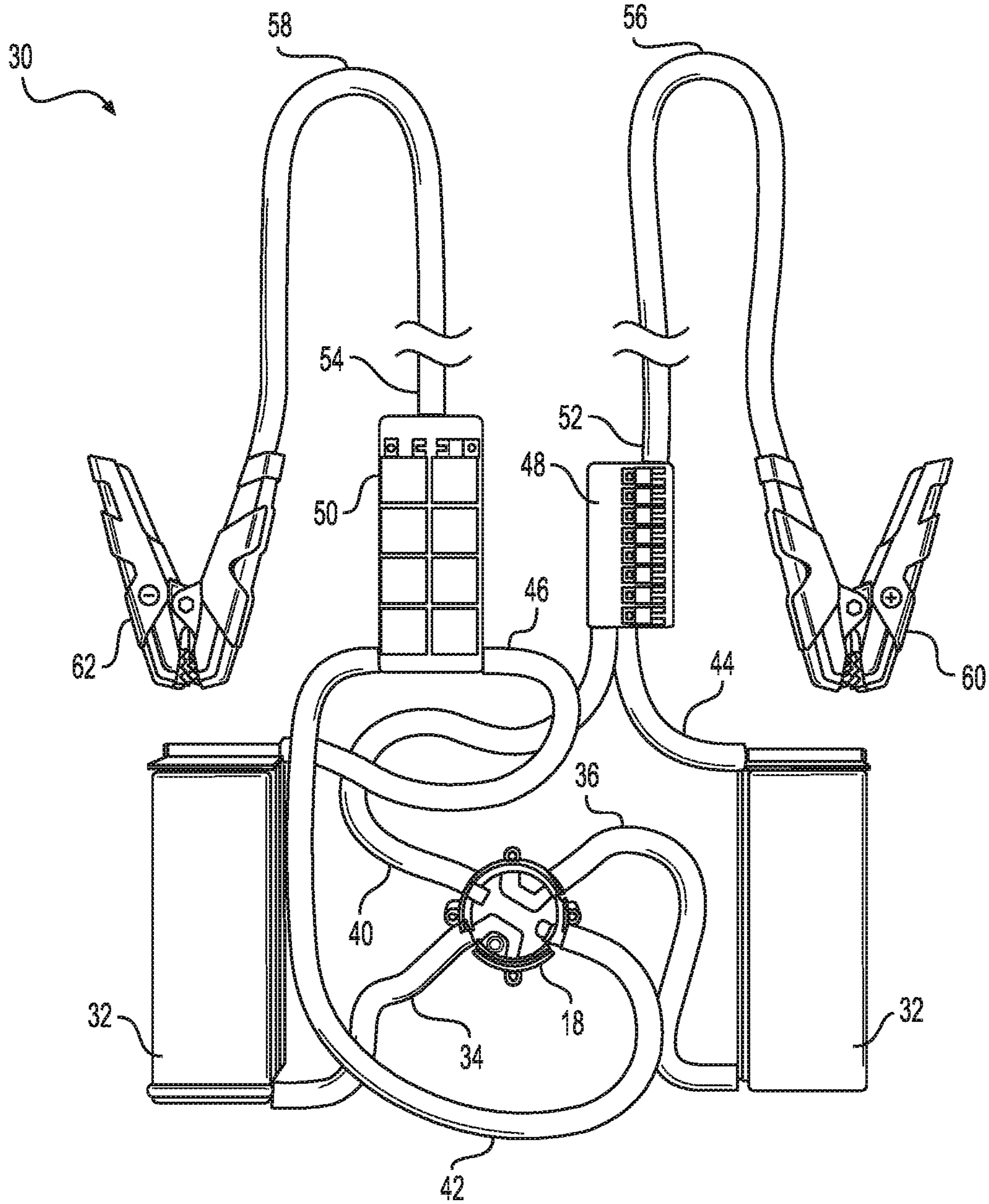
FIG. 10 is a top view of the layout of interior components of the battery jump starting device shown in FIG. 1 having non-detachable battery cables.

In a modified first embodiment shown in FIG. 10, the battery cables 56, 58 are directly hard wired to the reverse current diode array 48 and smart switch 50, respectively, eliminating the cam-locks 24*a*, 24*b*, so that the battery cables 56, 58 are no longer removable or detachable.

The cables 56, 58 shown in FIG. 9 are configured to cooperate with the cam-locks 24*a*, 24*b*. For example, the cables 56, 58 are provided with cable ends 56*a*, 58*a* (e.g. insulation removed) for fitting into the receptacles 25*a*, 25*b* of the cam-locks 24*a*, 24*b*.

Figure 16:
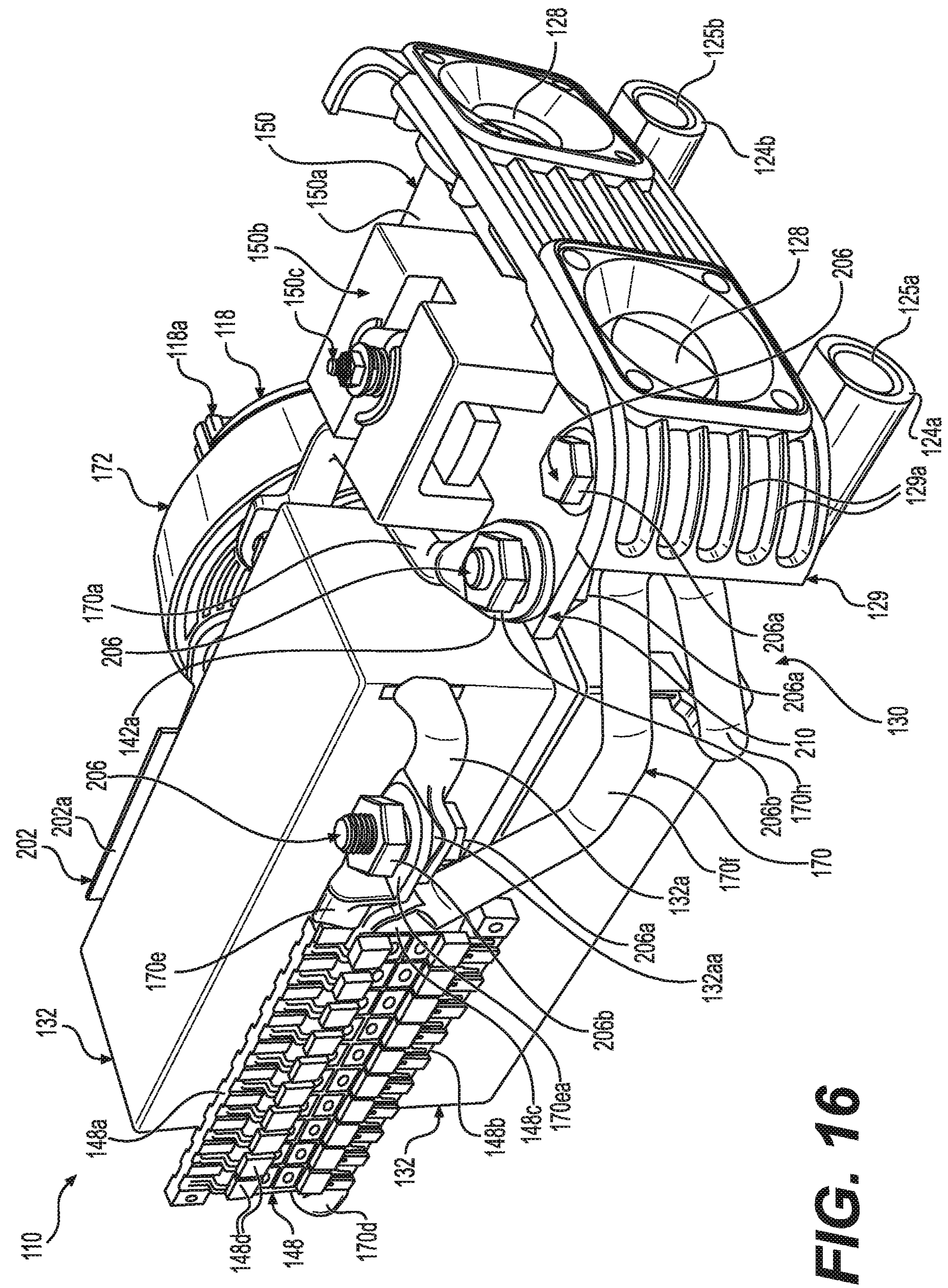
FIG. 16 is a rear and left side perspective view of a second embodiment of the battery jump starting device according to the present invention with the cover removed.

In a second embodiment of the rechargeable jump starting device 110 and power circuit 130 to be described below, the cables 34, 36, 40, 42, 44, 46 (FIG. 9) of the first embodiment of the rechargeable jump starting device 10 located between the Li-ion batteries 32 and the reverse current diode array 48 and smart switch 50, respectively, and the cables 52 and 54 between the reverse current diode array 48 and the smart switch 50, respectively, are replaced with a highly electrically conductive rigid frame 170 (FIG. 16). For example, the highly electrically conductive frame 170 of the second embodiment of the rechargeable jump starting device 110 (FIG. 16) comprises frame members 170 *a-h* shown in FIGS. 16-25. Another highly electrically conductive frame 370 of the third embodiment of the rechargeable jump starting device 310 (FIG. 26) comprises frame members 370*a-h* shown in FIGS. 56-62.

Control Switch

The control switch 18 is shown in FIGS. 12-15. The control switch 18 comprises the following:

1) control knob 18*a;*
2) front housing 72;
3) rear housing 74;
4) rotor 76 having a collar 76*a*, legs 76*b*, and legs 76*c;*
5) springs 78;
6) pivoting contact 80 each having two (2) points of contact (e.g. slots 80*c*);
7) separate terminals 82, 84, 86, 88;
8) connected terminals 90, 92;
9) conductive bar 94
10) O-ring 96;
11) O-ring 98; and
12) O-ring 100.

The control knob 18*a* comprises rear extension portions 18*b*, 18*c*. The extension portion 18*c* has a T-shaped cross section to connect into a T-shaped recess 76*e* (FIG. 12) in rotor 76 when assembled. The rotor 76 is provided with a flange 76*a* configured to accommodate the rear extension portion 18*b* (e.g. round cross-section) therein.

The pair of legs 76*c* (e.g. U-shaped legs) of the rotor 76 partially accommodate the springs 78, respectively, and the springs 78 apply force against the pivoting contacts 80 to maintain same is highly conductive contact with the selected contacts 82*b*-92*c* of the terminals 82-92.

The pivoting contacts 80 each have a pivoting contact plate 80*a* having a centered slot 80*b* configured to accommodate an end of each leg 76*b* of the rotor 76. When the rotor 76 is turned, each leg 76*b* actuates and pivots each pivoting contact plate 80*a*.

Further, the pivoting contact plates 80*a* each having a pair of spaced apart through holes 80*c* (e.g. oval-shaped through holes) serving as two (s) points of contact with selected contacts 82*c*-92*c* of the terminals 82-92.

The terminals 82-92 have threaded posts 82*a*-92*a*, spacer plates 82*b*-92*b*, and conductive bar 94, respectively, configured so that the contacts 82*c*-92*c* are all located in the same plane (i.e. plane transverse to longitudinal axis of the control switch 18) to allow selective pivoting movement of the pivoting contacts 80. The threaded posts 82*a*-92*a* of the terminals 82-92 are inserted through the through holes 74*a*, respectively, of the rear housing 74.

Figure 12:
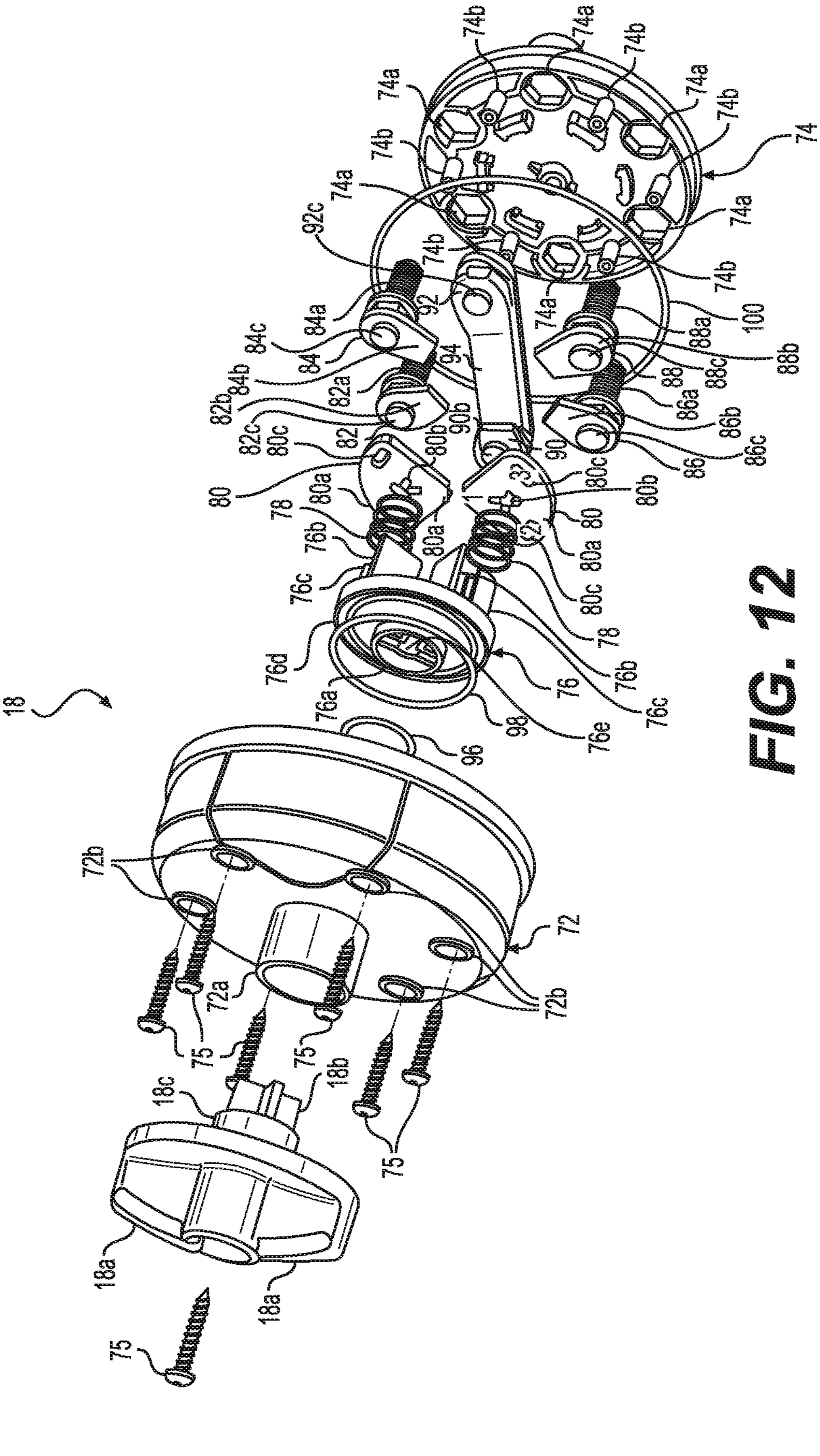
FIG. 12 is an exploded perspective view of the control switch installed on the front of the battery jump starting device shown in FIG. 1.

The O-rings 96, 98, 100, as shown in FIG. 12, seal the separate the various components of the control switch 18 as shown. After assembly of the control switch 18, a set of screws 75 connect with anchors 74*b* of the rear housing 74 to secure the front housing 72 to the rear housing 74 as shown in FIG. 12.

Figure 13:
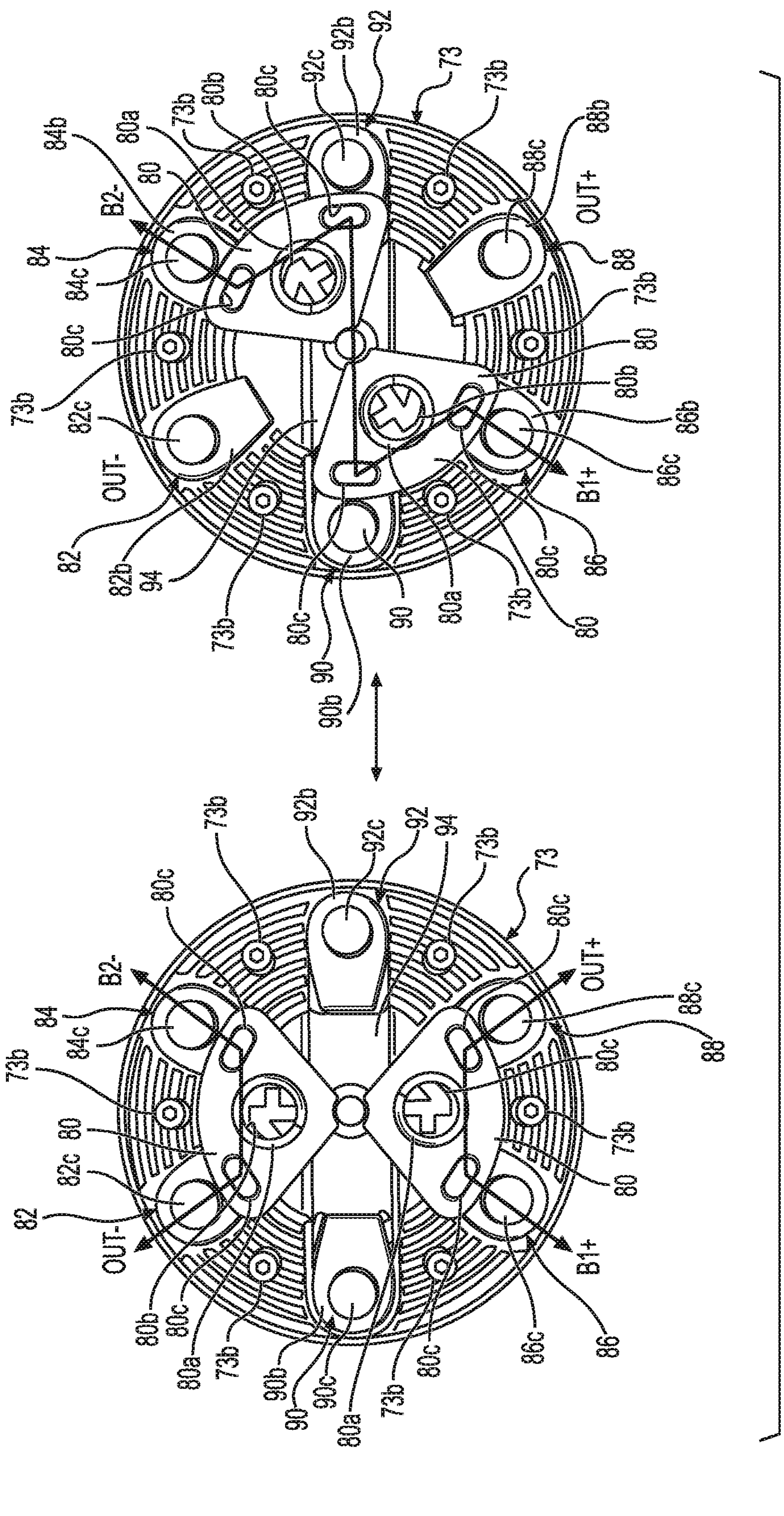
FIG. 13 is a front elevational view of the switch plate of the control switch shown in FIG. 12 operable between a first position and second position.

The control switch 18 is a 12V/24V selective type switch as shown in FIG. 13. The configuration of the pivoting contacts 80 in the first position or Position 1 (i.e. Parallel position) is shown on the left side of FIG. 13, and the second position or Position 2 (i.e. Series position) is shown on the right side of FIG. 13.

Figure 15:
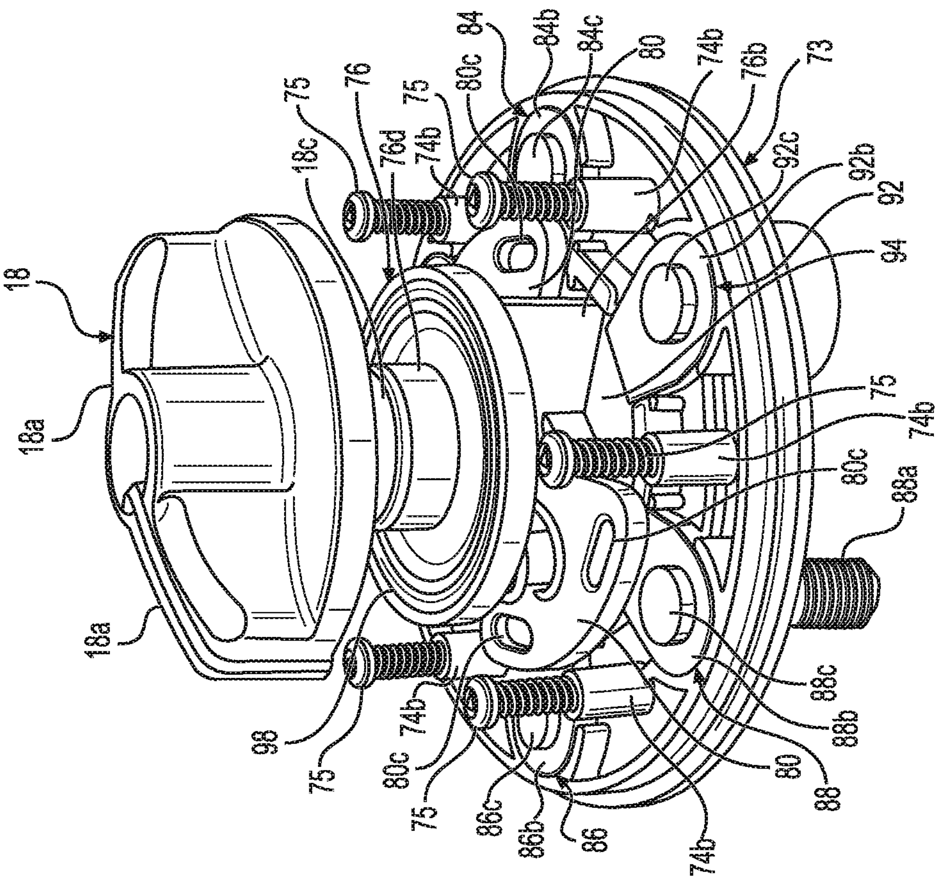
FIG. 15 is a perspective view of the control switch shown in FIG. 12.
Figure 14:
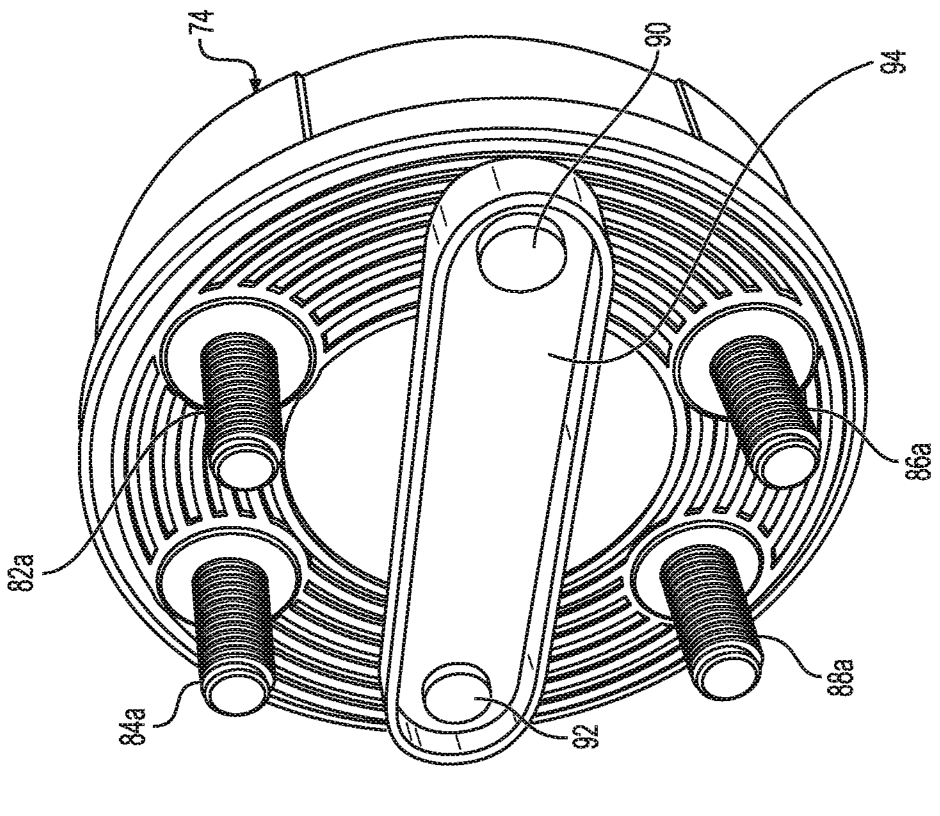
FIG. 14 is a rear perspective view of the switch plate shown in FIG. 13.

The rear side of the control switch 18 is shown in FIG. 14. Another highly conductive bar 94 is provided on the rear outer surface of the rear housing 74. The fully assembled control switch 18 is shown in FIG. 15.

The second embodiment of the battery jump starting device 110 is shown in FIGS. 16-25 with the cover 112 removed. The cover for the battery jump starting device 110, for example, is the same as the cover 12 of the battery jump starting device 10 shown in FIG. 1-8.

In the second embodiment of the battery jump starting device 110 (FIGS. 16-25) compared to the battery jump starting device 10 (FIGS. 1-8), the cable sections 34, 36, 40, 42, 44, 46 (FIG. 9) in the first embodiment are replaced with a highly conductive frame 170. The highly conductive frame 170 is constructed of highly conductive metal (e.g. copper, aluminum) frame members 170*a-h* configured as conductive metal rods having flattened ends connected together.

The battery jump starting device 110 comprises a pair of 12V Li-ion batteries 132 directly connected to the highly conductive rigid frame 170. Specifically, terminals 132*a*, 132*b* (e.g. highly conductive bars of copper or aluminum) of the Li-ion batteries are mechanically connected and/or soldered to the positive and negative tabs or foils, respectively, of the battery cells and then connected to the highly conductive rigid frame 170 by highly conductive fasteners 206 comprising a bolt 206*a* and nut 206*b* and/or soldering.

The highly conductive rigid frame 170 is constructed of multiple highly conductive rigid frame members 170*a-h* connected together by mechanical fasteners (e.g. metal nut and/or bolt fasteners) and/or soldering. For example, the highly conductive rigid frame members are made of highly conductive rigid metal rods having flattened ends with through holes. Alternatively, the highly conductive rigid metal rods can be replaced with highly conductive rigid metal plates, bars, tubing, or other suitably configured highly conductive metal material (e.g. copper or aluminum stock material). The highly conductive rigid frame members 170*a-h* can also be insulated (e.g. covered with heat shrink insulation) in at least the key areas to prevent any internal short circuiting.

The highly conductive rigid frame members 170*a-h* shown in FIGS. 16-25 are metal rods having flattened end portions (e.g. flattened using a hydraulic or mechanical press). The flattened end portions each have a through hole to provide a mechanical connection between adjoining highly conductive rigid frame members 170*a-h* and/or electrical components (e.g. battery 132, smart switch 150). The flattened end portions of adjoining highly conductive rigid frame members 170*a-h* are overlapped when being assembled together, and then a bolt is inserted through the overlapped through holes. A highly conductive nut is threaded onto the bolt fastener (e.g. copper or aluminum bolt and nut) and tightened. In the case of attaching a highly conductive rigid frame member 170*a-h* to an electrical component, the electrical component can be provided with a highly conductive plate base portion having a through hole for attachment to the frame member 170*a-h*. In addition, the end of the highly conductive rigid frame member 170*a-h* can be provided with a base portion (e.g. plate or bar portion) configured for connecting with or being a portion or part of one or more electrical components.

For example, the reverse flow diode assembly 148 is constructed of three (3) base portions of three (3) highly conductive frame members 170*d*, 170*e*, 170*f* of the highly conductive rigid frame 170, including:

1) an upper highly conductive rigid bar 148*a* (FIG. 16) is a flattened end portion of the highly conductive frame member 170*e* also having an opposite flattened end portion 148*ea* connected to the flattened end portion 132*aa* of the battery terminal 132*a* using a highly conductive fastener 206 (e.g. made of copper or aluminum) having a highly conductive bolt 206*a* and highly conductive nut 206*b;*
2) a lower highly conductive rigid bar 148*b* (FIG. 16) is a flattened end portion of highly conductive rigid frame member 170*d*; and
3) a center highly conductive rigid bar 148*c* (FIG. 16) is a flattened end portion of the highly conductive rigid frame member 1170*f.*

As another example, the smart switch 150 (FIG. 16) comprises a highly conductive rigid plate 150*a* serving as a base portion supporting the solenoid 150*b*. The highly conductive rigid plate 150*a* is provided with through holes for connecting highly conductive rigid frame members 170*a*, 170*h* to the smart switch 150 using highly conductive fasteners 206.

The stock material (e.g. copper or aluminum rod, plate, bar, tubing) selected for construction of the highly conductive rigid frame 170 has substantial gauge to provide high conductivity and substantial rigidity. The "rigid" nature of the highly conductive rigid frame 170 provides the advantage that the highly conductive rigid frame 170 remains structurally stiff and stable during storage and use of the battery jump starting device 110.

For example, the highly conductive rigid frame 170 is designed and constructed to sufficiently prevent flexing, movement, bending and/or displacement of the highly conductive rigid frame 170 during storage or use so as to prevent electrical shortages of the highly conductive rigid frame touching other internal electrical components or parts of the electronic assembly. This "rigid" nature is important due to the high conductivity path of electrical power from the Li-ion batteries 132 flowing through the power circuit and reaching the battery clamps 60, 62 (FIG. 9). It is a desired goal and feature of the present invention to conduct as much power as possible from the Li-ion batteries 132 to the battery being jump started by the battery jump starting device 110 by reducing or minimizing any electrical resistance by using the heavy duty and highly conductive rigid frame 170 arrangement disclosed.

As an alternative, the highly conductive rigid frame 170 can be constructed as a single piece having no mechanically fastened joints. For example, the highly conductive rigid frame 170 can be made from a single piece of stock material and then formed, bent, machined, or manufactured into the highly conductive rigid frame 170. For example, a billet of highly conductive copper can be machined (e.g. milled, lathed, drilled) into the highly conductive rigid frame 170. As another example, a copper sheet or plate can be bent and/or machined into the highly conductive rigid frame 170. As a further alternative, the highly conductive rigid frame 170 can be metal molded (e.g. loss wax process).

As another alternative, the highly conductive rigid frame 170 is made of multiple highly conductive rigid frame members 170*a-h* connected together into a unitary structure. For example, the highly conductive rigid frame 170 is made of highly conductive sections of stock material (e.g. copper or aluminum rod, plate, bar, tubing), which are extruded, machined and/or bent, and soldered and/or welded together.

Figure 17:
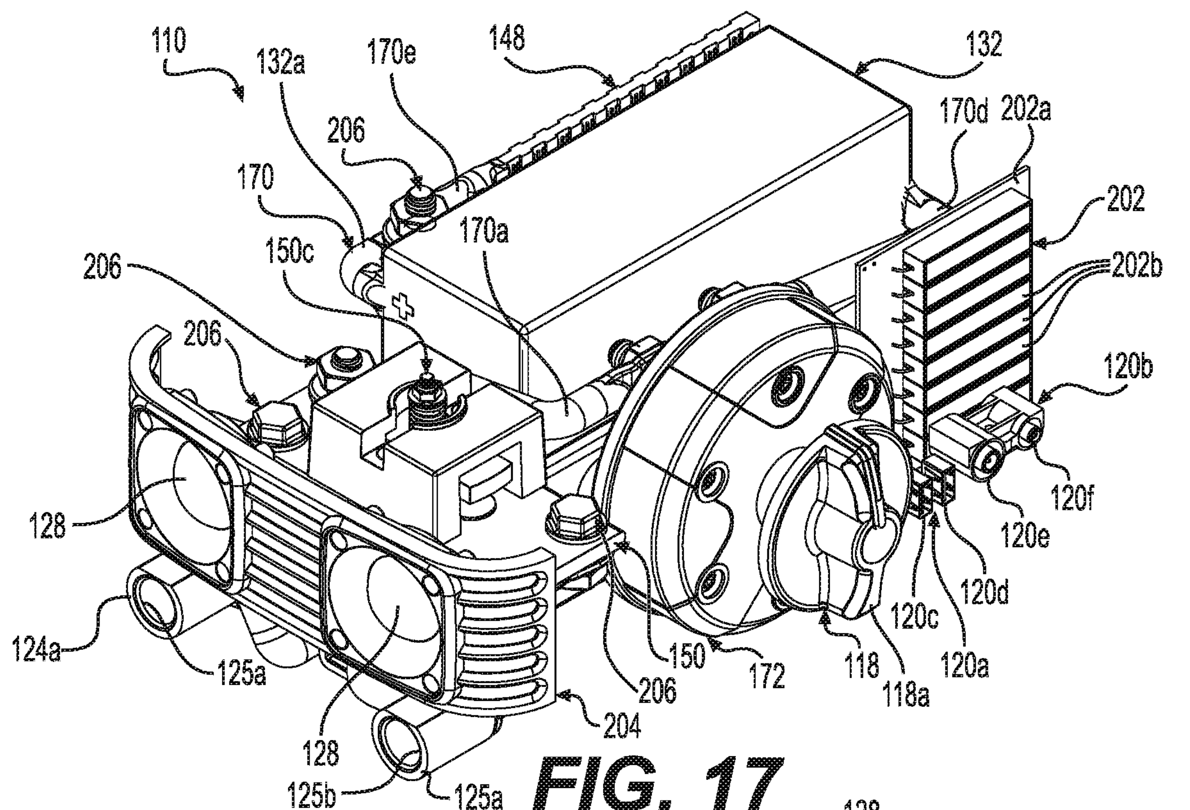
FIG. 17 is a front and left side perspective view of the battery jump starting device shown in FIG. 1 with the cover removed.
Figure 19:
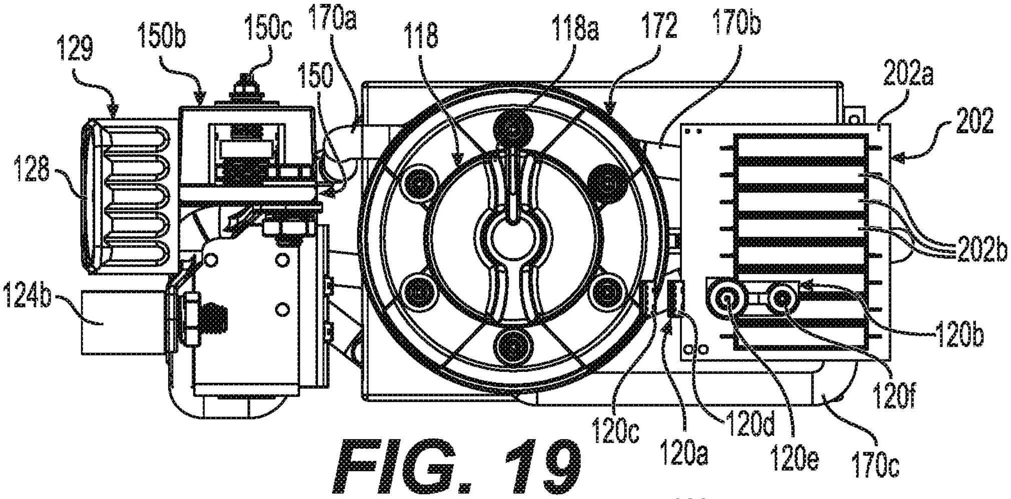
FIG. 19 is a front elevational view of the battery jump starting device shown in FIG. 1 with the cover removed.

The battery jump starting device 110 further comprises a resistor array 202 (e.g. 12 V 5 A XGC) comprising a printed circuit board (PCB) 202*a* serving as a base supporting an array of individual resistors 202*b*, as shown in FIGS. 17 and 19. The PCB 202*a* also supports the dual 2.1 amp (A) USB OUT ports 120*c*, 120*d*, the 18 A 12V XGC OUT port 20*e*, and the 5 A 12V XGC IN port 20*e*.

The left side of the battery jump starting device 110 is also fitted with a pair of light emitting diodes 128 (LEDS) for using the battery jump starting device 110 as a work light. For example, the LEDs 128 are dual 1100 Lumen high-intensity LED floodlights), as shown in FIG. 16. The LEDs 128 are configured to have seven (7) operational modes, including 100% intensity, 50% intensity, 10% intensity, SOS (emergency protocol), Blink, Strobe, and Off.

The battery jump starting device 110 is fitted with a heat sink 129 (FIG. 16) for dissipating heat from the LEDs 128. For example, the heat sink 129 is made of a heat conductive material (e.g. molded or die cast metal plate). The heat sink

129 is provided with ribs 129*a* transferring heat to the surrounding atmosphere to prevent the LEDs 128 from overheating.

The battery jump starting device 110 is shown in FIG. 16 without any battery cables having battery clamps for connecting the battery jump starting device 110 to a battery of a vehicle to be jump started. The battery jump starting device can be configured to removably or detachably connect to a set of battery cables having battery clamps (e.g. positive battery cable with a positive clamp, negative battery cable with a negative clamp). For example, see the detachable battery cables 56, 58 and battery clamps 60, 62 in FIG. 9, which can be detachably connected to the cam-locks 124*a*, 124*b* of the battery jump starting device 110. Alternatively, the battery jump starting device 110 can be fitted with battery cables hard wired to the device and non-removable or non-detachable the same or similar to those shown in FIG. 10.

For example, the left side of the battery jump starting device 110 is provided with POSITIVE (+) cam-lock 124*a* and NEGATIVE (−) cam-lock 124*b*, as shown in FIG. 16. The cam-locks 124*a*, 124*b* include receptacles 125*a*, 125*b* configured for detachably connecting with connecting end 56*a* (FIG. 11) of the positive battery cable 56 and the connecting end 58*a* of negative battery cable 58, respectively. The cam-locks 124*a*, 124*b* can be fitted with sealing caps the same or similar to the sealing caps 26 (FIG. 1) for closing and sealing the receptacles 125*a*, 125*b* of the cam-locks 124*a*, 124*b*, respectively, during non-use of the battery jump starting device 110.

A third embodiment of the battery jump starting device 210 is shown in FIGS. 26-31. In this embodiment, the highly conductive rigid frame 270 is made from flat copper bar stock material having a rectangular-shaped cross-sectional profile. The flat copper bar is bent to at least partially wrap around and envelop the Li-ion batteries.

Further, the battery jump starting device 210 comprises a main printed circuit board 208 serving as a base for LEDs for the control knob 218*a* and interface 216, and for supporting other electrical components of the battery jump starting device 210.

Cam-Lock Connectors

Again, the battery cables 56, 58 (FIG. 9) can be detachably connected to the battery jump starting device 10 via cam-locks 24*a*, 24*b* (FIG. 1) or cam-locks 124*a*, 124*b* (FIG. 16).

The cam-locks 24*a*, 124*a*, 24*b*, 124*b* and cables 56, 58 (FIG. 9) having conductive ends 56*a*, 56*b* (FIG. 11) can each have the construction of the cam-lock connector 27, as shown in FIGS. 32-45.

The cam-lock connector 27 can be used for other applications for detachably connecting a conductive electrical cable to an electronic device other than the battery jump starting device according to the present invention.

The cam-lock connector 27 comprises a male cam-lock end 27*a* and a female cam-lock end 27*b* for detachable connecting the battery cables 56, 58 (FIG. 10), respectively, to the battery jump starting device 10.

The male cam-lock end 27*a* comprises a pin 27*aa* having a tooth 27*ab*. The female cam-lock end 27*b* comprises a receptacle 27*ba* having a slot 27*bb* together located in a hex portion 27*bc*. The receptacle 27*ba* is configured to accommodate the pin 27*aa* and tooth 27*ab* of the male cam-lock end 27*a*. Specifically, the pin 27*aa* and tooth 27*ab* of the male cam-lock end 27*a* can be inserted (FIG. 33) into the receptacle 27*ba* and slot 27*bb* a fixed distance until the tooth 27*ab* contacts an interior surface of the internal thread of the female cam-lock 27*b* to be described below. The male cam-lock end 27*a* can be rotated (e.g. clockwise) to tighten within the female cam-lock end 27*b* until the end face portion 27*ac* of the male cam-lock end 27*a* engages with the end face portion 27*bc* of the female cam-lock end 27*b*. The more the cam-lock 24 is tightened, the better the electrical connection is between the male cam-lock end 27*a* and the female cam-lock end 27*b*.

Figure 34:
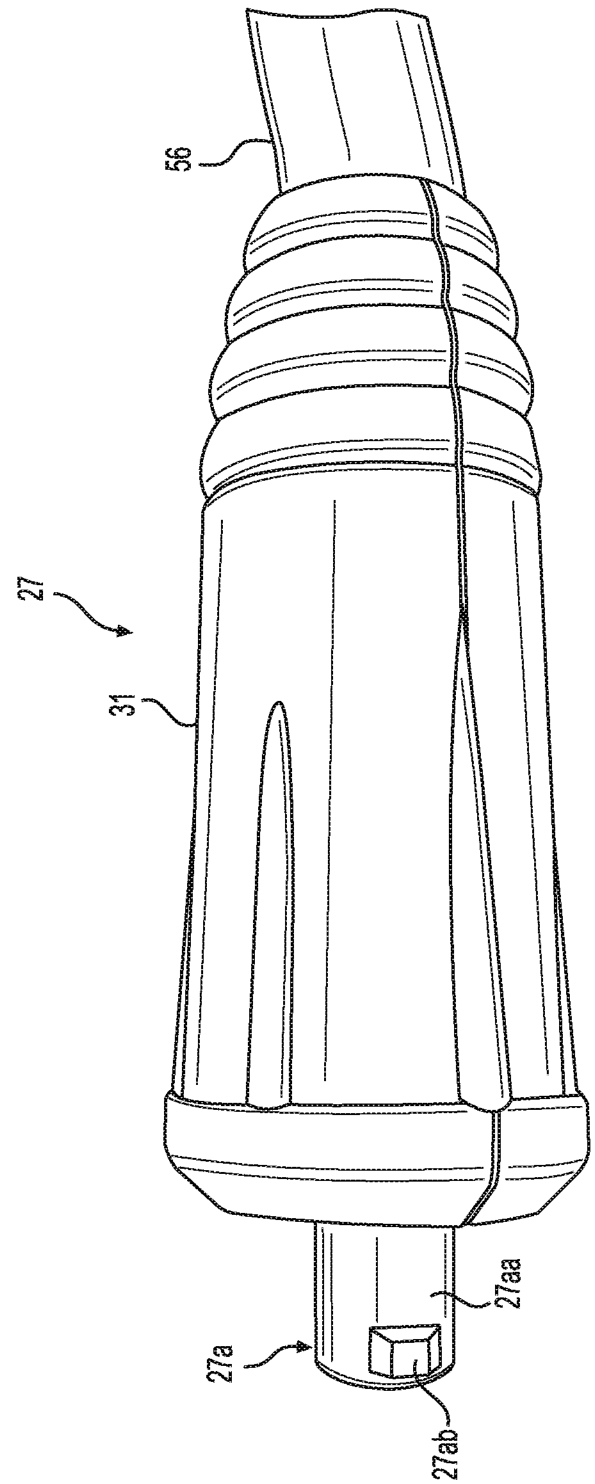
FIG. 34 is a perspective view of the male cam-lock end of the cam-lock connecting device shown in FIG. 32.

The male cam-lock end 27*a* is fitted with a rubber molded cover 31, as shown in FIG. 34, to insulate and improve the grip on the male cam-lock end 27*a*. The highly conductive cable 33 is electrically and mechanically connected to the male cam-lock end 27*a*, and is fitted through a passageway in the rubber molded cover 31.

Figure 35:
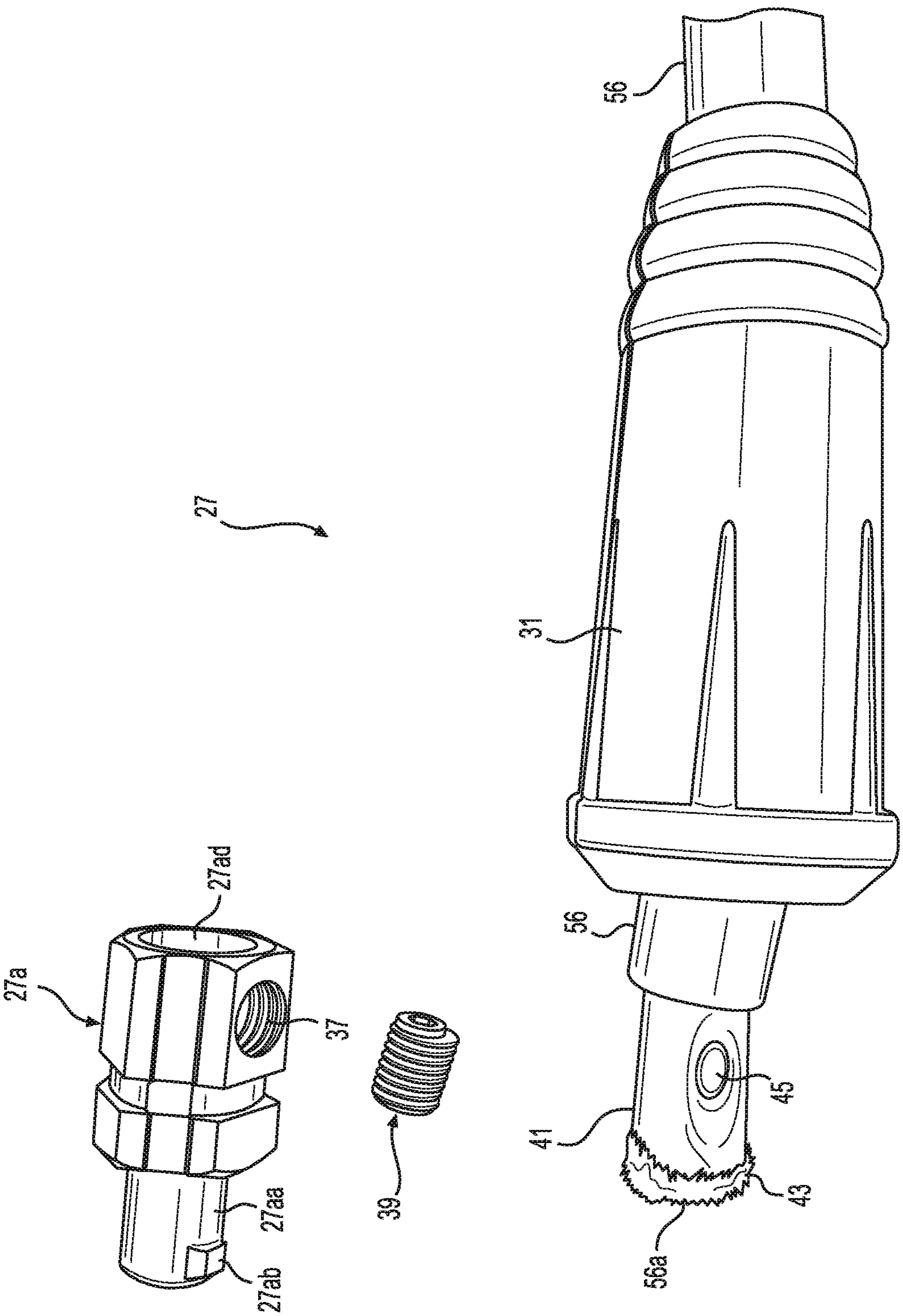
FIG. 35 is a disassembled perspective view of the male cam-lock end of the cam-lock connecting device shown in FIG. 32.

The assembly of the male cam-lock 27*a* is shown in FIG. 35. The male cam-lock 27*a* is provided with a thread hole 37 for accommodating Allen head fastener 39. The one end of the male cam-lock 27*a* is provided with a receptacle 27*ad* for accommodating the copper sleeve 41 fitted onto the end of the inner conductor 56*a* of the battery cable 56. The copper sleeve 41 is soldered onto the inner conductor 56*a* using solder 43.

Figure 36:
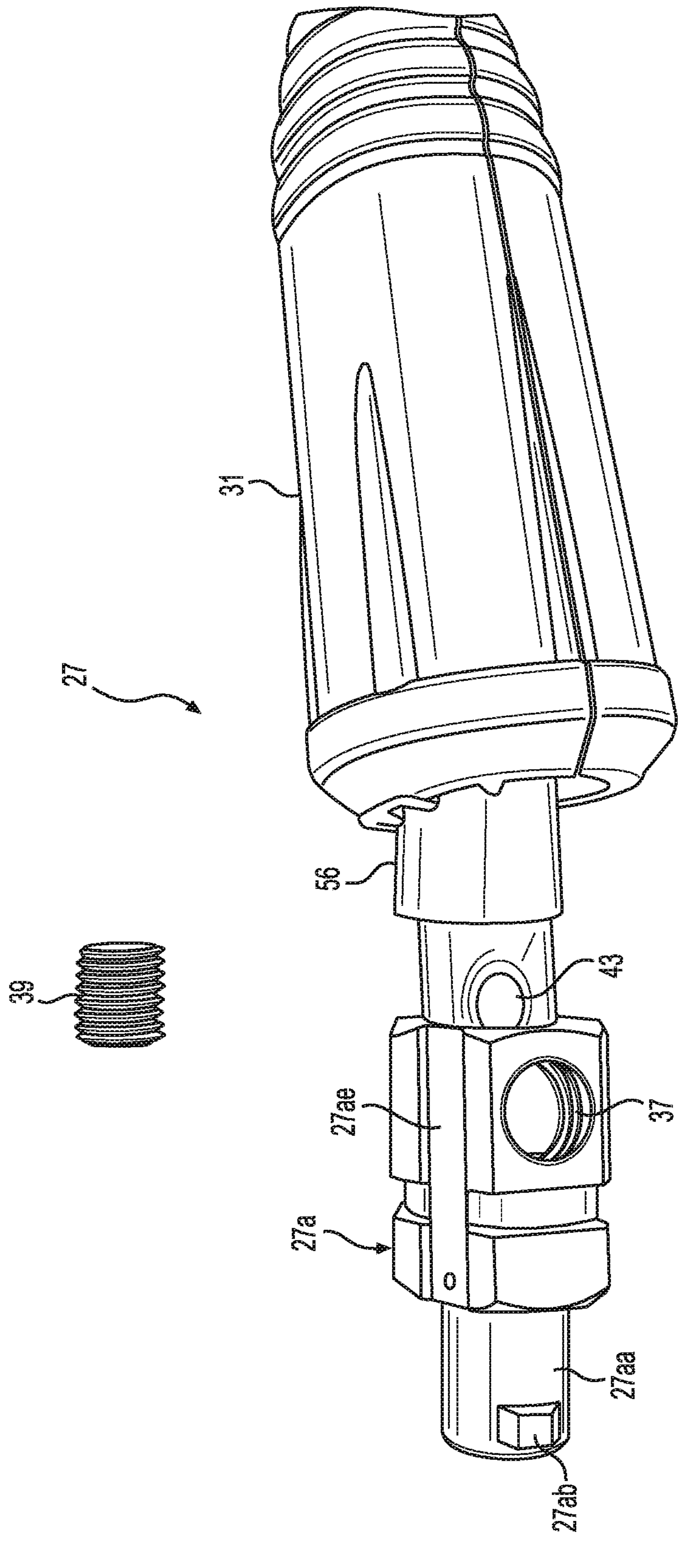
FIG. 36 is a partially assembled perspective view of the male cam-lock end of the cam-lock connecting device shown in FIG. 32.
Figure 37:
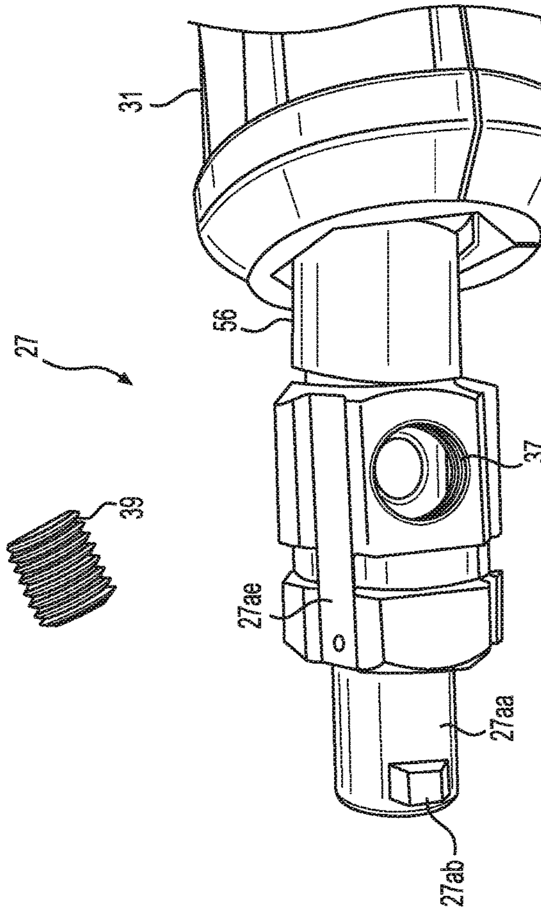
FIG. 37 is a partially assembled perspective view of the male cam-lock end of the cam-lock connecting device shown in FIG. 32.

The copper sleeve 41 is fitted into the receptacle 27*ad* of the male cam-lock end 27*a*, as shown in FIG. 36. When the copper sleeve 41 is fully inserted into the receptacle 27 of the male cam-lock end 27*a*, as shown in FIG. 36, then the Allen head fastener is threaded into the threaded hole 37 and tightened, as shown in FIG. 37.

It is noted that the inner end of the Allen head fastener makes an indent 45 when sufficiently tightened to firmly anchor the copper sleeve 41 and inner conductor 56*a* of the battery cable 56 to mechanically and electrically connect the cable 56 to the male cam-lock end 27*a*.

Figure 38:
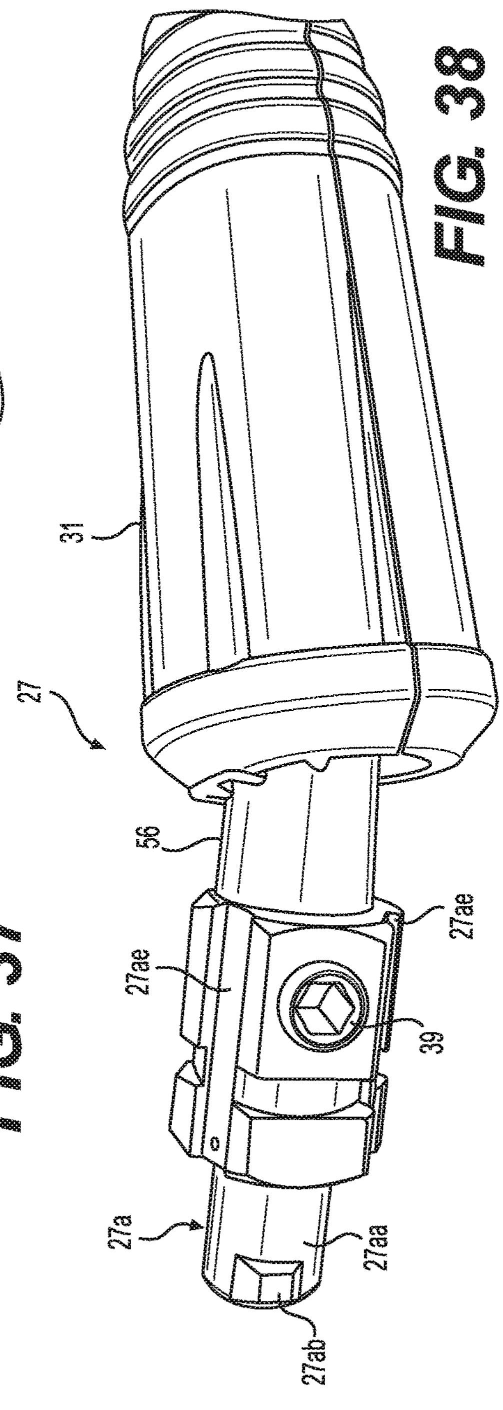
FIG. 38 is a fully assembled perspective view of the male cam-lock end of the cam-lock connecting device shown in FIG. 32.
Figure 39:
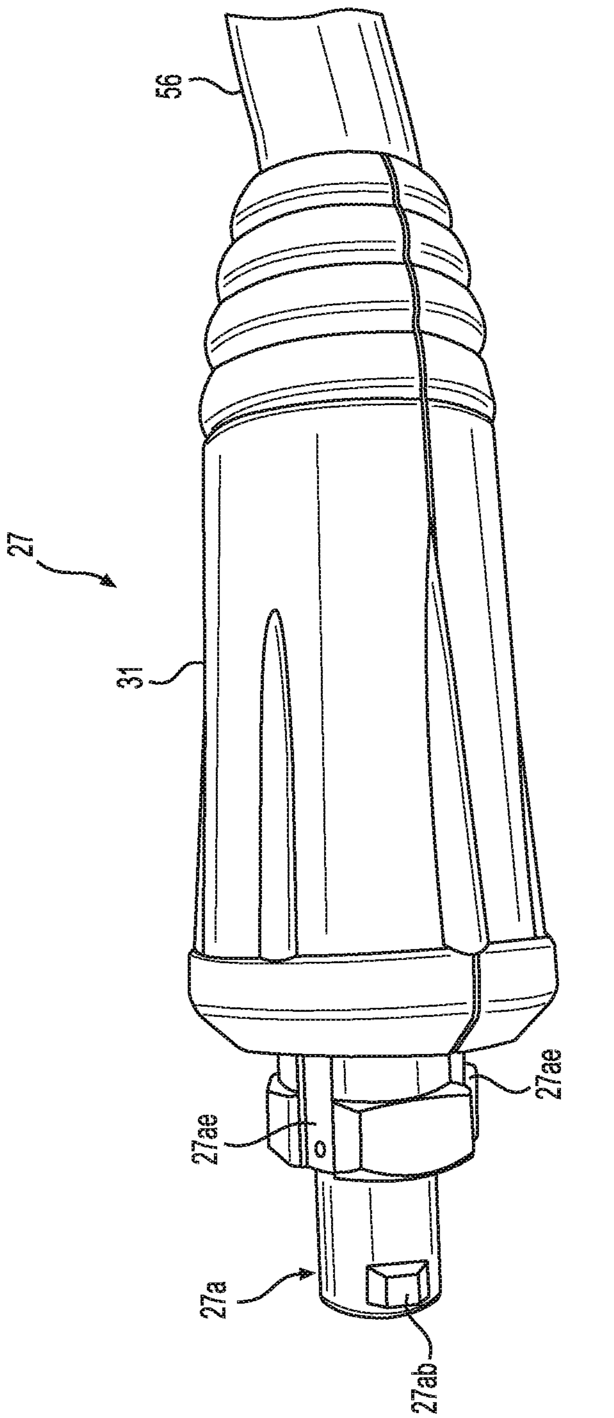
FIG. 39 is a partially assembled perspective view of the male cam-lock end of the cam-lock connecting device shown in FIG. 32.

The rubber molded cover 31 is provided with one or more inwardly extending protrusions 31*a* cooperating with one or more slots 27*ae* in an outer surface of the male cam-lock end 27*a* (FIG. 38).

Again, the male cam-lock end 27*a* and the female cam-lock end 27*b* are configured so as to tighten together when rotating the male cam-lock end 27*a* when inserted within the female cam-lock end 27*b*.

Figure 40:
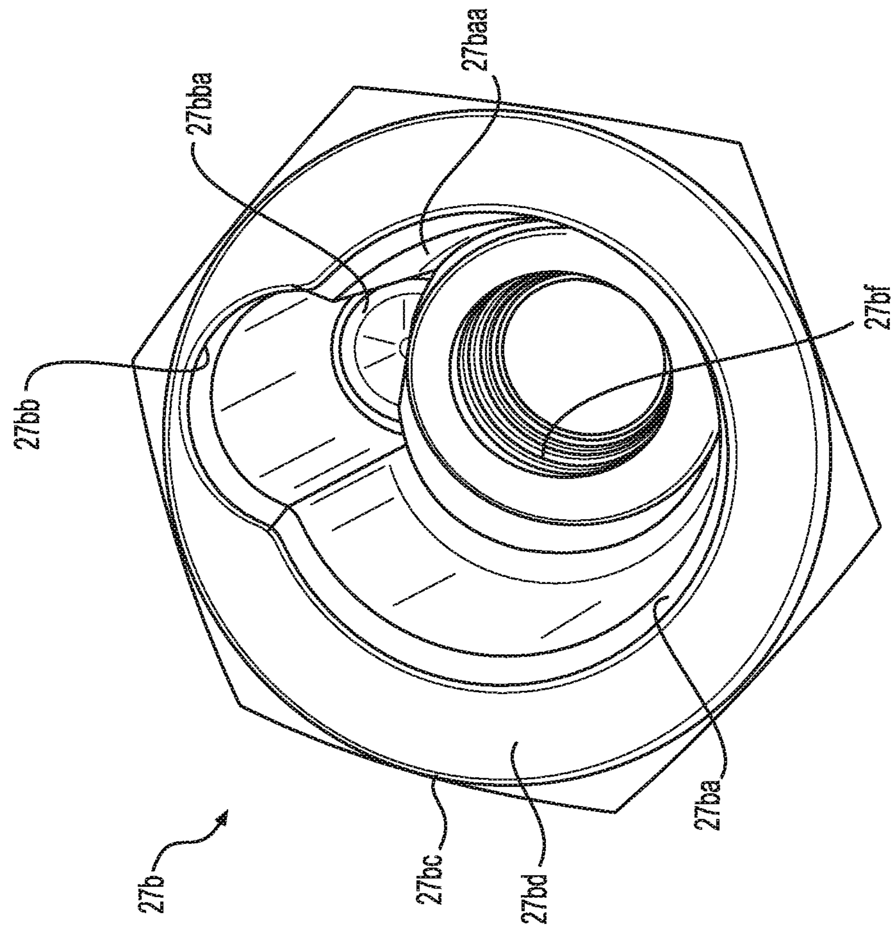
FIG. 40 is a disassembled perspective end view of the female cam-lock end of the cam-lock connecting device shown in FIG. 32.

The female cam-lock end 27*b*, as shown in FIG. 40, is provided with the receptacle 27*ba* and slot 27*bb* for accommodating the end of the male cam-lock end 27*a*. The slot 27*bb* is provided with a surface 27*bba* serving as a stop for the tooth 27*ab* of the male cam-lock end 27*a*. The receptacle 27*ba* is provided with inner threading 27*baa* for cooperating with the tooth 27*ab* of the male cam-lock end 27*a* to provide a threaded connection therebetween. Specifically, the tooth 27*ab* engages with the surface 27*bba* and is stopped from being further inserted into the receptacle 27*ba* of the female cam-lock end 27*b*. When the male cam-lock end 27*a* is rotated, the tooth 27*ab* engages and cooperates with the inner threading 27*baa* of the receptacle 27*ba* of the female cam-lock end 27*b* to begin tightening the male cam-lock end 27*a* within the female cam-lock end 27*b* with the tooth 27*ab* riding against an edge of the inner thread 27*baa*. The male cam-lock end 27*a* is further rotated to further tighten the connection with the female cam-lock end 27*b*. When the face 27*ac* (FIG. 32) of the male cam-lock end 27*a* engages with the face 27*bd* of the female cam-lock end 27*b*, then the cam-locks ends 27*a*, 27*b* are fully engage and rotation is stopped.

The female cam-lock end 27*b* is accommodated with a rubber molded cover 51 having cover portions 51*a*, 51*b*, as shown in FIGS. 42-45

The female cam-lock end 27*b* (FIGS. 40 and 41) is provided with inner threading 27*bf* (FIG. 40) to accommodate the bolt 47 and lock washer 49 (FIG. 41) for connecting the female cam-lock end 27*b* to the battery jump starting device 10 (e.g. connects to base plate for smart switch 50 (FIG. 9)).

Figure 41:
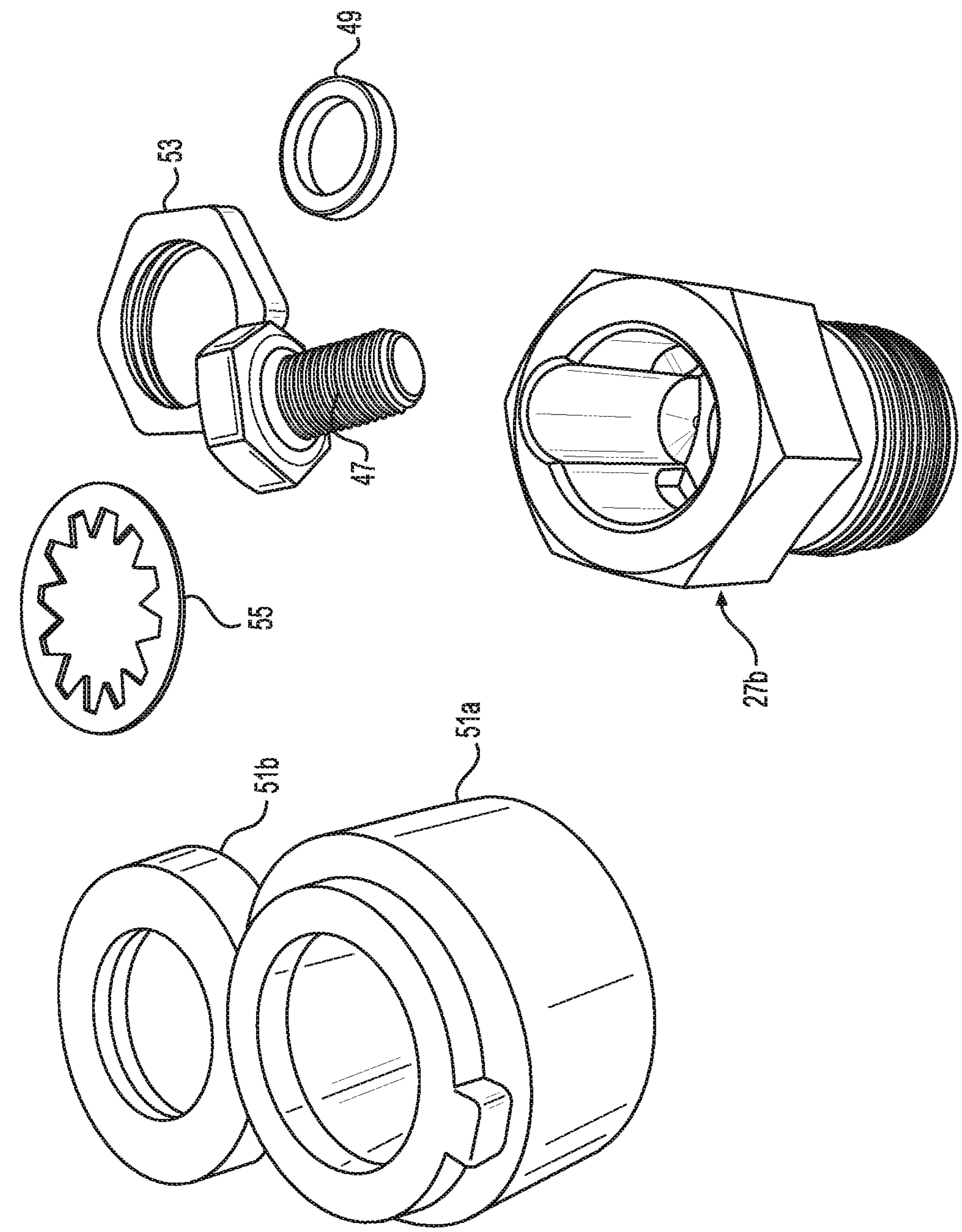
FIG. 41 is a disassembled perspective end view of the female cam-lock end of the cam-lock connecting device shown in FIG. 32.
Figure 42:
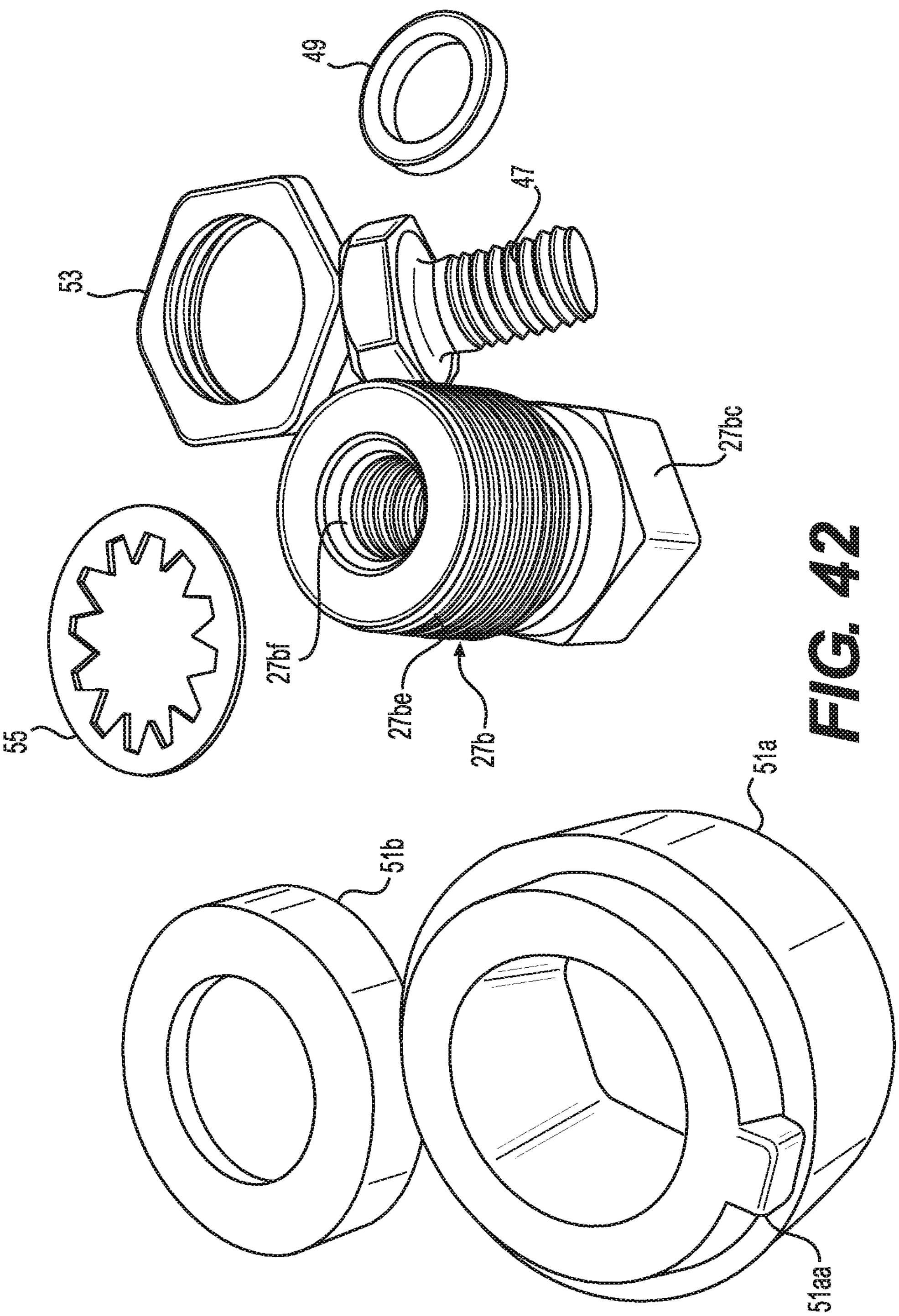
FIG. 42 is a disassembled perspective end view of the female cam-lock end of the cam-lock connecting device shown in FIG. 32.
Figure 43:
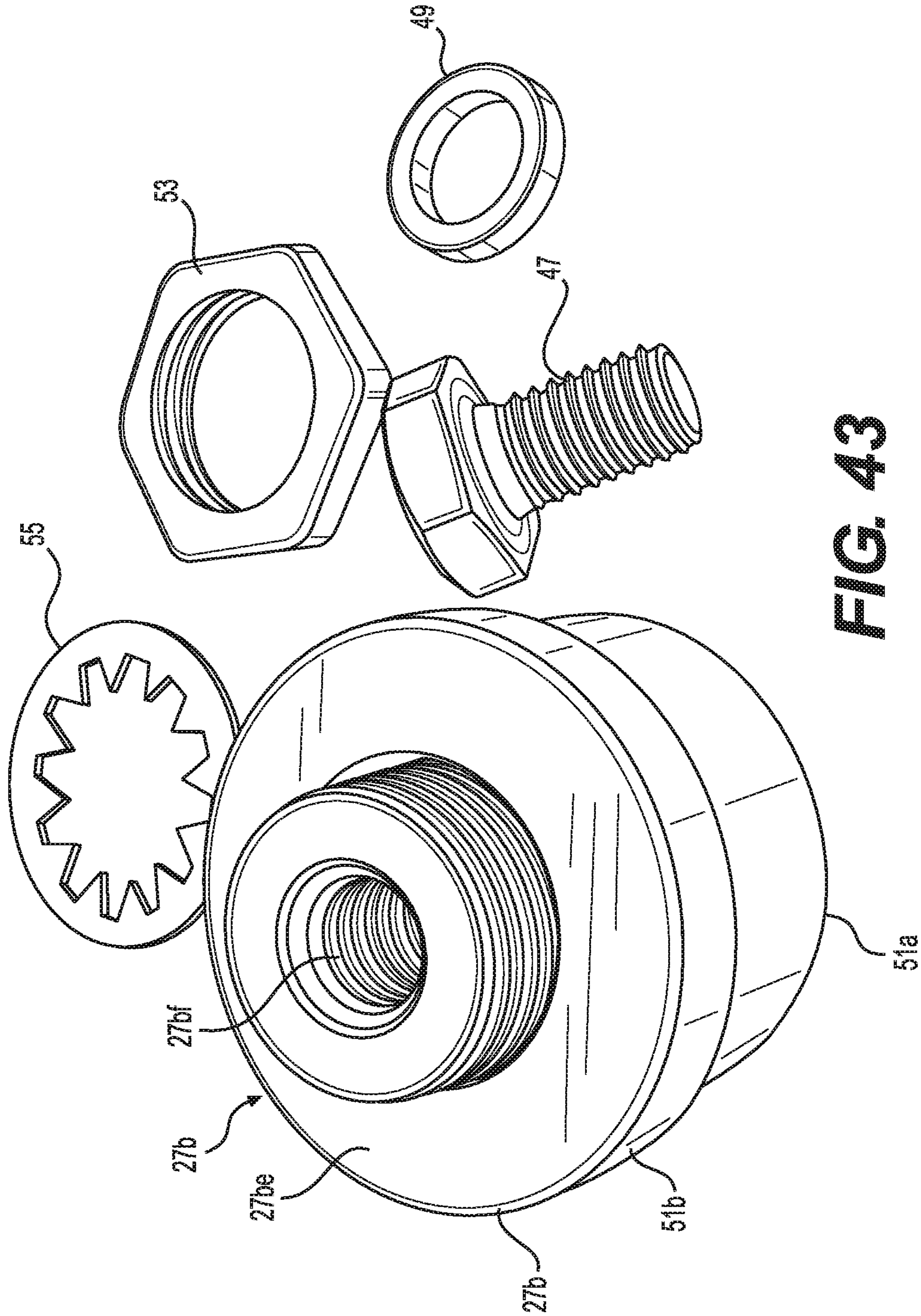
FIG. 43 is a partially assembled perspective end view of the female cam-lock end of the cam-lock connecting device shown in FIG. 32.
Figure 44:
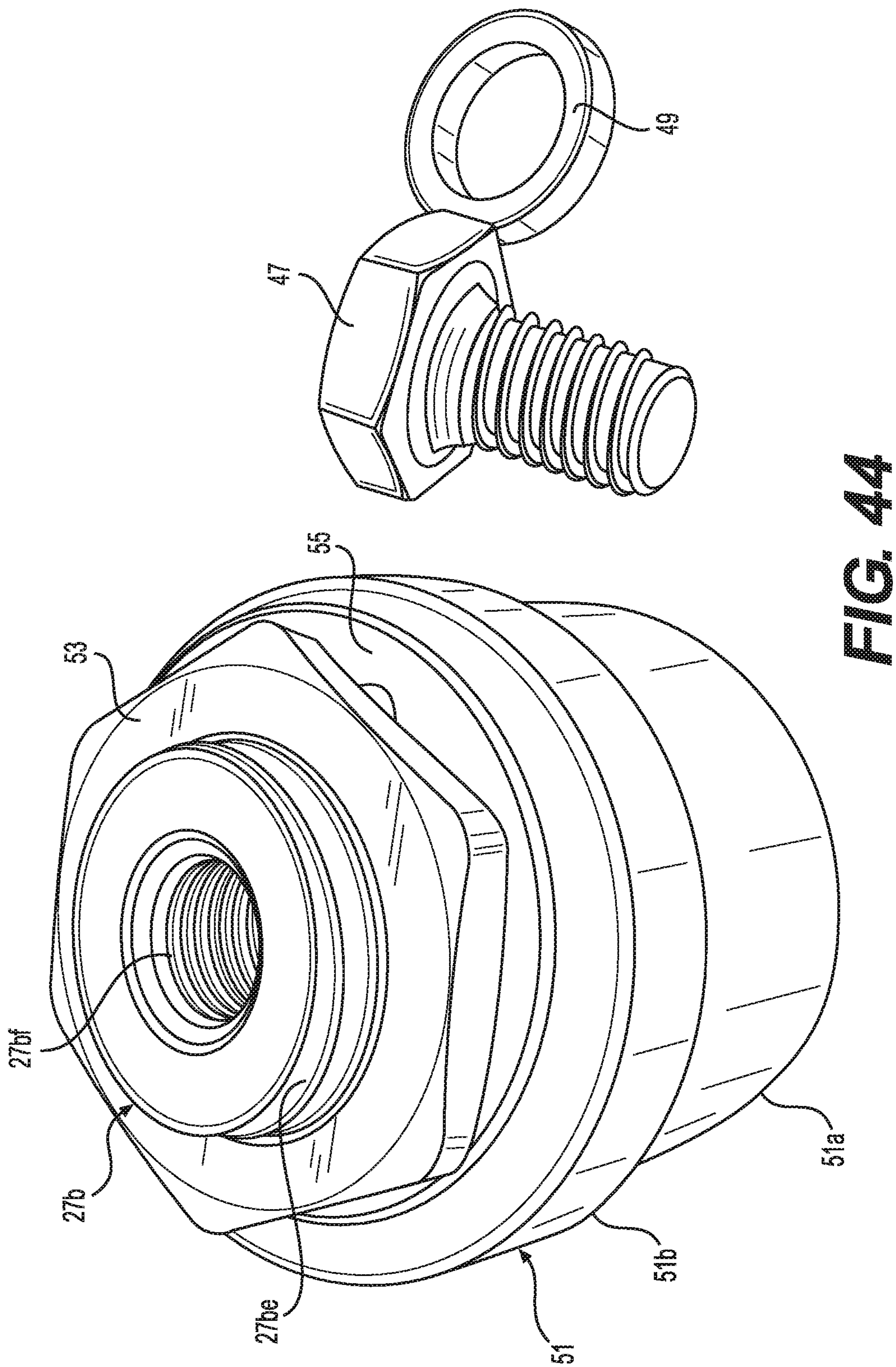
FIG. 44 is an assembled perspective end view of the female cam-lock end of the cam-lock connecting device shown in FIG. 32.
Figure 45:
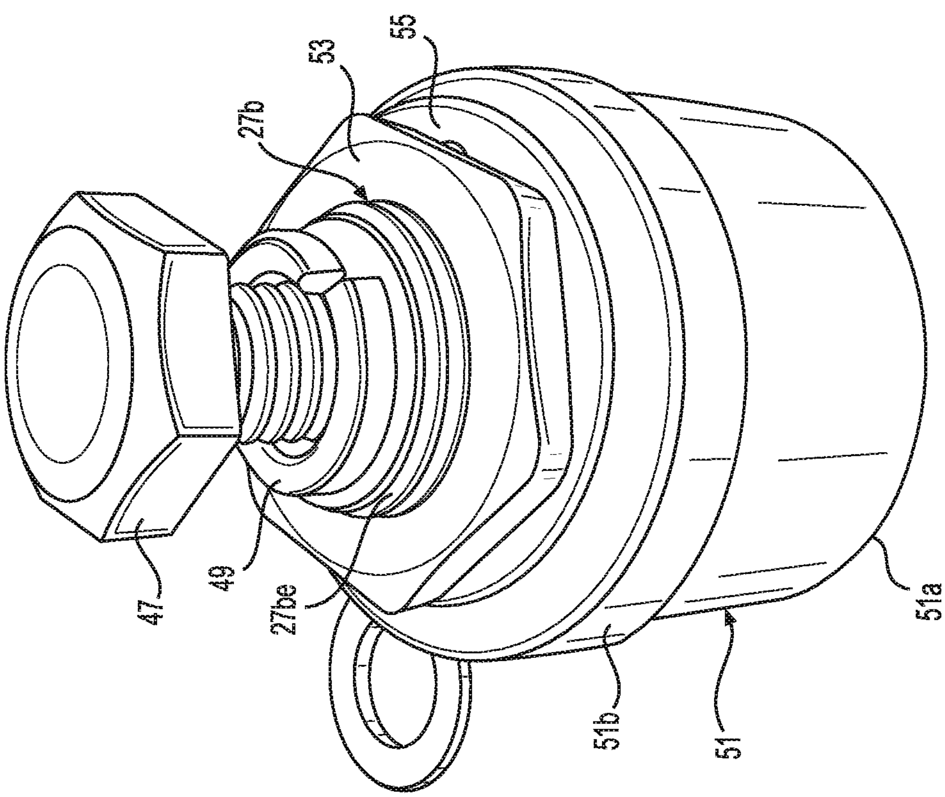
FIG. 45 is an assembled perspective end view of the female cam-lock end of the cam-lock connecting device shown in FIG. 32 along with a bolt for connecting to conductor such as a highly conductive frame of the battery jump starting device according to the present invention.
Figure 46:
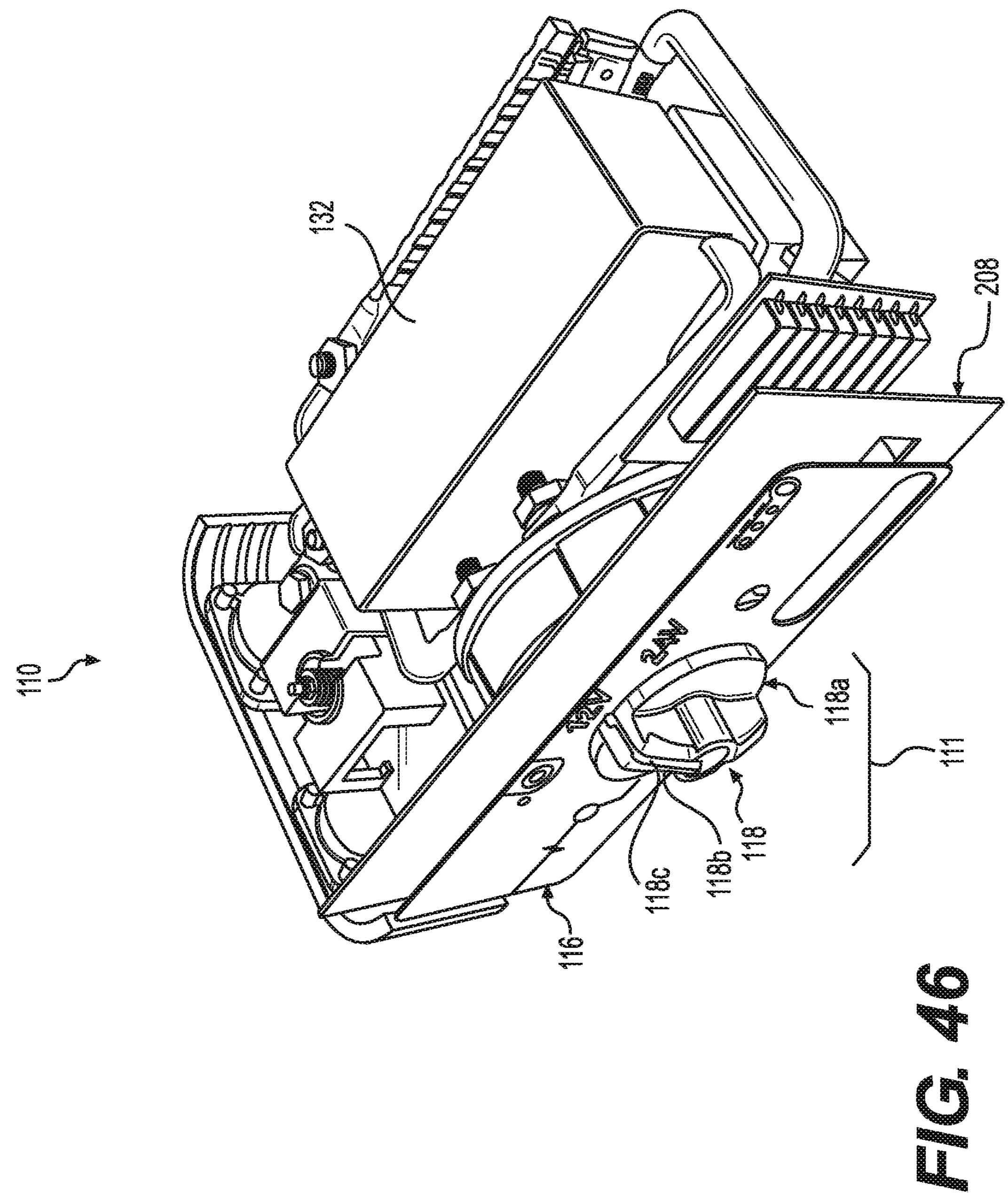
FIG. 46 is a front perspective view of the battery jump starting device shown in FIG. 16 with the cover removed showing the master control switch and interface backlight system according to the present invention.
Figure 47:
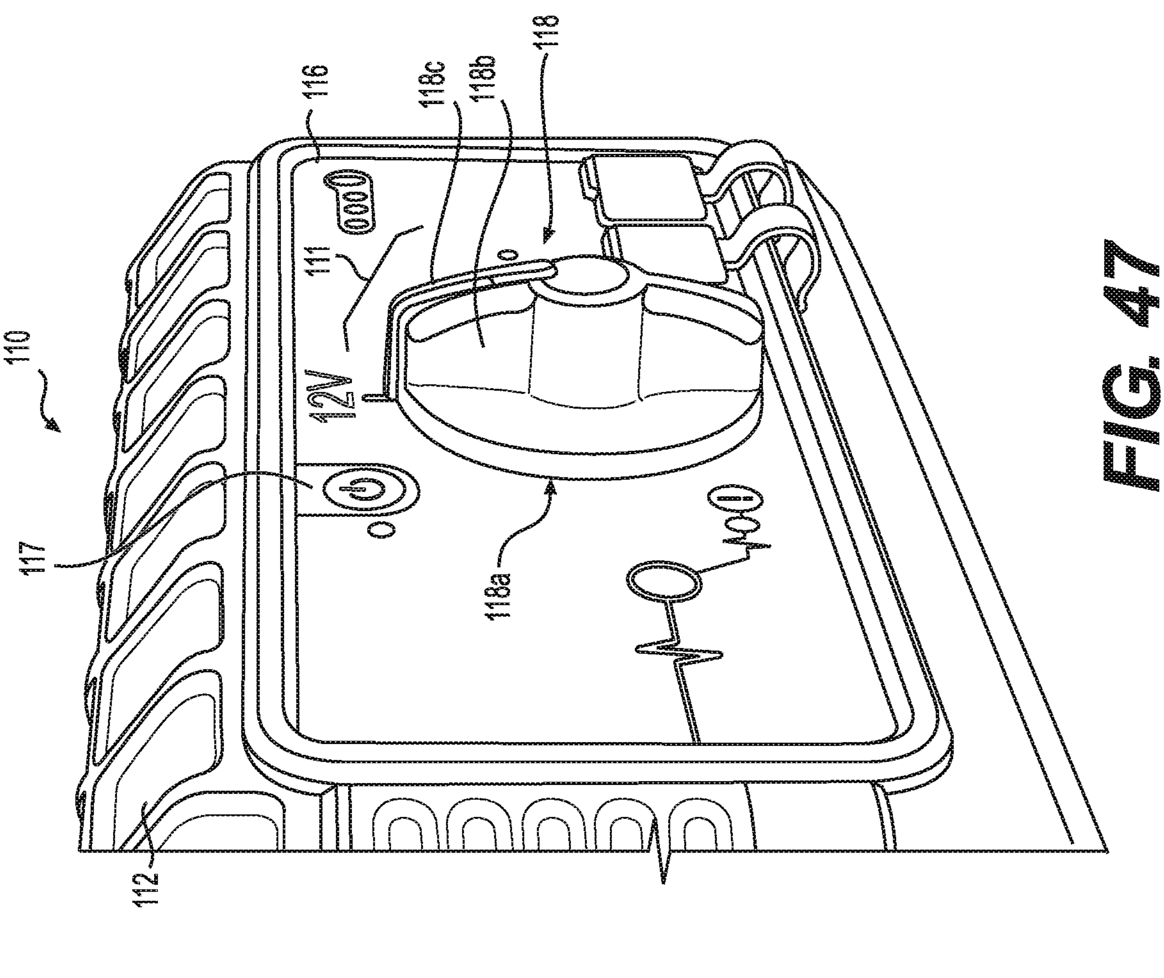
FIG. 47 is a partial front perspective view of the battery jump starting device shown in FIG. 16 with the backlight of the control knob of the control switch for 12V turned "on."
Figure 48:
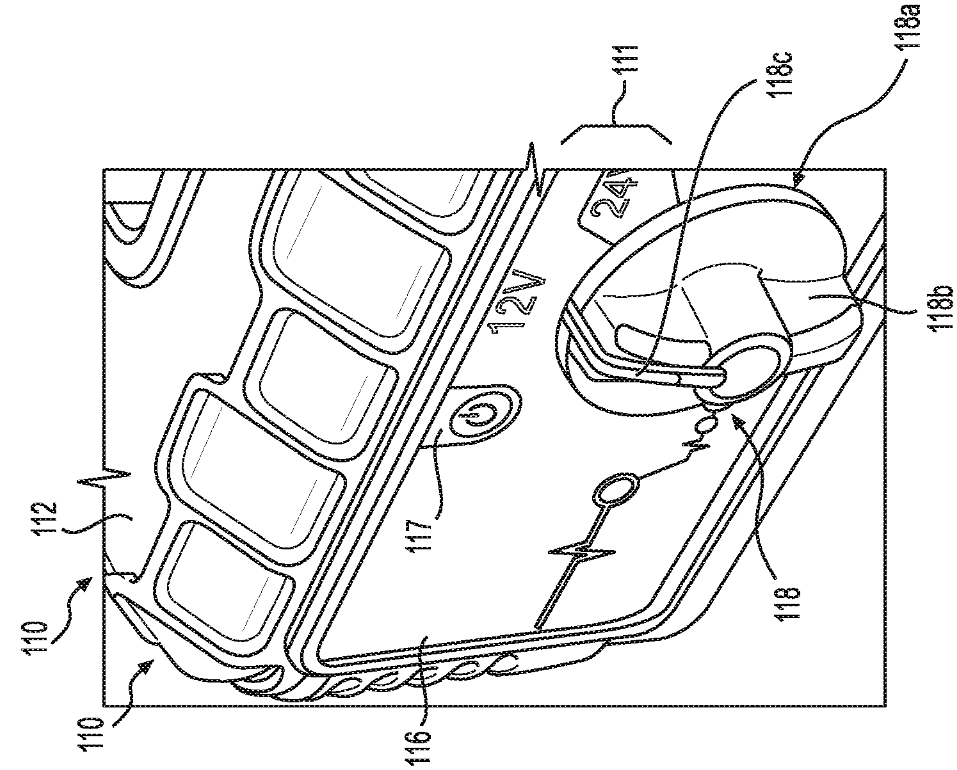
FIG. 48 is a partial front perspective view of the battery jump starting device shown in FIG. 16 with the backlight of the control knob of the control switch for 12V turned "off."

The female cam-lock end 27*b* is accommodated within the molded rubber cover portions 51*a*, 51*b*, as shown in FIGS. 41-43. The molded rubber cover portions 51*a*, 51*b* are fitted onto the threaded portion 27*be* of the female cam-lock end 27*b* (FIGS. 43-45), and then secured in place using nut 53 and lock washer 55. The molded rubber cover portion 51*a* includes an outwardly extending protrusion 51*aa*.

Electrical Control Switch Backlight System

The battery jump charging device 110 can be provided with an electrical control switch backlight system 111, as shown in FIGS. 46-50.

Figure 26:
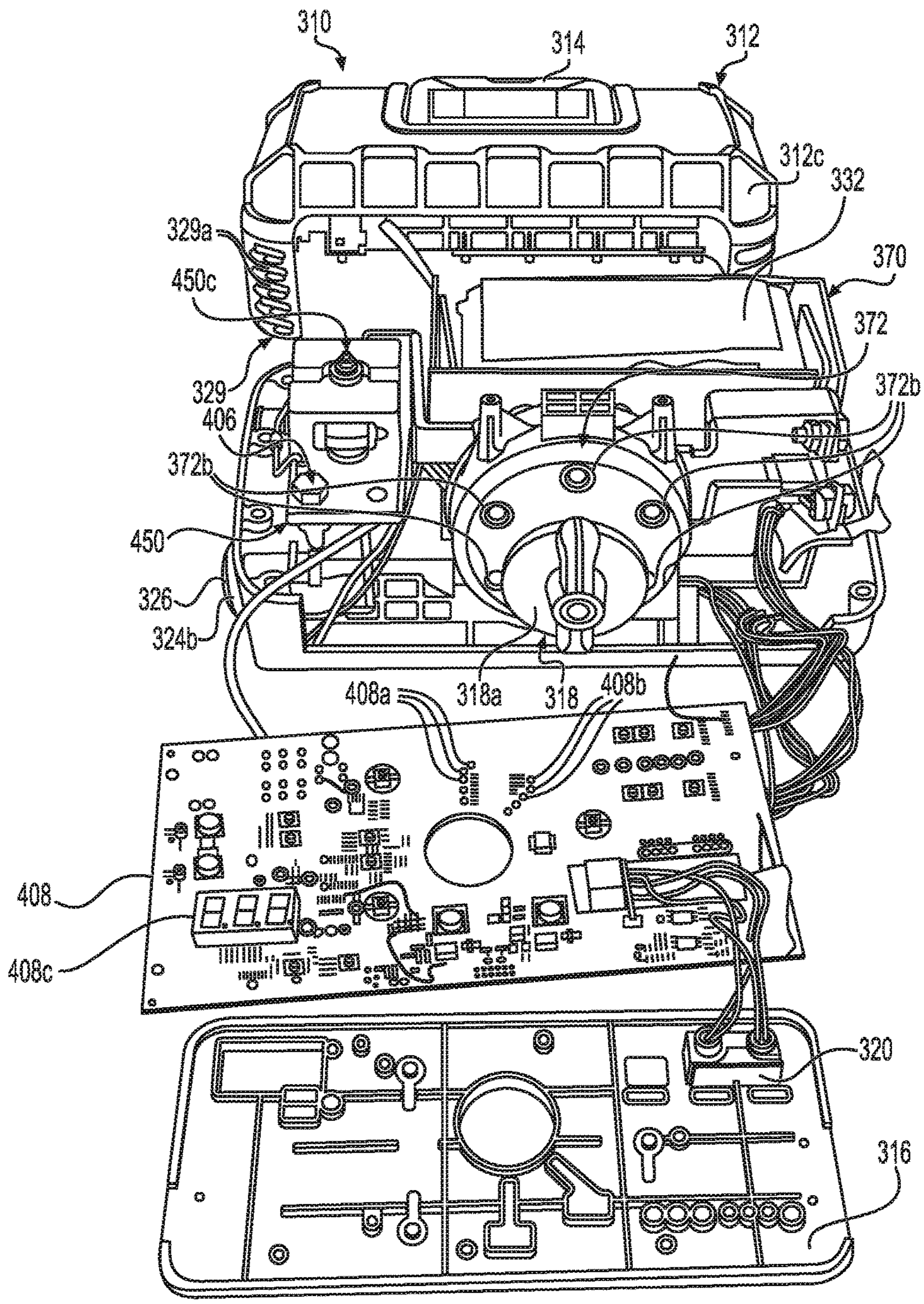
FIG. 26 is a disassembled front perspective view of a third embodiment of the battery jump starting device according to the present invention with the cover removed.
Figure 27:
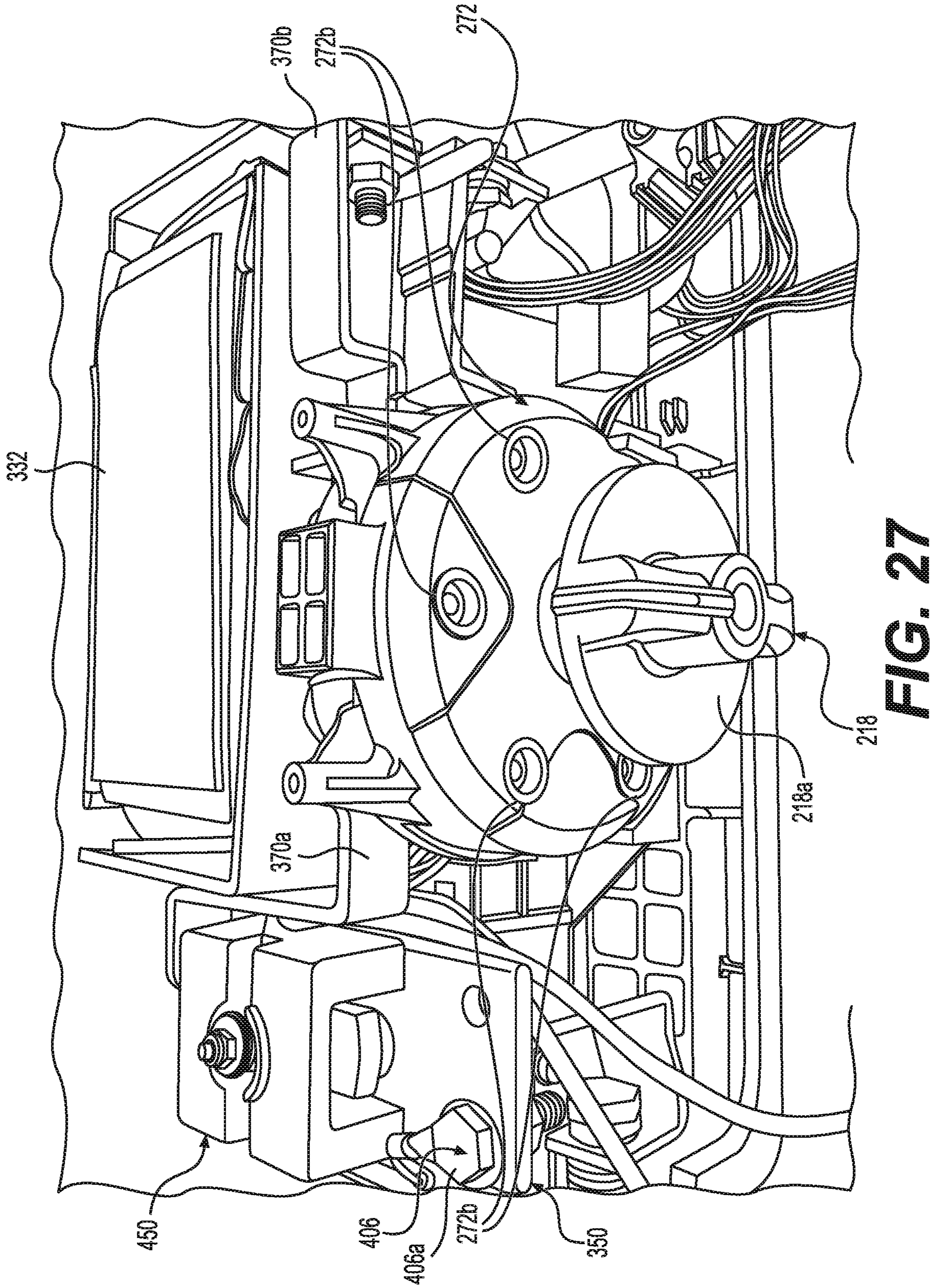
FIG. 27 is a disassembled partial front perspective view of the battery jump starting device shown in FIG. 26 with the cover removed.
Figure 28:
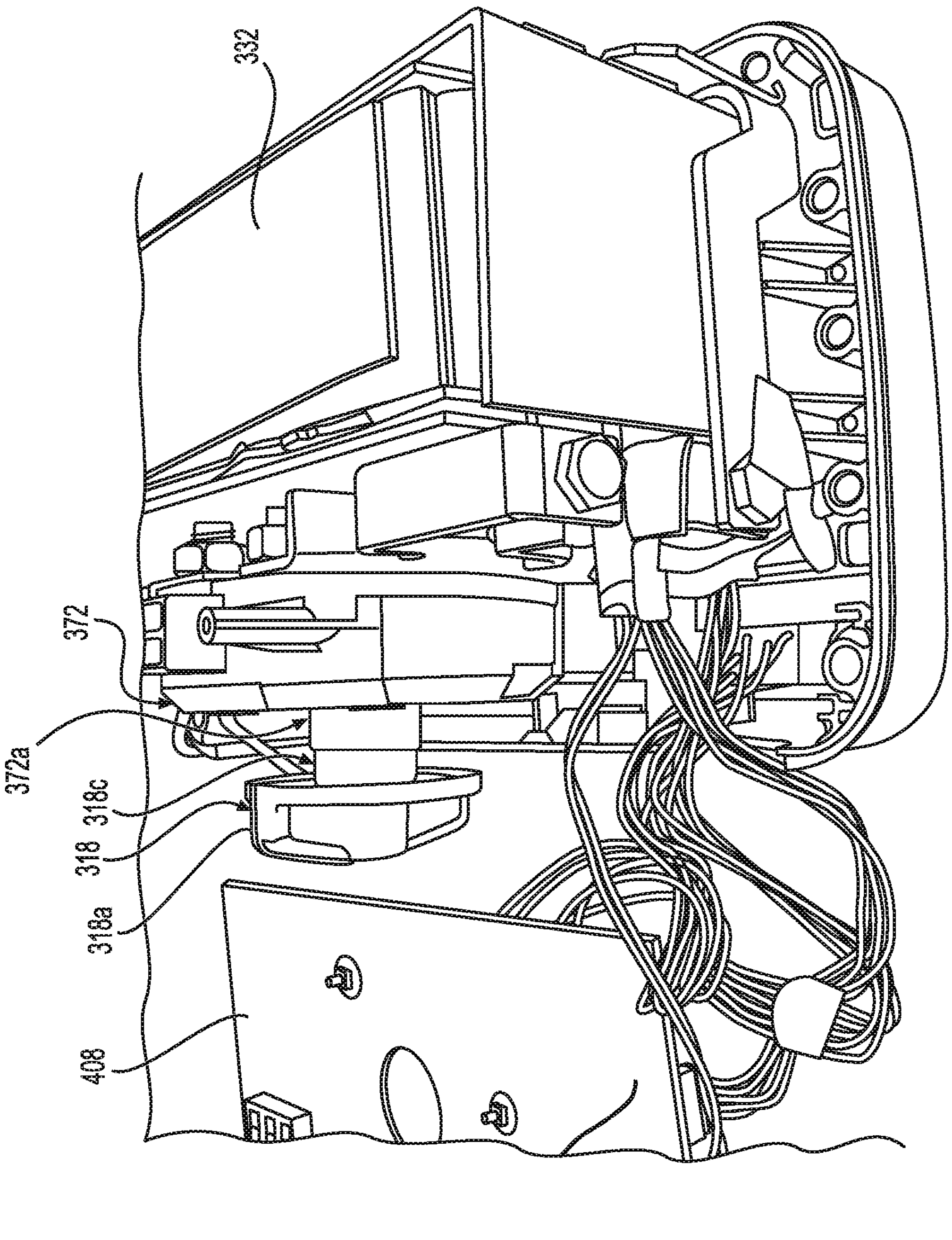
FIG. 28 is a disassembled partial right side perspective view of the battery jump starting device shown in FIG. 26 with the cover removed.
Figure 29:
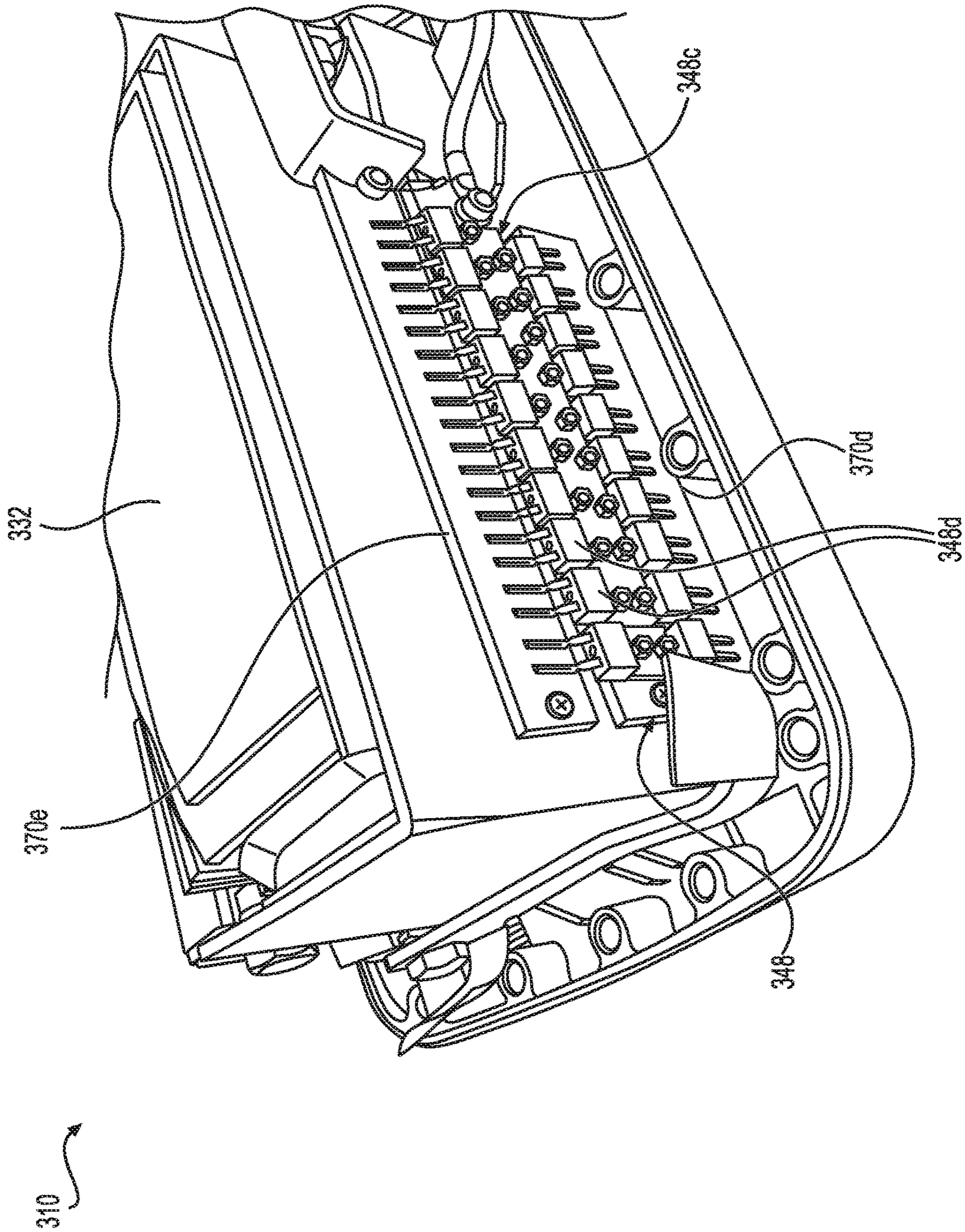
FIG. 29 is a partial rear perspective view of the battery jump starting device shown in FIG. 26 with the cover removed.
Figure 30:
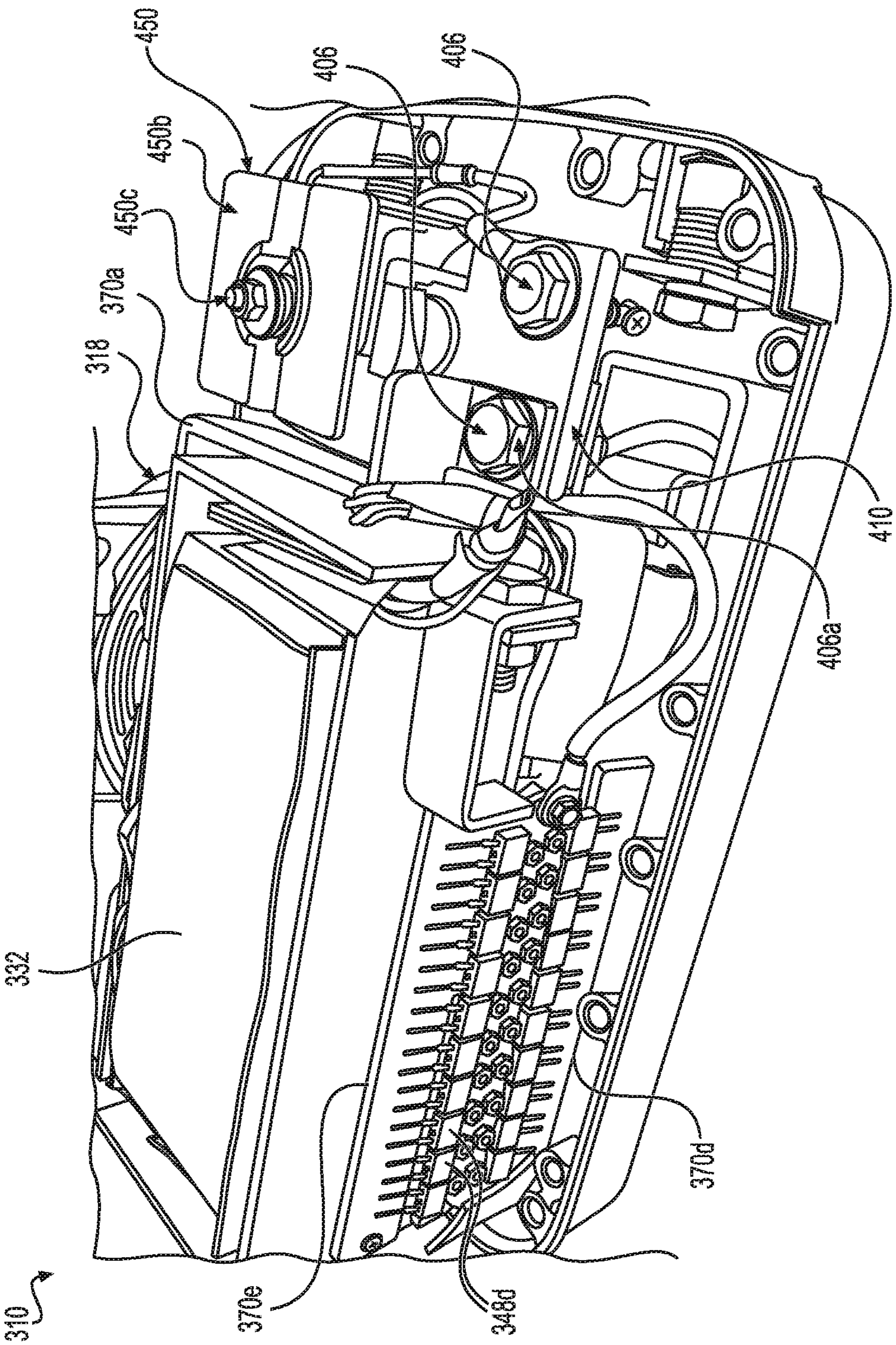
FIG. 30 is a partial rear perspective view of the battery jump starting device shown in FIG. 26 with the cover removed.

The electrical control switch backlight system 111, for example, comprises control switch 118 having the control knob 118*a*, the interface 116 (e.g. with black colored membrane label), and the main printed circuit board 408 (FIG. 26).

The control knob 118*a* comprises the finger grip 118*b* and light window 118*c*. For example, the control knob 118*a* is made of plastic (e.g. black colored injection molded plastic part). For example, the control knob 118*a* is mainly made of a colored (e.g. black colored) opaque plastic material selected to prevent the transmission of light through the control knob 118*a*, and provided with the light window 118*c* (e.g. a slot filled with light transmitting plastic such as clear plastic material or see through plastic material). For example, the light window 118*c* is insert molded with a clear or see through insert part). The light window 118*c* allows light from the backlight LEDs 408*a* or 408*b* mounted on the printed circuit board 408 (FIG. 26) to pass through light windows in the interface 116 and then the light window 118*c* of the control knob 118*a*. The LEDs 408*a* or 408*b* are selectively lite up when the power button 16*a* (FIG. 69) on the interface 16 (116) is turned on (e.g. touch power switch) selectively lighting up the LEDs 408*a* or 408*b*. Alternatively, the light window 118*c* can be an open slot (i.e. void) in the control knob 118*a* serving as the light window 118*c*.

The control switch 118 is rotatable between a first position (Position 1) for a 12V mode of operation of the battery jump starting device 110 and a second position (Position 2) for a 24V mode of operation of the battery jump starting device 110.

The interface 16 (116) is provided with a 12V backlight indicator 16*c* (FIG. 69), a 24V backlight indicator 16*d* (FIG. 69), and an operating voltage display 16*p* for indicating the actual or real time operating voltage of the battery jump charging device 10 (110), and a power "on" indicator 16*a* (FIG. 69).

The electrical control switch backlight system 111 (FIGS. 46-50) is configured to turn on the LEDs 408*a* (e.g. white LEDs) mounted on the printed circuit board 408 (FIG. 26) when the control switch 118 is located at Position 1 for the 12V mode of operation of the battery jump starting device 110, and turn on the LEDs 408*b* (e.g. blue LEDs) mounted on the printed circuit board 408 when the control switch 118 is located at Position 2 for the 24V mode of operation of the battery jump starting device 110. As show in FIGS. 46-50, the light window 118*c* is provided in the control knob 118*a* and lights up along with 12V backlight indicators on the interface 116 when the control knob 118 is in Position 1. The 24V backlight indicator lights up when the control knob 118*a* is in Position 2.

The rechargeable battery jump starting device 110 comprises the cover 112 and the interface 116 mounted on the cover. A power source for the electrical switch backlight system is disposed within the cover 112. For example, the power source is one or both of the Li-ion batteries 332 (FIG. 26).

Figure 49:
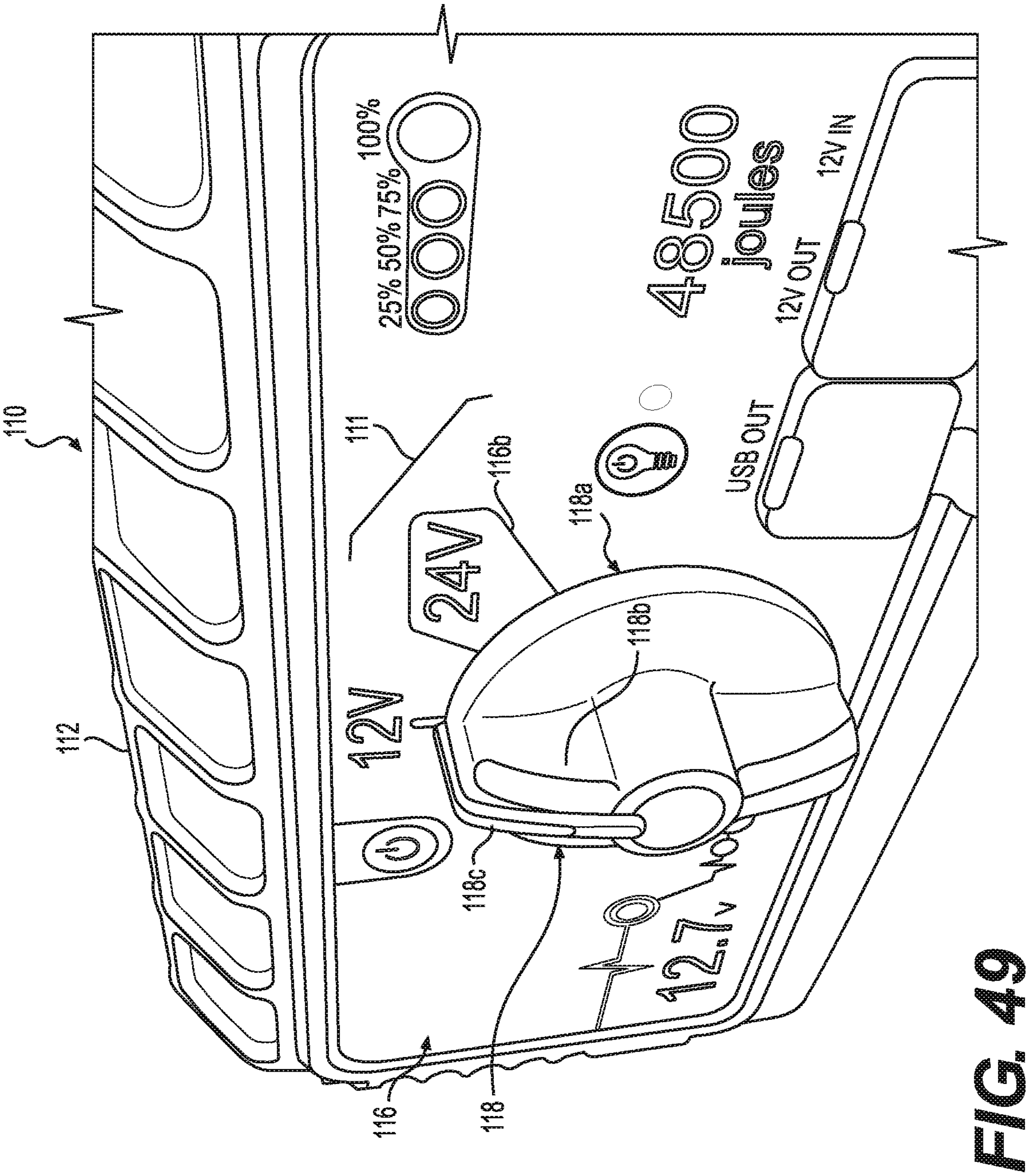
FIG. 49 is a partial front perspective view of the battery jump starting device shown in FIG. 16 with the backlight of the control knob of the control switch for 12V turned "on", the backlight indicator for 12V on the interface turned "on", the variable backlight indicator on the indicator showing 12.7V turned "on", and the backlight for power "on."
Figure 50:
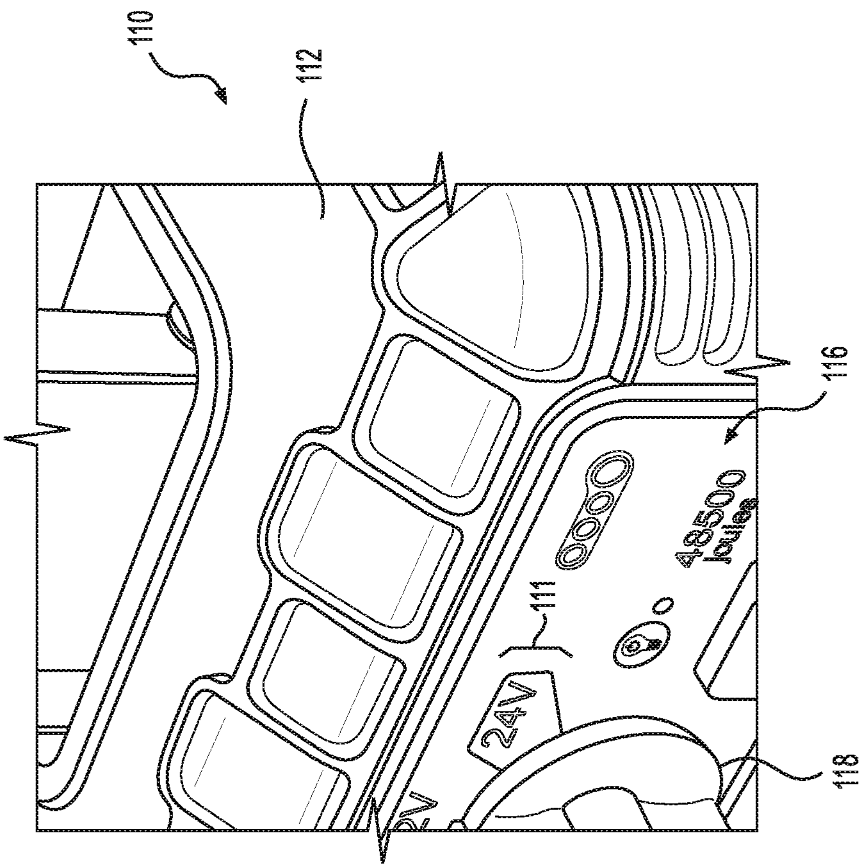
FIG. 50 is a partial front perspective view of the battery jump starting device shown in FIG. 16 with the backlight of the control knob of the control switch for 24V turned "on."

The printed circuit board 408 (FIG. 26) is provided with the backlights 408*a*, 408*b* located at different positions on the printed circuit board 408 (FIG. 26) and at different positions on the interface 116 (FIG. 49). The backlights 408*a*, 408*b* are selectively powered by the power source.

The electrical control switch 118 is mounted on the interface 116. The electrical control switch 118 is rotatable between different positions on the interface 116 (e.g. 12V position and 24V position).

The control knob 118*a* is mounted on the electrical control switch 118, and the control knob 118*a* is rotatable between the different positions on the interface 116. Again, the control knob 118*a* is provided with the light window 118*c*. The light window 118*c* of the control knob 118*a* lights up when the control knob 118*a* is selectively rotated to one of the different positions (e.g. 12V position or 24V position) on the interface 116 by one of the at least two backlights 408*a*, 408*b* (FIG. 26).

The interface 116 is provided with at least two visual indicators (e.g. 12V symbol and 24V symbol) each located at the different positions on the interface 116, respectively, to indicate different operating modes of the rechargeable battery jump starting device 110. The at least two visual indicators are configured to selectively light up when the control knob 118*a* is selectively rotated to one of the different positions on the interface 116 by the backlights 408*a*, 408*b*.

The at least two visual indicators 16*c*, 16*d* (FIG. 69) are provided by light windows through the interface 116 located at the different positions, respectively. Again, the at least two visual indicators 16*c*, 16*d* selectively light up when the control knob is selectively rotated to one of the different positions on the interface 116 by one of the at least two backlights 16*c*, 16*d*. One of the at least two visual indicators 16*c*, 16*d* (FIG. 69) is the symbol 12V to indicate 12 volt operation mode of the device and the other of the at least two visual indicators 16*c*, 16*d* (FIG. 69) is the symbol 24V to indicate 24 volt operation mode of the rechargeable battery jump starting device 110.

The interface 116 (316) comprises the printed circuit board 408 (FIG. 26) located on or adjacent to a back side of the interface 116 (316). The interface 116 (316) having at least two lights such as LEDs 408*a*, 408*b* located at the different positions on the interface 116 (316). For example, the at least two backlights are at least two light emitting diodes (LEDs) 408*a*, 408*b* connected to the printed circuit board 408.

The control knob 118*a* comprises a light blocking opaque portion having a clear portion or see through portion configured to serve as the light window 118*c*.

The rechargeable battery jump starting device 110 further comprises the first 12V battery 132 (332) disposed within the cover 310, as shown in FIG. 26, and a second 12V battery 332 located below the first 12V battery 332 and disposed within the cover.

The highly conductive frame 370 having a positive conductive pathway and a negative conductive pathway is selectively connected to the first 12V battery 332 and/or the second 12V battery 332 when the rechargeable battery jump starting device 110 device is jump charging a battery to be charged.

The positive battery cable 56 (FIG. 9) having the positive battery clamp 60 is connected to the positive conductive pathway of the highly conductive frame 370 (FIG. 26). The negative battery cable 58 (FIG. 9) having the negative battery clamp 62 is connected to the negative conductive pathway of the highly conductive rigid frame 370 (FIG. 26).

The control switch 318 (FIG. 26) is connected to the highly conductive frame 370 to selectively operate the first 12V battery 332 and/or the second 12V battery 332. The control knob 318*a* is configured to rotate between the 12V operating mode position (FIG. 49) and the 24V operating mode position to selectively operate the rechargeable battery jump starting device 110 in either the 12V mode or 24V mode.

The rechargeable battery jump starting device 110 is configured to light up one of the at least two backlights such as LEDs 408*a*, 408*b* (FIG. 26) on the interface 116 (316) when the rechargeable battery jump starting device 110 is turned on. Further, the interface 116 (316) is configured to display the real time operating voltage of the device during operation of the rechargeable battery jump starting device 110 (310). The first 12V battery 332 (FIG. 26) and second 12V battery 332 are Li-ion batteries.

The control knob 118*a* is made of an opaque material (e.g. black injection molded plastic polymer material), and the light window 118*c* is defined by the slot-shaped light window in the control knob 118*a* filled light transmitting material (e.g. clear or see through plastic material). The control knob 118*a* comprises a round outer edge, and the slot-shaped light window 118*c* is a radially oriented slot extending from the outer edge of the control knob inwardly. The control knob 118*a* comprises a finger grip 118*b*, and the slot-shaped light window 118*c* extends along a length axis of the finger grip 118*b*.

The rechargeable battery jump starting device 110 further comprises an electrical position switch located between the power source (e.g. Li-ion batteries 332) and the at least two backlights such as LEDs 408*a*, 408*b* (FIG. 26). The electrical position switch is configured to light up one of the at least two backlights when the control knob 118*a* is selectively rotated to one of the different positions on the interface 116.

Electrical System

Figure 67:
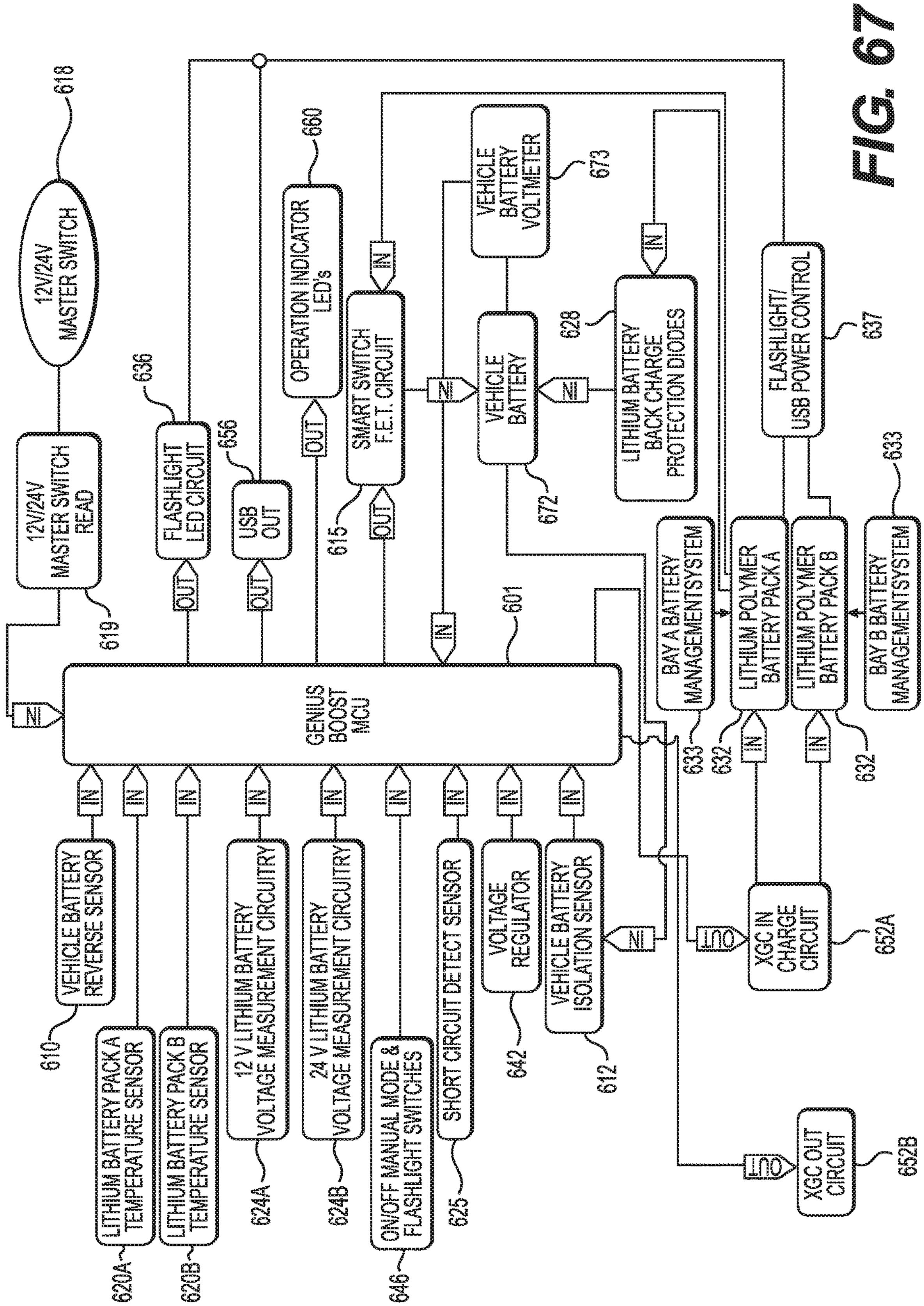
FIG. 67 is a functional block diagram of the rechargeable battery jump starting device shown in FIG. 26.
Figures 1, 68A:
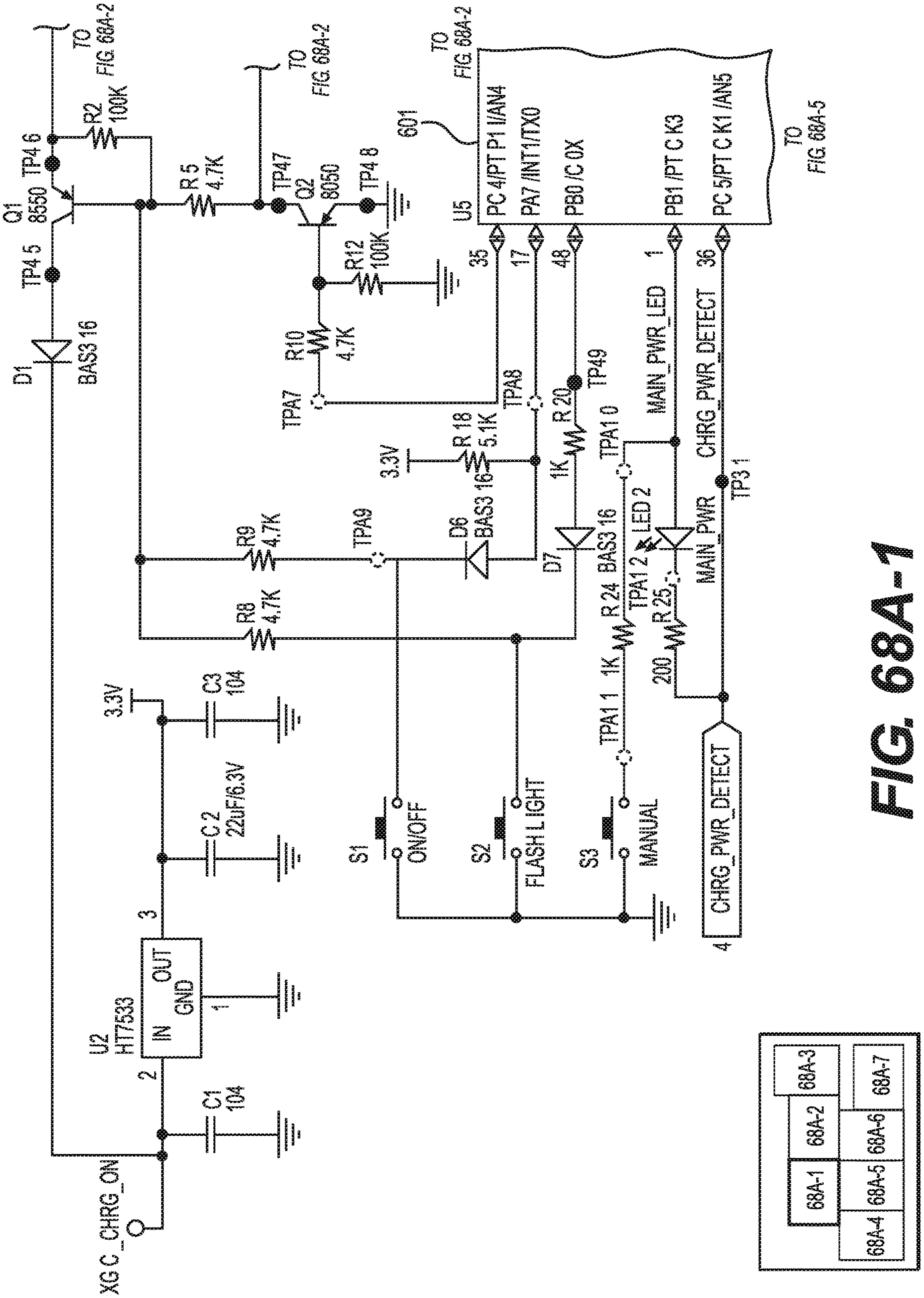
Figures 2, 68A:
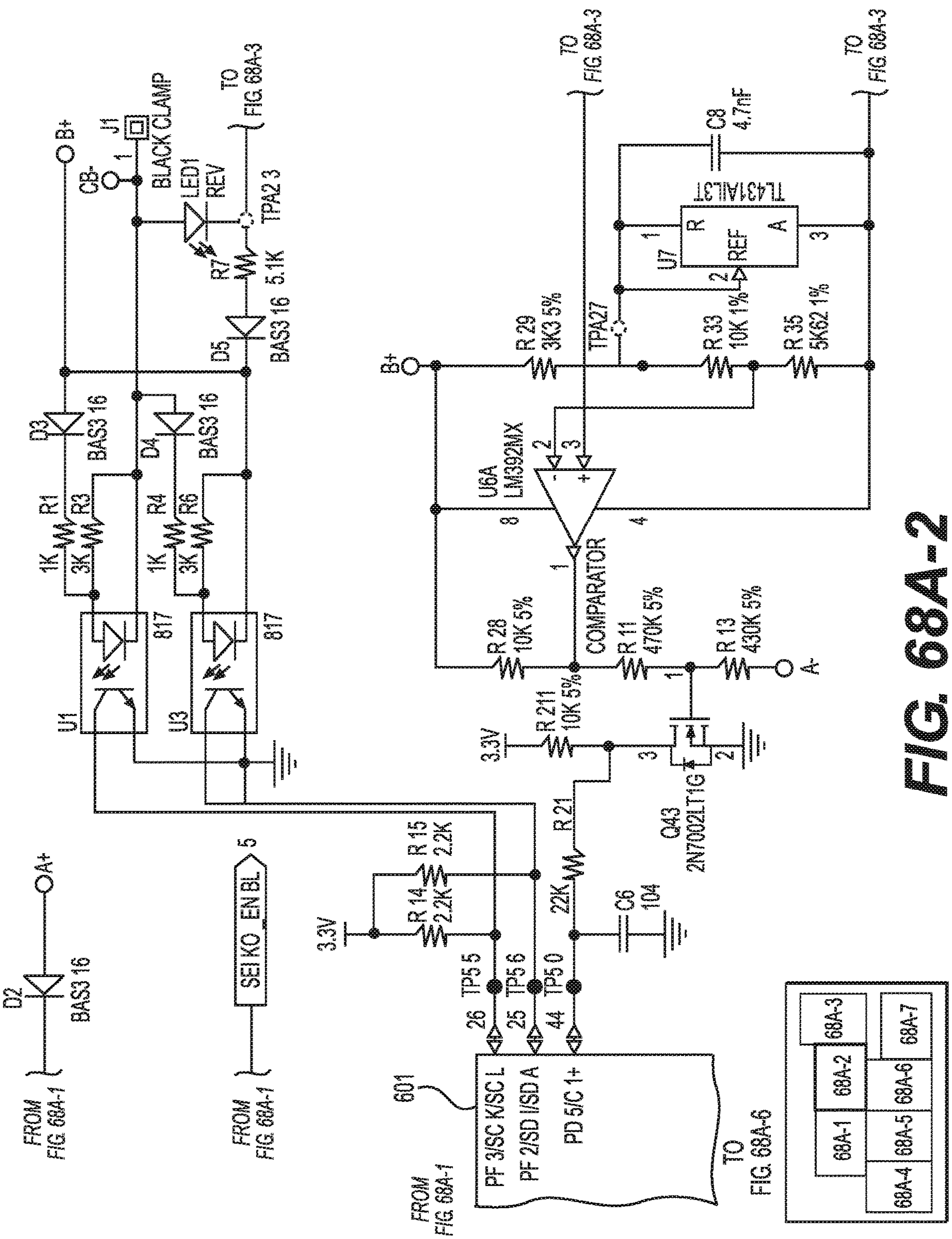
Figures 3, 68A:
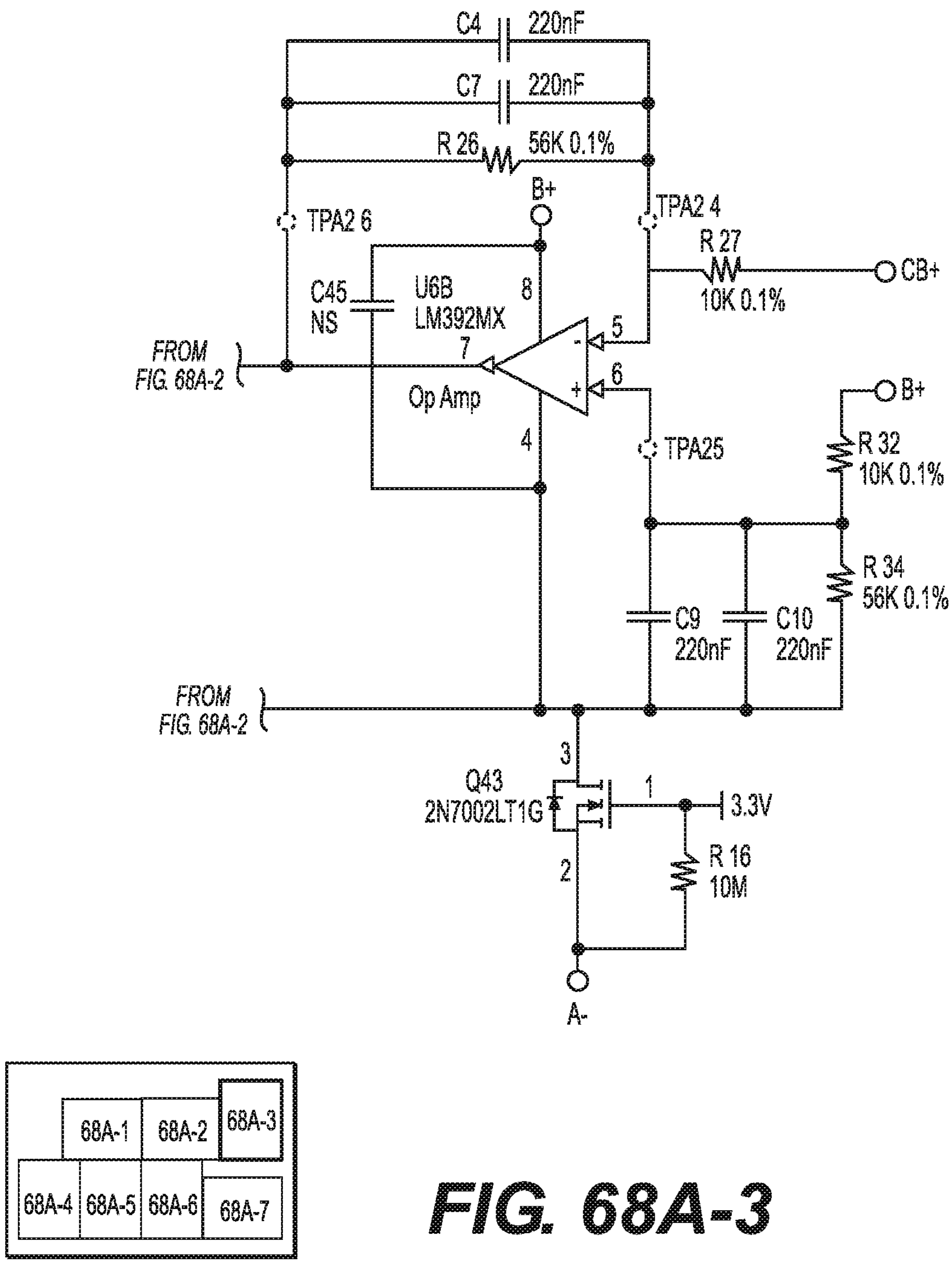
Figures 4, 68A:
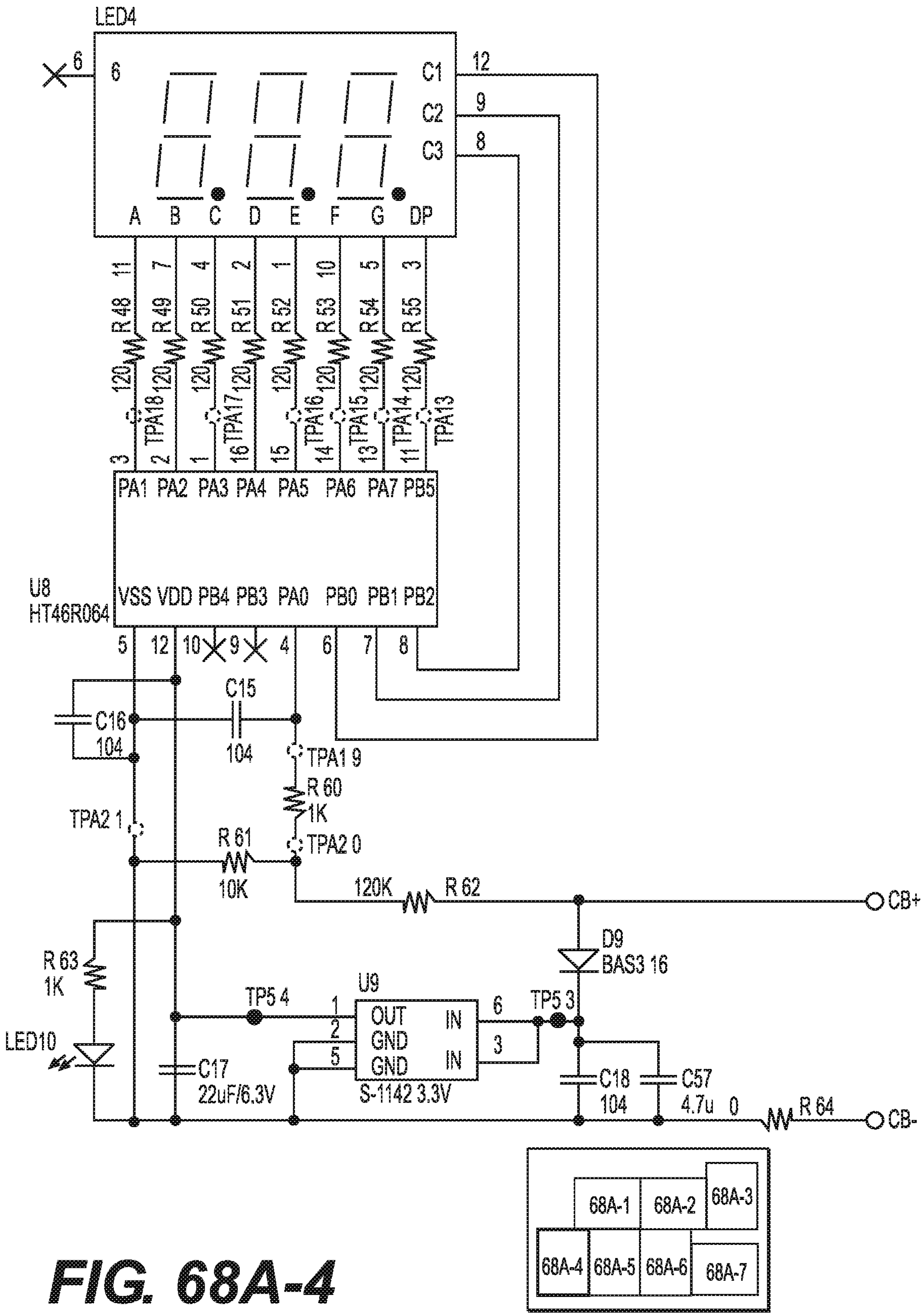
Figures 5, 68A:
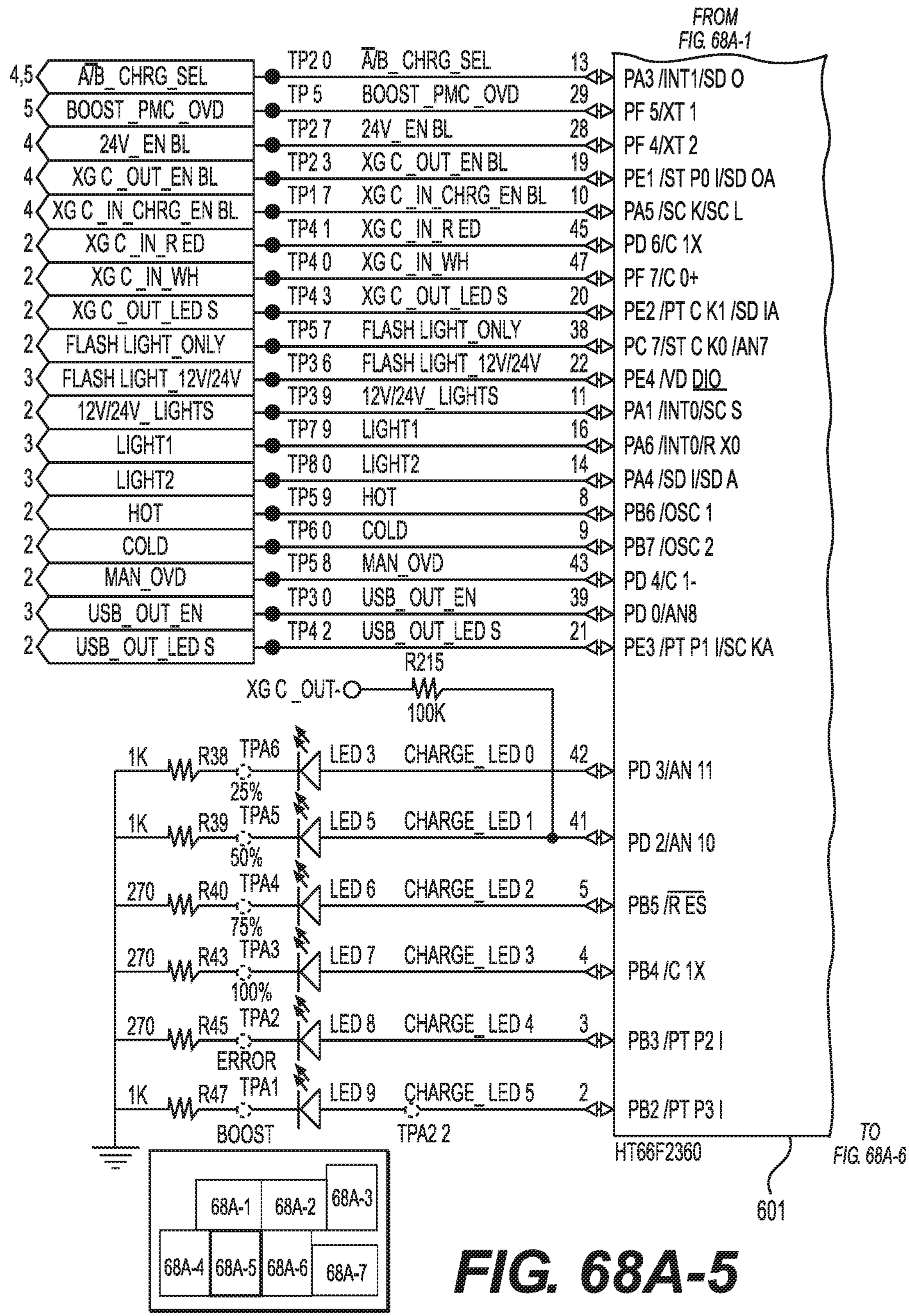
Figures 6, 68A:
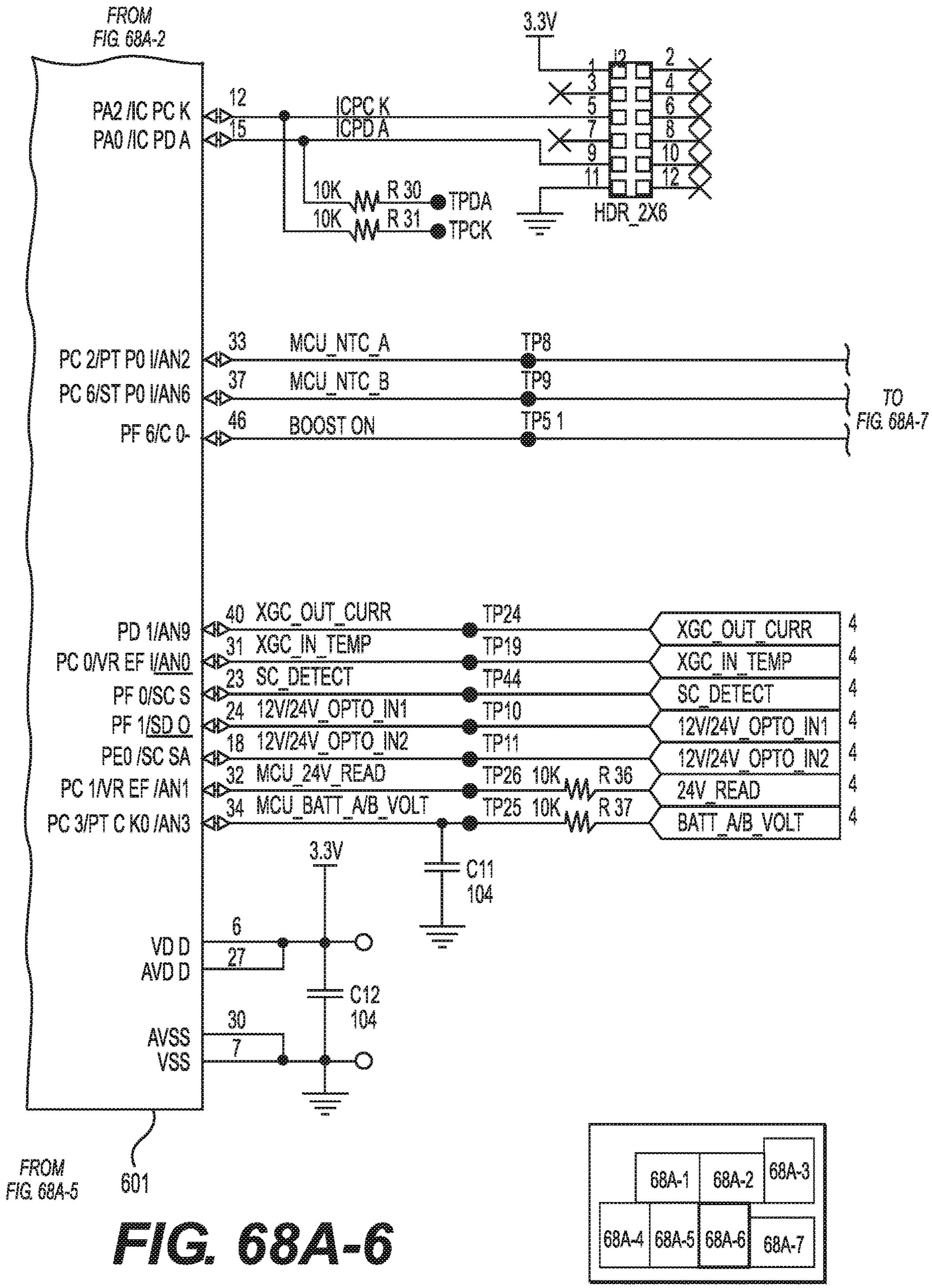
Figures 7, 68A:
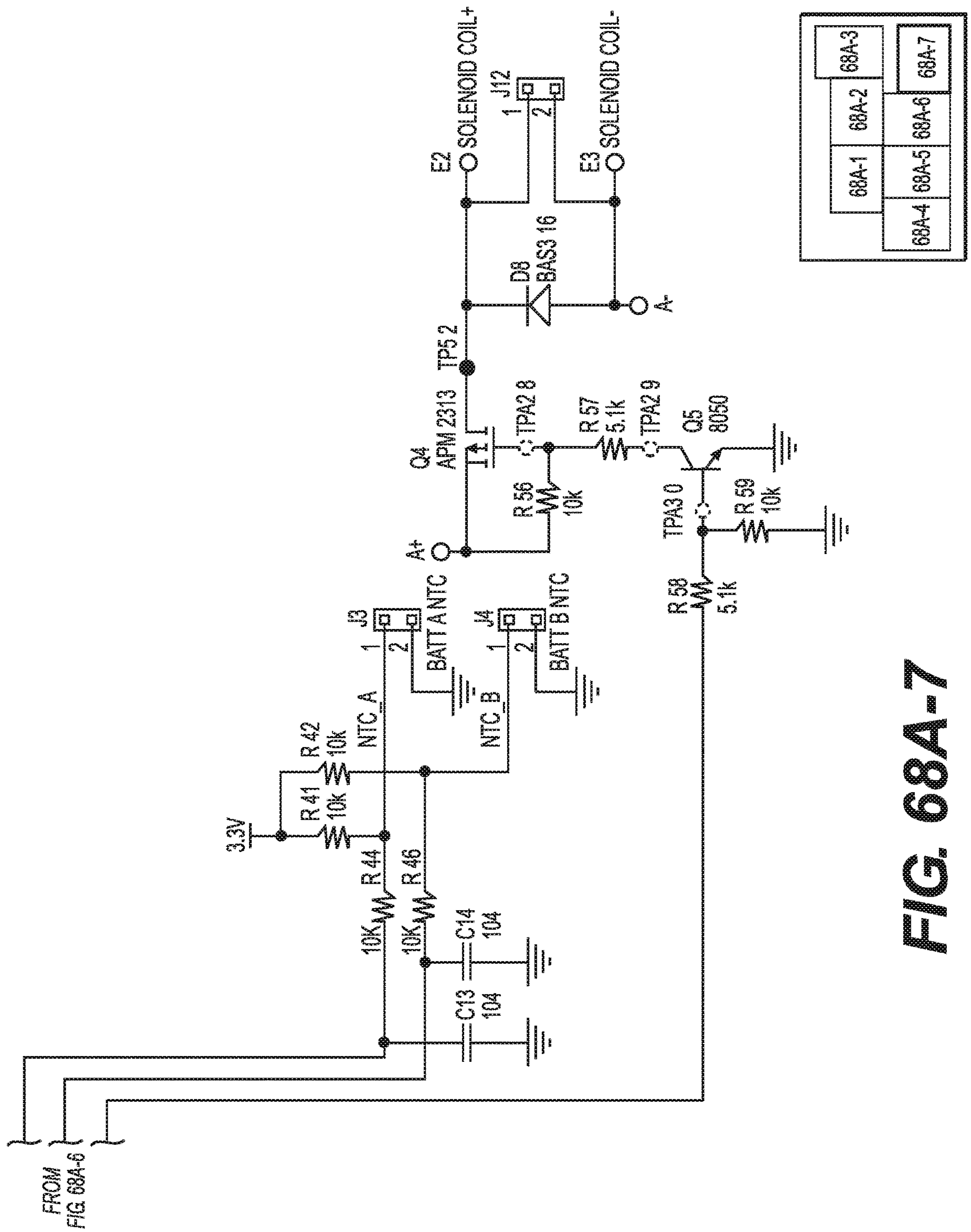
Figures 1, 68B:
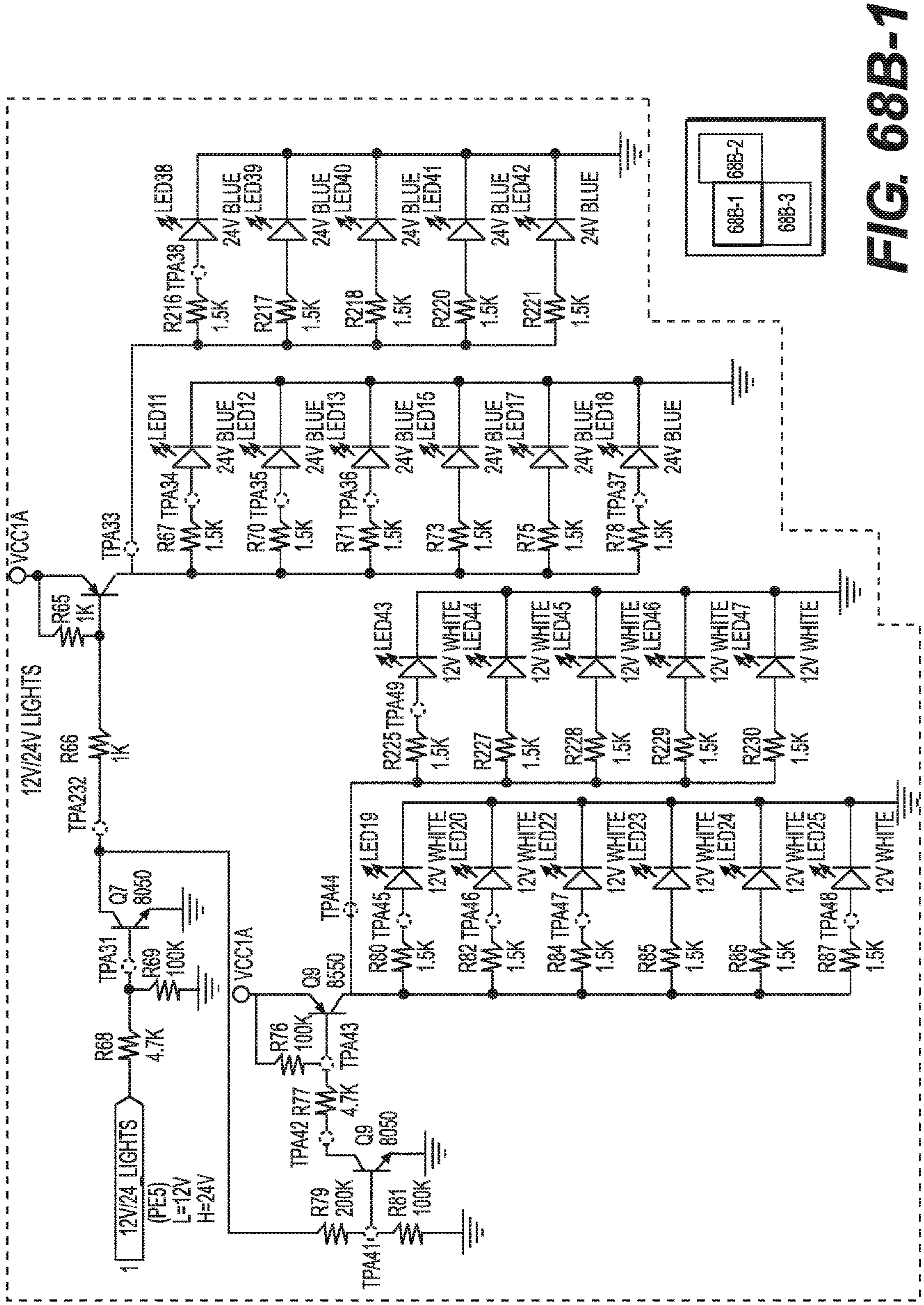
Figures 2, 68B:
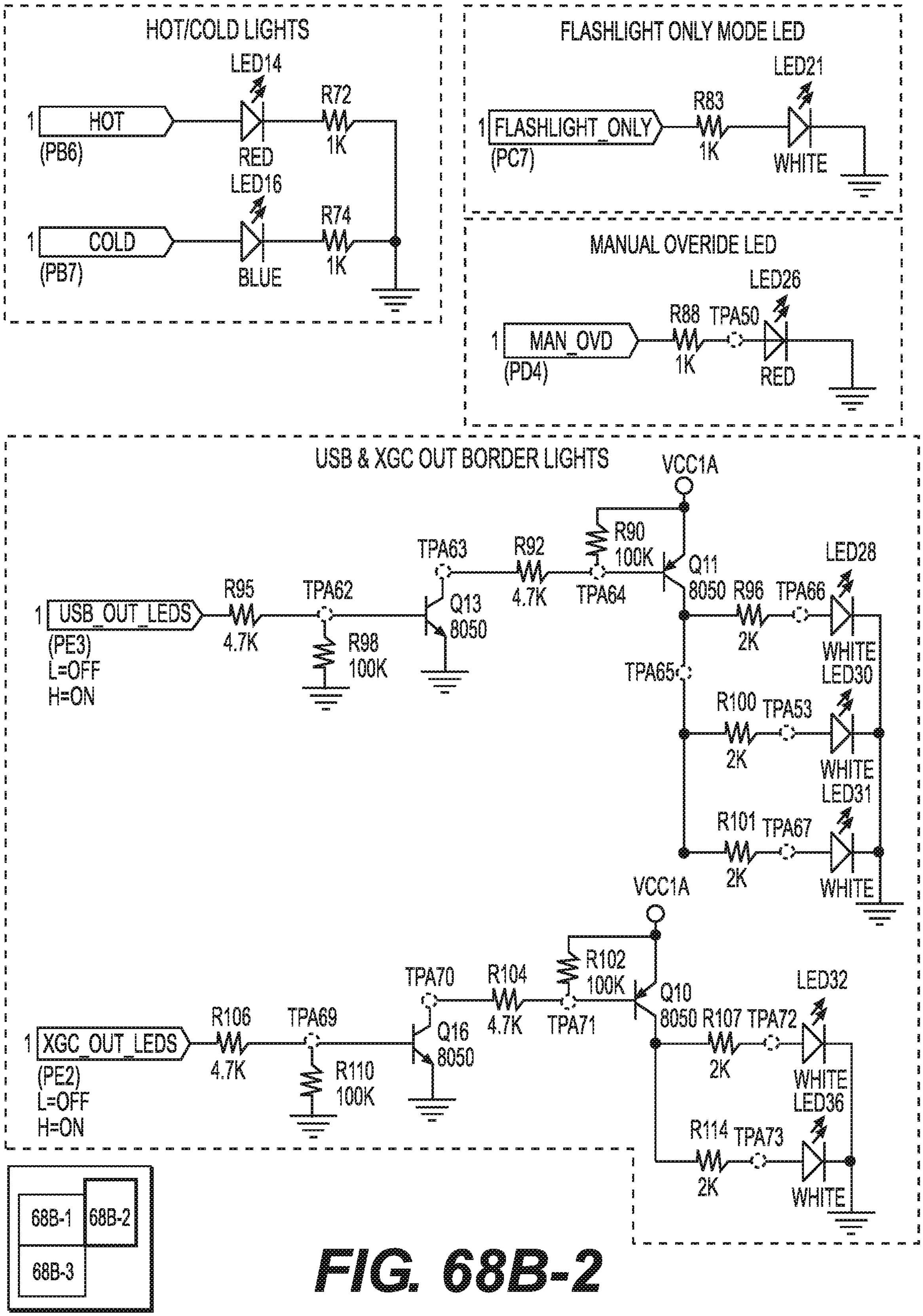
Figures 3, 68B:
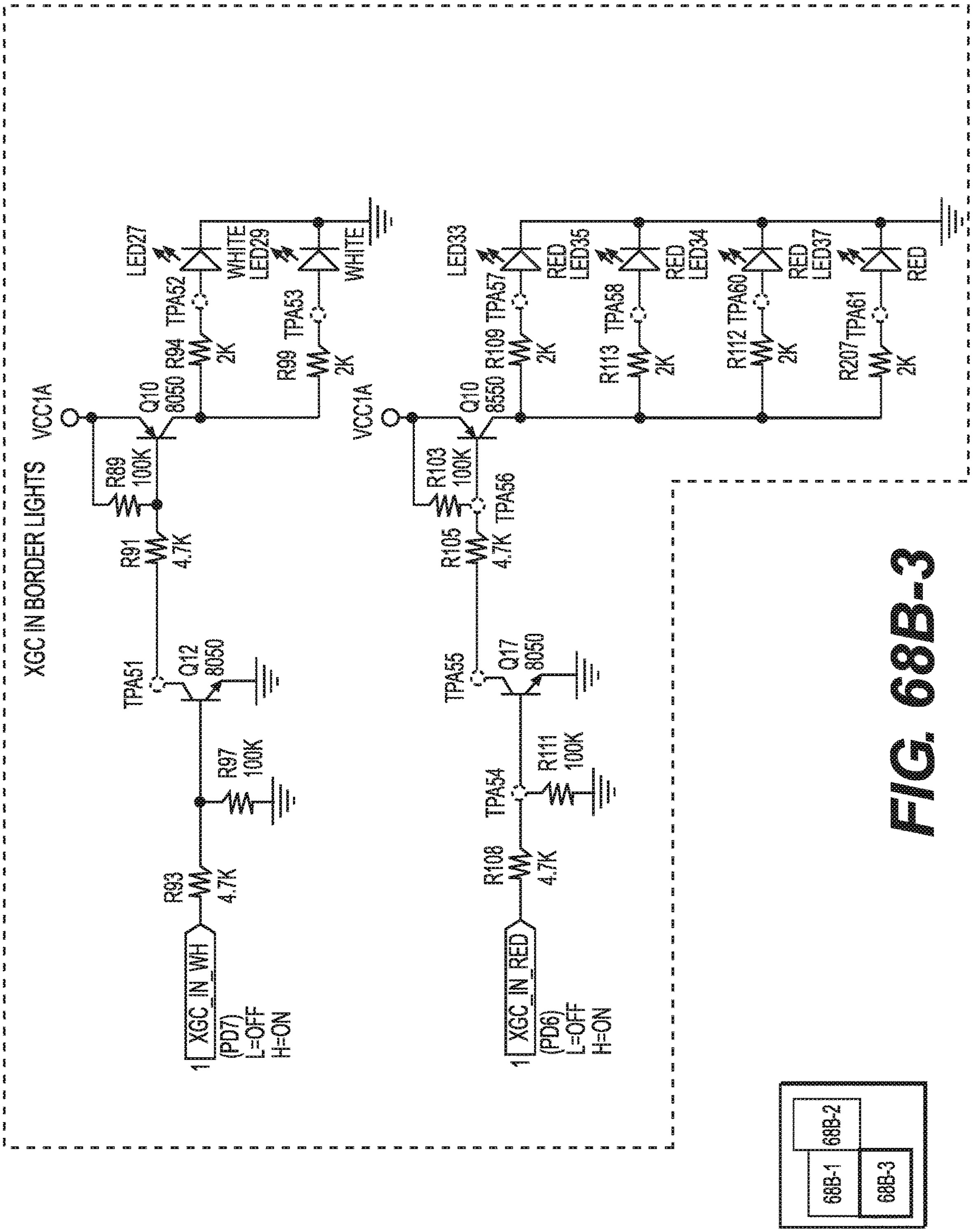
Figures 1, 68C:
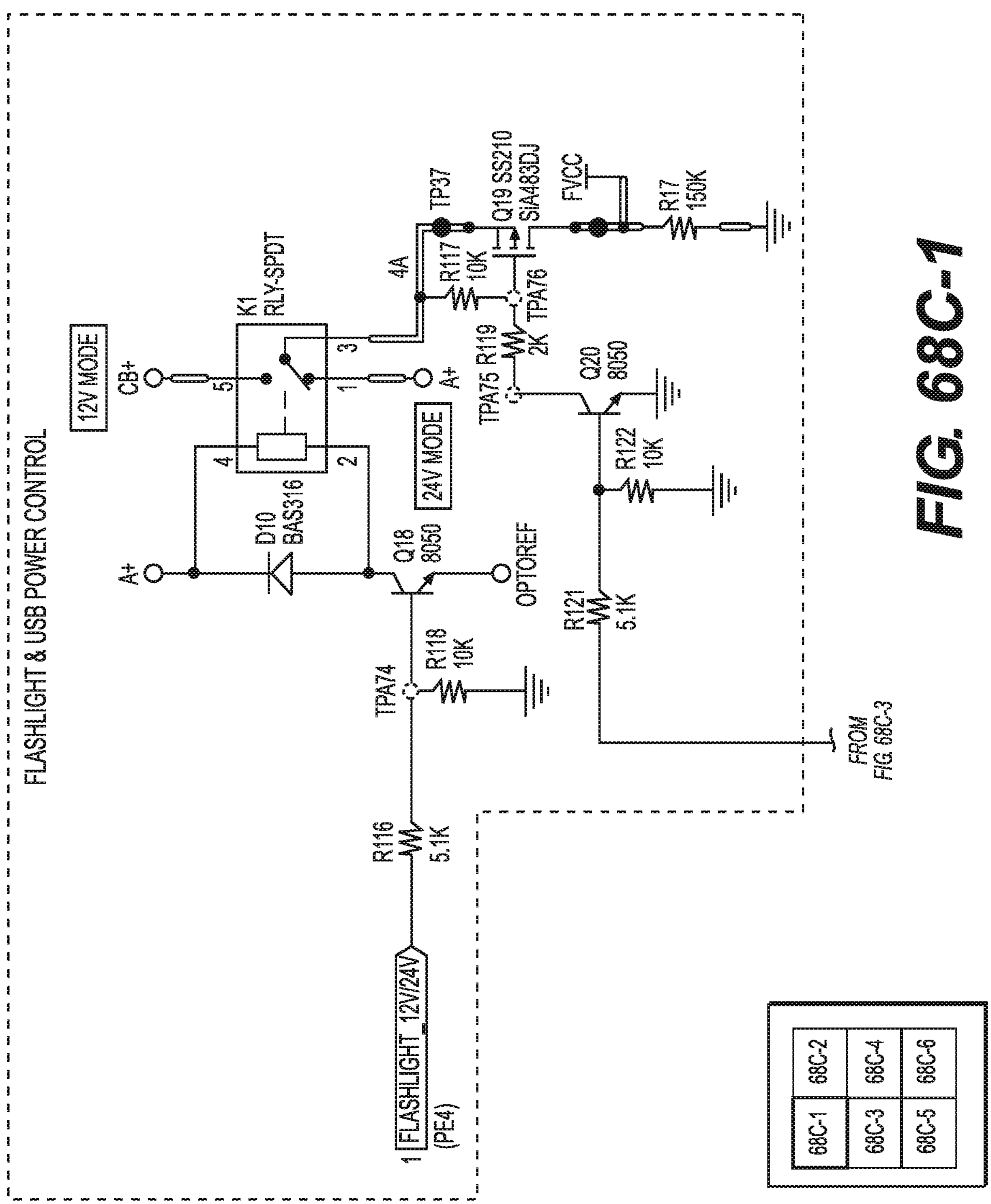
Figures 3, 68C:
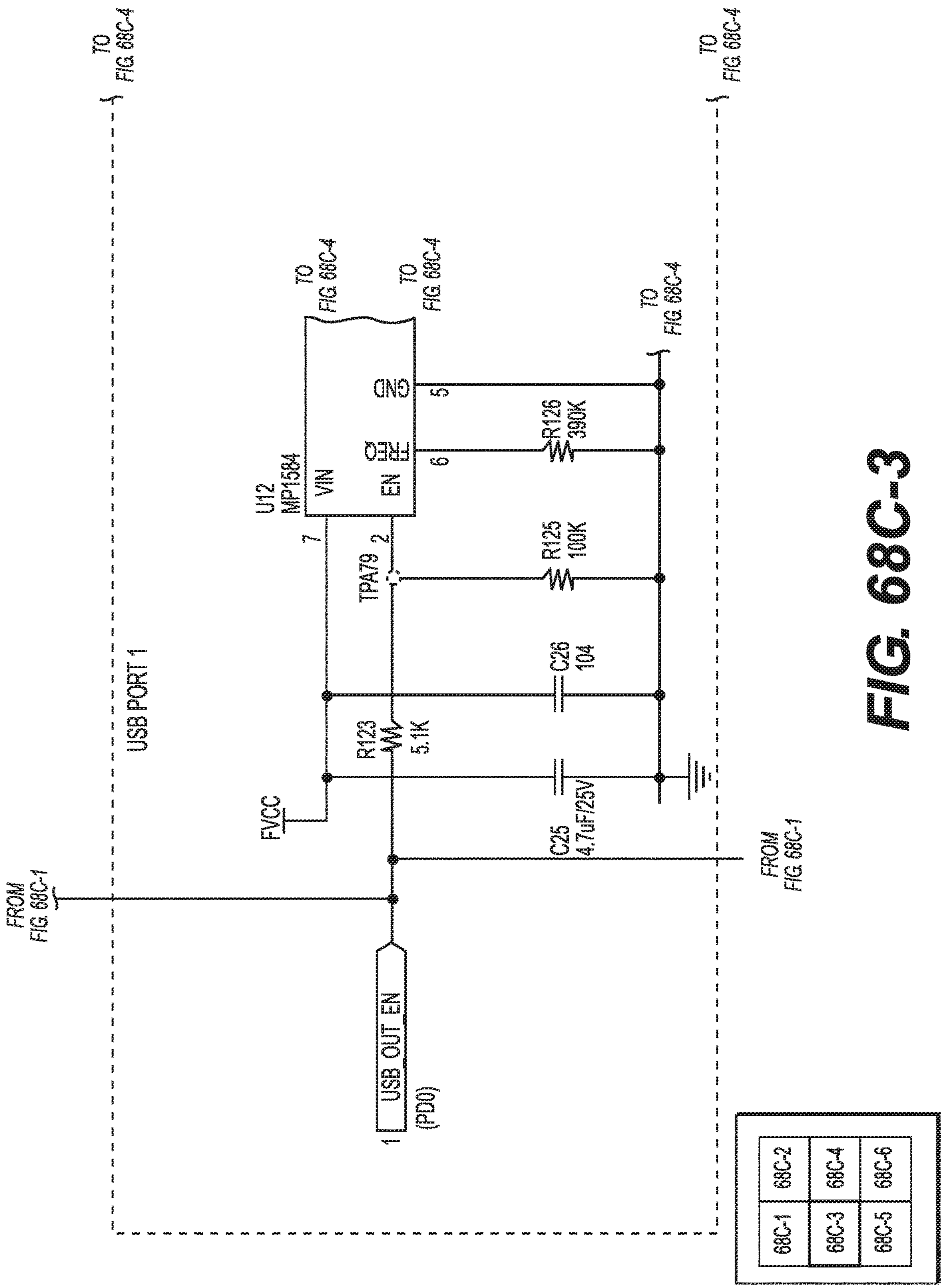
Figures 4, 68C:
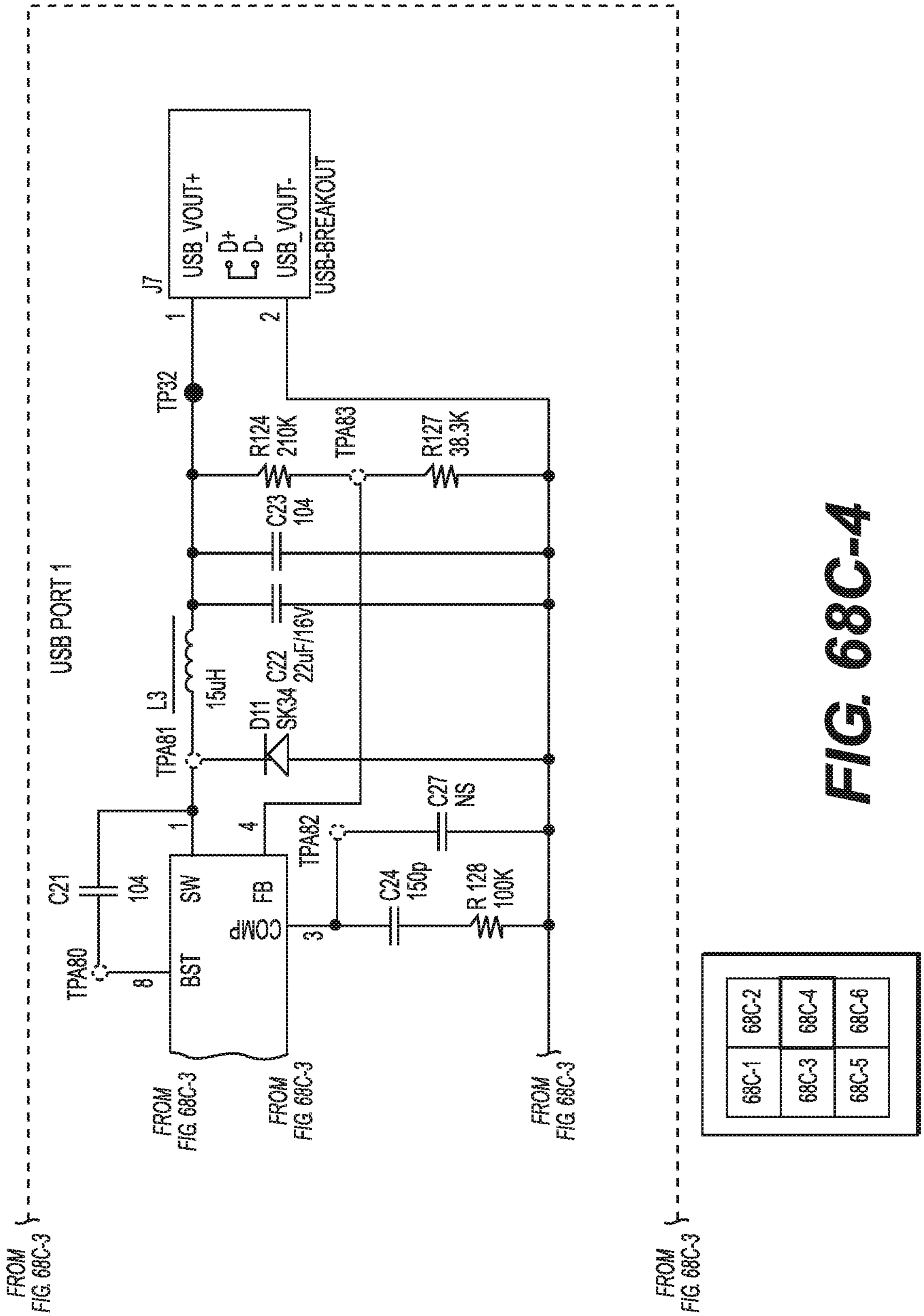
Figure 68D:
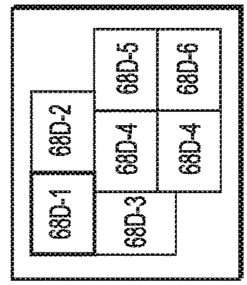
Figure 1:
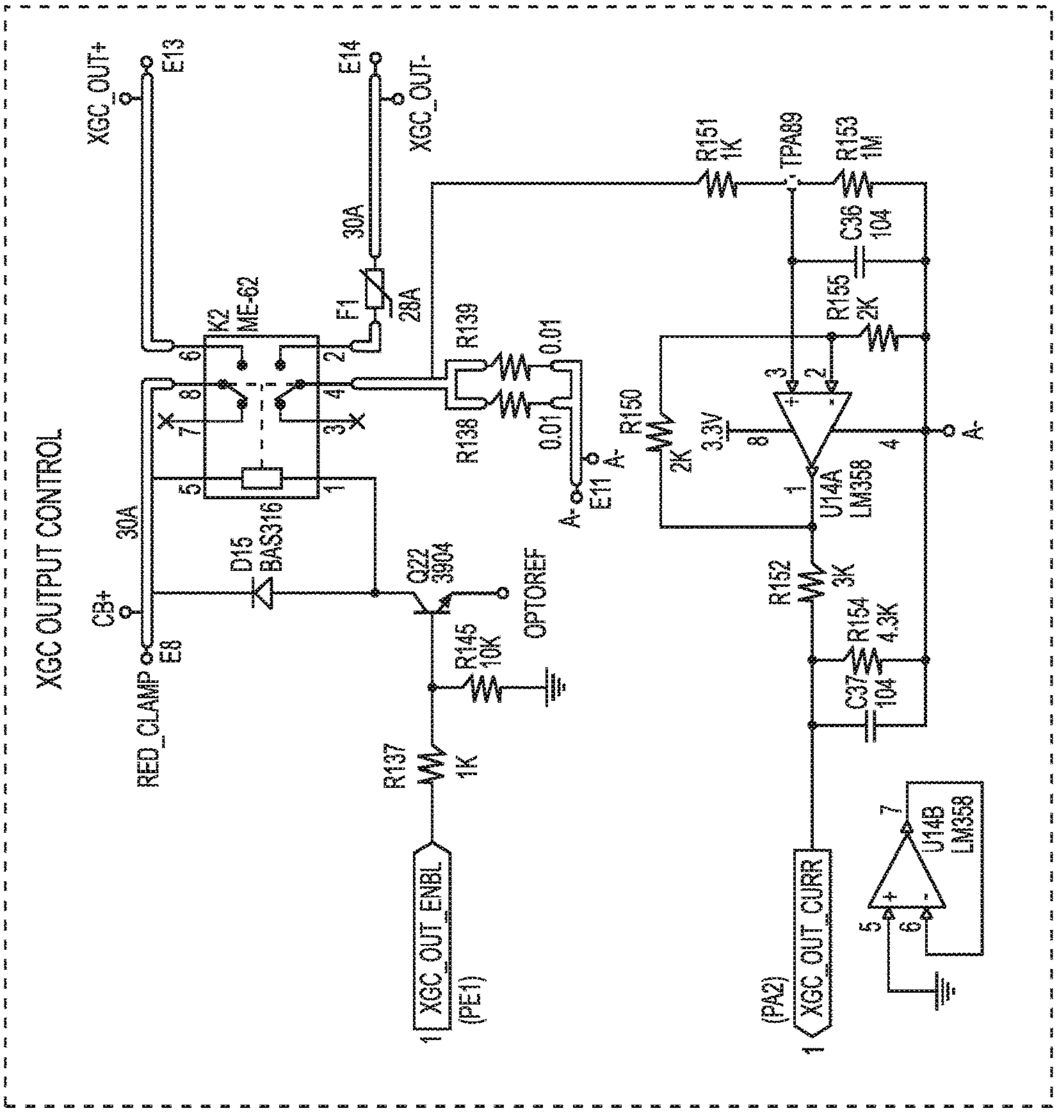
Figures 3, 68D:
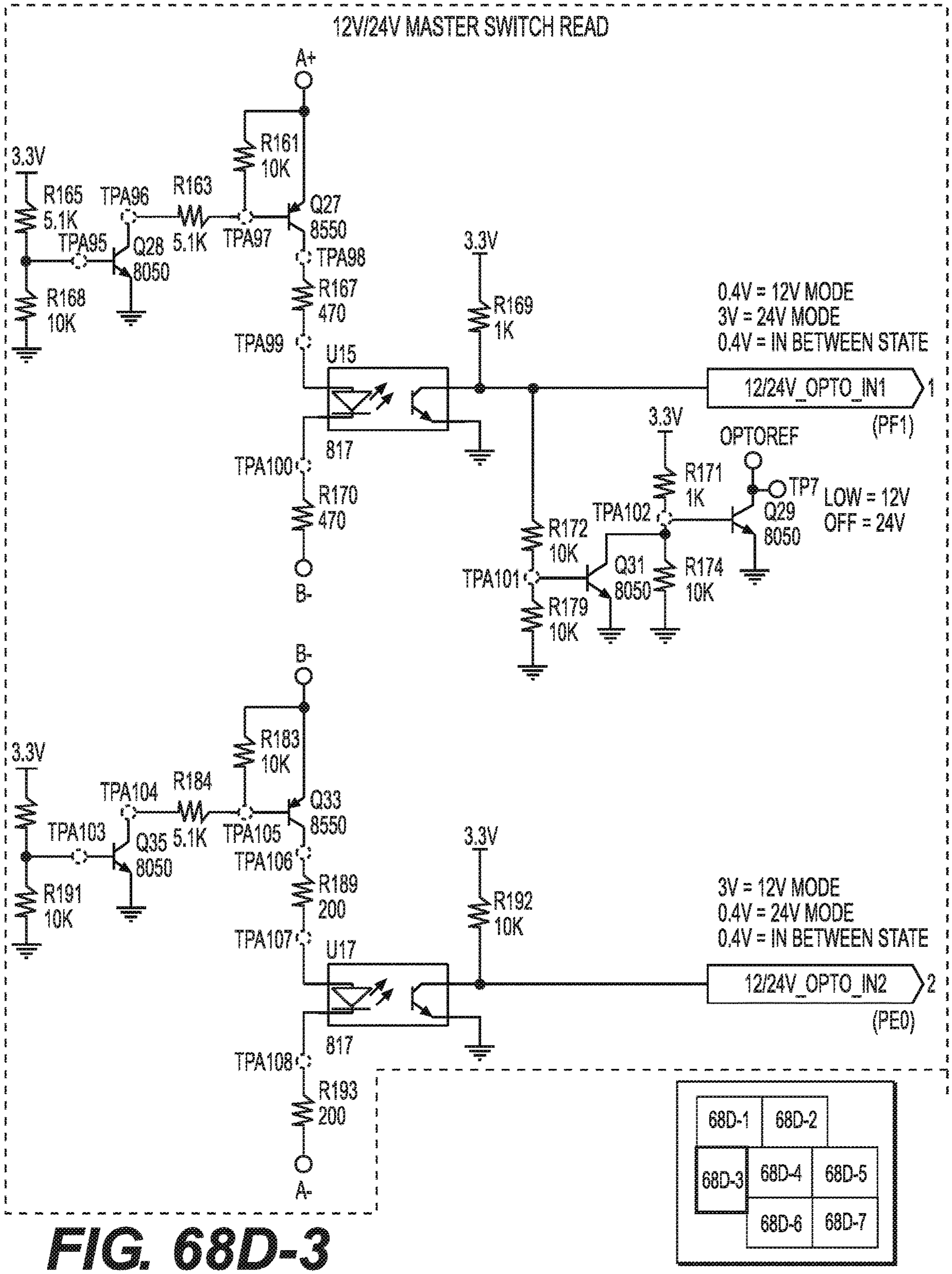
Figure 68D:
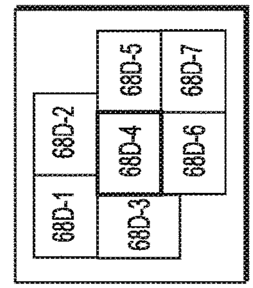
Figure 4:
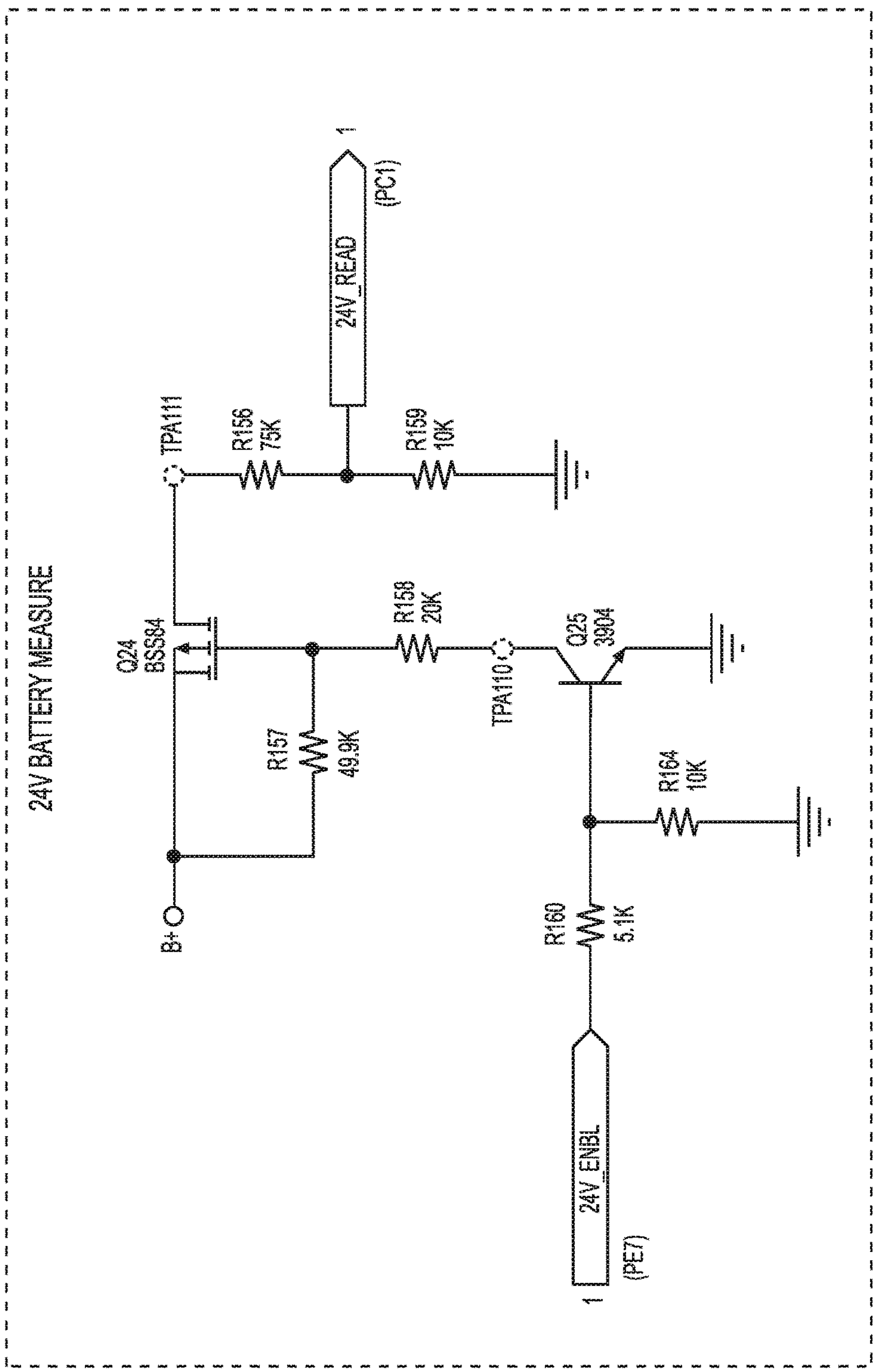
Figures 5, 68D:
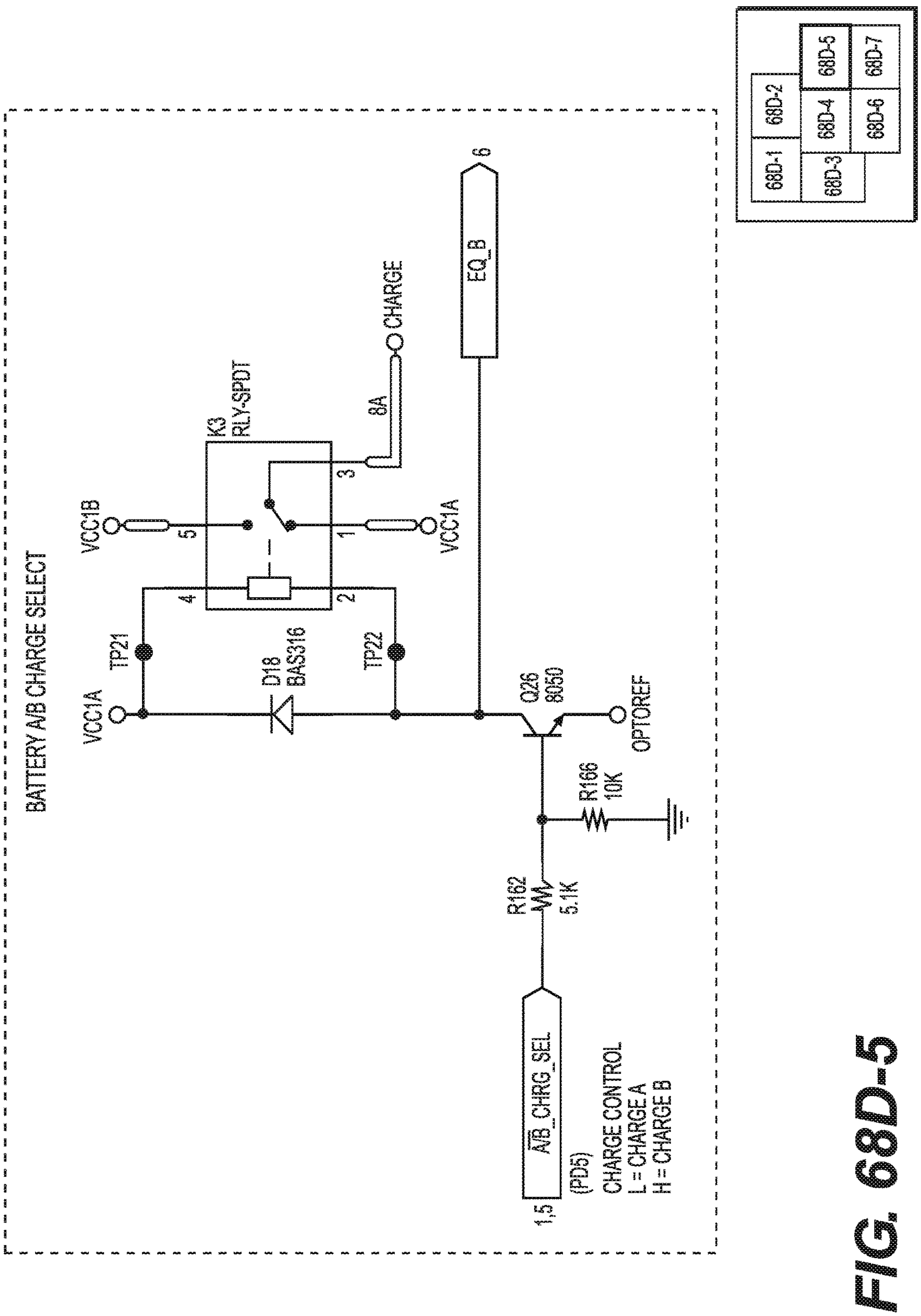
Figure 68D:
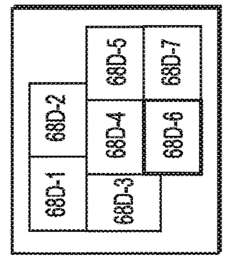
Figure 6:
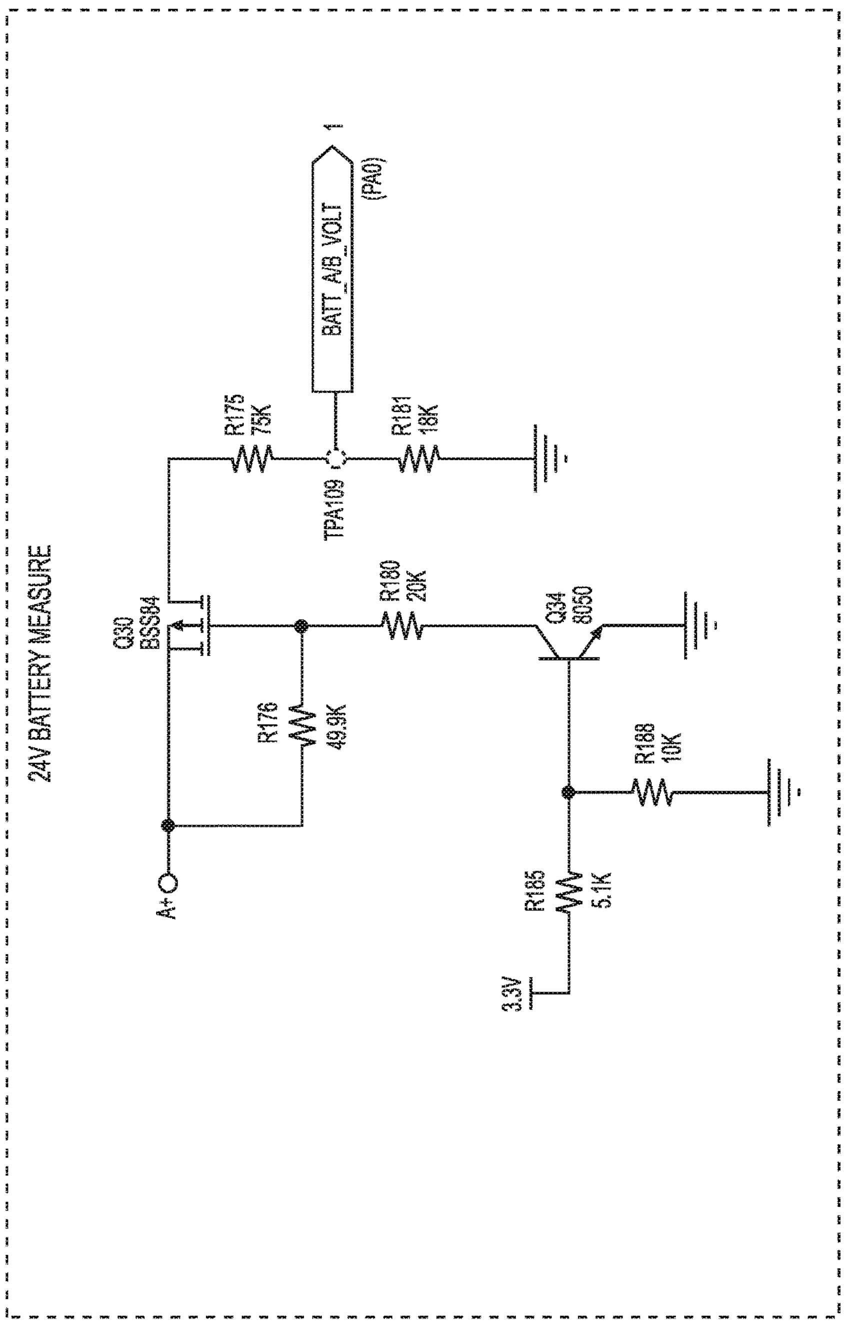
Figures 7, 68D:
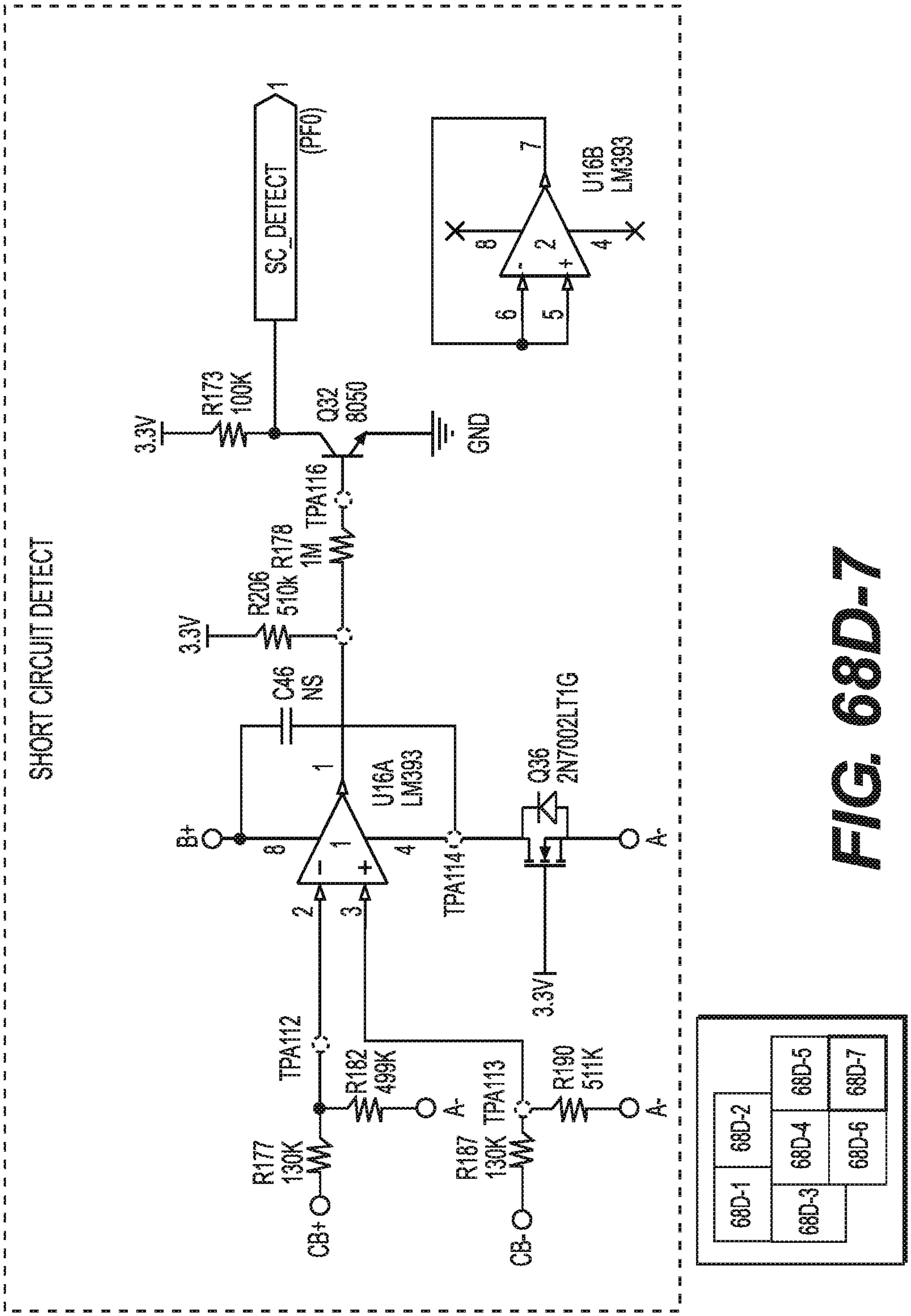
Figure 68E:
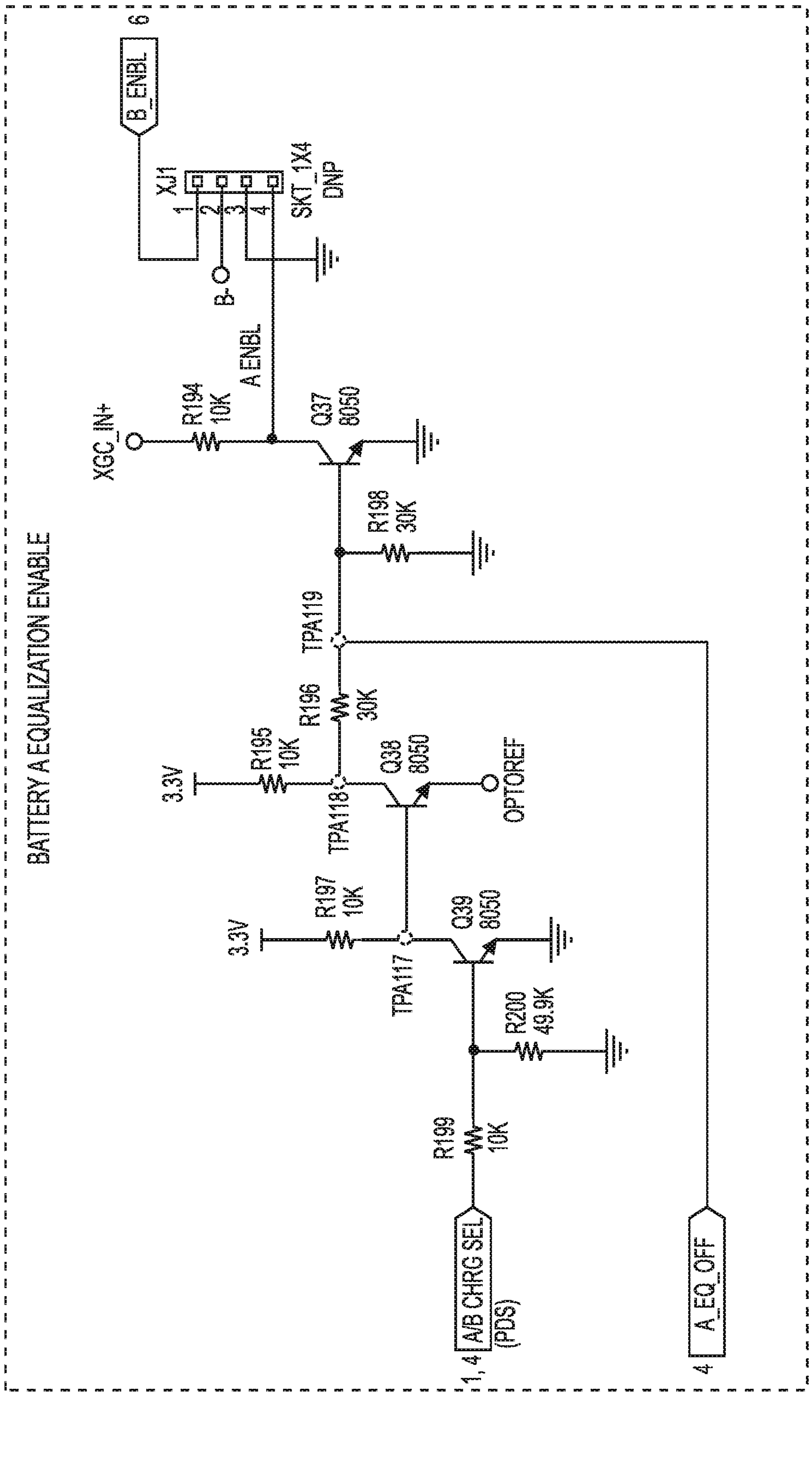
Figure 1:
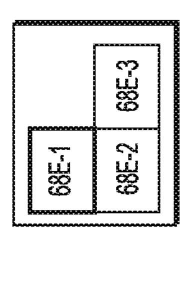
Figures 2, 68E:
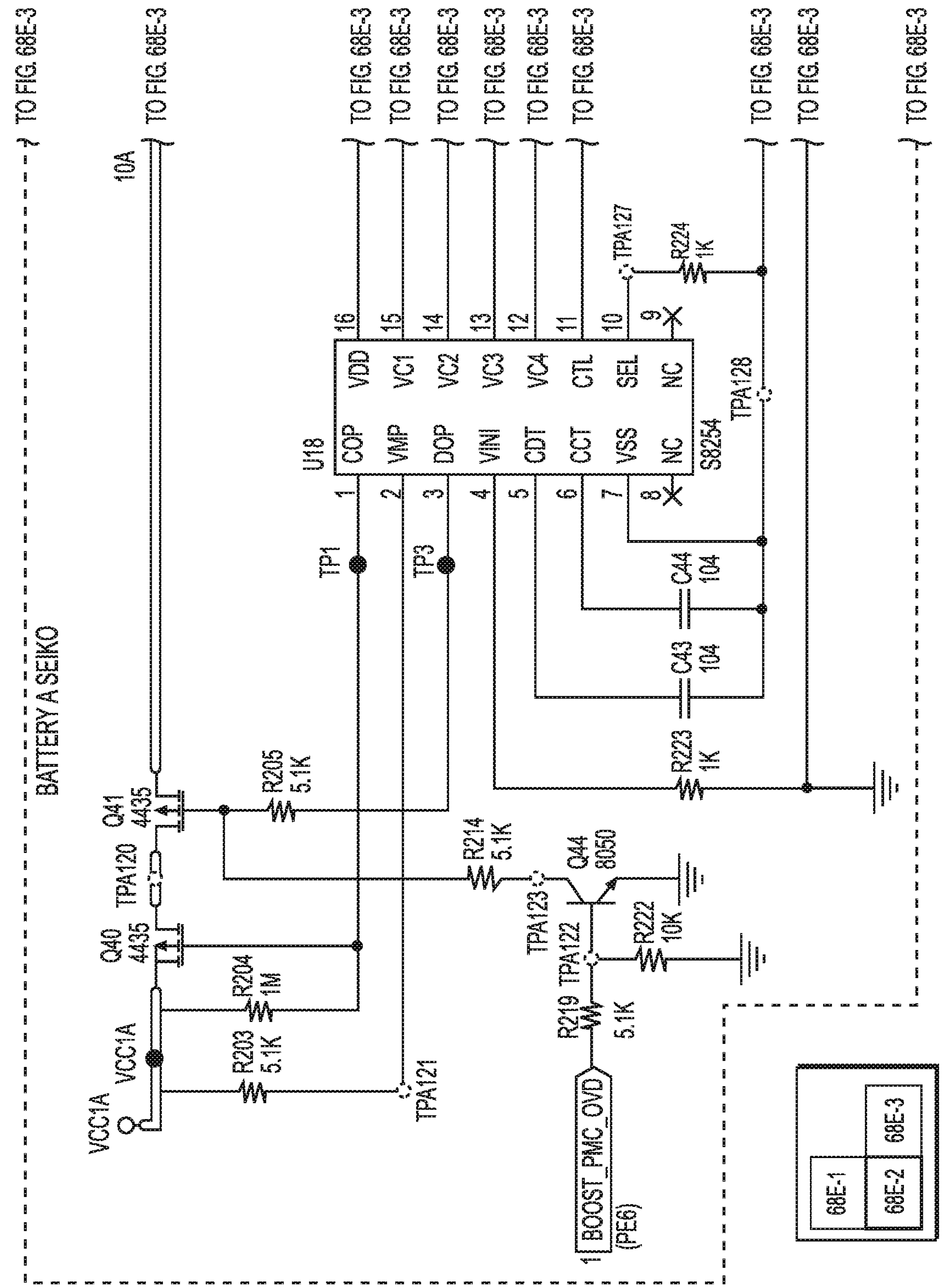
Figures 3, 68E:
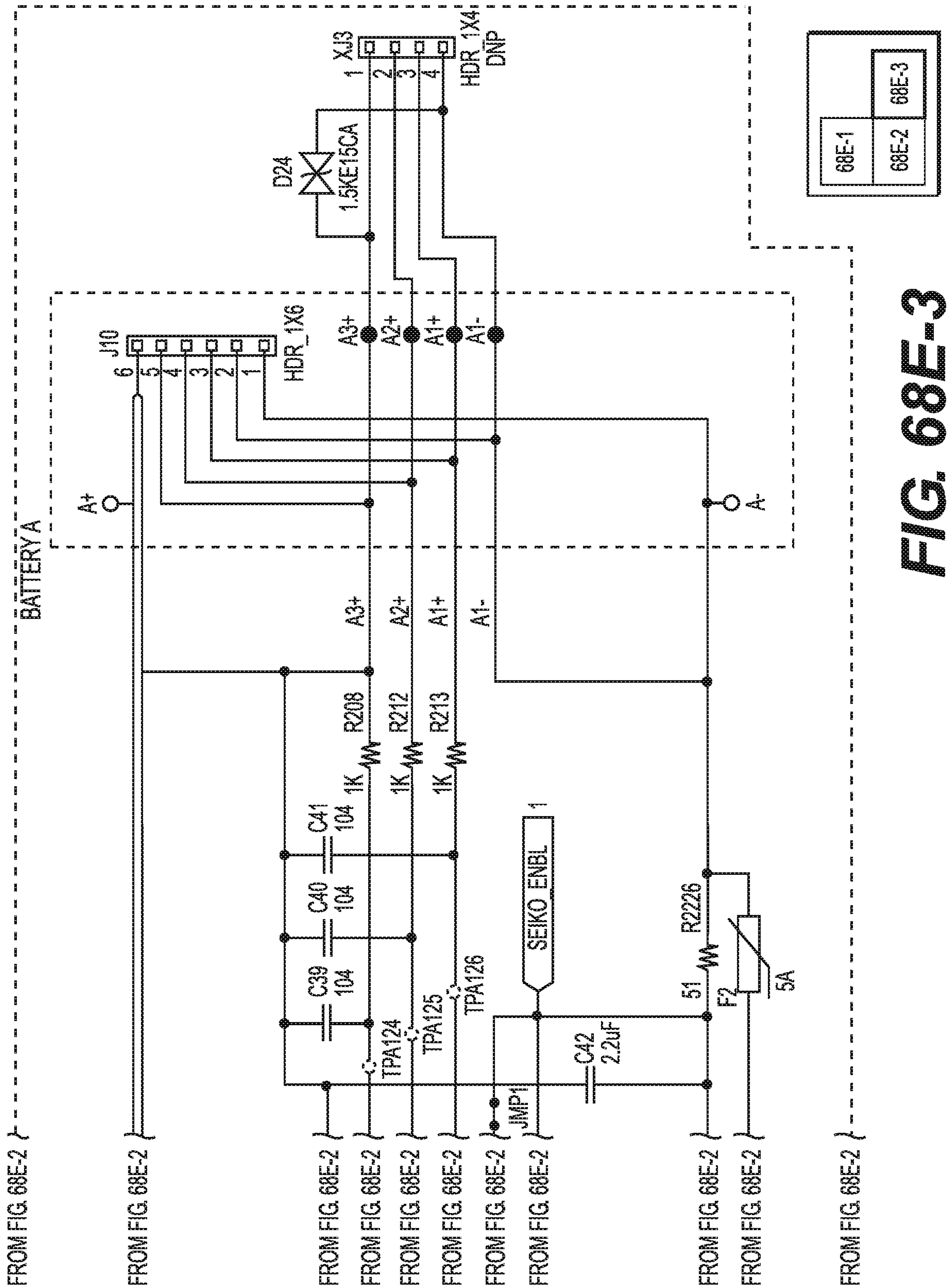
Figures 2, 68F:
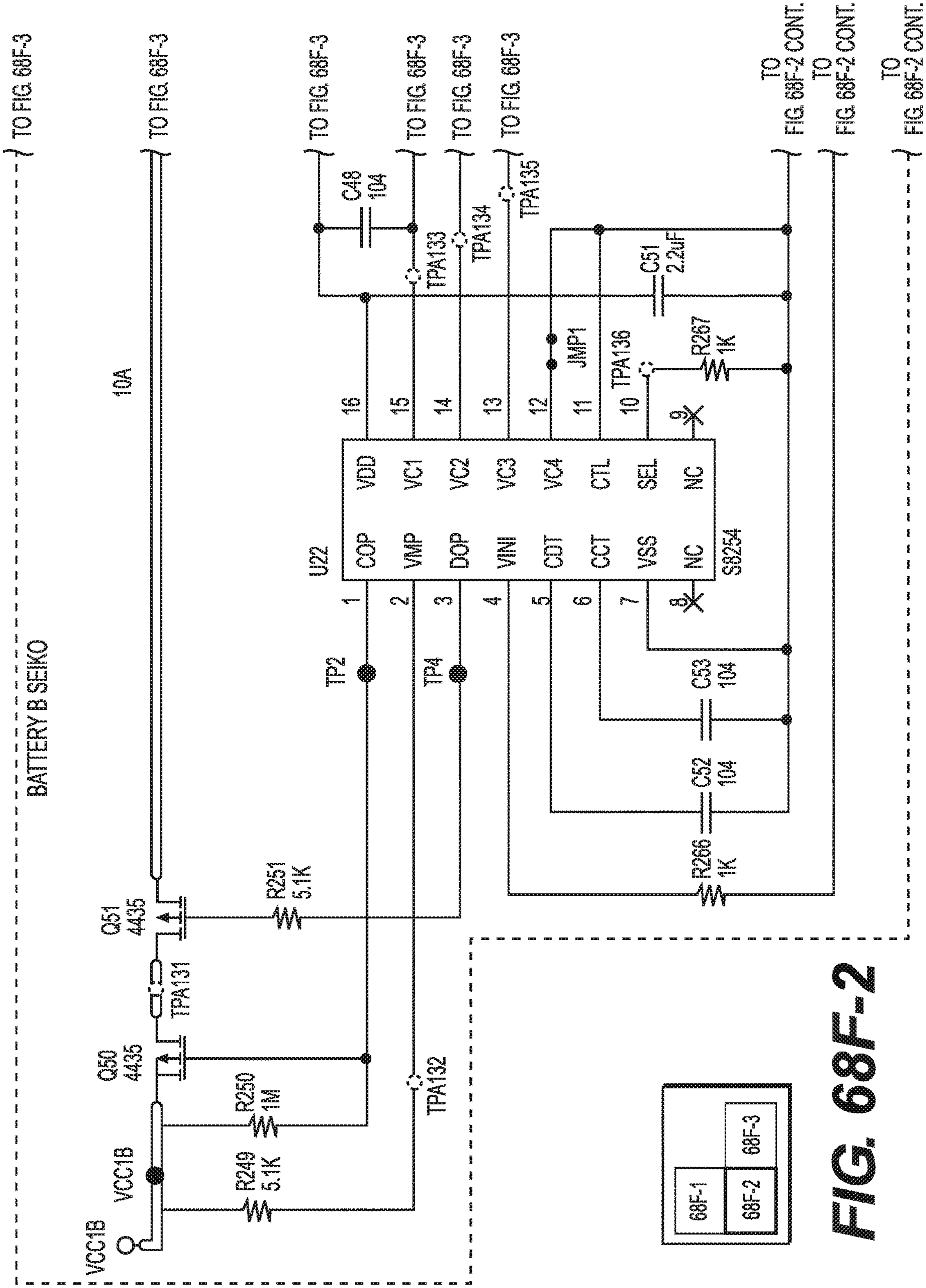
Figures 3, 68F:
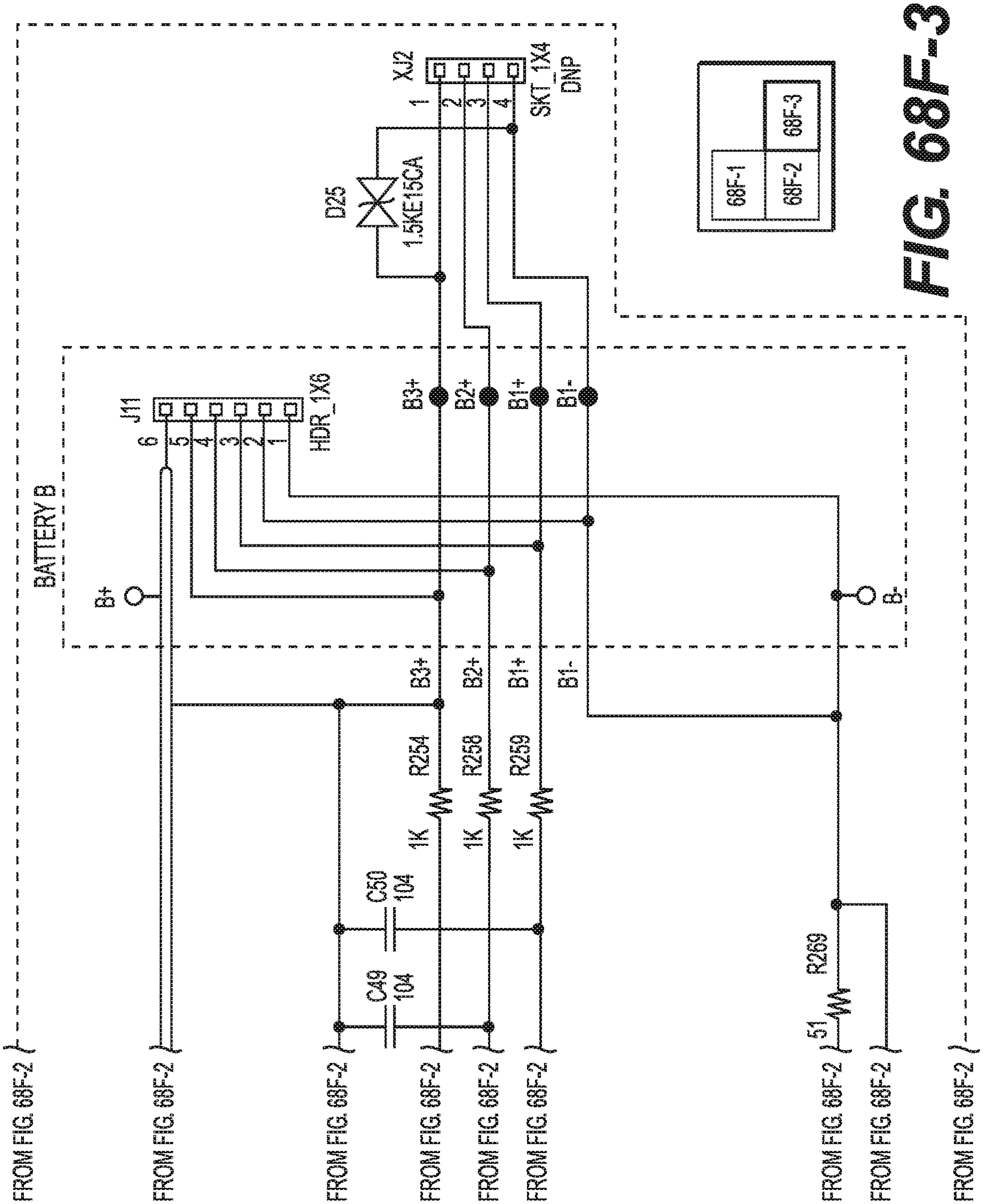

FIG. 67 is a functional block diagram of a rechargeable battery jump starting device according to one aspect of the invention. The rechargeable battery jump starting device includes two (2) lithium polymer battery packs 632 (PACK A and PACK B), which store sufficient energy to jump start a vehicle engine served by one or two conventional 12 volt lead-acid or valve regulated lead-acid battery(ies). A battery management system 333 (BAY A) is connected to one battery pack 632 and a battery management system 333 (BAY B) is connected to the other battery pack 632. In one example embodiment, the high-surge lithium polymer battery packs 632 include three 3.7V, 2666 mAh lithium polymer batteries in a 351P configuration. The resulting battery packs 632 each provide 11.1V, 2666 Ah (8000 Ah at 3.7V, 29.6 Wh). The continuous discharge current for each battery pack 632 is 25 C (or 200 amps), and burst discharge current is 50 C (or 400 amps). The maximum charging current of each battery pack 632 is 8000 mA (8 amps).

A programmable microcontroller unit (MCU) 601 receives various inputs and produces informational as well as control outputs. The programmable MCU 601 further provides flexibility to the system by allowing updates in functionality and system parameters, without requiring any change in hardware. According to one example embodiment, an 8 bit microcontroller with 2K x15 bits of flash memory is used to control the system. One such microcontroller is the HT67F30, which is commercially available from Holtek Semiconductor Inc.

A vehicle battery reverse sensor 610 monitors the polarity of the vehicle battery 672 when the rechargeable battery jump starting device is connected to the vehicle's electric system (e.g. vehicle battery 672). As explained below, the rechargeable battery jump starting device prevents the lithium battery packs 632 from being connected to the vehicle electric system (e.g. vehicle battery 672), for example, when the terminals of the vehicle battery 672 are connected to the wrong terminals of the rechargeable battery jump starting device. A vehicle battery isolation sensor 612 detects whether or not a vehicle battery 672 is connected to the rechargeable battery jump starting device, and prevents the lithium battery packs 672 from being connected to the output terminals (e.g. battery clamps) of the rechargeable battery jump starting device unless there is a good (e.g. chargeable) battery connected to the output terminals. A vehicle battery voltmeter 673 measures the voltage of the vehicle battery 672 and provides an input signal to the microcontroller unit 601.

A smart switch FET circuit 615 electrically switches the lithium battery packs 632 to connect to the vehicle battery only when the vehicle battery is determined by the MCU 601 to be present (in response to a detection signal provided by isolation sensor 612) and connected with the correct polarity (in response to a detection signal provided by reverse sensor 610). Lithium battery temperature sensors 620A, 620B each monitor the temperature of each lithium battery pack 632 to detect overheating due to high ambient temperature conditions and overextended current draw during jump starting. Lithium battery voltage measurement circuits 624A, 624B monitor the voltage of the lithium battery packs 632 (PACK A, PACK B) to prevent the voltage potential from rising too high during a charging operation and from dropping too low during a discharge operation. A short circuit detect sensor 625 is provided to detect a short circuit in the power supply from the rechargeable battery jump charging to the vehicle battery.

Lithium battery back-charge protection diodes 628 prevent any charge current being delivered to the vehicle battery 672 from flowing back to the lithium battery packs 632 of the rechargeable battery jump starting device from the vehicle's electrical system. A flashlight LED circuit 636 connected to a flashlight/USB power control 637 is provided to furnish a flashlight function for enhancing light under a vehicle's hood in dark conditions, as well as providing SOS and strobe lighting functions for safety purposes when a vehicle may be disabled in a potentially dangerous location. Voltage regulator 642 provides regulation of internal operating voltage for the microcontroller unit 601 and sensors. On/Off manual mode and flashlight switches 646 allow the user to control power-on for the rechargeable battery jump starting device, to control manual override operation if the vehicle has no battery, and to control the flashlight function. The manual button functions only when the rechargeable battery jump starting device is powered on. This button allows the user to jump-start vehicles that have either a missing battery, or the battery voltage is so low that automatic detection by the microcontroller unit 601 is not possible. When the user presses and holds the manual override button for a predetermined period time (such as three seconds) to prevent inadvertent actuation of the manual mode, the internal lithium ion battery power is switched to the vehicle battery connect port or battery clamps. The only exception to the manual override is if the vehicle battery provided by the lithium battery packs 632 is connected to the rechargeable battery jump starting device in reverse. If the vehicle battery is connected in reverse, the internal lithium battery power provided by the lithium battery packs 632 shall never be switched to provide power to the vehicle battery connect port or battery clamps.

The XGC charge circuit 652A converts power from any XGC charger power source, to provide charge voltage and current for charging the lithium battery packs 632 (PACK A, PACK B). The XGC out circuit 652B can connect the microcontroller unit 601 to an external device. The USB output 656 connected to the flashlight/USB power control 637 provides a USB portable charger for charging smartphones, tablets, and other rechargeable electronic devices. The operation indicator LEDs 660 provide visual indication of lithium battery capacity status as well as an indication of smart switch activation status (i.e. indicating that power is being provided to the vehicle's electrical system or vehicle battery).

The 12V/24V master switch 618 connects to a 12V/24V master switch read list 619 providing input to the microcontroller unit 601.

Electrical Optical Position Sensing Switch System

Figure 51:
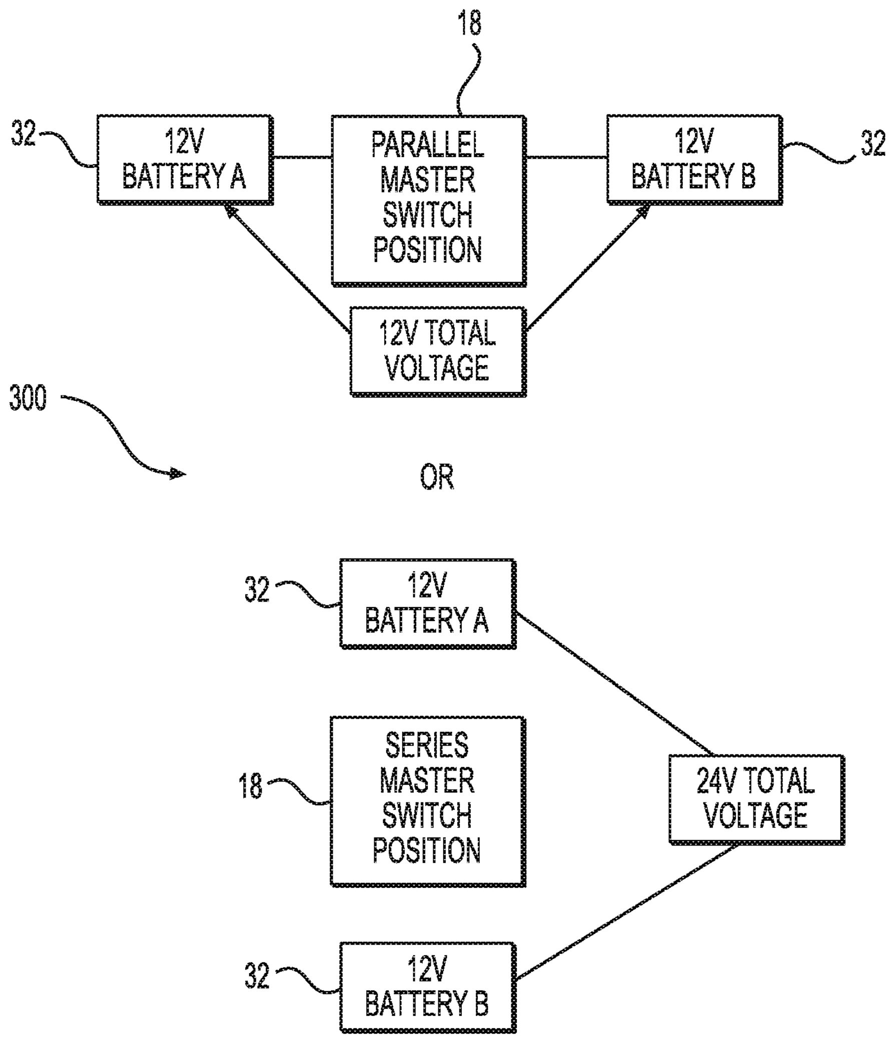
FIG. 51 is a block diagram showing the 12V or 24V jump starting operational modes.

The portable jump starting device 10 can be configured as a dual purpose rechargeable battery jump starting device to allow for jump starting either a 12V or 24V vehicle or equipment (e.g. heavy duty 24V vehicle or equipment). The lightweight portable rechargeable battery jump starting device utilizes the manual rotary control switch 18 with the control knob 18*a* for switching between 12V or 24V jump starting or operational modes. Any of the above described rechargeable battery jump starting devices according to the present invention can be provided with the electrical optical position sensing system 300, as shown in FIGS. 51-53.

The rechargeable battery jump starting device 10 uses two rechargeable 12V Li-ion batteries 32 that are connected in parallel for 12V jumpstarting and in series for 24V jump starting. The series or parallel connections are accomplished with the rotary control switch 18 shown in FIGS. 1 and 12-15, and indicated as the 12V/24V rotary control switch 618 ("master switch") in the functional block diagram shown in FIG. 51.

Figure 52:
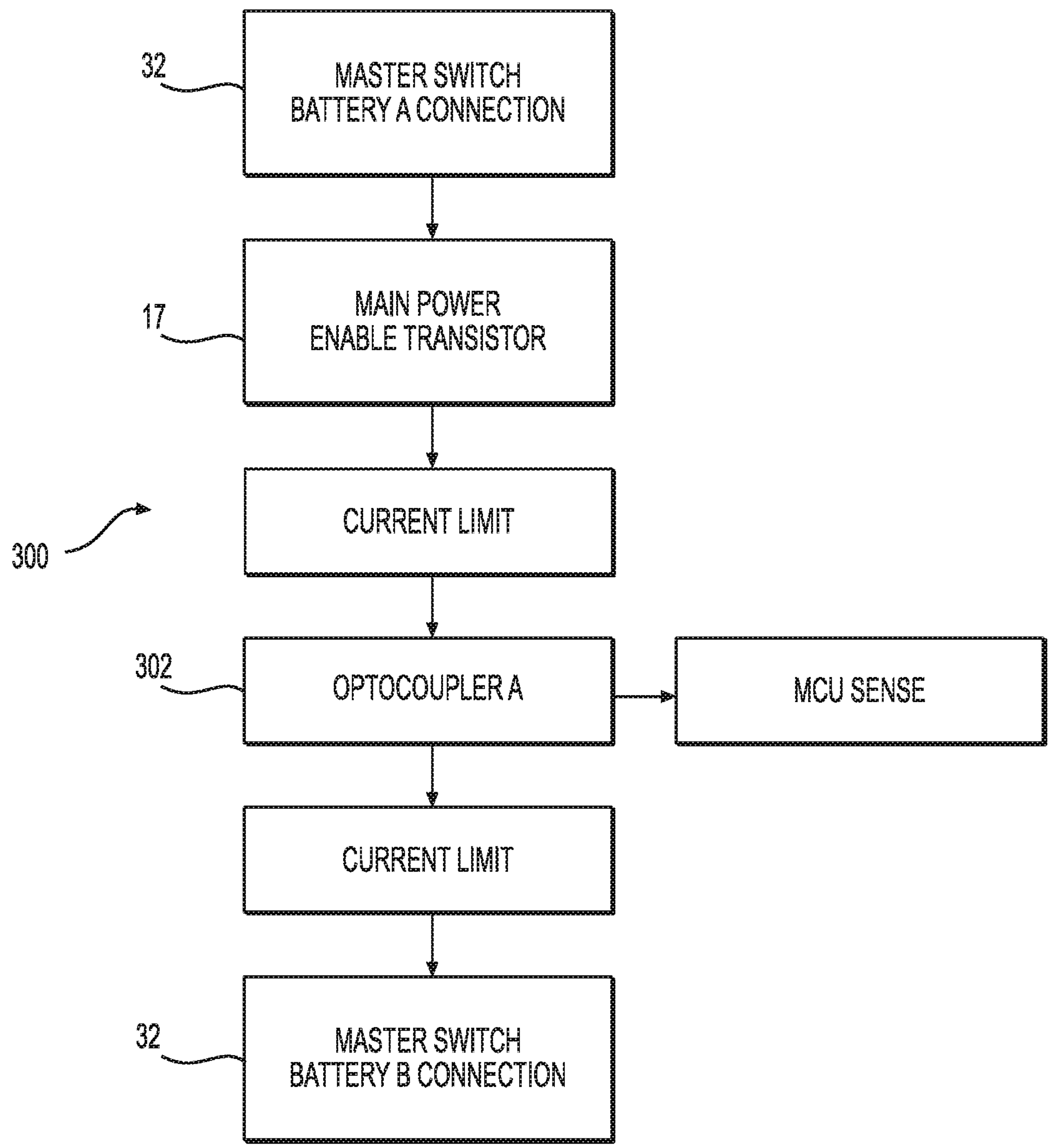
FIG. 52 is a block diagram showing the electrical optical position sensing system according to the present invention.
Figure 53:
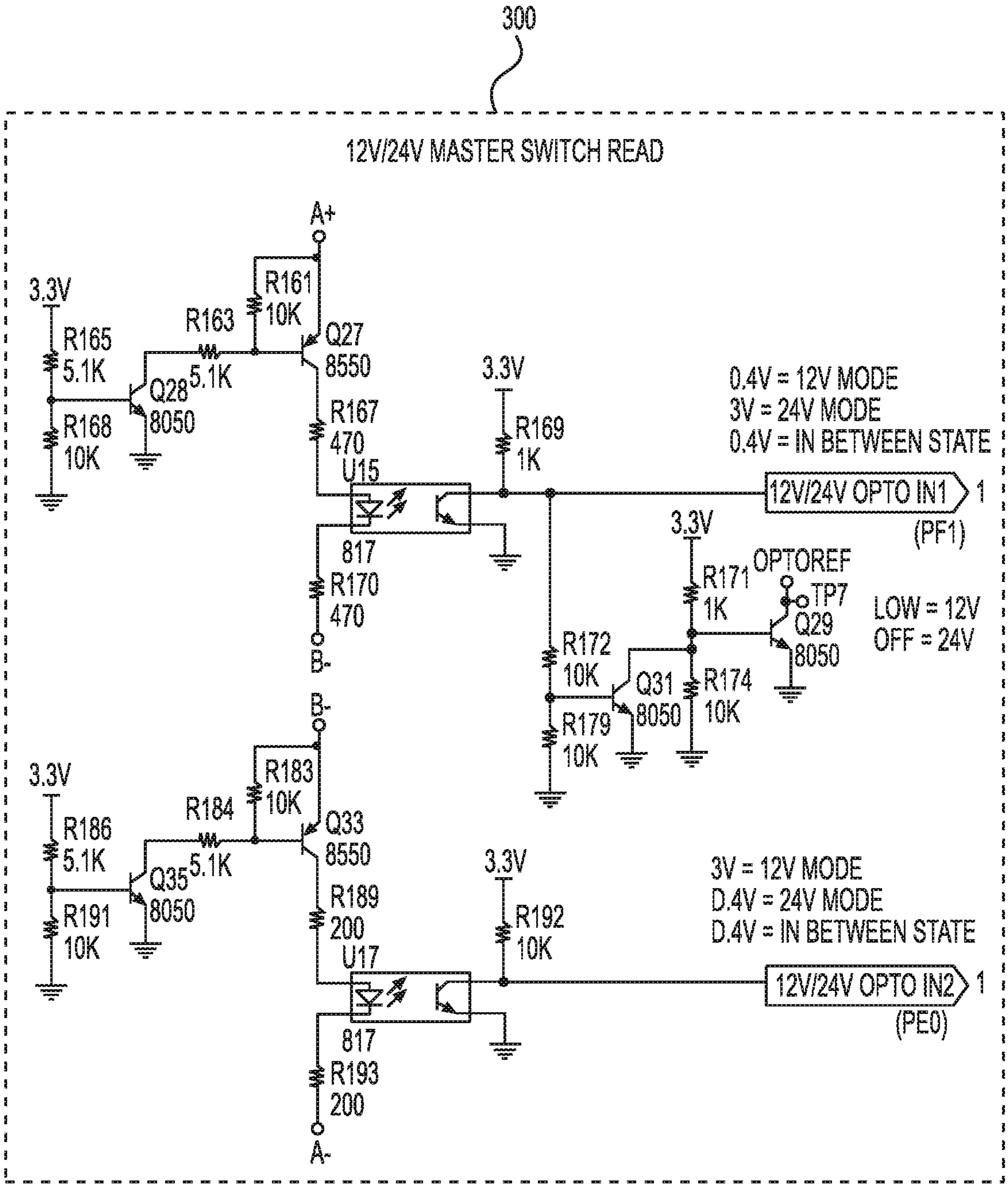
FIG. 53 is an electrical schematic diagram of the 12V/24V master switch read.

The electrical optical position sensing system 300 is shown in FIG. 52 (e.g. 12V/24V master switch read 619 shown in FIG. 67).

The optical position sensing system 300 is configured to allow for a safe and effective method for the system microcontroller unit (e.g. microcontroller unit 601 shown in FIG. 67) to read the position of the control switch 18. The optical position sensing system 300 comprises a sensor 302 (FIG. 52) using optical coupling to insure the integrity of isolation on the 12V to 24V rotary control switch 18.

A schematic of the circuit of the optical position sensing system 300 is shown in FIG. 53. The upper portion of the schematic includes transistor Q28 and resistors R165, R168, R161, and R163. This circuit acts as an electrical enable when the main system 3.3V power is turned "on." The purpose of this enable is to reduce parasite current when the portable jump starting device 10 is in the "off" state. When "on", this enables current from battery A+ to flow through Q27, which acts as an electrical switch.

If Q27 is "on", it allows current to flow from Battery A+ to Battery B− when the batteries are connected in parallel. When they are connected in series, no current flows because A+ and B− are connected together through the control switch 18.

The result of current flow or lack thereof, allows the optical coupler to provide a signal to the microcontroller unit telling it which position the master switch is in.

The lower portion of the schematic (i.e. schematic located just below the first schematic), allows the opposite signal to be provided to a separate input of the microcontroller. The result of this is to provide the microcontroller an effective method of determining when the switch is "In Between" meaning it is not in 12V position or 24V position and is in between those two positions. This allows the microcontroller to provide diagnostics in case a user leaves the switch in an unusable position.

Dual Battery Diode Bridge System

Figure 54:
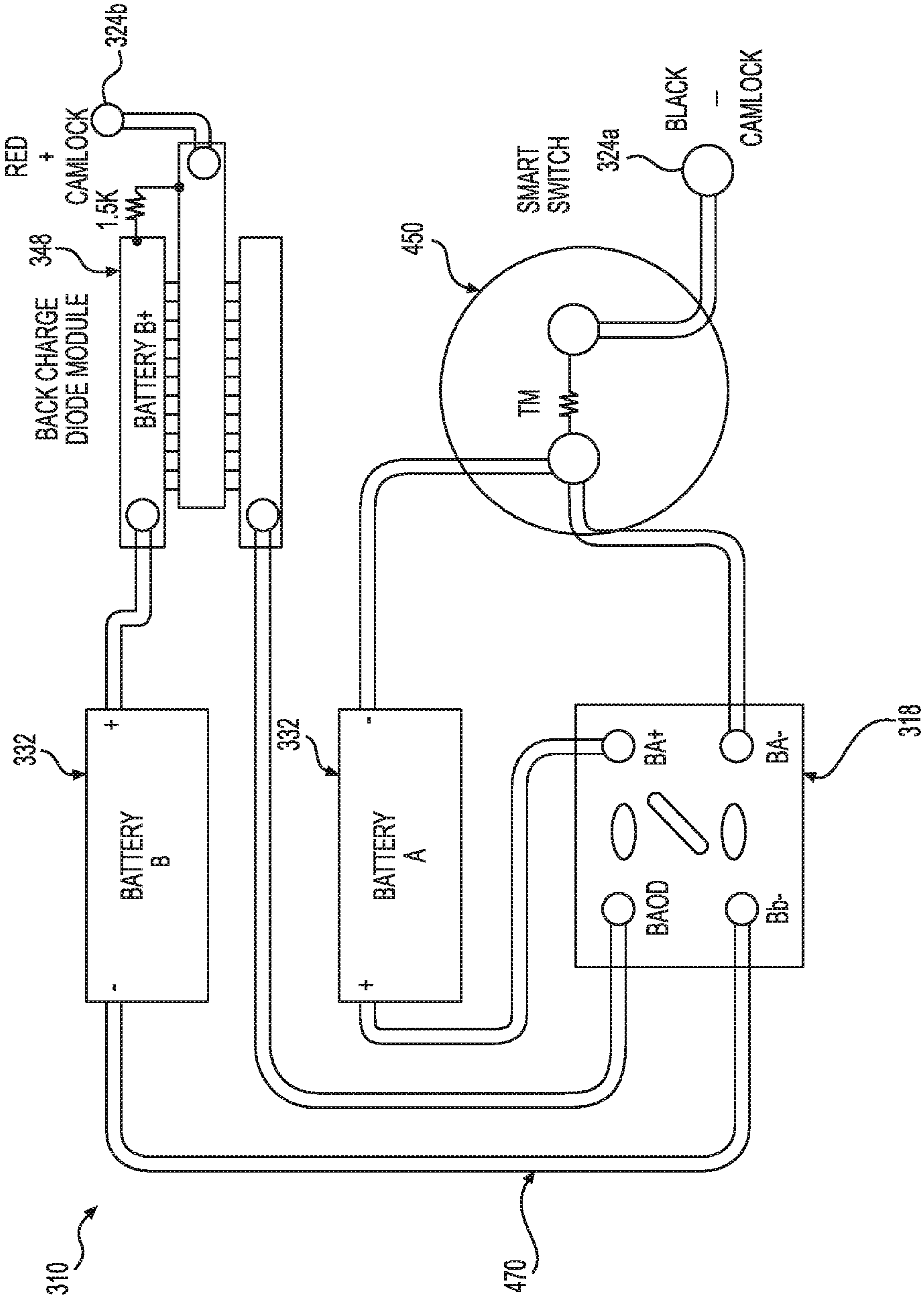
FIG. 54 is a diagrammatic view showing a single connection or dual connection arrangement of the battery jump starting device shown in FIG. 26.

The battery jump starting device 310 (FIG. 26-31) can be provided with a dual diode battery bridge system, for example, in the form of a back-charge diode module 348 configured for protecting against back-charge after a vehicle battery has been jump charged, as shown in FIG. 54. Any of the above described rechargeable battery jump starting devices according to the present invention can be provided with the electrical optical position sensing system 300, as shown in FIGS. 54 and 55.

The dual bridge battery bridge system, for example, includes a back-charge diode array or module 348 configured to provide two (2) channels 348*a*, 348*b* of diodes (FIG. 55) to support the two (2) battery system (e.g. two (2) 12V Li-ion batteries 332 of the rechargeable battery jump starting device 310), which are bridged together to provide peak current output during jump starts.

The single wiring connection and dual wiring connections of the battery jump starting device 310 is shown in FIG. 54. The components are connected together by the highly conductive rigid frame 370. The highly conductive frame members 370*a-h* (FIGS. 56-62) making up the highly conductive rigid frame 370 made of copper are more conductive than 2/0 copper cable. Further, the connection points between the highly conductive frame members 370*a-h* of the highly conductive rigid frame 370 are configured to reduce power losses compared to copper cable. The highly conductive frame members 370*a-h* of the highly conductive rigid frame 370 can be replaced with other highly conductive metals (e.g. aluminum, nickel, plated metal, silver plated metal, gold plated metal, stainless steel, and other suitable highly conductive metal alloys).

Figure 55:
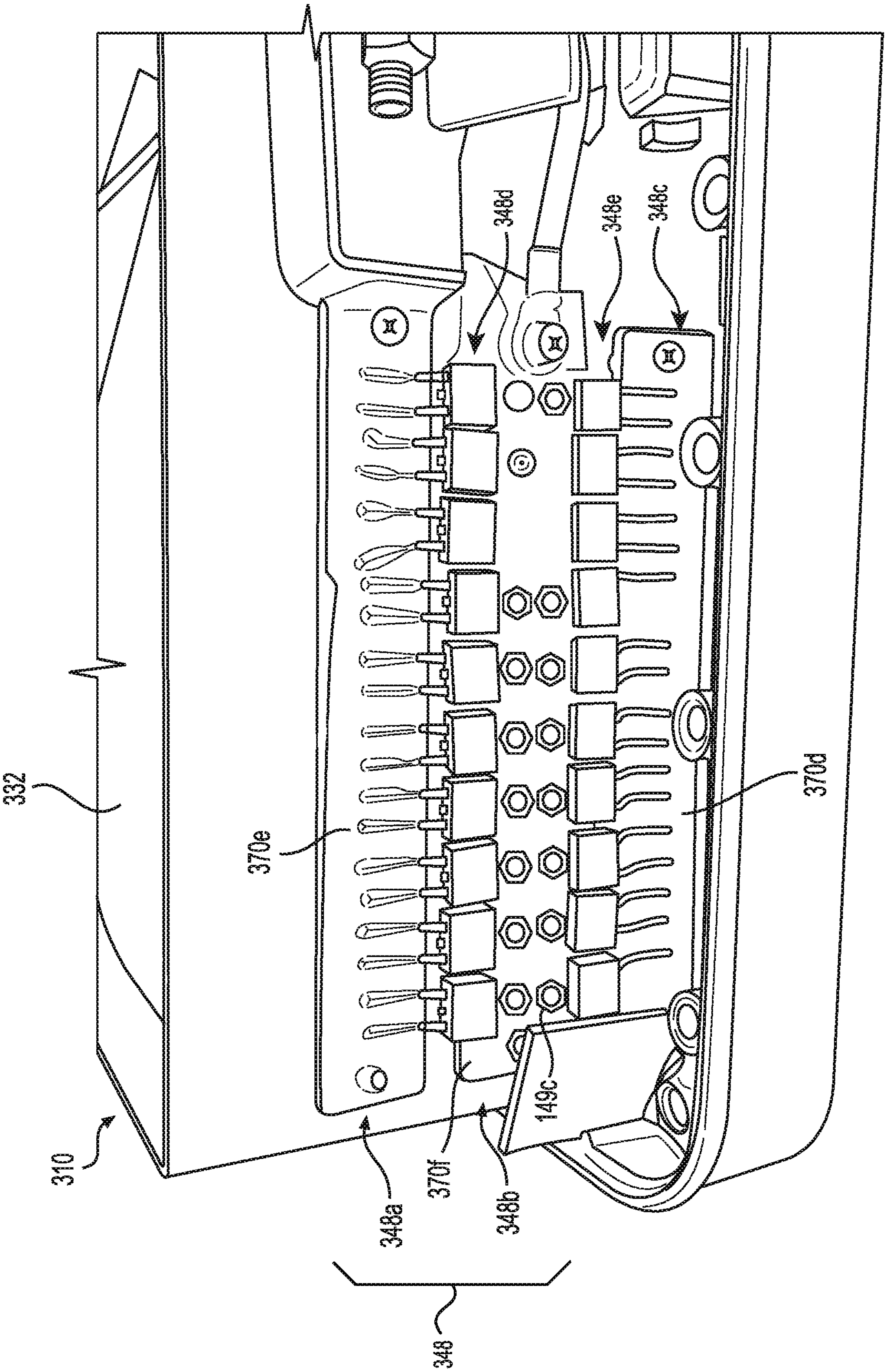
FIG. 55 is a rear elevational view of the battery jump starting device shown in FIG. 26, with the cover removed, showing the dual battery diode bridge according to the present invention.

The dual diode battery bridge in the form of the back-charge diode module 348 is shown in FIG. 55. The upper channel of diodes 348*a* connected to the frame member 370*e* supports current through one 12V battery 332. The lower channel of diodes 348*b* connected to the frame member 370*d* supports current through the second 12V battery 332. The combined current from both 12V batteries 332, 332 through the two (2) diode channels 348*a*, 348*b* exits the back-charge diode module 348 through the copper bar member 370*f* leading to the positive output (i.e. positive cam-lock) of the battery jump starting device 310.

The back-charge diode module 348 comprises the upper highly conductive plate 370*e*, the lower highly conductive plate 370*d*, and the center highly conductive plate 370*f* connected together by the channels of diodes 348*a*, 348*b*.

The rechargeable battery jump starting device 10 (FIG. 1) includes a having the reverse current diode array 48 (i.e. back-charge diode system) configured for protecting against a back-charge to the first 12V battery 32 and/or the second 12V battery 32 after a vehicle battery has been jump charged.

The rechargeable battery jump starting device 10 comprises the first 12V battery 32, the second 12V battery 32; the electrical control switch 18 electrically connected to the first 12V battery 32 and the second 12V battery 32. The electrical control switch 18 has a parallel switch position for connecting the first 12V battery 32 and second 12V battery 32 in parallel. The electrical control switch 18 has a series switch position for connecting the first 12V battery 32 and second 12V battery 32 in series. The reverse current diode array 48 is connected to the first 12V battery 32 and the second 12V battery 32. The reverse current diode array 48 is configured for protecting against a back-charge to the first 12V battery 32 and/or the second 12V battery 32 after a vehicle battery has been jump charged.

The reverse current diode array 48, for example, can be a back-charge diode module. The back-charge diode module can comprise a first channel of diodes accommodating current flow through the first 12V battery 32, and a second channel of diodes accommodating current flow through the second 12V battery 32.

Figure 56:
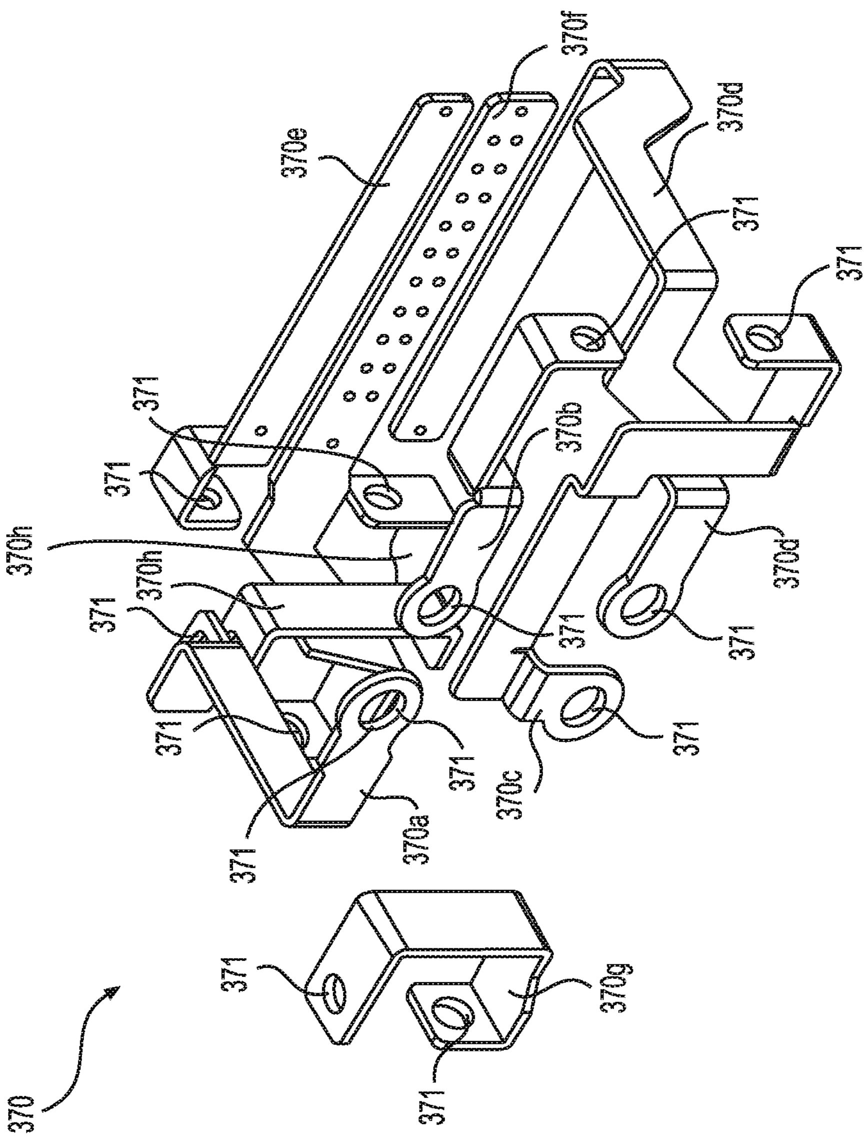
FIG. 56 is a front perspective view of the highly conductive frame according to the present invention used in the battery jump starting device shown in FIG. 26.
Figure 57:
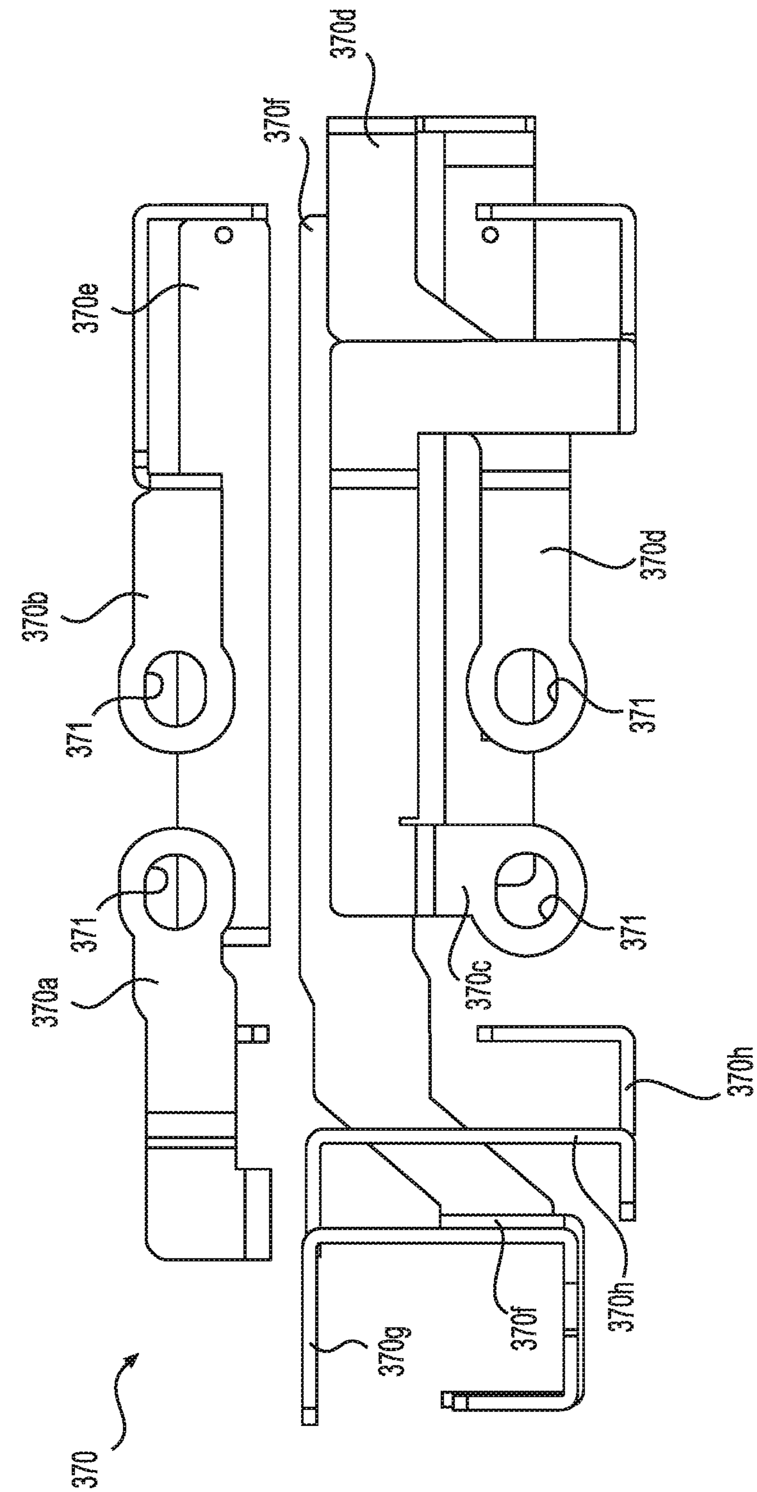
FIG. 57 is a front elevational view of the highly conductive frame shown in FIG. 56.
Figure 58:
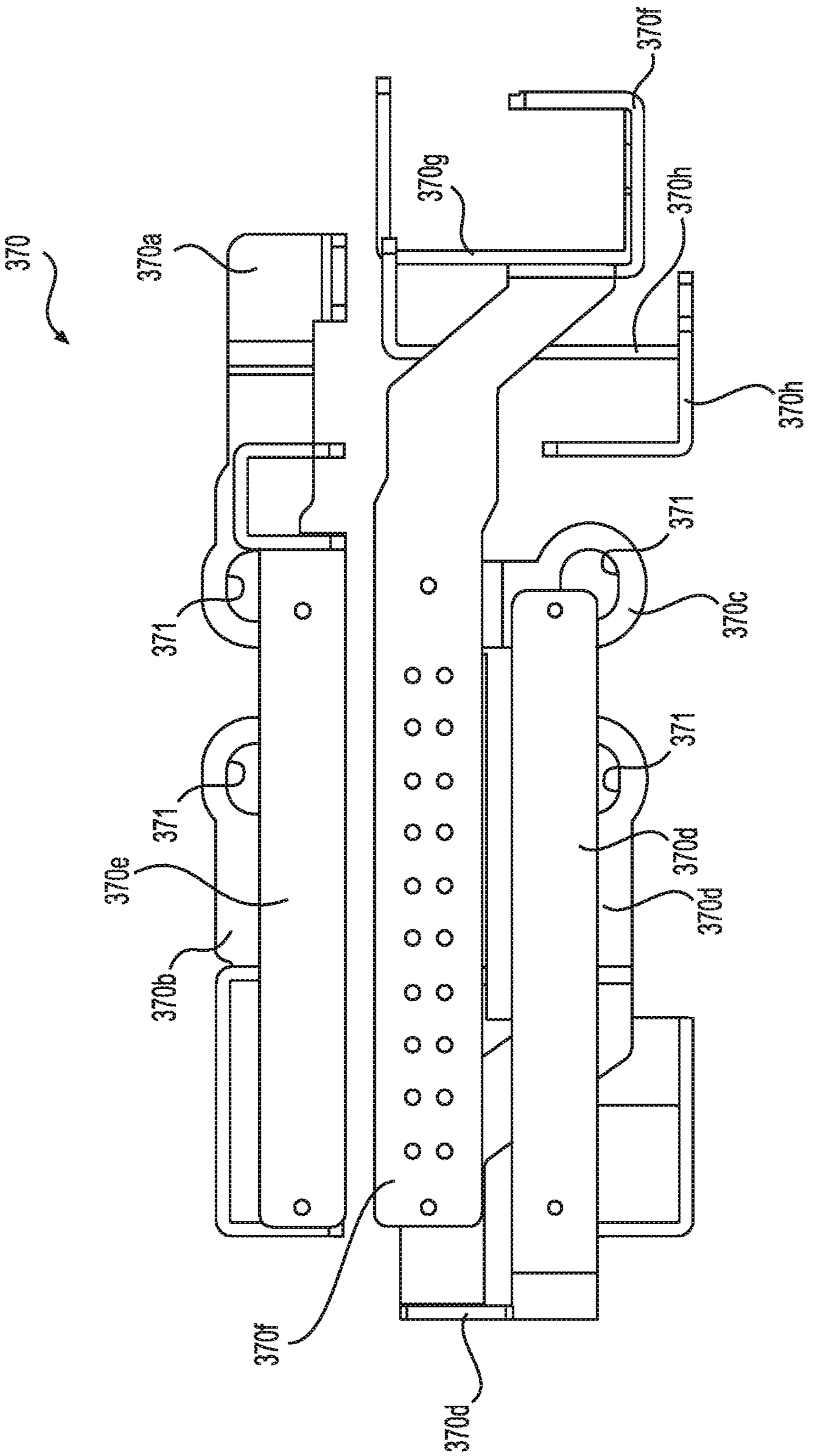
FIG. 58 is a rear elevational view of the highly conductive frame shown in FIG. 56.
Figure 59:
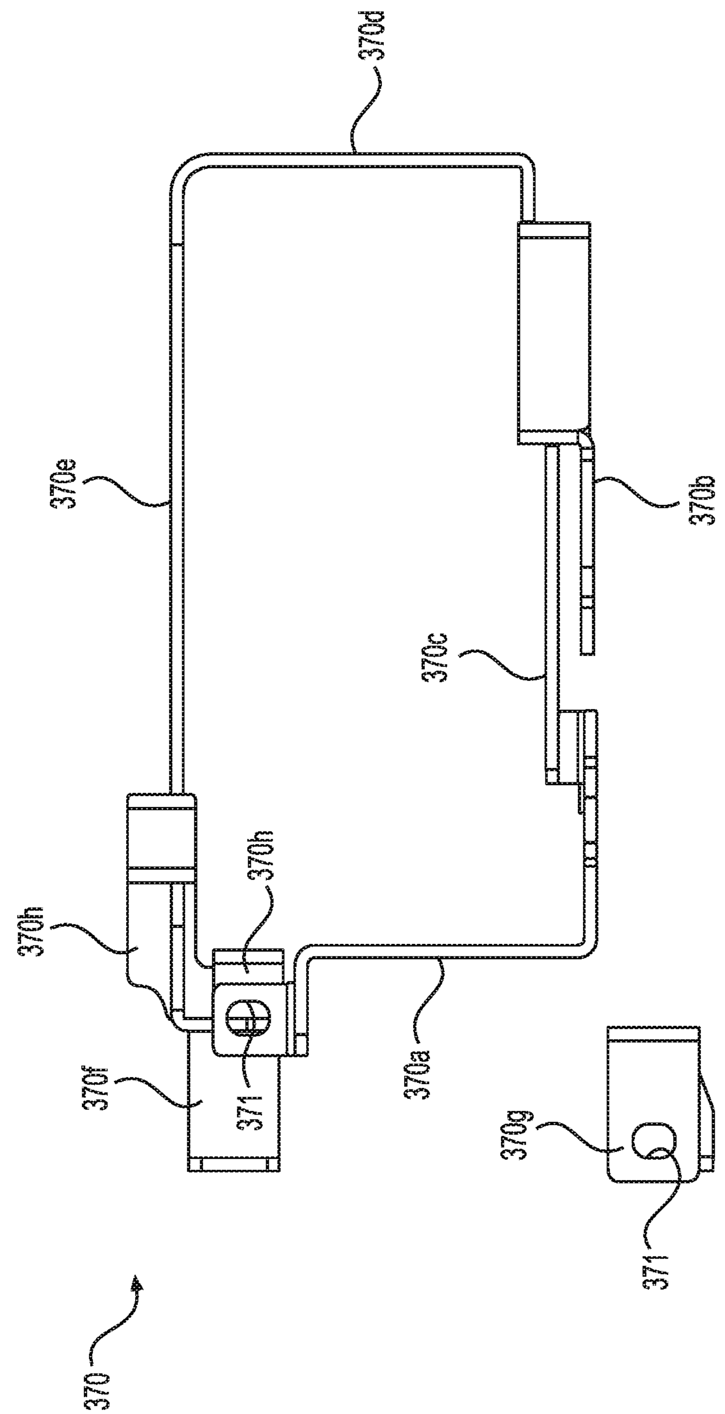
FIG. 59 is a top planar view of the highly conductive frame shown in FIG. 56.
Figure 60:
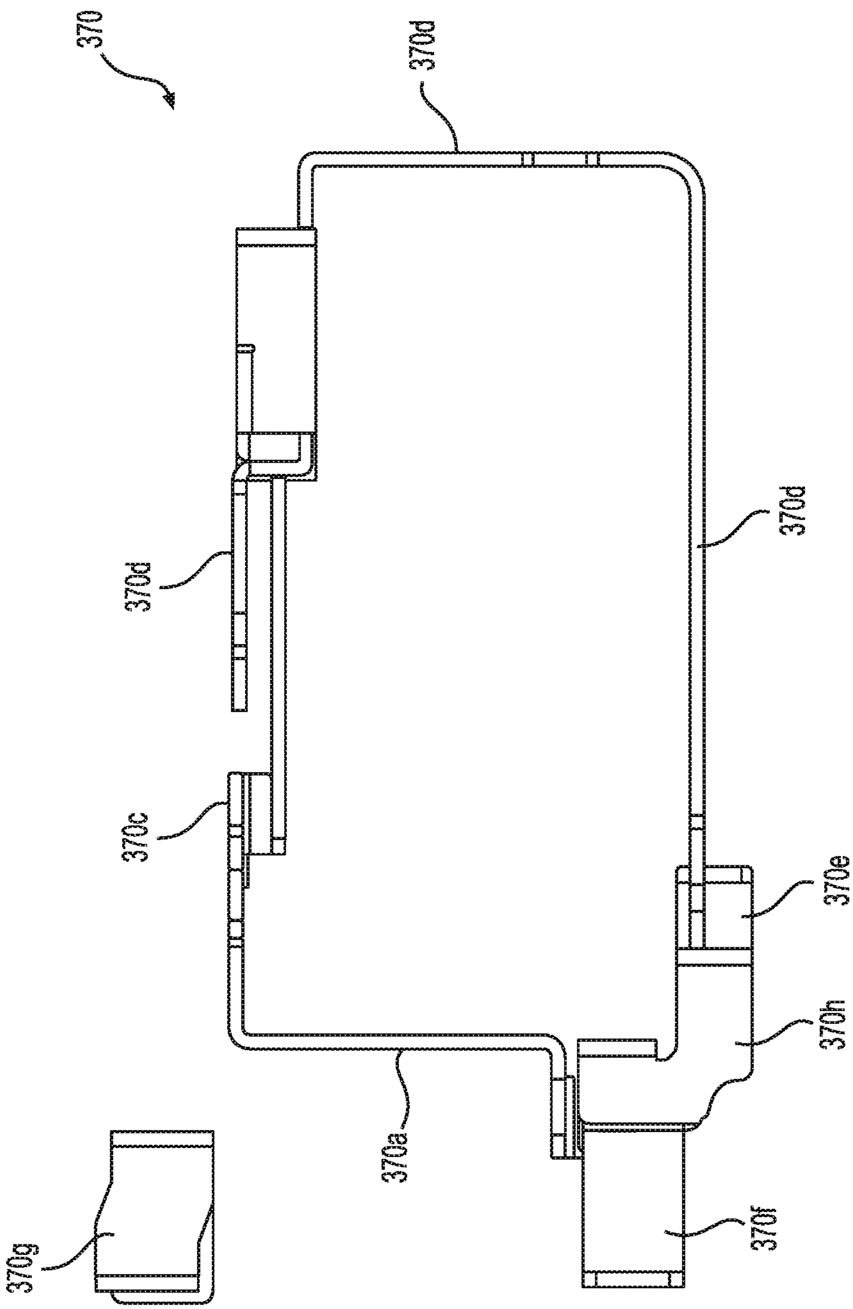
FIG. 60 is a bottom planar view of the highly conductive frame shown in FIG. 56.
Figure 61:
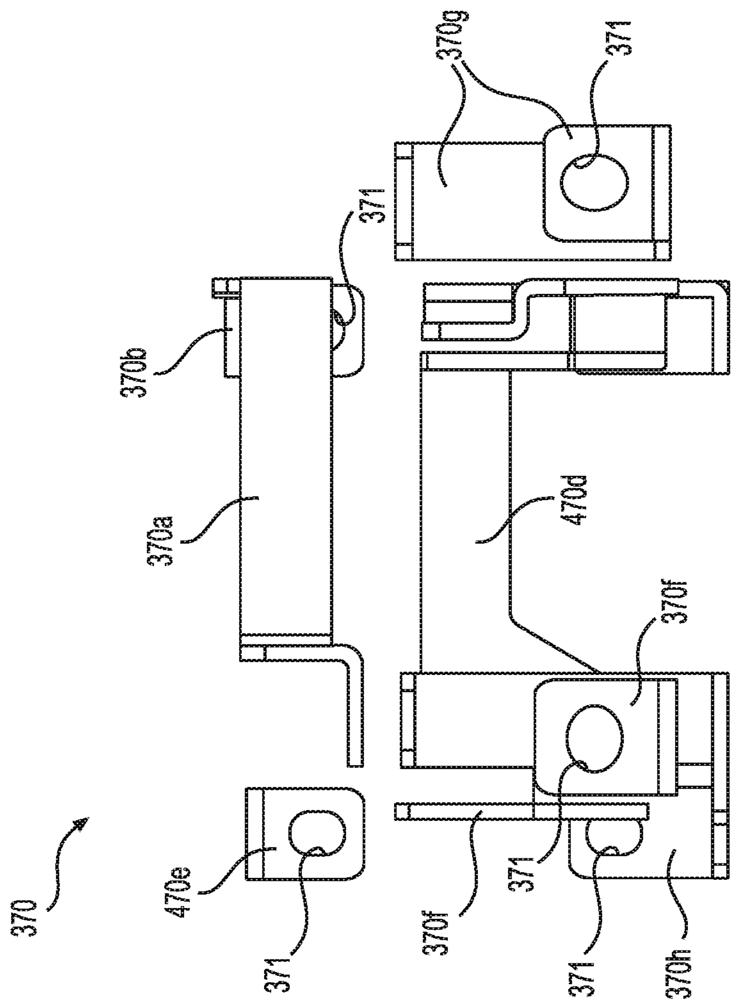
FIG. 61 is a left side elevational view of the highly conductive frame shown in FIG. 56.
Figure 62:
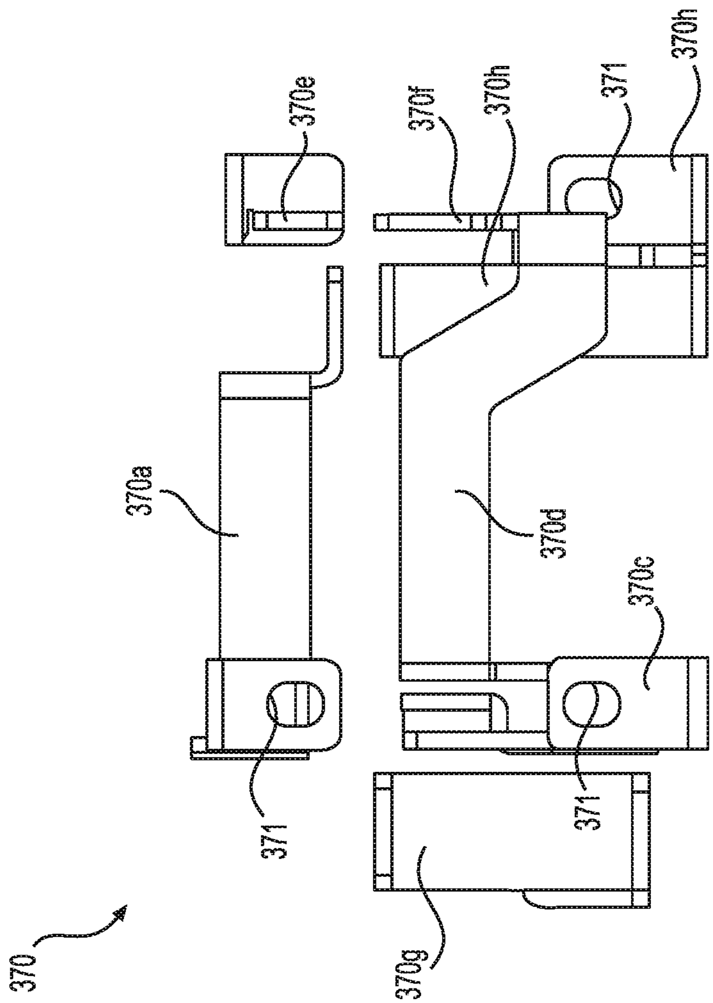
FIG. 62 is a right side elevational view of the highly conductive frame shown in FIG. 56.
Figure 63:
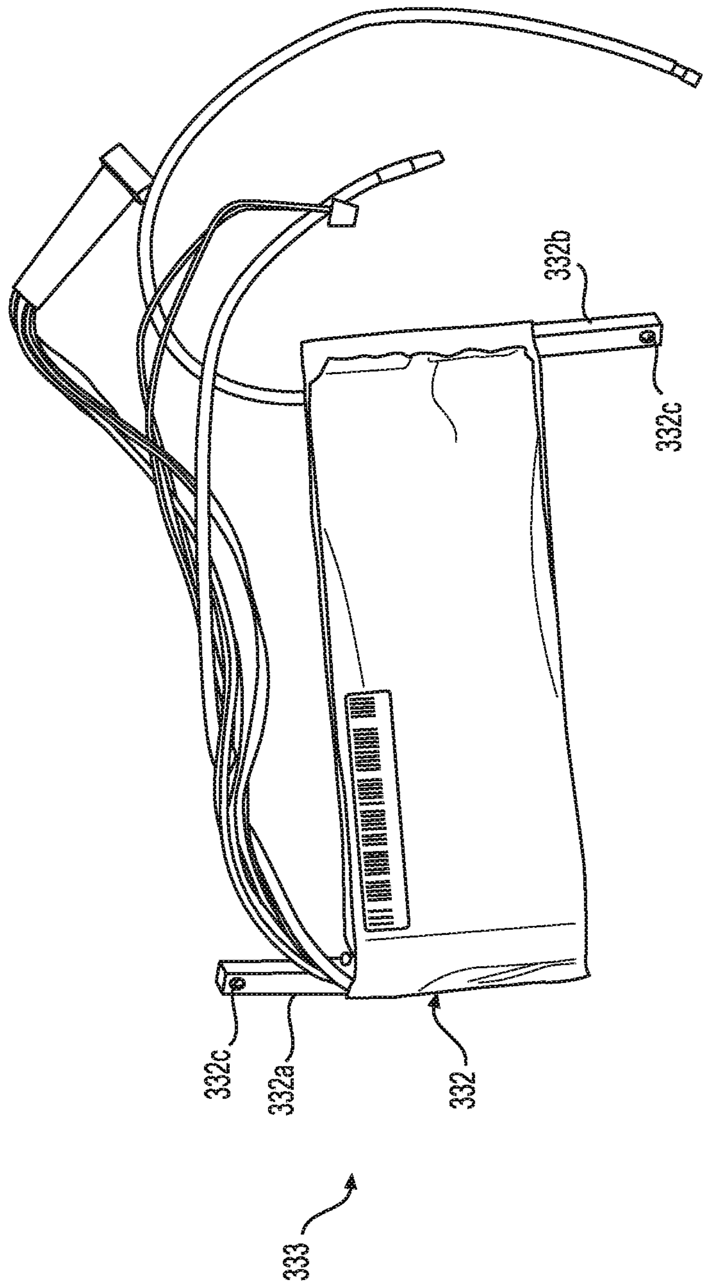
FIG. 63 is a top planar view of an assembled Li-ion battery assembly according to the present invention.

The cables 34, 36, 40, 42, 44, 46, 52, and 54 shown in FIG. 9 can be replaced with a highly conductive frame 370 comprising a plurality of highly conductive frame members 370*a-h*, as shown in FIG. 56. The highly conductive frame 370 is connected to the first 12V battery 32 (332), the second 12V battery 32 (332), and the electrical control switch 18 (318), as shown in FIG. 54.

The back-charge diode module 348 (FIG. 55) comprises highly conductive bars 348*a*, 348*b*, 348*c*. The highly conductive bars 348*a*, 348*b*, 348*c* are portions of the upper highly conductive frame member 370*e*, the lower highly conductive frame member 370*d*, and the center highly frame member 370*f*. The center highly conductive frame member 370*f* is located between the upper highly conductive frame member 370*e* and the lower highly conductive frame member 370*d* and spaced apart from each other. The first channel of diodes 348*d* are connected between the upper highly conductive frame member 370*e* and center highly conductive frame member 370*f*. The second channel of diodes 348*e* are connected between the lower highly conductive frame member 370*d* and the center highly conductive frame member 370*f*.

The center highly conductive frame member 370*e* is connected to a positive battery cable (e.g. positive battery cable 56 shown in FIG. 9). Specifically, the center highly conductive frame member 370*f* is connected to the positive cam lock (e.g. positive cam lock 25*a* shown in FIG. 9) configured for releasably connecting the positive battery cable to the positive cam lock.

The rechargeable battery jump starting device 10 further comprises a smart switch (e.g. smart switch 50 shown in FIG. 9 or smart switch 450 shown in FIG. 54) connected to the first 12V battery 32 (332) and the second 12V battery 32 (332). The smart switch 50 (450) is configured for switching on current flow from the first 12V battery 32 (332) and/or the second 12V battery 32 (332) only upon detecting that the positive battery clamp (e.g. positive battery clamp 60 shown in FIG. 9) and negative battery clamp (e.g. negative battery clamp 62 shown in FIG. 9) are correctly connected to the correct polarity battery terminals of the vehicle battery being jump started.

As shown in FIG. 54, the negative terminal of the first 12V battery 332 (BATTERY A) is permanently connected to the smart switch 450, and the negative terminal of the second 12V battery 332 (BATTERY B) is selectively connected to the smart switch 450 via the electrical control switch 318.

As further shown in FIG. 54, the positive terminal of the second 12V battery 332 (BATTERY B) is permanently connected to the back-charge diode module 348, and the positive terminal of the first 12V battery 332 (BATTERY A) is selectively connected to the back-charge diode module 348 via the electrical control switch 318.

Leapfrog Charging System

The rechargeable battery jump starting devices 10, 110, and 310 use two (2) 12V Li-ion batteries used for jump starting vehicles or equipment, and other system functions. These two (2) 12V individual Li-ion batteries are used in both series or parallel depending on whether the operator is jumpstarting a 12V vehicle or a 24V vehicle or equipment.

The battery jump starting device 10, 110, 310 can be charged using a charging device having a plug-in cord (e.g. 114 V to 126 V (RMS) AC charger) and a charging control device (e.g. programmable micro-controller). Each battery is charged on its own (i.e. independently) by the rechargeable battery jump starting device 10, 110, 310 separate from the other battery, but the batteries are kept close in potential during the charging process using "leapfrog charging". Leapfrog charging insures that both batteries are close to the same potential even if the rechargeable battery jump starting device 10, 110, 310 is removed from charging early. This provides for equal power delivery during jumpstarts as well as other system functions.

The battery jump starting device 310 is provided with a charging device. For example, the circuit board 408 shown in FIG. 26 can be provided with charging components and a charging circuit for recharging the two (2) Li-ion batteries 332. The components, for example, includes a programmable microcontroller for controlling the recharging circuit for recharging the Li-ion batteries 332

This method is accomplished by charging one Li-ion battery 332, starting with the lowest charged battery, until it is approximately 100 mv higher than the other battery 332, and then switching to charge the other battery 332. This process continues until both batteries 332 are completely charged.

Safeguards are provided in the rechargeable battery jump starting device 310 to protect against any of the batteries 332 being overcharged as well as sensing if a battery cell is shorted. These safeguards include peak voltage shutoff as well as charge timeouts in software.

The leapfrog charging system and method can be design or configured to charge the rechargeable batteries 332 (e.g. Li-ion batteries) in a charging sequence. The charging sequence can be designed or configured to ensure that both batteries become fully charge regardless of the operations of the battery jump starting device 310. In this manner, the batteries are fully charged on a regular basis to maximize the use and life of the batteries.

Further, the charging sequence can be tailored to most effectively charge particular types of rechargeable battery, in particular Li-ion batteries taking into account particular charging properties of the batteries (e.g. reduce heat generation of batteries over a time interval, apply best charging rate(s) for batteries, charging in a sequence increase life of batteries. The charging sequence, for example, can be to partially charge the batteries 332, one at a time, and back-and-forth. For example, the charging sequence can be configured to incrementally charge the batteries 332 in a back-and-forth sequence until both batteries are fully charged. For example, a voltage increase increment can be selected (e.g. 100 mV) for charging the batteries in a back-and-forth sequence.

In addition, the charging sequencing between the two batteries 332 can be selected or programmed to provide back-to-back charging of one battery two or more increments before switching to the other battery for charging. Also, the charging sequence can include one or more pauses to prevent the charging battery 332 from becoming too hot (e.g. temperature limit) or so that the charging sequence matches with the charging chemistry of the charging battery.

Figure 70:
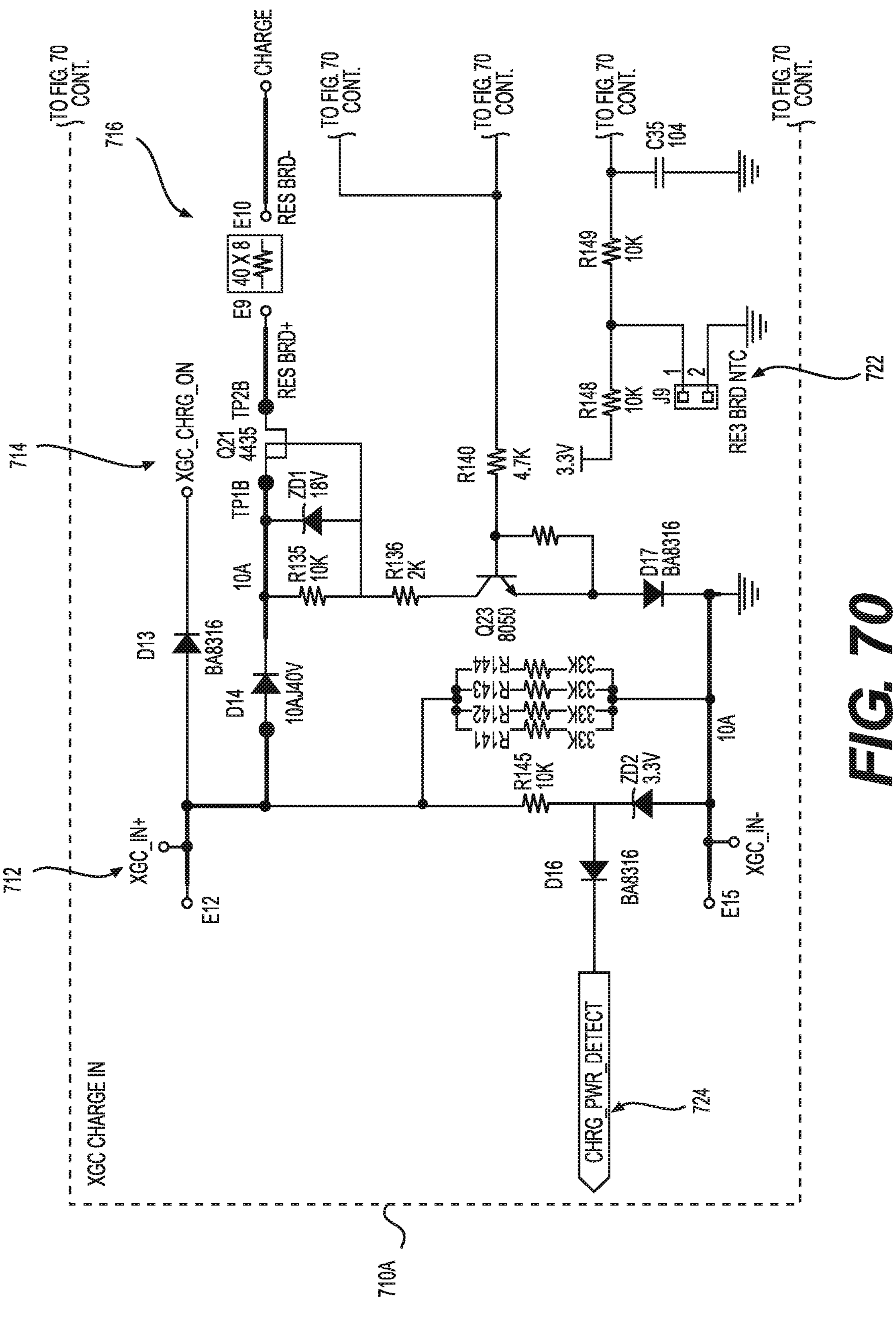
FIG. 70 is an electrical schematic diagram of the leapfrog charging system.
Figure 70:
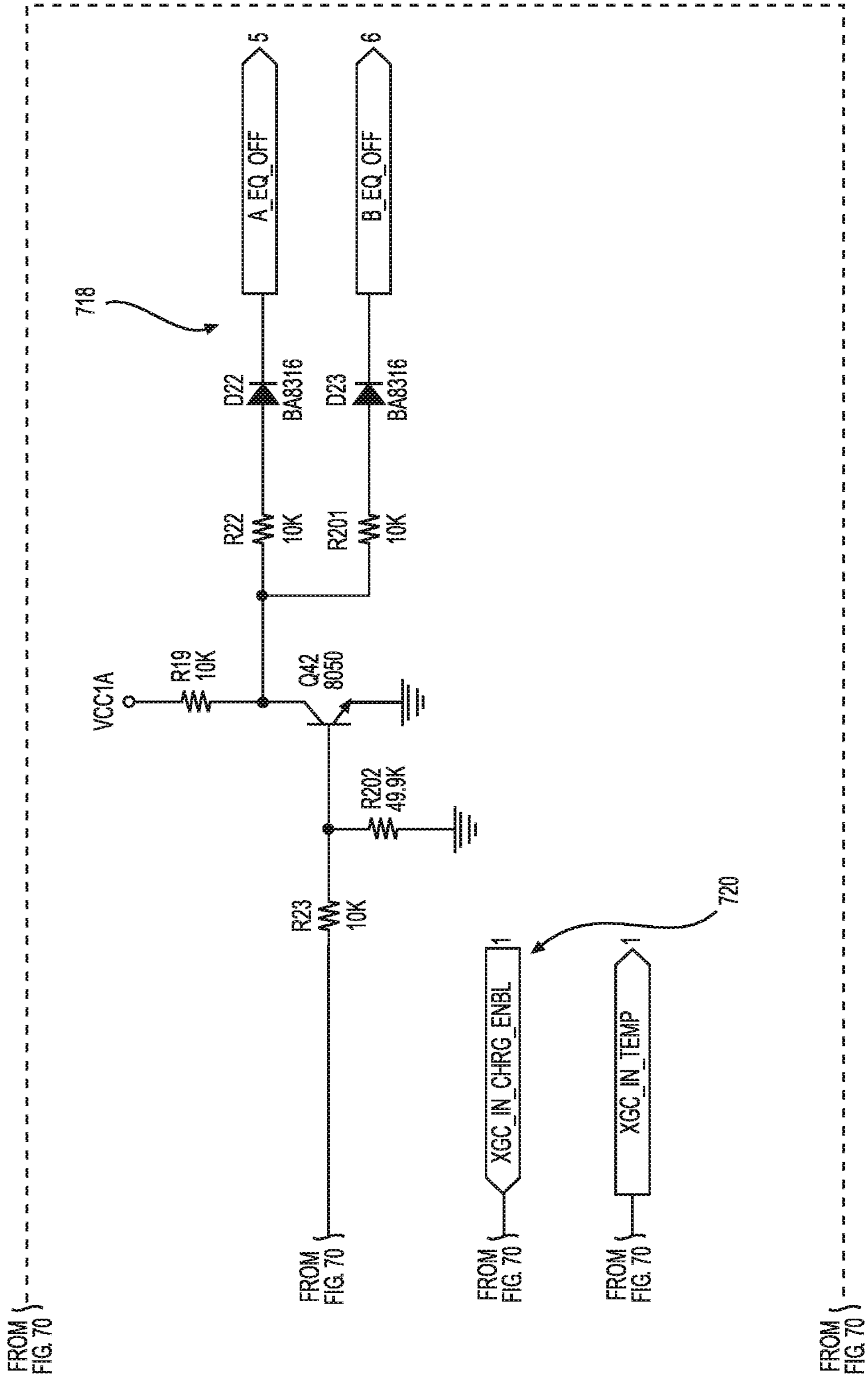
Figure 71:
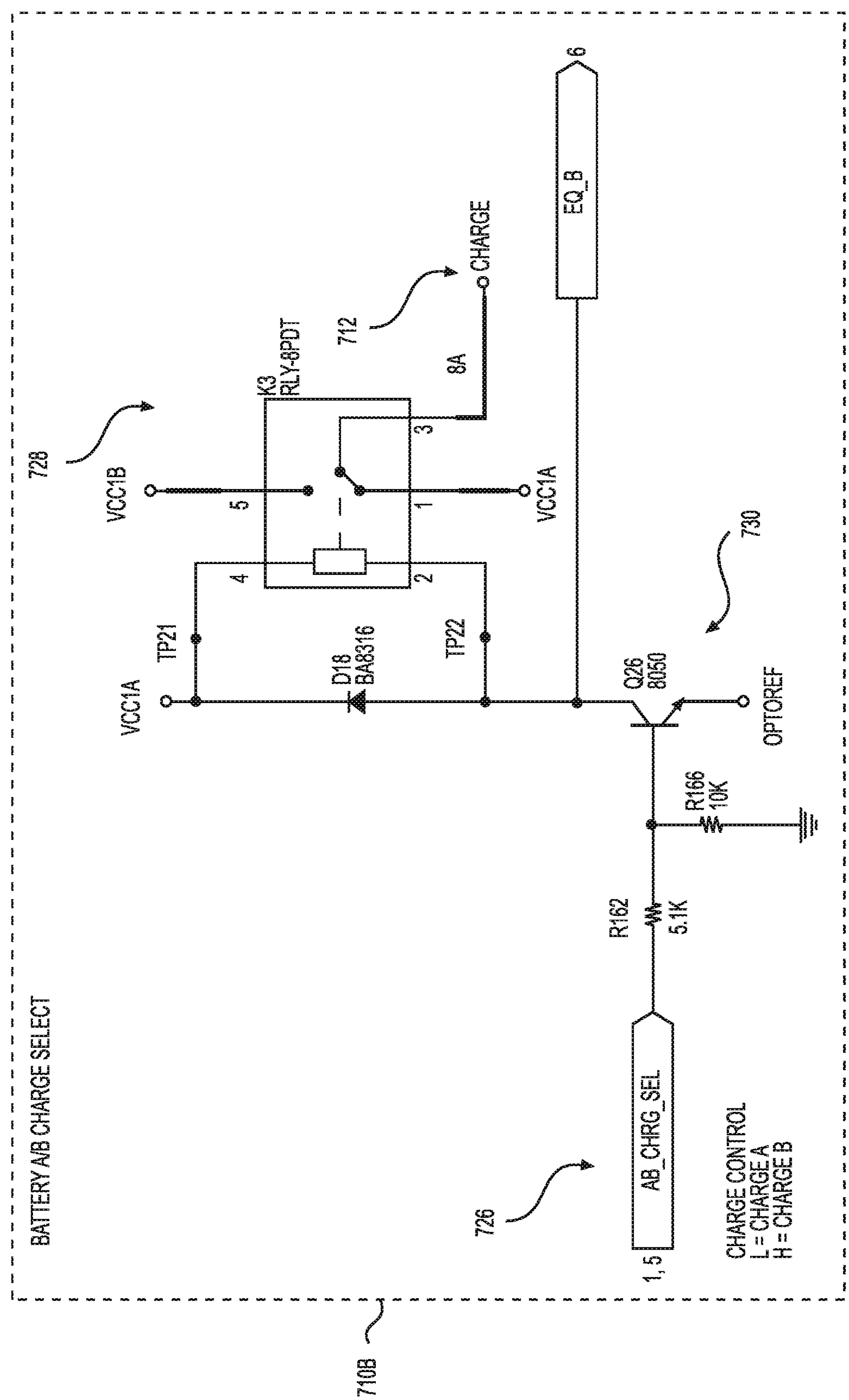
FIG. 71 is another electrical schematic diagram of the leapfrog charging system.

An example of a leapfrog charging system 710A, 710B for use in a rechargeable battery jump starting device, for example, rechargeable battery jump starting devices 10, 110, and 310, is shown in FIGS. 70 and 71.

The leapfrog charging system 710A shown in FIG. 70 comprises:

1) CHARGE SOURCE (712): The power for this input comes from the vehicle itself or an AC/DC charge adapter that outputs 14.4V @ 4 amps;
2) CHARGE ENABLE SWITCH (714): The charge current for the internal 12V lithium batteries is gated by a FET switch controlled by the system MCU;
3) CURRENT LIMIT MODULE (716): The charge current to the batteries is limited by this high power resistor module;
4) BATTERY CELL EQUALIZATION ENABLE (718): This circuit assists in enabling equalization for the individual batteries (A and B). Equalization provides a method for keeping the battery cell capacity even during charge;
5) CHARGE ENABLE FROM MCU (720): This signal is provided from the Micro Controller Unit (MCU), for example the Microcontroller Unit (MCU) 601 shown in FIG. 67, to enable the FET switch for charge current delivery;
6) CURRENT LIMIT TEMPERATURE SENSE (722): This circuit connects a temperature sensor to the MCU for reading the temperature of the CURRENT LIMIT MODULE (716) which allows the MCU to shut off charge current in case of overheating;
7) CHARGE SOURCE DETECT (724): This signal is sent to the MCU letting it know that the charge source has been connected;

The leapfrog charging system 710B shown in FIG. 71 comprises:

8) BATTERY A OR B CHARGE SELECT (726): This signal comes from the MCU and is used to select which battery is being charged;
9) CHARGE RELAY FOR BATTERY A OR B (728): This relay is used to switch charge between battery A or B;
10) CHARGE SOURCE (712) FROM FIG. 70: This is the main charge source; and
11) CONTROL TRANSISTOR FOR RELAY COIL (730): This transistor is used to control the relay coil for switching the relay contact from battery A or B for charging.

Improved Battery Detection System

Figure 72:
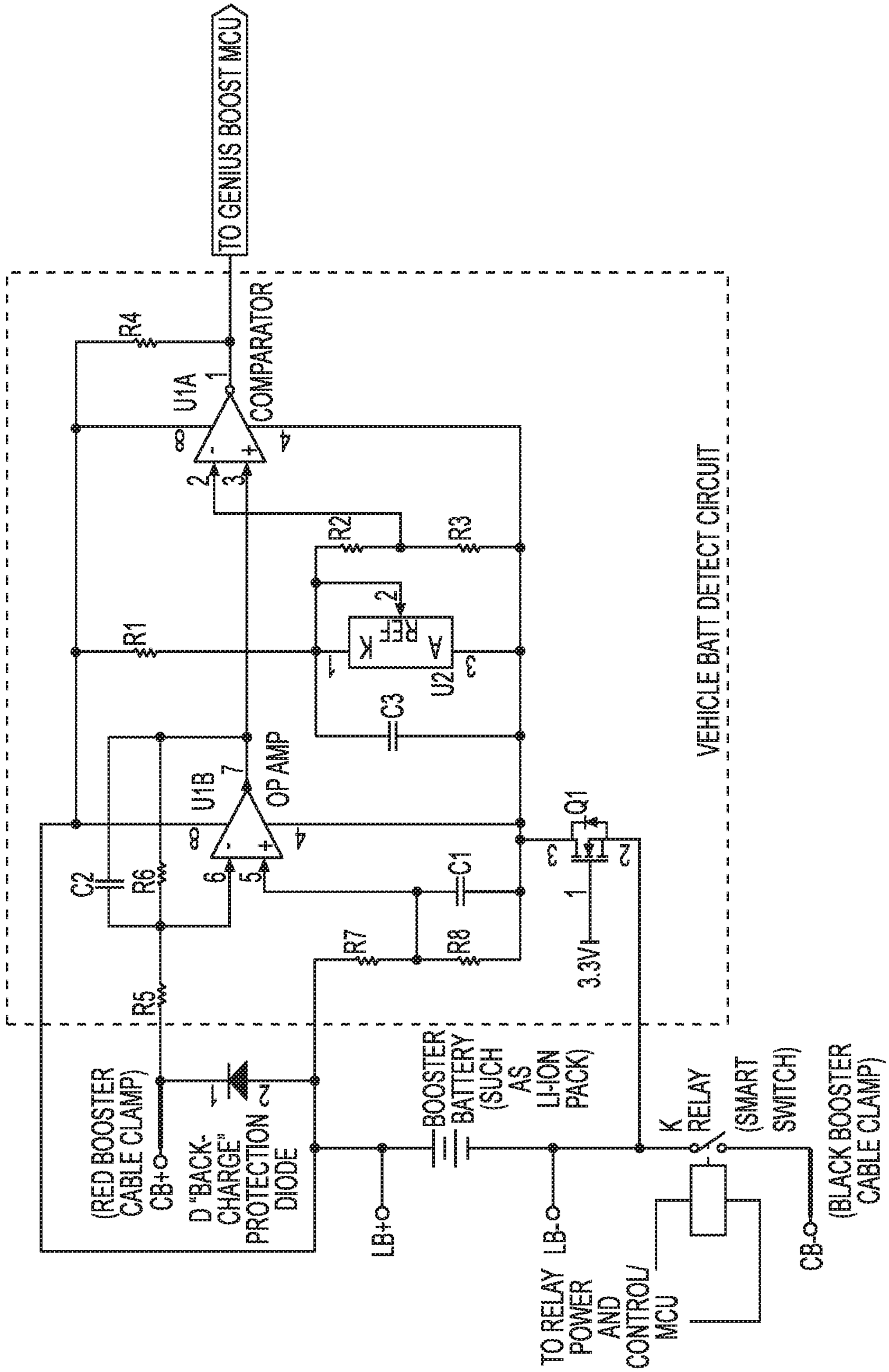
FIG. 72 is an electrical schematic diagram of the improved battery detection system.

The schematic shown in FIG. 72 shows the circuit to detect the forward voltage drop across the "back-charge" diodes, D. The circuit includes an op amp subtractor or difference amplifier whose output is fed into a comparator. If a forward voltage drop is detected across diodes D, and is above a certain threshold, meaning, an external load (vehicle battery) is connected to the jumper cables, then the comparator U1A puts out a "high" signal, allowing the jump starter to continue normal operation, i.e., internal jumper battery terminals continue being connected to the jumper cables through the "smart-switch" and the "back-charge" diodes, specifically, the internal battery negative terminal (LB−) remains connected to the black jumper cable. If the forward voltage drop sensed is below a certain threshold, then the comparator U1A puts out a "low" signal, instructing the jump starter logic (controlled by the micro-controller unit, MCU) to open the "smart-switch", disconnecting battery terminal LB− from the black or negative jumper cable, thus removing the internal battery voltage from being applied across the jumper cables and rendering the cable terminals inactive or dead.

The latter situation (forward voltage drop below a certain threshold) arises where there is negligible or no current from the internal booster battery to the vehicle battery. This scenario occurs when the jumper cables are open or disconnected from the vehicle battery, or when the vehicle battery has been charged (by the vehicle alternator) to a voltage higher than the booster battery.

Referring to FIG. 72, the forward voltage drop across the "back-charge" diodes D, is sensed by Op Amp U1B and resistors R5, R6, R7, R8, which together make up the difference amplifier or subtractor circuit. This section of the circuit subtracts the voltage potential at LB+(anode terminals of diodes, D) from the voltage potential at CB+(cathode terminal of D). Capacitors C1, C2 are added to filter the noise or voltage ripple arising when the vehicle alternator turns on, which can cause output of U1B to undesirably fluctuate.

Op Amp U1B output is fed into the non-inverting terminal of comparator U1A (pin 3). A voltage reference, U2, biased through R1, with capacitor C3 to stabilize its operation, is applied to its inverting input (pin 2) through voltage divider R2, R3. Comparator UA compares the voltage at its non-inverting input pin 3 to this reference voltage at pin 2 and changes its output voltage state depending on the comparison outcome. Comparator UA used in this circuit happens to have an open collector transistor output stage, hence R4 is added between the collector to the power supply node to allow the output transistor to turn ON when needed.

Op amp U1B's output (pin 7) represents the forward voltage drop across "back-charge" diodes (D), including an offset voltage due to op amp circuitry. Voltage at pin 7 of U1B is applied to non-inverting input UA (pin 3). If a detectable forward voltage drop is present across diodes D, the Op Amp U1B's output voltage goes above the reference voltage present at comparator UA's pin 2, causing the comparator to put out a "high" signal, allowing the jump starter to continue normal operation, i.e., jumper battery terminals continue to be connected to the jumper cables through the "smart-switch" and diodes D. If the forward voltage drop sensed is below a certain threshold, the Op Amp output voltage falls below the reference level at comparator's pin 2, causing the comparator to put out a "low" signal, instructing the jump starter logic (controlled by the micro-controller unit, Genius Boost MCU) to open the "smart-switch", disconnecting the booster battery's negative terminal from the black or negative jumper cable, thus rendering the cable terminals inactive or dead.

The booster battery serves as the circuit's power supply (power supply pins 8 of U1B and U1A connected to LB+). To prevent the circuitry to draw current from the booster battery when the unit is not in use, the circuit ground is connected to the booster battery ground terminal, LB−, through an enhancement mode MOSFET switch Q1, which is turned ON by a 3.3V signal that gets generated and is applied between the gate to source terminals of Q1, only when the boost unit is powered ON, only then allowing the circuitry to start drawing current.

Highly Conductive Frame

The highly electrically conductive frame 370 ("highly conductive frame"), is shown in FIGS. 56-62. The highly conductive frame 370 comprises highly conductive frame members 370*a-h*.

The highly conductive frame 370 can replace the electrically conductive cables 34, 36, 40, 42, 44, 46, 52, 54 (FIGS. 9 and 10) of the portable battery jump starting device 10, or the highly conductive frame 170 (FIG. 16) of the battery jump starting device 110.

The highly conductive frame 370 comprises a positive conductive frame 371*a* and negative conductive frame 371*b*, as shown in FIG. 56. The positive conductive frame 371*a* comprises highly conductive frame members 170*c*, 170*d*, 170*e*, 170*f* providing a positive conductive pathway between the rechargeable batteries 332 and the positive cam-lock 324*a*. The negative conductive frame 371*b* comprises highly conductive frame members 170*a*, 170*b*, 170*g*, 170*h* providing a negative conductive pathway between the rechargeable batteries 332 and the negative cam-lock 324*b* of the rechargeable battery jump starting device 310. The highly conductive frame members 370*a-h* each carry or transfer power a distance between connecting ends of the highly conductive frame members 370*a-h*.

The highly electrically conductive frame 370 comprises the multiple electrically conductive frame members 370*a-h* electrically and mechanically connected together. For example, the highly electrically conductive frame members 370*a-h* are each provided with connecting ends having through holes 371 to allow a fastener (e.g. highly electrically conductive nuts and bolts) to connect the electrically conductive frame members 370*a-h* to each other or to other electrical components (e.g. rechargeable batteries 332, cam-locks 324*a*, 324*b*, back-charge diode module 348, smart switch 450). The highly electrically frame members 370*a-h*, for example, are flat highly electrically conductive bars (e.g. copper or aluminum bars) bent along multiple spaced apart axes to provide a three dimensionally (3D) arrangement of each highly electrically conductive bar 370*a-h*, which cooperate together to define a three dimensional (3D) highly electrically conductive frame 370. As shown in FIG. 56, one or both ends of the electrically conductive frame members 370*a-h* have bent ends each provided with a through hole 371.

The highly electrically conductive frame 370, for example, can be a highly electrically conductive semi-rigid or rigid frame 370 made of semi-rigid or rigid highly conductive material (e.g. copper, aluminum, plated metal, gold plated metal, silver plated metal, steel, coated steel, stainless steel). The highly electrically conductive frame 370 is structurally stable (i.e. does not move or flex) so that it does not contact and electrically short with components or parts of the portable jump starting device. The more rigid the highly electrically conductive frame 370 typically the more structurally stable is the highly electrically conductive frame 370.

The highly electrically conductive frame 370 electrically connects together the two (2) batteries 332, for example Li-ion batteries 332 with the cam-locks 324*a*, 324*b*. The cam-locks 324*a*, 324*b* connect to the removable or detachable positive and negative battery cables 56, 58 (FIG. 9).

The highly electrically conductive frame 370 comprises multiple highly electrically conductive frame members 370*a-h*. For example, highly electrically conductive frame members 370*a*, 370*b*, 370*c*, 370*d* are connected to the control switch 318 via the terminals 382*a*, 384*a*, 386*a*, 388*a* (also see terminals 82*a*, 84*a*, 86*a*, 88*a* of the control switch 18 shown in FIG. 14).

Figure 18:
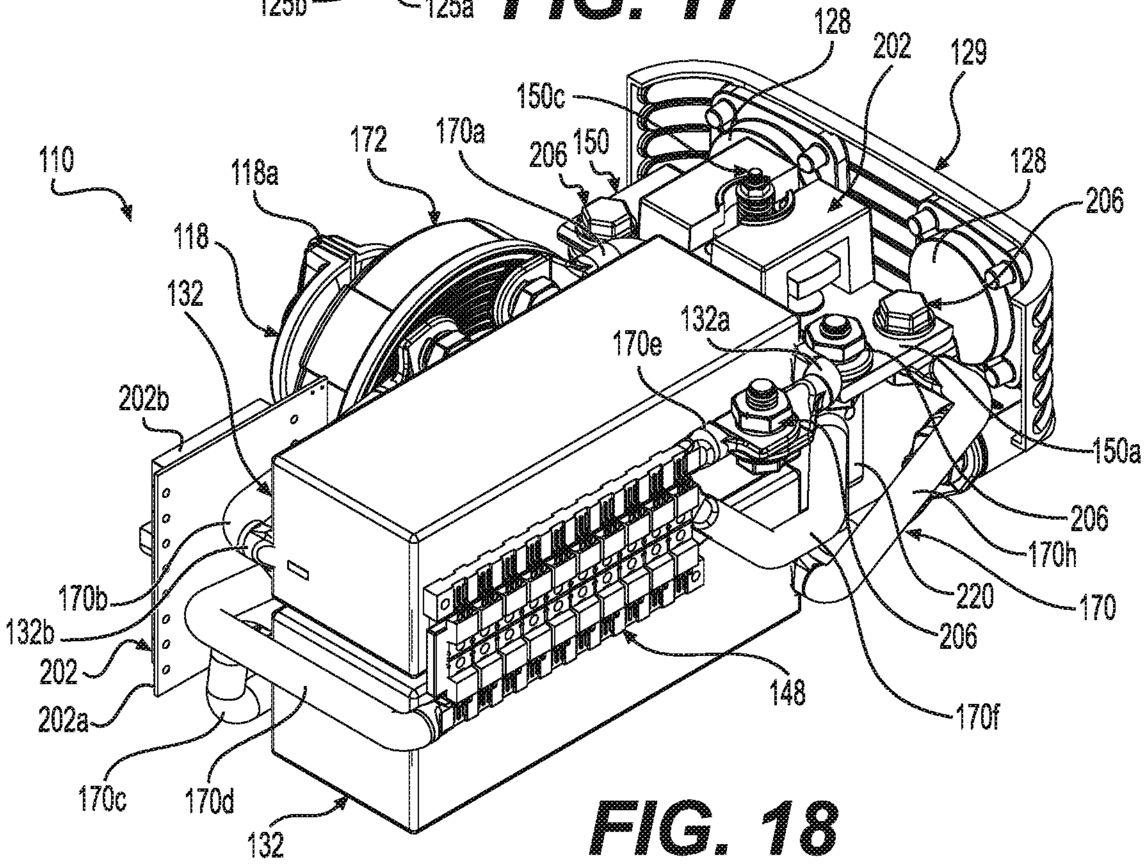
FIG. 18 is a rear and right side perspective view of the battery jump starting device shown in FIG. 1 with the cover removed.

The highly electrically conductive frame members 370*d*, 370*e*, 370*f* are part of the reverse flow diode assembly 348 (see reverse flow diode assembly 148 in FIG. 18).

Figure 20:
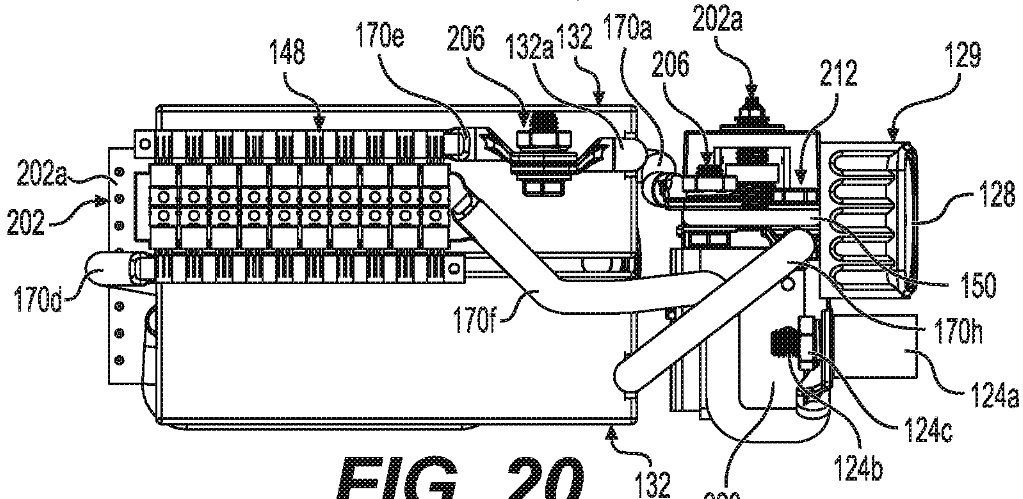
FIG. 20 is a rear elevational view of the battery jump starting device shown in FIG. 1 with the cover removed.
Figure 21:
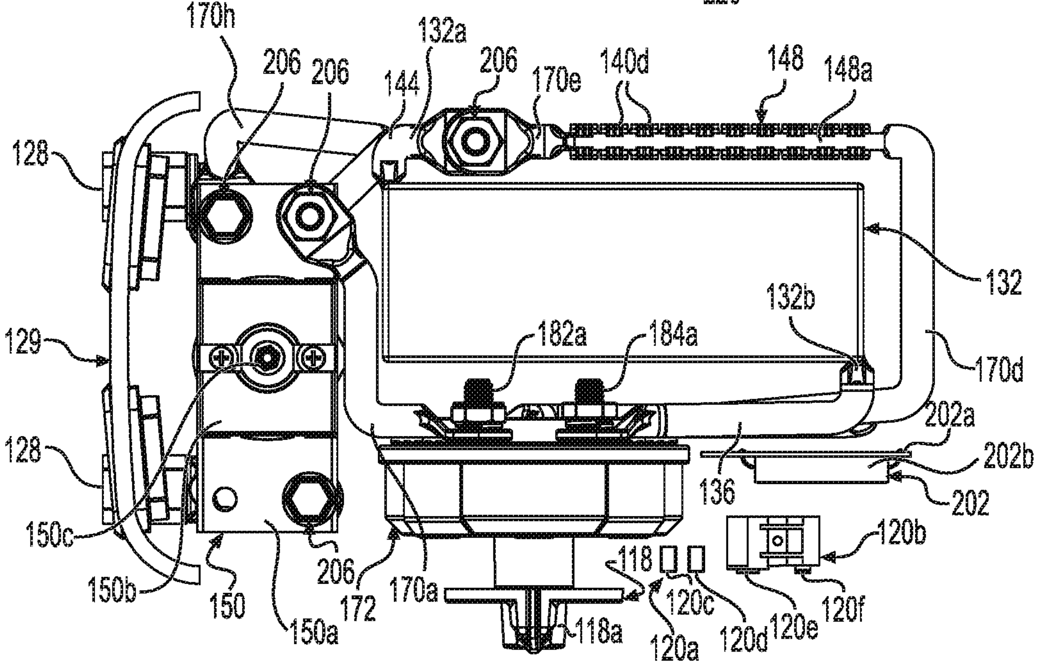
FIG. 21 is a top planar view of the battery jump starting device shown in FIG. 1 with the cover removed.
Figure 22:
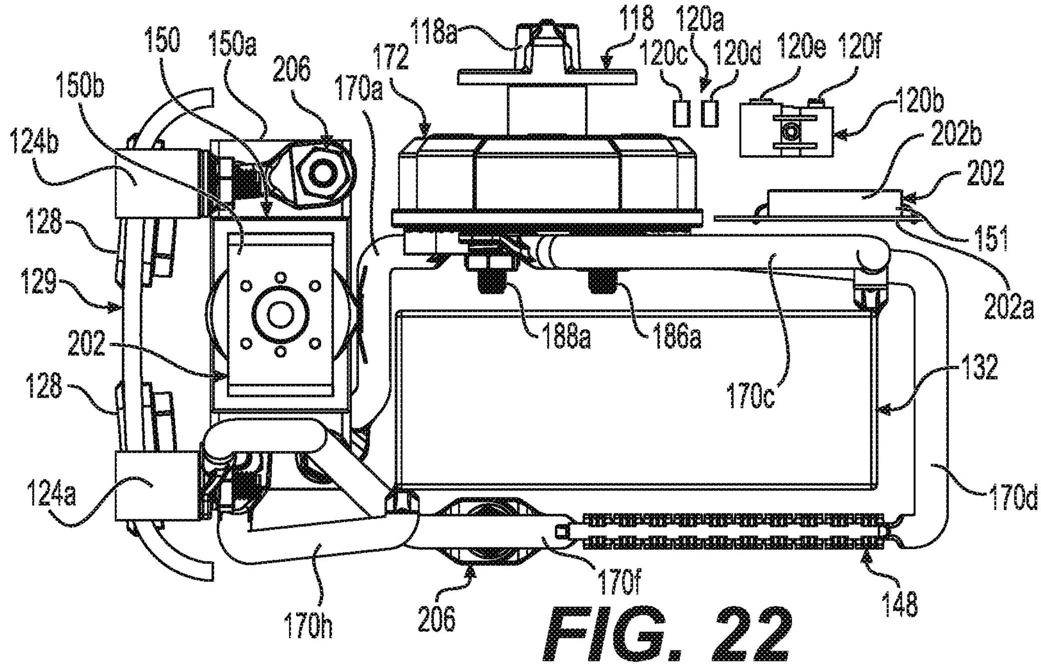
FIG. 22 is a bottom planar view of the battery jump starting device shown in FIG. 1 with the cover removed.
Figure 23:
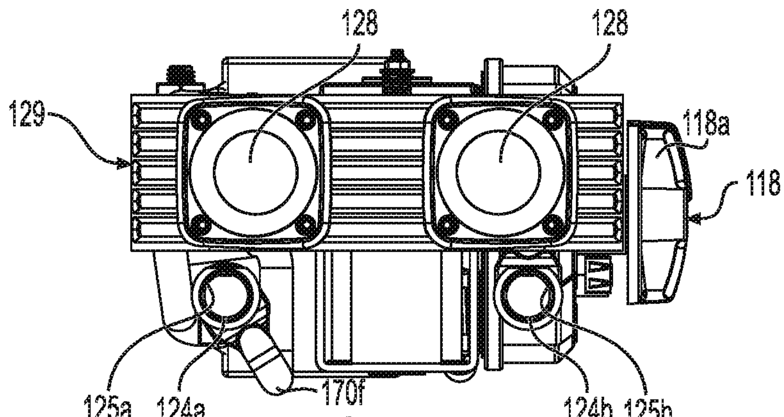
FIG. 23 is a left side elevational view of the battery jump starting device shown in FIG. 1 with the cover removed.
Figure 24:
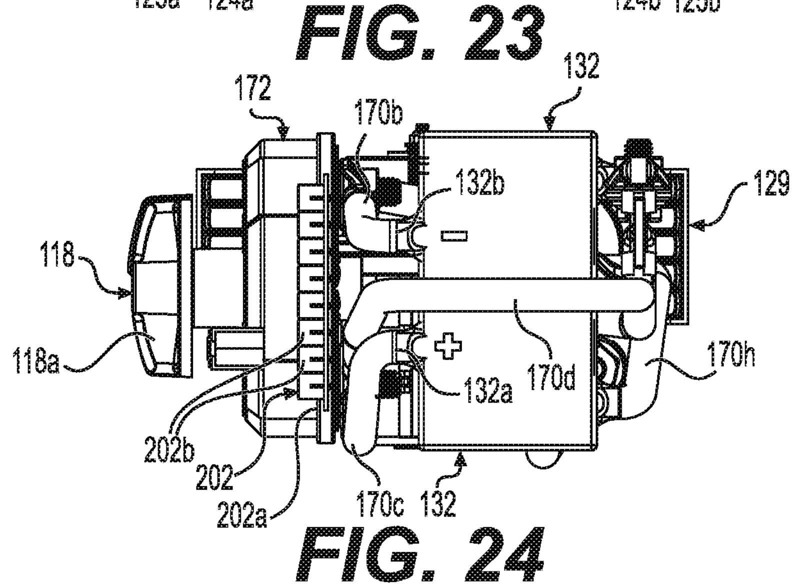
FIG. 24 is a right side elevational view of the battery jump starting device shown in FIG. 1 with the cover removed.
Figure 25:
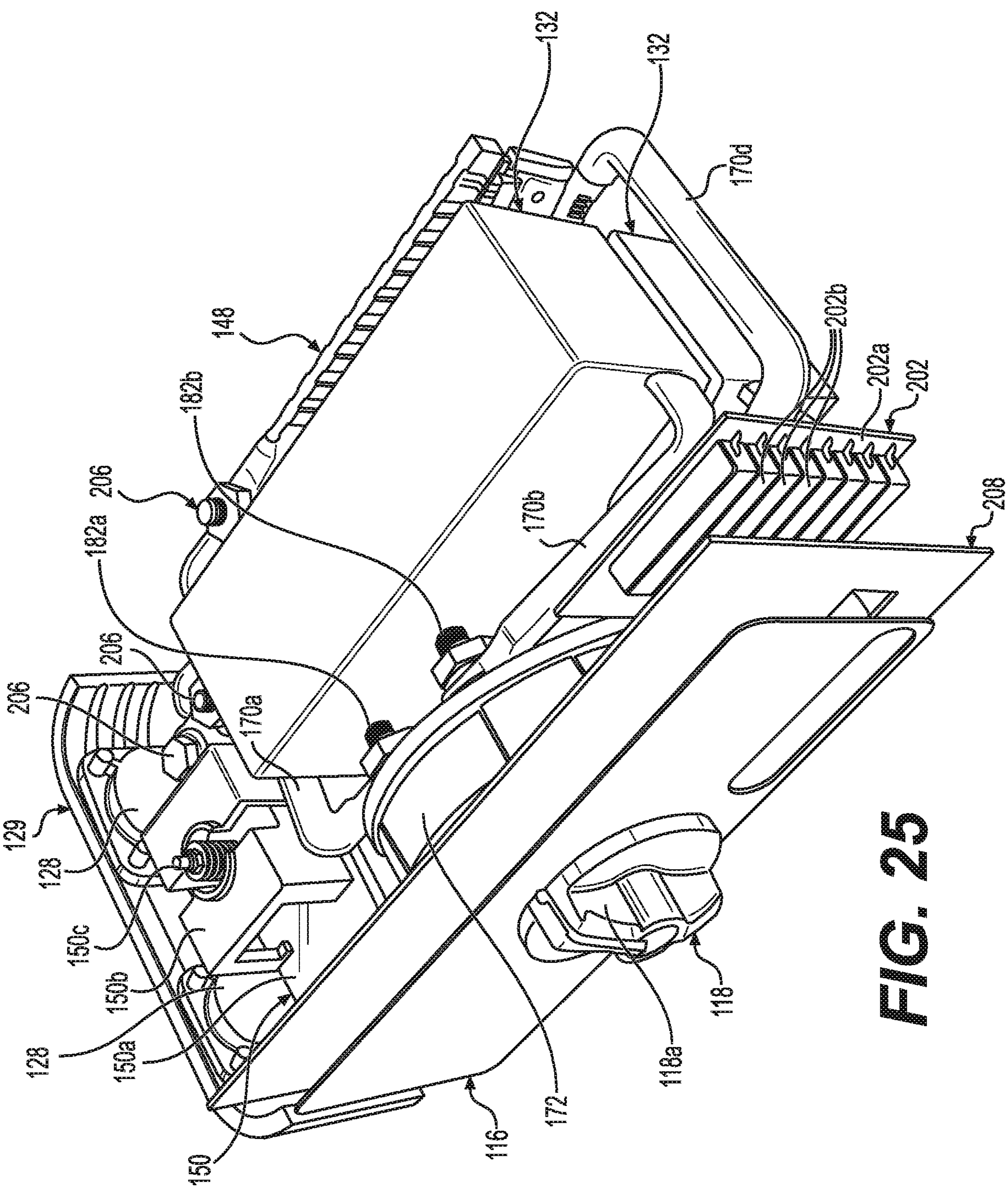
FIG. 25 is a front and top perspective view of the battery jump starting device shown in FIG. 1 with the cover removed.

The highly electrically conductive frame member 370*f* is connected to the positive cam-lock 324*a* (also see positive cam-lock 24*a* shown in FIGS. 1 and 9 and positive cam-lock 124*a* shown in FIG. 20).

The highly electrically conductive frame member 370*g* is connected to the negative cam-lock 324*b* (see negative cam-lock 24*b* shown in FIG. 1 or negative cam-lock 124*b* shown in FIG. 19).

The highly electrically conductive frame member 370*h* connects to the smart switch 450 (also see smart switch 150 shown in FIG. 18).

The highly electrically conductive frame 370 is a three-dimensional (3D) structure configured to wrap around and partially or fully enclose the Li-ion batteries 332 (also see the rechargeable Li-ion batteries 132 shown in FIGS. 16-25). This arrangement provides the shortest conductive pathways from the rechargeable Li-ion batteries 332 to the other internal electrical components of the portable jump starting device 310 to maximize the power output to the positive cam-lock 324*a* and negative cam-lock 324*b*. The highly electrically conductive frame members 370*a-h* have multiple bends along multiple spaced apart axes.

The highly electrically conductive frame members 370*a-h* are provided with ends having through holes to accommodate highly conductive fasteners 406 (e.g. see conductive fasteners 206, including bolts 206*a* and nuts 206*b* shown in FIGS. 16-25). Further, the highly electrically conductive frame members 370*a-h* are made of flat bar stock bent at one or more locations so as to wrap around the Li-ions batteries 332. For example, the highly electrically conductive frame members 370*a-h* are bent at multiple locations to form a three-dimensional (3D) frame structure. For example, the highly electrically conductive frame members 370*a-h* can have bent ends provided with ring-shaped through holes. Alternatively, the high electrically conductive frame 370 can be made as a single piece (e.g. single piece of plate or bar bent into shape, multiple pieces welded or soldered together, machined from a block of stock material). Further, the highly electrically conductive frame members 370*a-h* are located adjacent to the sides of the Li-ion batteries 332 to make the combination of the Li-ion battery assembly and highly electrically conductive frame 370 as compact as possible.

The highly electrically conductive frame 370 is made from flat highly electrically conductive plate stock material (e.g. flat bars or strips of copper or aluminum stock material cut to length, bent, and drilled).

Battery Assembly

The Li-ion battery assembly 333 according to the present invention is shown in FIGS. 63-66.

The Li-ion battery assembly 333 comprises the one or more rechargeable Li-ion batteries 332. For example, the rechargeable battery jump starting device comprises two (2) rechargeable batteries 332.

The Li-ion batteries 332 each comprise multiple battery cells 335 connected together in series (i.e. positive tab of one rechargeable battery cell 335 connected to negative tab of adjoining rechargeable battery cell 335) resulting in one rechargeable battery cell 335 situated at one end of the multiple battery cells 335 having a positive terminal (+) and another rechargeable battery cell 335 situated at an opposite end of the multiple battery cells 335 having a negative terminal (−).

A positive highly conductive battery member 332*a* is connected to the positive terminal (+), and a negative highly conductive battery member 332*b* is connected to the negative terminal (−). The positive highly conductive battery member 332*a* and the negative highly conductive battery members 332*b* can be highly electrically conductive bars, plates, rods, and tubes. The rods and tubes can have flattened ends to facilitate connection with the highly electrically conductive frame 370 (FIG. 56).

Figure 64:
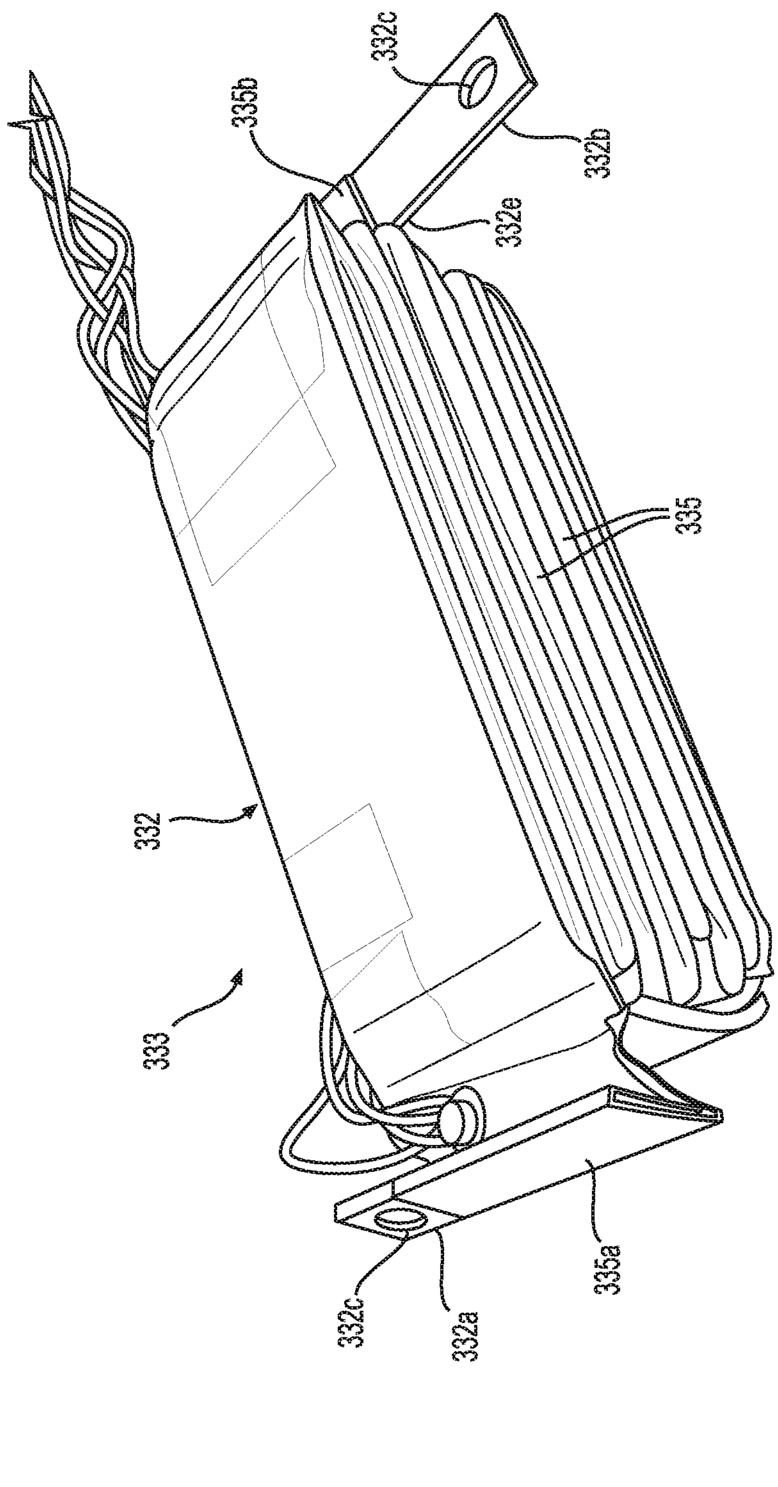
FIG. 64 is a perspective view of the Li-ion battery assembly shown in FIG. 63 with the covering removed.
Figure 65:
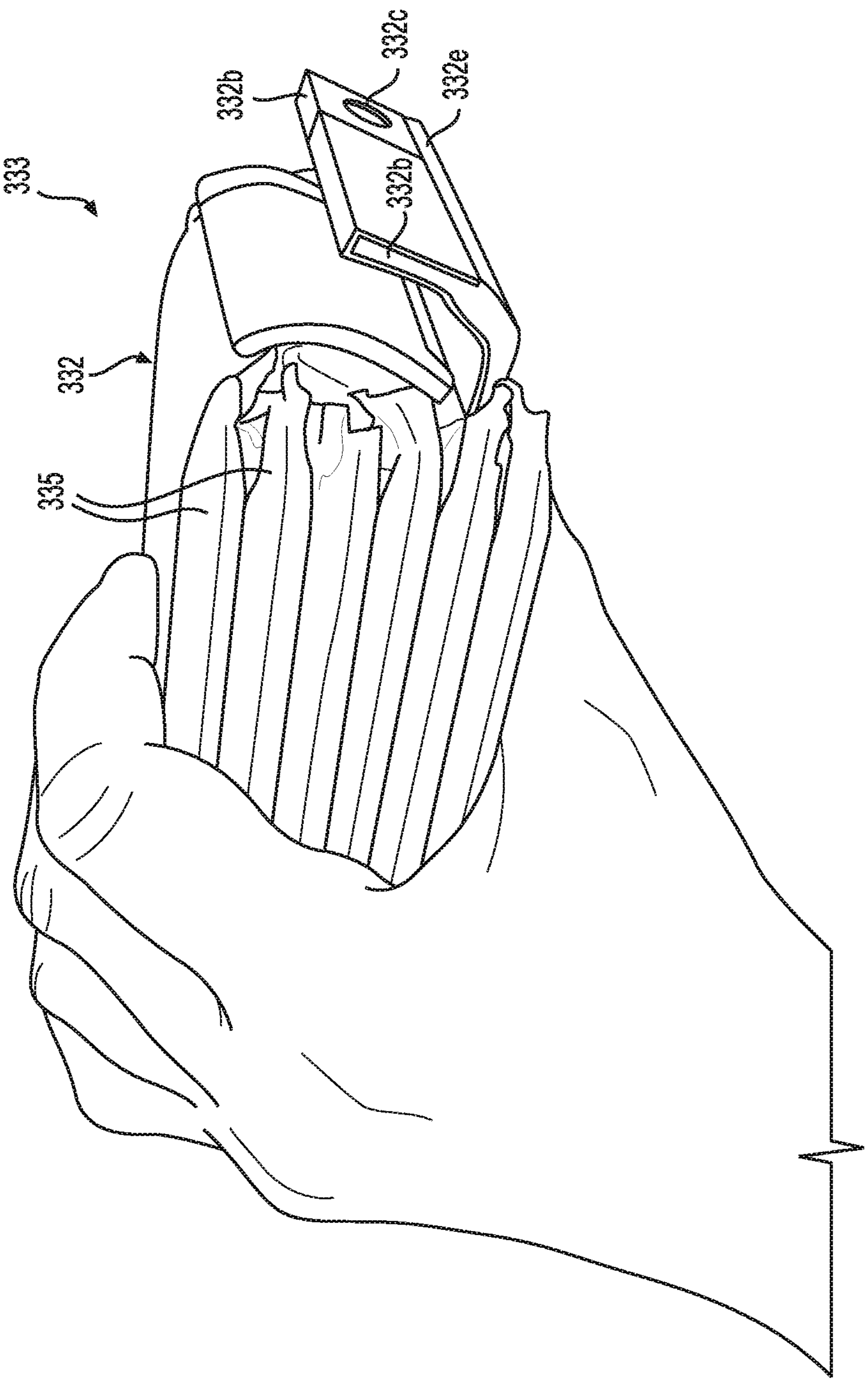
FIG. 65 is a perspective view of the Li-ion battery assembly shown in FIG. 63 with the covering removed.
Figure 66:
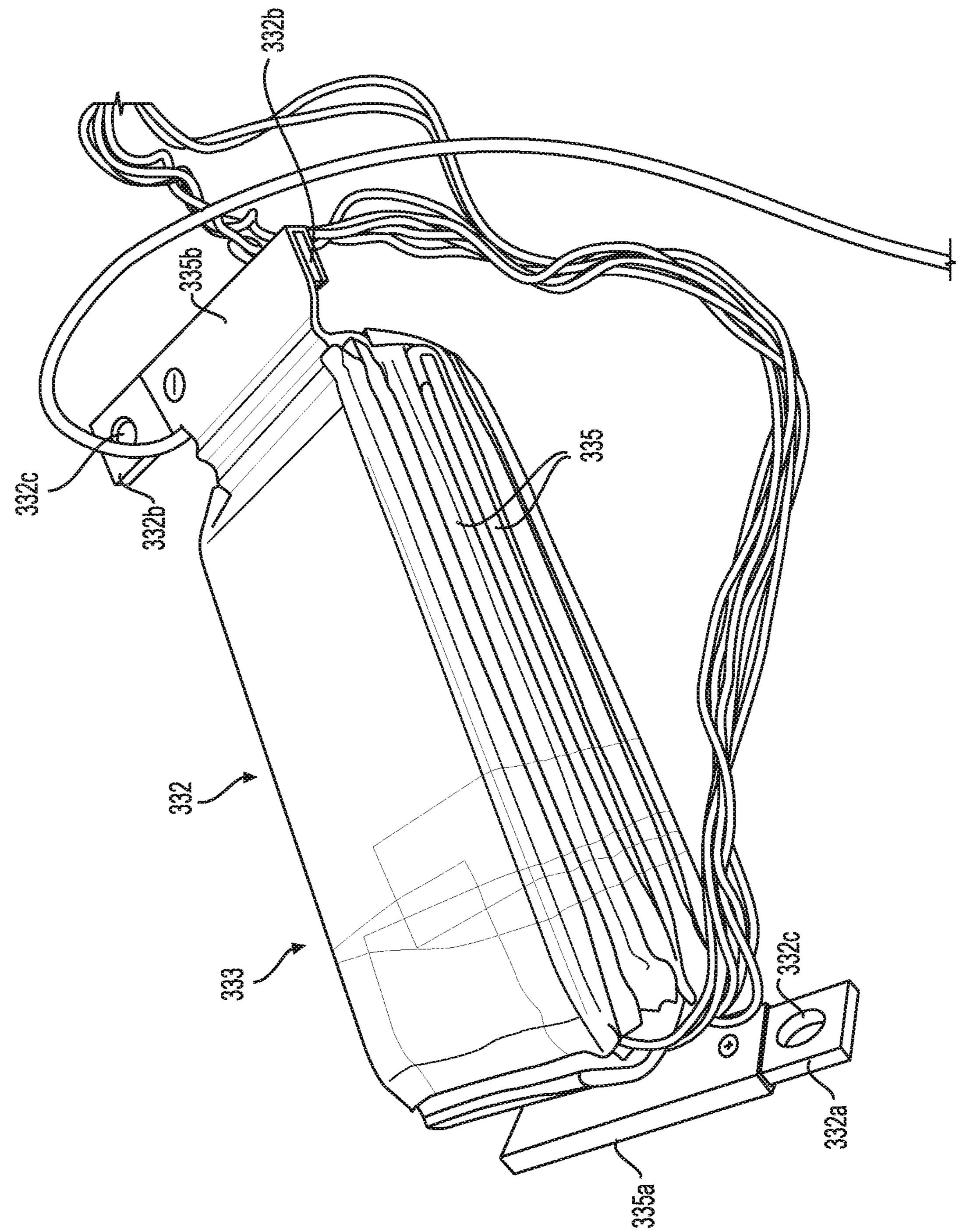
FIG. 66 is a perspective view of the Li-ion battery assembly shown in FIG. 63 with the covering removed.

Each Li-ion battery 332 comprises multiple Li-ion battery cells 332*c* layered one on top of the other, as shown in FIGS. 64-66 (i.e. stacked arrangement).

The positive foil tab or end 335*a* of the positive terminal (+) of the Li-ion battery cells 335 is connected (e.g. soldered, welded, and/or mechanically fastened) to the positive highly conductive battery member 332*a*. The negative foil tab or end 335*b* of the negative terminal (−) of the Li-ion battery cells 335 is connected (e.g. soldered, welded, and/or mechanically fastened) to the negative highly conductive battery member 332*b*.

The positive highly conductive battery member 332*a* and the negative highly conductive battery member 332*b* are made from highly conductive flat plate or bar stock material (e.g. copper plate, copper bar, aluminum plate, aluminum bar, steel plate, steel bar, metal coated plate, gold plated plate, silver plated plate). The positive highly conductive battery member 332*a* is provided with a through hole 332*c* located at an end extending a distance outwardly from a side of the rechargeable Li-ion battery 332 (i.e. transverse to longitudinal axis or length the rechargeable battery cells 335 and the rechargeable Li-ion battery 332). The negative highly conductive battery member 332*b* is provided with a through hole 332*c* located at an end extending a distance outwardly from and oriented transversely relative to the rechargeable battery cells 335 and the rechargeable Li-ion battery 332.

The highly conductive battery members 332*a*, 332*b* are made of relatively thick plate or bar material. The foil tabs or ends 335*a*, 335*b* of the battery cells 332*c* can at least partially or fully wrap around the highly conductive battery members 332*a*, 332*b*, as shown in FIGS. 64-66. Further, the highly conductive battery members 332, 332*b* are connected flat against the foil tabs or ends 335*a*, 335*b*, respectively, to maximize contact area therebetween.

The rechargeable battery cells 335 are covered with protective heat shrink material to package the rechargeable batteries 332.

The highly conductive battery members 332*a*, 332*b* are connected by highly conductive fasteners (e.g. nuts and bolts) to the highly electrically conductive frame such as highly electrically conductive frame 370 (FIGS. 56-62) of the portable jump starting devices 310.

Figure 31:
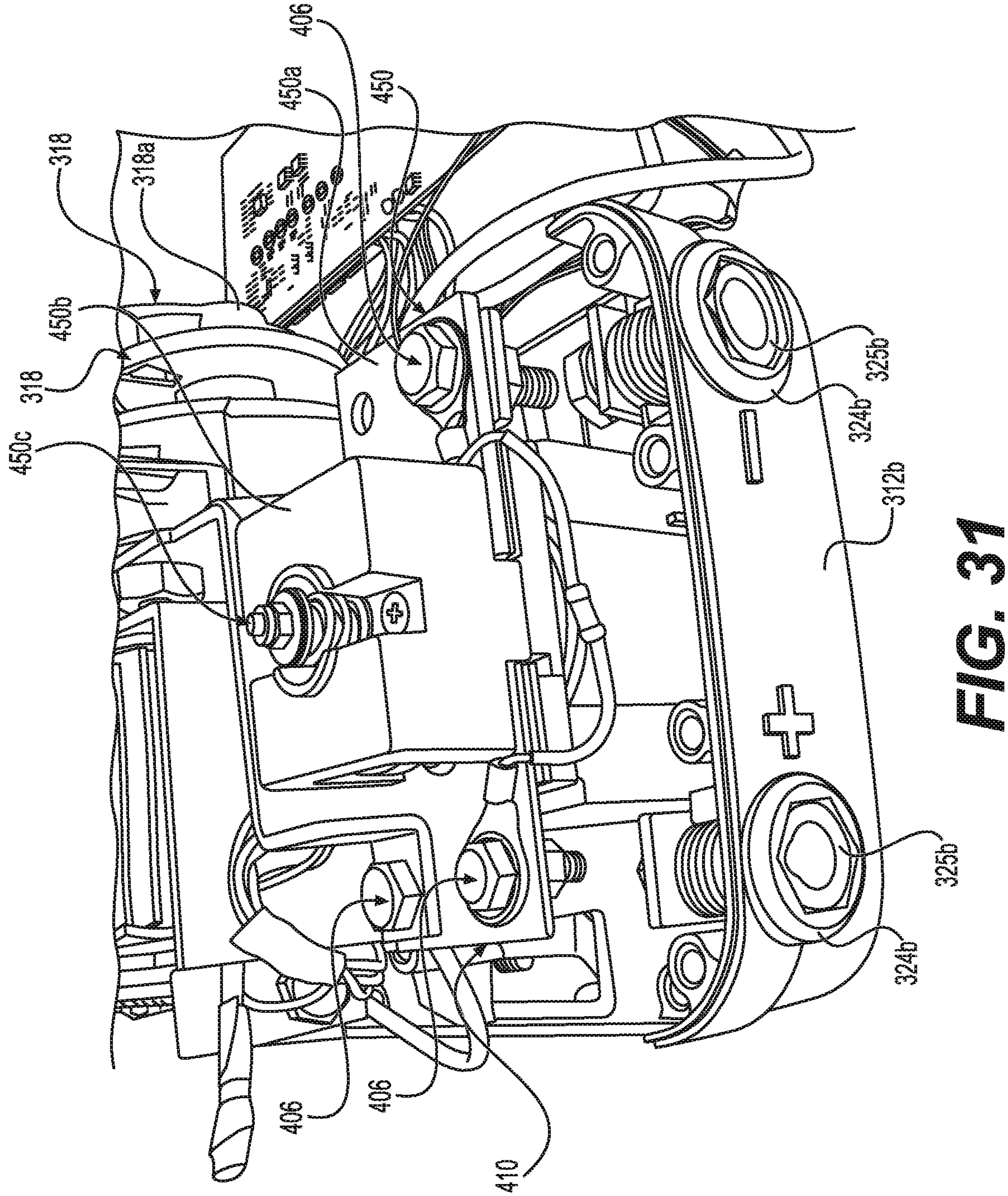
FIG. 31 is a disassembled partial left side perspective view of the battery jump starting device shown in FIG. 26 with the cover removed.
Figure 32:
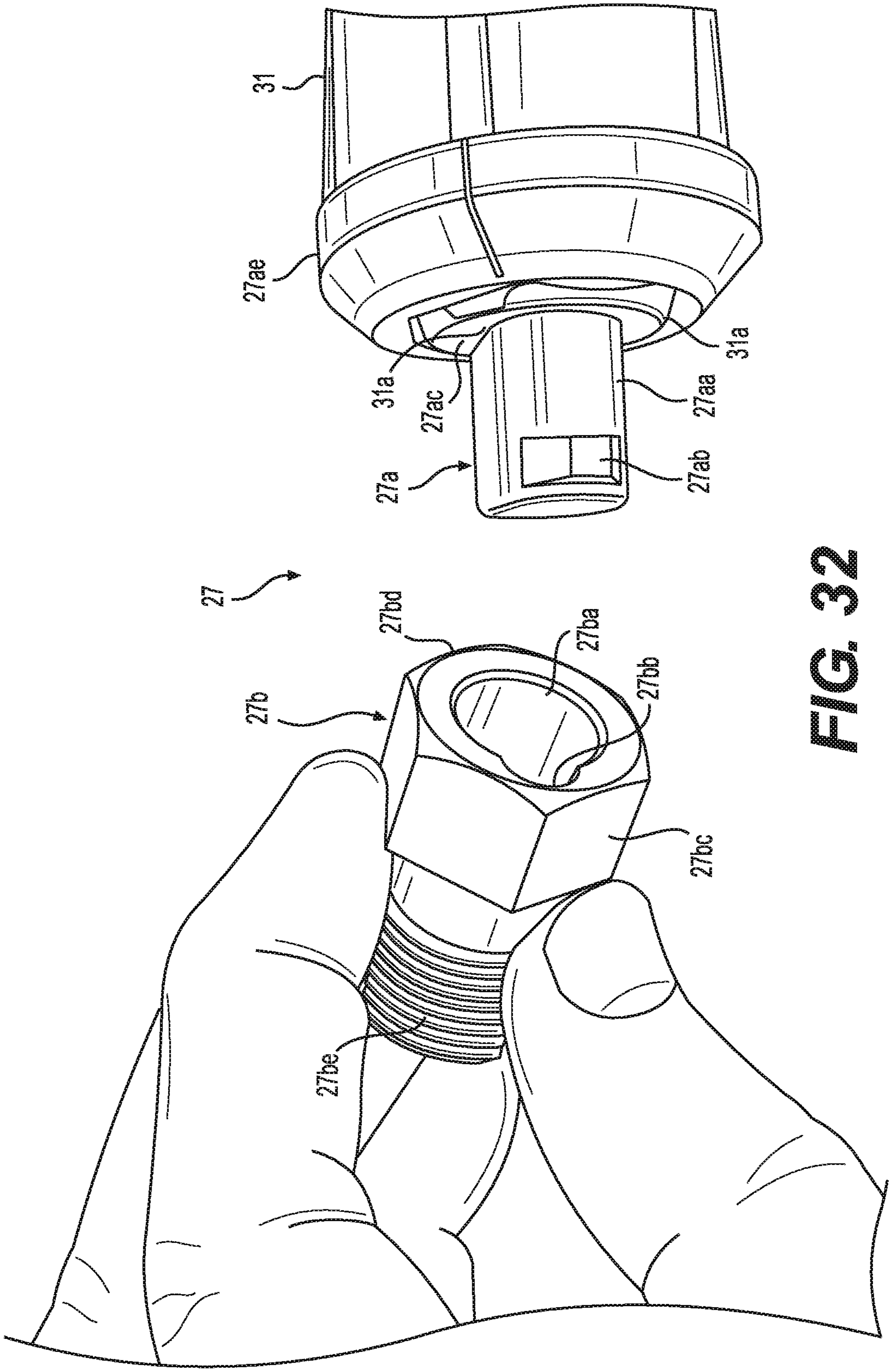
FIG. 32 is a perspective view of the cam-lock connecting device according to the present invention for use, for example, with the battery jump starting device according to the present invention shown with the male cam-lock end disconnected from the female cam-lock end.
Figure 33:
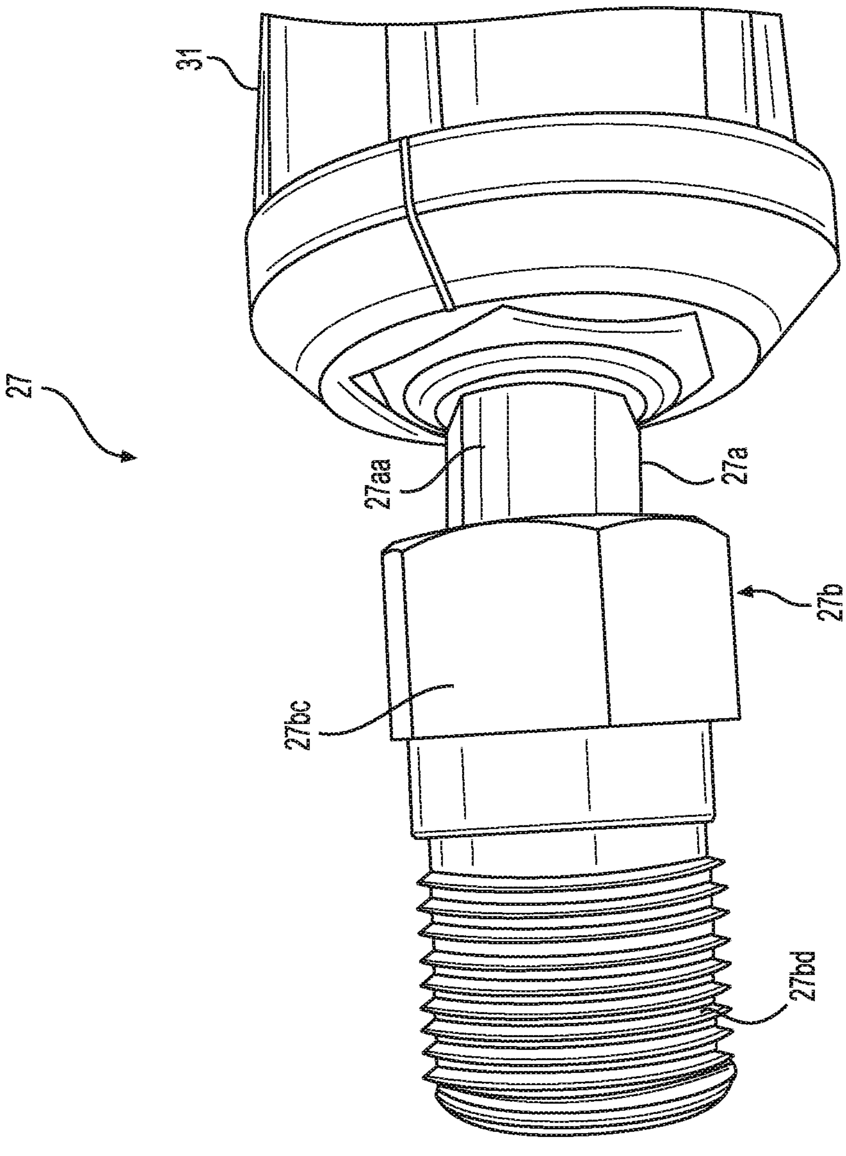
FIG. 33 is a perspective view of the cam-lock connecting device shown in FIG. 32 with the male cam-lock end partially connected to the female cam-lock end.

The rechargeable battery jump starting device 310 (FIG. 26-31) comprises the rechargeable battery assembly comprising one or more rechargeable battery cells having a positive terminal connector tab or end 335*a* (FIGS. 64-66) and a negative terminal connector tab or end 335*b*. A positive electrically conductive bar 332*a* is connected to the positive terminal connector tab or end 335*a* and a negative electrically conductive bar 332*b* is connected to the negative terminal connector tab or end 335*b*. The highly electrically conductive frame 370 (FIG. 56-62) is connected to the battery assembly 333 (FIG. 64-66). The positive battery cable 56 (FIGS. 9 and 10) is connected to the highly electrically conductive frame 370, for example, directly or through cam-locks 324*a*, 324*b* (FIG. 31). The negative battery cable 58 (FIGS. 9 and 10) is electronically connectable to the highly electrically conductive frame 370 via the smart switch 150 (also see smart switch 50 in FIGS. 9 and 10). The positive battery clamp 60 is connected to the positive battery cable 56 and the negative battery clamp 62 is connected to the negative battery cable 58.

The highly electrically conductive frame 370 comprises positive conductive pathways from the positive terminal connectors 332*a*, 332*a* of the rechargeable batteries 332, 332 of the rechargeable battery assembly 333 to the connection with the positive battery cable 56 (e.g. direct cable connection or via cam-lock 324*a*) and negative conductive pathways from the negative terminal connectors 332*b*, 332*b* of the rechargeable batteries 332, 332 of the rechargeable battery assembly 33 to the connection with the negative battery cable (e.g. direct cable connection or via cam-lock 324*b*).

As shown in FIGS. 64-66, the positive electrically conductive member 332*a* (e.g. highly conductive bar) and the negative electrically conductive member 332*b* (e.g. highly conductive bar) are both oriented transversely relative to a length or longitudinal axis of the rechargeable battery cells 335 of each rechargeable battery 332. More specifically, the positive electrically conductive member 332*a* and negative electrically conductive member 332*b* protrude from opposite sides of the rechargeable batteries 332 and the rechargeable battery assembly 333. Further, the positive electrically conductive member 332*a* and the negative electrically conductive member 332*b* are wider (FIG. 64) relative to a width of the rechargeable battery cells 335 and protrude from the opposite sides of the rechargeable battery cells 335 and the rechargeable battery assembly 333.

The positive terminal connector tab or end 332*a* is a positive terminal foil tab or end of the rechargeable battery cells 335 connected in series at one end and the negative terminal connector tab or end 332*b* is a negative foil tab or end of the rechargeable battery cells 335 connected in series at an opposite end. A side of the positive electrically conductive member 332*a* (i.e. highly electrically conductive bar 332*a*) is connected flat against the positive foil tab or end 335*a* of the series of rechargeable battery cells 335 and a side of the negative electrically conductive member 332*b* (i.e. highly conductive bar 332*b*) is connected flat against the negative foil tab or end 335*b* of the series of rechargeable battery cells 335. For example, the positive foil tab or end 335*a* and the negative foil tab or end 335*b* are soldered to the positive electrically conductive member 332*a* and the negative electrically conductive member 332*b*, respectively. Further, the positive electrically conductive member 332*a* (i.e. highly conductive bar 332*a*) and negative electrically conductive member 332*b* (i.e. highly conductive bar 332*b*) are each provided with a through hole 332*c* for connection with the highly electrically conductive frame 370 (FIG. 56).

To enhance the conductivity between the series of rechargeable battery cells 335 and the positive electrically conductive member 332*a* (i.e. highly conductive bar 332*a*) and negative electrically conductive member 332*b* (i.e. highly conductive bar 332*b*), the positive foil tab or end 335*a* and the negative foil tab or end 335*b* are at least partially or fully wrapped around the positive electrically conductive member 332*a* (i.e. highly conductive bar 332*a*) and negative electrically conductive member 332*b* (i.e. highly conductive bar 332*b*), respectively, and also soldered and/or welded thereto. The ends of the positive electrically conductive member 332*a* (i.e. highly conductive bar 332*a*) and negative electrically conductive member 332*b* (i.e. highly conductive bar 332*b*) protrude from the sides of the positive foil tab or end 335 and the negative foil tab or end 335*b*, respectively.

Again, the rechargeable battery cells 335 are connected in series and layered one on top of the other to provide the rechargeable battery assembly, as shown in FIGS. 64-66, to provide a stacked arrangement to make the rechargeable battery assembly 333 compact in size. The multi-layered battery cells 335 then covered with heat shrink material to package same.

The rechargeable battery assembly 332 used in a rechargeable jump starting device 310 comprises one or more rechargeable battery cells having a positive terminal connector; a negative terminal connector; a positive electrically conductive bar connected to the positive terminal connector; and a negative electrically conductive bar connected to the negative terminal connector.

Functional Block Diagram and Circuits

The functional block diagram of the rechargeable battery jump starting device 310 (FIG. 26) is shown in FIG. 67. The schematic circuit diagrams of the rechargeable battery jump starting device 310 are shown in FIGS. 68A-1 thru 68F-3.

The invention claimed is:

1. A rechargeable battery jump starting device with vehicle or equipment battery detection system, the device comprising:

- a first rechargeable battery having a positive terminal and negative terminal; a positive battery cable connected to the positive terminal of the first rechargeable battery;
- a vehicle or equipment positive terminal battery connector connected to the positive battery cable;
- a back-charge diode array connecting the positive terminal of the first rechargeable battery and the vehicle or equipment battery positive terminal battery connector;
- a negative battery cable connected to the negative terminal of the first rechargeable battery;
- a vehicle or equipment negative terminal battery connector connected to the negative battery cable; and
- a vehicle or equipment battery detection system associated with the rechargeable battery jump starting device for detecting a forward voltage drop across the back-charge diode array, the vehicle or equipment battery detection system including a detection circuit comprising an op amp subtractor or difference amplifier whose output is fed into a comparator,
- wherein, if a forward voltage drop is detected across the back-charge diode array, and if the voltage is above a specific threshold or external load of the vehicle or equipment battery connected to the positive and negative battery cables, then the comparator puts out a "high" signal, allowing the rechargeable battery jump starting device to continue normal operation.

2. The device according to claim 1, wherein the vehicle or equipment battery positive terminal connector is a positive battery clamp and the vehicle or equipment battery positive terminal connector is a negative battery clamp.

3. The device according to claim 1, further comprising a smart switch selectively connecting the negative terminal of the first rechargeable battery and the vehicle or equipment negative terminal battery connector.

4. The device according to claim 2, wherein, if the voltage is above the threshold, then the negative terminal of the first rechargeable battery continues being selectively connected to the vehicle or equipment negative terminal battery connector by the smart switch while the negative terminal of the first rechargeable battery remains connected to the vehicle or equipment negative terminal battery connector.

5. The device according to claim 1, further comprising a microcontroller unit having a jump starting device logic controlled by the microcontroller unit.

6. The device according to claim 3, wherein, if the forward voltage drop detected is below a specific threshold, then the comparator puts out a "low" signal, instructing the jump starting device logic controlled by the microcontroller unit to open the smart switch, disconnecting the negative battery terminal of the rechargeable battery of the rechargeable battery jump starting device from the negative battery cable, thus removing internal battery voltage from being applied across the positive and negative battery terminal connectors and rendering the positive and negative battery terminal connectors inactive or dead.

7. The device according to claim 1, wherein the back-charge diode array is connected along the positive battery cable.

8. The device according to claim 3, wherein the smart switch is connected along the negative battery cable.

9. The device according to claim 8, wherein the smart switch is connected along the negative battery cable.

10. The device according to claim 1, wherein a highly conductive frame connects the first rechargeable battery to the back-charge diode array.

11. The device according to claim 10, wherein highly conductive frame supports the back-charge diode array.

12. The device according to claim 3, wherein a highly conductive frame connects the first rechargeable battery to the smart switch.

13. The device according to claim 12, wherein the highly conductive frame connects the first rechargeable battery to the back-charge diode array.

14. The device according to claim 1, further comprising:

- a second rechargeable battery; and
- an electrical control switch electrically connected to the first rechargeable battery and the second rechargeable battery, the electrical control switch having a parallel switch position for connecting the first battery and second battery in parallel, the electrical control switch having a series switch position for connecting the first battery and second battery in series.

15. The device according to claim 14, further comprising a highly conductive frame connecting the first rechargeable battery, second rechargeable battery, and the electrical control switch, the highly conductive frame selectively connecting one or both of the positive terminals of the first rechargeable battery and second rechargeable battery to the back-charge diode array, and selectively connecting one or both of the negative terminals of the first rechargeable battery and the second rechargeable battery to a smart switch.

* * * * *